United States Patent [19]
Abiven et al.

[11] Patent Number: 6,122,267
[45] Date of Patent: Sep. 19, 2000

[54] METHODS, DEVICES AND SYSTEM FOR TRANSMISSION OF DIGITAL DATA

[75] Inventors: Anne Abiven, Rennes; Isabelle Amonou, Thorigne-Fouillard; Alain Caillerie, Rennes; Claude le Dantec, St Marc sur Couesnon; Bernard Revillet, Viroflay; Pascal Rousseau, Rennes, all of France

[73] Assignee: Canon Kabushiki Kaisha, Tokyo, Japan

[21] Appl. No.: 08/725,293

[22] Filed: Oct. 2, 1996

[30]     Foreign Application Priority Data

Oct. 2, 1995  [FR]  France ................................. 95 11573

[51] Int. Cl.⁷ ................................................. H04L 12/44
[52] U.S. Cl. ........................... 370/338; 370/346; 370/449
[58] Field of Search ................................... 370/279–281, 370/338, 345–349, 449

[56]             References Cited

U.S. PATENT DOCUMENTS

| | | | |
|---|---|---|---|
| 4,930,118 | 5/1990 | Sugihara | 370/16 |
| 5,206,881 | 4/1993 | Messenger et al. | 375/1 |
| 5,274,841 | 12/1993 | Natarajan et al. | 455/33.4 |
| 5,722,076 | 2/1998 | Sakabe et al. | 455/450 |

FOREIGN PATENT DOCUMENTS 495600  7/1992  European Pat. Off. .

OTHER PUBLICATIONS

Douglas Duet, "An Assessment Of Duplexing Methods For The Radio Links Of Personal Communication Systems", IEEE, pp. 131–135, Apr. 1992.

A. Santamaria et al., "Wireless LAN Systems", Artech House, pp. 13–17, 1994.

R. Fantacci et al., "Performance Evaluation of Preemptive Polling Schemes and ARQ Techniques for Indoor Wireless Networks", IEEE Transactions On Vehicular Technology, vol. 45, No. 2, pp. 248–257, May 1996.

Interfaces In Computing, vol. 3, No. 3/4, Dec., 1985, Lausanne CH, pp. 173–187, XP002005672, R.W. Robinson et al.: Interfacing to Ethernet using VLSI protocol chips.

Sigmod '88 Symposium: Communication Architectures and Protocols, Aout 1988, USA, pp. 134–145, XP002005673, C. Song et al.: "Optimizing bulk data transfer performance: A packet train approach".

Proceedings of the IEEE, vol. 82, No. 9, Sep. 1994, New York, U.S. pp. 1398–1430, XP000474894, K. Pahlavan et al.: "Wireless data communications".

*Primary Examiner*—Melvin Marcelo
*Attorney, Agent, or Firm*—Fitzpatrick, Cella, Harper & Scinto

[57]              ABSTRACT

The methods for transmission of sequences or frames of data provide for retransmitting, with a central device (21), frames of data which reach it, to destination devices, by transmission of downlink frames when the destination device is a peripheral device (24), each downlink frame having systematically a service message activating a protocol controlling access to the transmission medium shared by the central device (21) and the peripheral devices (24), and possibly a frame of data. The central device (21) and at least one peripheral device (24) form a system which is particularly well suited to a local area network, notably with a wireless transmission medium.

124 Claims, 76 Drawing Sheets

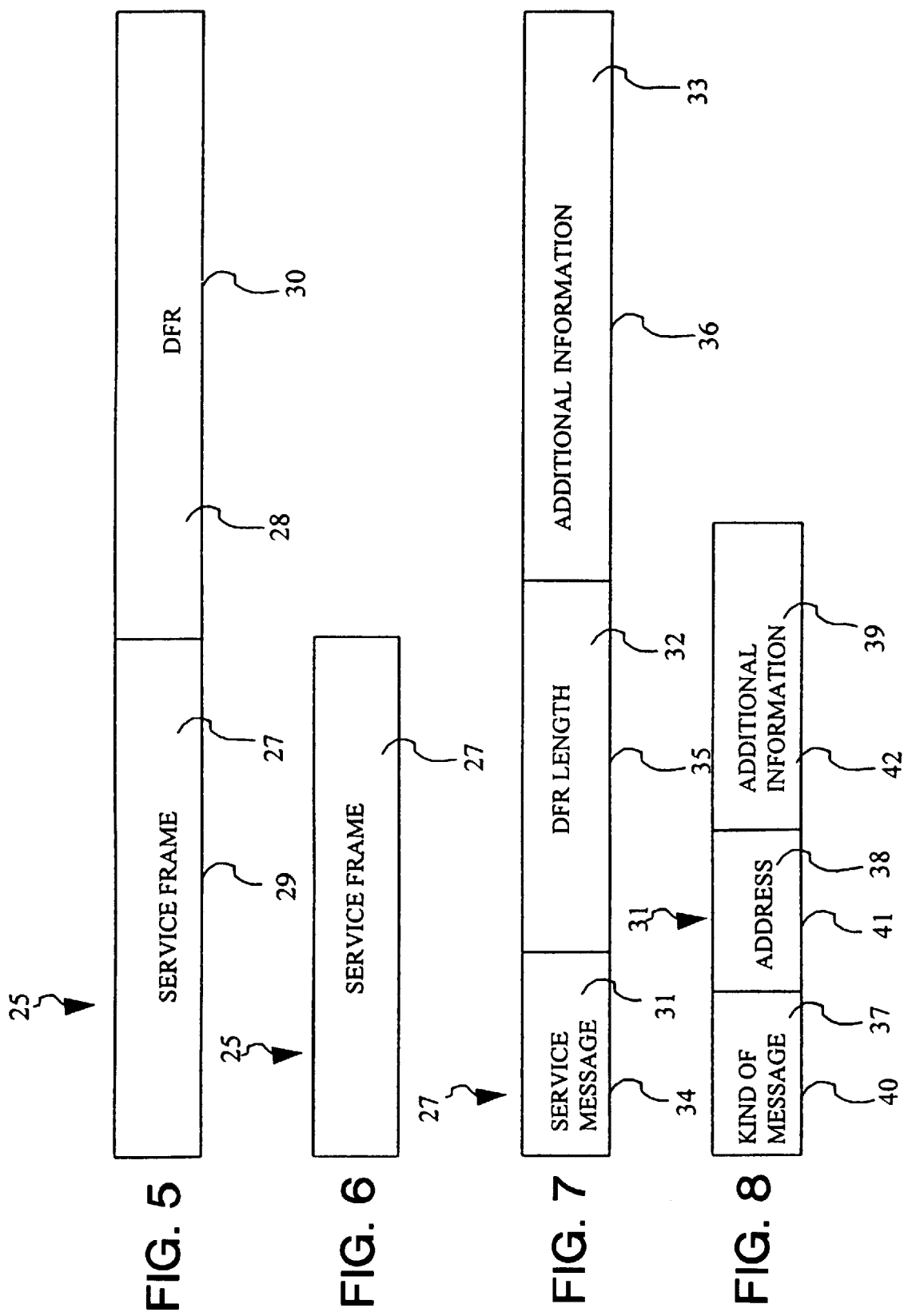

METHODS, DEVICES AND SYSTEM FOR TRANSMISSION OF DIGITAL DATA

The invention concerns the transmission of digital data, particularly but not exclusively in local area networks (LAN).

An example of such a network is described below, with the aid of FIGS. 1 to 3 of the accompanying drawings, in which.

Figure 1:
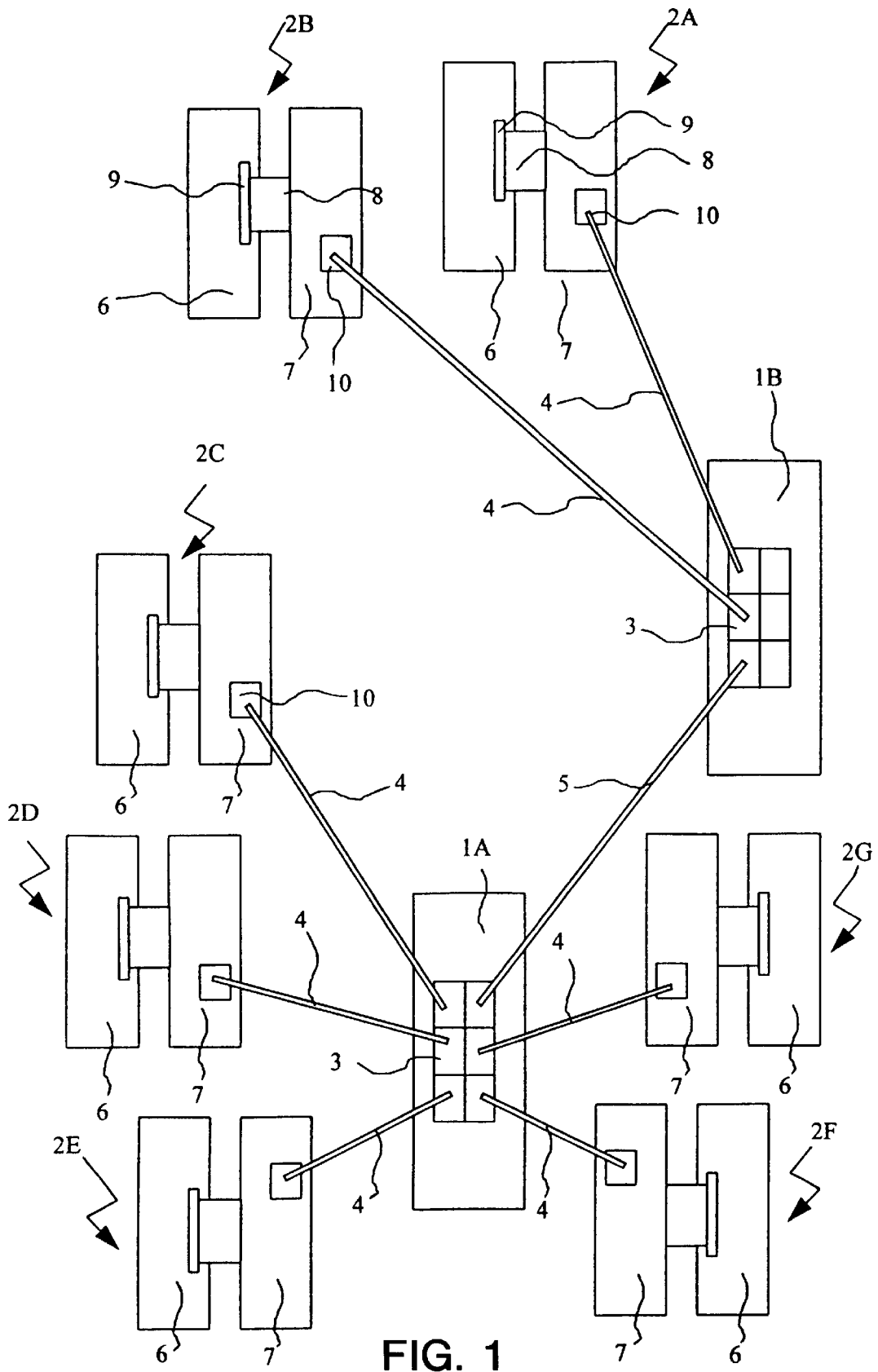
FIG. 1 illustrates the topology of this example of a network.

The network illustrated in FIG. 1 is in accordance with IEEE recommendation 802.3 type 10Base–T. It includes two concentrators (hub) 1A and 1B and data stations 2A to 2G.

Each of the concentrators 1A and 1B has a set of ports 3 for twisted-pair cables 4 or 5, designed here for six cables.

The assembly 3 of the concentrator 1A is fully occupied, five of its ports each receiving one of the end connectors of a cable 4, the other end connector of which is plugged into a respective one of the stations 2C to 2G, the sixth port receiving one of the end connectors of the cable 5, the other end connector of which is plugged into one of the ports of the assembly 3 of the concentrator 1B.

Only two other ports of this assembly are occupied, each by one of the end connectors of a cable 4, the other end connector of which is respectively plugged into the station 2A or into the station 2B.

The station 2A has a data processing terminal 6 of the personal computer type and an individual networked communication means 7 of the LAN adaptor card type conforming to the aforementioned recommendation, normally referred to as an Ethernet® card, this card 7 having a male ISA bus connector 8 engaged in the female ISA bus connector 9 of the personal computer 6, and a port 10 for receiving the end connector of a twisted-pair cable.

The data stations 2B to 2G are identical to the station 2A, with however some stations where the terminal 6 is not a personal computer but a printer, a file server or another type of data processing terminal.

Each of the cables 4 and 5 has at both ends a connector provided with two pairs of pins, each connector being adapted to be plugged into a port 10 or into one of the ports of an assembly 3, each of these ports having, for each aforementioned pin, a corresponding pin with which an electrical contact is established when the connector is plugged therein.

More precisely, the pairs of pins of the ports 10 in respective contact with the pins of first and second pairs of the connector which is plugged therein, serve respectively for sending and receiving, whilst in the ports of an assembly 3 the pair of pins in contact with the first pair of pins of the connector serves for receiving, and that which is in contact with the second pair of pins, for sending.

The cables 4 are of the direct type, that is to say the first pair of pins of one of the end connectors is connected by a pair of conductors to the first pair of pins of the other end connector, and likewise for the second pairs of pins, whilst the cable 5 is of the crossed type, that is to say the first pair of pins of each of its end connectors is connected by a pair of conductors to the second pair of pins of the other end connector.

The concentrators 1A and 1B function as follows: each time a signal conveying information is present at the reception pins of one of the ports of the assembly 3, this signal is repeated at each of the other ports of this assembly on the sending pins. Where a collision occurs, that is to say the simultaneous presence of a signal on a pair of reception pins at two different ports, the concentrator produces an interference sequence at each pair of sending pins, in order to warn the data stations that a collision has occurred.

If for example the station 2A produces a burst transmitting a data frame at the sending pins of its port 10, the concentrator 1B repeats this burst at the pair of sending pins of the port where the connector of the cable 4 which connects it to the station 2B is plugged in and at the pair of sending pins of the port where the connector of the cable 5 is plugged in, so that this burst arrives at the pair of reception pins of the port 10 of the station 2B and at those of the port of the assembly 3 of the concentrator 1A where the cable 5 is plugged in, this burst consequently being repeated once again at the pair of sending pins of the other ports of this assembly 3, this burst thus arriving at the pair of reception pins of the port 10 of each of the stations 2C to 2G.

More generally, each time one of the data stations 2A to 2G produces at the sending terminals of its port 10 a burst transmitting a data frame, this burst reaches the reception terminals of the port 10 of each of the other data stations, in the absence of a collision.

A description will now be given, with the help of FIGS. 2 and 3, of how, in the data stations, the terminals 6 cooperate with the individual networked communication means (MICR in the drawings) 7, so that any one of the terminals 6 can transmit data to another terminal 6 provided, as explained below, with the same network operating system.

To enable each of the data stations to be identified, each individual means 7 is allocated an address (@in the drawings) 11 for controlling access to the medium (MAC address—Medium Access Control), an address which is peculiar to it.

During this operation, the terminal 6 delivers to the means 7, in the manner explained below, data sequences each accompanied by a destination address, and on each occasion the means 7 prepares a data frame 12 (FIG. 3) including the data sequence delivered and the destination address accompanying it, which corresponds to the address 11 of the individual means 7 of the terminal 6 for which this data sequence is destined.

The format of the frame 12 is fixed by the protocol controlling access to the medium (MAC protocol) used in the network. In general, if fixes at the start of the frame the position of the field 13 containing the destination address, this field being followed by an additional-information field 14 and then a field 15 containing the data sequence.

Thus, in IEEE recommendation 802.3, the destination address field 13 extends over six octets from the start, the additional information field 14 over eight octets, and the data sequence field 15 over forty six to one thousand five hundred octets (where the length of the data sequence is less than forty six octets, a padding is added to it in order to achieve this minimum). The additional information field is subdivided into a source address field which contains the address 11 of the individual means 7 which prepared the data frame and a length field which indicates the number of octets in the field 15, the source address field occupying the first six octets of the field 14 and the length field the last two octets.

The data frame format provided for by the Xerox® Ethernet® protocol is similar, but with the last two octets of the additional information field representing the type of data rather than the length of the field 15.

More generally, when the individual means 7 receives from its terminal 6 a data sequence accompanied by its destination address, it sends over the cable 4, at a time which it determines in accordance with the access control protocol, a burst transmitting the data frame 12 corresponding to this data sequence and to this destination address.

Each burst begins with a synchronisation prefix and conveys, in addition to the bits peculiar to the data frame 12, error detection bits, grouped in a termination.

The nature of the prefix and the overall composition of the bit stream thus conveyed by each burst are also fixed by the protocol controlling access to the medium.

Thus, in IEEE 802.3, the prefix is formed by the encoding of a bit synchronisation acquisition preamble extending over seven octets, and a start-of-frame delimiter extending over one octet, whilst the termination is formed by a redundancy check with a length of four octets.

The prefix and the termination of the bit stream provided for in the Xerox Ethernet standard are similar, the preamble encoded in the prefix containing six bits more.

Finally, when the individual means 7 receives, over the cable 4, a burst which transmits a data frame, it isolates therein, in accordance with the format fixed by the protocol controlling access to the medium, the destination address appearing therein, it compares this with the address 11 which is peculiar to it and, if there is correspondence, it isolates in the data frame the data sequence which appears therein and delivers it, in the manner explained below, to its terminal 6.

The latter is adapted, with regard to its programs, to cooperate with the individual means 7 because it is provided on the one hand with a network operating system supplying a logic interface and on the other hand a driver for the individual means 7, compatible with this interface.

This is for example of the NDIS type (MICROSOFT® specifications) or of the ODI type (NOVELL® specifications).

It is by virtue of the aforementioned two programs that each terminal 6 is adapted, through the logic interface, to have data sequences delivered to it by its individual means 7, and to deliver such sequences to the latter each accompanied by a destination address.

It can be seen that the concentrators 1A and 1B and the cables 4 and 5 fulfil the role of a transmission medium shared by the stations 2A to 2G, by means of which the latter transmit data to each other. It is clear that such a transmission medium can be produced for a greater or lesser number of data stations, by using more or fewer concentrators and cables 4 and 5.

Many other ways of producing a shared transmission medium are known, for example using a coaxial cable to which the data stations are each connected by a T connection, as provided for in IEEE recommendation 802.3 type 10Base-2, or by using carrier currents or radio or infrared waves, or even by combining the use of these different physical media.

With regard to the protocol controlling access of the different stations to the transmission medium (MAC protocol), the one provided for by IEEE recommendation 802.3 is of the CSMA/CD type—Carrier Sense Multiple Access/Collision Detection: when a station is attempting to transmit data, it listens on the transmission medium, and as soon as it becomes free it transmits its data whilst listening to see whether a collision occurs, in which case it ceases to send, observes a waiting period of random duration, and attempts to send once again.

Other protocols for controlling access to a shared transmission medium are also known, notably of the TDMA type—Time Division Multiple Access—in which the stations are able to transmit only in a time slot which has been allocated to them, and of the polling type, in which the stations can transmit only if a central networked communication means has invited them to do so by means of a special message.

The number of data frame bits which a digital communication means can transmit per unit of time by means of a shared transmission medium, that is to say the rate available to it, depends on many factors and notably the passband procured by the transmission medium used, the synchronisation time of each frame, the protocol controlling access to this medium, the number of communication means sharing the medium, and the speed of these communication means.

The aim of the invention, in general terms, is to allow a high transmission rate under advantageous conditions from the topological point of view.

To this end, it proposes, firstly, a method of transmitting data frames between digital communication means, characterised by the following operations:

A) Providing:

that at least one said digital communication means is a peripheral digital communication means, each said peripheral means transmitting and/or receiving the said data frames by means of a shared transmission medium; and a central digital communication means communicating with each said peripheral means by means of the said shared transmission medium, by receiving uplink frames each coming from a said peripheral means and by broadcasting downlink frames to each said peripheral means;

B) with the said central means, retransmitting or not, according to a first pre-set rule, each data frame appearing in the uplink frames reaching it, to a destination digital communication means for this data frame; and C) with the said central means, in each said downlink frame, including:

a service message activating a protocol for controlling access to the said shared transmission medium; and a data frame if, according to a second preset rule, there is one to be included in this downlink frame in order to retransmit it to a peripheral means; each said downlink frame thus having systematically a said service message and possibly a said data frame.

The transmission method according to the invention makes it possible to benefit both from the advantage presented, from a topological point of view, by the existence of a central communication means retransmitting the data frames reaching it, and from the convenience of a protocol controlling access to service messages, without for all that there being any additional time necessary for activating the protocol or for retransmitting the data frames, since conveying a service message and, if applicable, a data frame in a single downlink frame takes much less time than if the service messages and data frames were transmitted in separate downlink frames.

This is because each of these separate frames would, in order to be transmitted, have had to have had a prefix, whilst, with the downlink frame provided by the invention, a single prefix suffices to transmit a service message and a data frame.

It will be observed that the greater the time required for synchronisation (long prefix), the more time is saved by the invention, so that the invention is particularly advantageous with a wireless transmission medium, for example using radio waves.

According to respective characteristics which are preferred as enabling the invention to be implemented simply and conveniently:

the said operation A) also involves providing that each said peripheral means communicates, by means of the said shared transmission medium, only with the central means; and the said first preset rule implemented in operation B) is to retransmit systematically, with the central means, the data frames appearing in the uplink frames reaching it, to their destination digital communication means.

According to other preferred characteristics, the access control protocol activated by the said service messages is of the polling type.

Such a protocol in fact offers the advantage of allowing particularly fine control of the traffic on the shared transmission medium, as well as a high level of security, since a peripheral means can have access to the shared transmission medium only if it is known to the central means.

According to other preferred characteristics of the method according to the invention:

each said service message indicates to each said peripheral means whether or not it is authorised to transmit an uplink frame, in return, that is to say as soon as the shared medium becomes free to transmit an uplink frame after broadcast of this service message; and it includes the operation, with each peripheral means, of transmitting an uplink frame only in return for a service message authorising it.

Implementation of the invention is thus particularly easy with regard to the peripheral means, unlike for example some protocols of the polling type where the peripheral means receive scheduling lists which oblige them to monitor the activity of the other peripheral means so as to be able to know the situation in time of the instants allocated to them in the scheduling lists, in order to transmit.

Preferably, in order to allow effective control and management of the peripheral means:

the said operation A) also involves making provision in the central means for a table having, for each peripheral means, an address specific to it; and the method also includes the operation of carrying out, with the central means, iteratively from start-up, a series of operations including an operation of preparing an authorisation-to-send message indicating to the peripheral means with a current address that it is authorised to transmit an uplink frame in return, with the transition from one said series to the next which is made each time that an operation to include a said authorisation-to-send message as a service message is carried out in the said operation C), each said series including the operation of taking a new address in the said table as the current address.

In particular, in a particularly simple embodiment, the said new address is the following address in the said table, according to a circular rotation.

The method according to the invention preferably involves the operation of carrying out, with the central means, iteratively from start-up, a series of operations including an operation of preparing an authorisation-to-send message indicating to a peripheral means that it is authorised to transmit an uplink frame in return, an operation of placing this authorisation-to-send message in a waiting condition, then an operation of awaiting an acknowledgment signal for this authorisation-to-send message, before proceeding to a next said series of operations.

The central means can thus perform in parallel the preparation of the service messages of the authorisation-to-send message type, and the preparation of the downlink frames, which enables it to offer particularly fast reaction times.

The said operation C) preferably includes, for each said downlink frame, the operation of including, as a service message: either an authorisation-to-send message indicating to a peripheral means that it is authorised to transmit an uplink frame in return, or a no-authorisation-to-send message indicating to each said peripheral means that it is not authorised to transmit in return, with the said inclusion operation which includes an operation of determining, according to a third preset rule, whether it is a said authorisation-to-send message or a said no-authorisation-to-send message which is to be included in this downlink frame.

The central means thus has the possibility of stopping, by transmitting no-authorisation-to-send messages, in accordance with this third rule, the transmission of the uplink frames by the peripheral means, which enables it for example, in the event of saturation of its buffers, to prevent data frames transmitted by the peripheral means from being lost.

According to other preferred characteristics:

the said operation B) includes the operation of placing in a state of awaiting retransmission each data frame appearing in the uplink frames reaching the central means; and the said operation C) includes, for each said downlink frame, an operation of preparing this downlink frame including the operation of including in this downlink frame a data frame, if there is at least one awaiting retransmission at the time of execution of the preparation operation, the said second preset rule being to include, in a downlink frame, a data frame as soon as there is one awaiting retransmission.

The time taken for routing data frames from one peripheral means to another thus remains relatively limited, since putting the data frames in a waiting state, that is to say storing them, also makes it possible to prepare the data frames in a particularly convenient fashion.

Preferably:

the said operation A) also includes making provision in the central means for:

at least one buffer of a first type for storing an uplink frame and for preparing a downlink frame including a data frame;

a buffer of a second type for preparing a downlink frame with no data frame;

the said placing in a state of awaiting retransmission operation includes, for each data frame appearing in the uplink frames reaching the central means, an operation of writing this data frame in a said buffer of a first type, and an operation of putting the location of this buffer in a queue;

each said operation of preparing a downlink frame includes an operation of determining the presence or not of a location in the said queue and, in the affirmative, an operation of taking the location which meets a first preset selection rule, and then an operation of writing a service message into the buffer of a first type at this location and, in the negative, an operation of writing a service message into the buffer of a second type.

In this way use of the memory is optimised, by avoiding manipulating the data frames directly.

In a first embodiment, the said first preset selection rule is to take the location which was the first to be put in the said queue.

In this way each of the data frames is dealt with equitably, which is particularly efficient in certain types of system.

In a second embodiment, the said first preset selection rule is to take the location where the data frame having the highest predetermined level of priority is situated.

This embodiment is of interest in other communication systems, where certain data stations require a particularly quality of service.

According to other characteristics, the method according to the invention includes the operation of performing, with the central means, iteratively as from start-up, a series of operations including:

an operation of preparing a said downlink frame, using the said operation C), and then an operation of transmitting this downlink frame.

By choosing thus to carry out sequentially the preparation and then the transmission of each data frame, the use of this central means is made particularly simple.

Alternatively, with a more elaborate use of the central means, in order to save time:

the said operation A) includes making provision, in the central means, for a queue for transmission of a downlink frame(s), having a number of predetermined location(s); and it also includes the operation of carrying out, with the central means, in parallel:

iteratively after start-up, a first series of operations including an operation of preparing a downlink frame, using the said operation C), and then an operation of determining the presence or not of a free location in the said queue and, in the affirmative, an operation of putting this downlink frame in the said queue; and iteratively after start-up, a second series of operations including an operation of determining the presence or not of at least one downlink frame in the said queue and, in the affirmative, an operation of taking that which meets a second preset selection rule, an operation of releasing the location it occupied in the said queue, and an operation of transmitting this downlink frame.

In a first embodiment, in the said second series of operations, when the said operation of determining the presence or not of at least one downlink frame in the said queue is negative, there is a wait, with no downlink frame transmission, until there is at least one downlink frame in the said queue.

The absence of transmission of a downlink frame when there is none to be transmitted, makes it possible to avoid congestion on the shared transmission medium and to economise on computing time to a certain extent.

In a second embodiment, in the said second series of operations, when the operation of determining the presence or not of a downlink frame in the said queue is negative, an operation is carried out of transmitting a pre-prepared downlink frame including, as a service message, a no-authorisation-so-send message indicating to each said peripheral means which is not in return authorised to transmit an uplink frame.

In this way the shared transmission medium is not left unoccupied, which, in certain circumstances, can be useful with regard to synchronisation.

According to other preferred characteristics:

the said operation A) includes making provision, as a said shared transmission medium, for a half-duplex transmission medium, that is to say a medium which is free for transmitting an uplink or downlink frame only when there is transmission of neither an uplink nor a downlink frame;

the method also includes the implementation, with the central means, of a continuous operation of determining whether or not a period of authorisation to transmit a downlink frame is currently elapsing, such a period being in the course of elapsing at all times except between each:

first instant at the end of transmission of a downlink frame which contains a service message indicating that a said peripheral means is authorised to transmit an uplink in return, that is to say as soon as the shared medium becomes free for transmitting an uplink frame after broadcast of this service message, and second instant when either a period of a predetermined length as from this first instant has elapsed without the central means having received an uplink frame, or the central means has finished receiving an uplink frame which it started to receive before the said period of predetermined length had elapsed; and each operation of transmitting a downlink frame starts with an operation of waiting, if necessary, for a said period of authorisation to be in the course of elapsing.

In this way the occupation of the transmission medium is managed with the central means in a particularly easy way.

Each operation of transmitting a downlink frame preferably includes, after the said operation of waiting if necessary for a said period of authorisation to be in the course of elapsing, an operation of initiating the sending of a burst transmitting this downlink frame and then an operation of waiting until the sending of this burst is finished.

This waiting operation offers the advantage of enabling the central means to avoid subsequently, when it attempts to transmit a downlink frame, having to detect whether or not it is already sending a burst.

Each operation of transmitting a downlink frame preferably includes, after the said operation of waiting until sending of the burst transmitting this downlink frame is finished, an operation, if this downlink frame contains a data frame, of releasing a buffer having served for storing this data frame and preparing this downlink frame.

In this way a particularly simple and efficient management of the memory of the central means is effected.

Alternatively, according to circumstances:

the said operation A) also includes making provision, as a said shared transmission medium, for a full-duplex transmission medium, that is to say a medium which is free for transmitting an uplink frame independently of the transmission of a downlink frame, and vice-versa;

it also includes the implementation, with the central means, of a continuous operation of determining whether or not a period of authorisation to transmit a downlink frame is currently elapsing, such a period being in the course of elapsing at all times except between each:

first instant at the end of transmission of a downlink frame which contains a service message indicating that a said peripheral means is authorised to transmit an uplink in return, that is to say as soon as the shared medium becomes free to transmit an uplink frame after broadcast of this service message, and second instant where the central means has finished receiving this uplink frame; and each operation of transmitting a downlink frame starts with an operation of waiting, if necessary, for a said period of authorisation to be in the course of elapsing.

Just as when the shared transmission medium is half-duplex, occupation of the transmission medium is thus managed with the central means in a particularly easy way.

Preferably, each operation of transmitting a downlink frame includes, after the said operation of waiting if necessary for a period of authorization to be in the course of elapsing, an operation of initiating the sending of a burst transmitting this downlink frame, then:

in the case where this downlink frame contains a service message indicating that a said peripheral means is authorised to transmit an uplink frame in return, an operation of waiting for a predetermined moment during the sending of this burst, then an operation of waiting a predetermined time, then an operation of waiting until the sending of this burst is finished; or in the contrary case, immediately an operation of waiting until the sending of this burst is finished.

Just as when the transmission medium in half-duplex, this waiting operation offers the advantage of enabling the central means to avoid subsequently, when it seeks to transmit a downlink frame, having to detect whether or not it is already in the process of sending a burst.

Preferably, each operation of transmitting a downlink frame includes, after the said operation of waiting until the sending of the burst transmitting this downlink frame is finished, an operation, if this downlink frame contains a data frame, of releasing a buffer which has served for storing this data frame and for preparing this downlink frame.

Just as when the transmission medium is half-duplex, a particularly simple and efficient management of the memory of the central means is thus effected.

According to other preferred characteristics, the said operation A) also includes providing that the said shared transmission medium is wireless.

The invention is in fact particularly well suited to a wireless transmission medium, which affords mobility of the peripheral means, flexibility of the system and a greatly reduced or even non-existent infrastructure cost.

Preferably, the said shared transmission medium is of the radio type, and the central means and each said peripheral means encode the streams of bits which they transmit by means of the said medium, by spectrum spreading.

The invention is in fact particularly well suited to this type of wireless transmission medium and to this encoding method.

According to other preferred characteristics:

the said operation A) also includes making provision for the central means to communicate with at least one digital communication means, which is not a said peripheral means, by means of a transmission medium distinct from the said shared transmission medium, by sending and/or receiving data frames; and the said operation B) involves retransmitting or not:

according to the said first preset rule, each data frame appearing in the uplink frames reaching it, intended for a said digital communication means which is not a peripheral means, by means of the said distinct transmission medium; and according to a fourth preset rule, each data frame which it receives by means of the said distinct transmission medium, intended for a peripheral means, by means of the said shared transmission medium.

Effecting the interconnection between two transmission systems each having its own transmission medium, with the central means, is particularly advantageous because of the retransmission of data frames performed by this means.

Preferably, the said fourth preset rule is to retransmit systematically, with the central means, the data frames reaching it by means of the said distinct transmission medium, to the destination peripheral means.

This rule offers the advantage of simplicity and avoiding a waste of resources.

According to other preferred characteristics, the said operation A) also includes making provision in the said central means for:

a memory for storing a table having, for each peripheral means, an address which is specific to it; and a connector in order to enter the said table into it.

The fact that the user enters the table himself offers a certain degree of security vis-a-vis attempts to intrude in the system.

It will be noted that, in general, the peripheral means provided in this system have characteristics corresponding to those which have just been disclosed for the central means, characteristics which obviously offer the same advantages.

The invention also proposes a method for transmitting digital data between terminals each intended to cooperate with an individual networked communication means assigned with an address which is specific to it, each said terminal being adapted:

to deliver, in a predetermined manner, to its individual networked communication means, sequences of user data each accompanied by a destination address corresponding to the address specific to the individual networked communication means of the terminal for which the sequence of data it accompanies is intended; and/or to allow sequences of user data to be delivered to it, in a predetermined manner, by its individual networked communication means;

each said individual networked communication means being intended to send and/or receive, over a transmission medium, bursts each transmitting a stream of bits, in a manner allowing it to be identified from the first to the last bits, and being adapted:

for each said sequence of user data accompanied by a destination address which its terminal has delivered to it, to prepare a data frame including, arranged according to a predetermined format, this sequence of data and the destination address which accompanies it;

for each data frame prepared, to send over the said transmission medium a burst transmitting a stream of bits including this data frame; and for each burst which it receives by the said transmission medium, to determine whether a data frame appears in the stream of bits transmitted by this burst, and if a data frame is present therein, to isolate in the latter, in accordance with the said predetermined data frame format, the said destination address which appears in it, to compare whether this address corresponds to that which is specific to it, and if there is correspondence, to isolate in this data frame the sequence of data which appears there, and to deliver it to its terminal;

method characterised in that it includes operations of transmitting data frames between said individual networked communication means, which are carried out in accordance with the method which has just been disclosed.

The invention also proposes, in a second aspect, a central digital communication device suitable for the implementation of the methods which have just been disclosed, as a said central digital communication means, characterised in that it includes:

means for communicating with at least one peripheral digital communication device by means of a shared transmission medium, by receiving uplink frames each coming from a said peripheral device and by broadcasting downlink frames to each said peripheral device, adapted so that said uplink and downlink frames include data frames;

means for retransmitting or not, according to a first preset rule, each data frame appearing in the uplink frames reaching it, to a destination digital communication device for this data frame; and means for including in each said downlink frame:
    a service message activating a protocol for controlling access to the said shared transmission medium; and
    a data frame if, according to a second preset rule, there is one to be included in this downlink frame in order to retransmit it to a peripheral means;

each said downlink frame thus having systematically a said service message and possibly a said data frame.

The invention also proposes, under this second aspect, peripheral digital communication device suitable for implementing the methods which have just been disclosed, as a said peripheral digital communication means, characterised in that it has:

means for communicating with a central digital communication device by means of a shared transmission medium, by transmission of uplink frames to the said central device and by reception of downlink frames from the said central device, adapted so that said uplink and downlink frames include data frames;

means for including in the uplink frames which it transmits, data frames intended for a digital communication device other than the said central device; and means for extracting from each said downlink frame reaching it:
    a service message activating a protocol for controlling access to the said shared transmission medium; and
    a data frame, if there is one included in this downlink frame;

each said downlink frame having systematically a said service message and possibly a said data frame.

The invention finally proposes, under this second aspect, a digital communication system suited to the implementation of the methods which have just been disclosed, including a said central device and at least one said peripheral device.

It should be noted, in general terms, as far as terminology is concerned, with regard to the embodiments of the central means or device and peripheral means or device in which there are buffers for storing uplink frames, downlink frames and data frames, that it is considered:

that an uplink frame or a downlink frame has arrived or been received respectively at and by the central means or device, and at or by a peripheral means or device, only if it goes as far as being written in a buffer; and that in particular the uplink or downlink frames which could not be written in such a memory, for example for reasons of saturation, must not be considered to have arrived or to have been received; and that for the peripheral means or devices, in a similar manner, a data frame has been fully prepared only when it has been put in a buffer.

Figure 4:
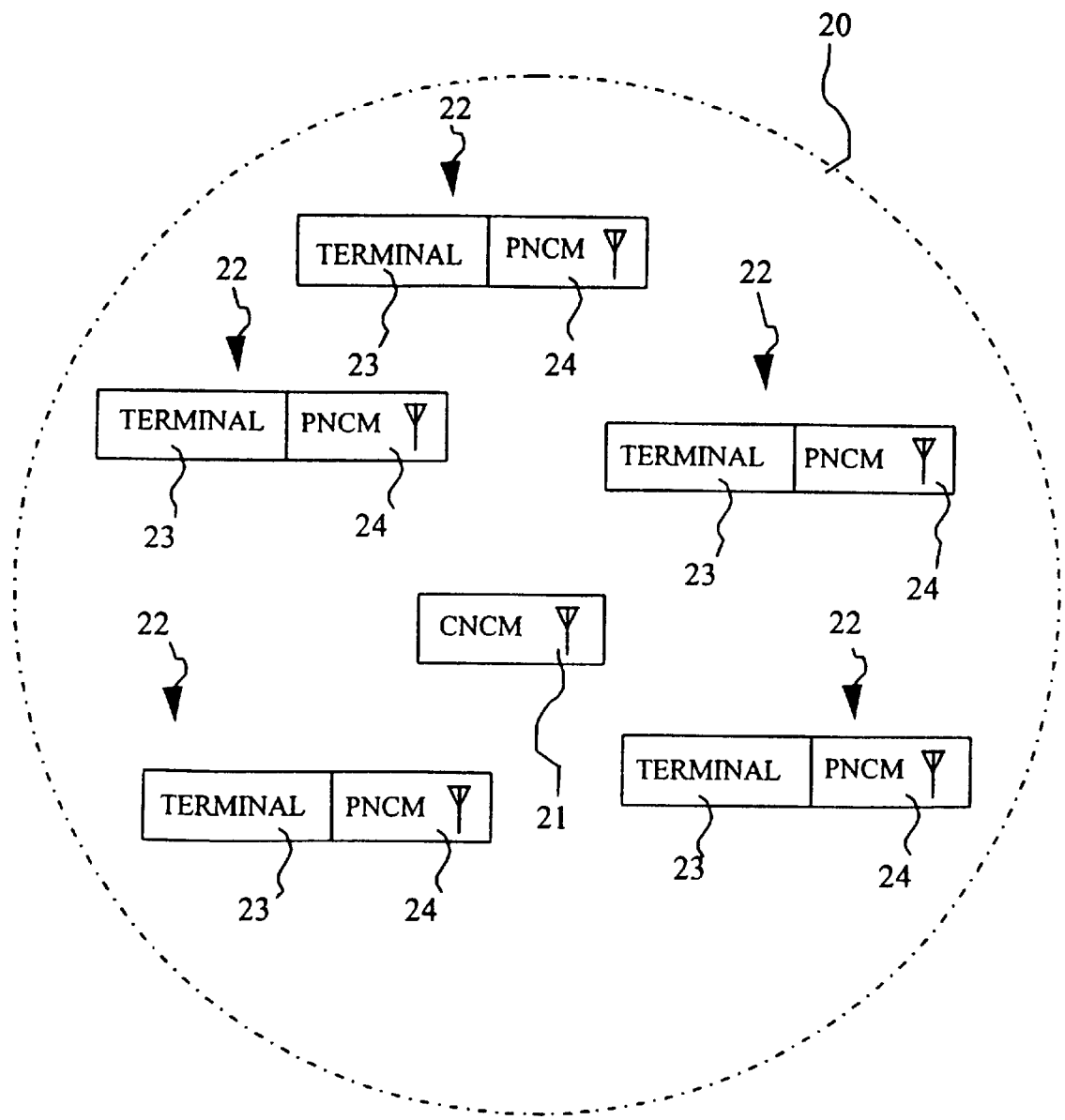
Figure 9:
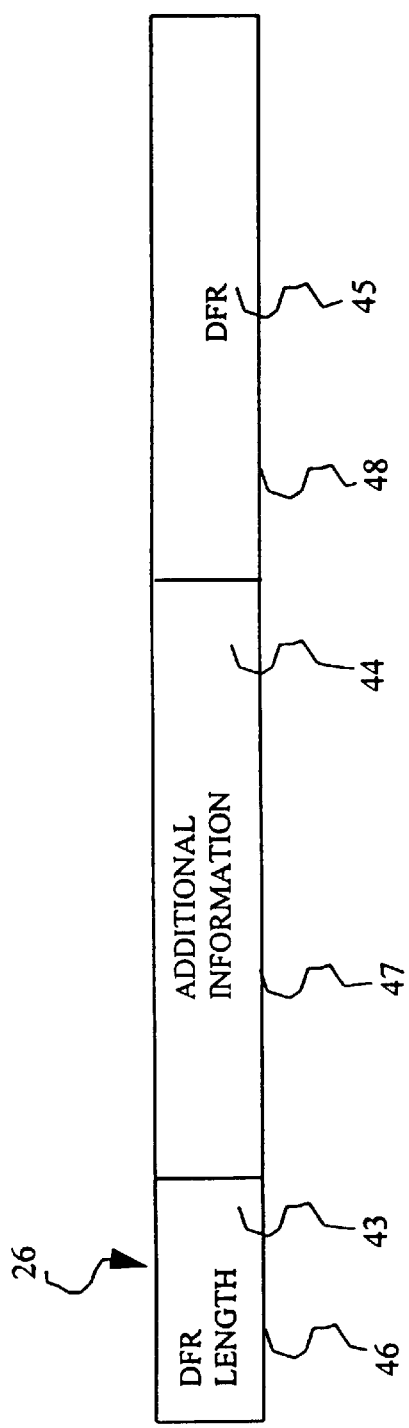
Figure 10:
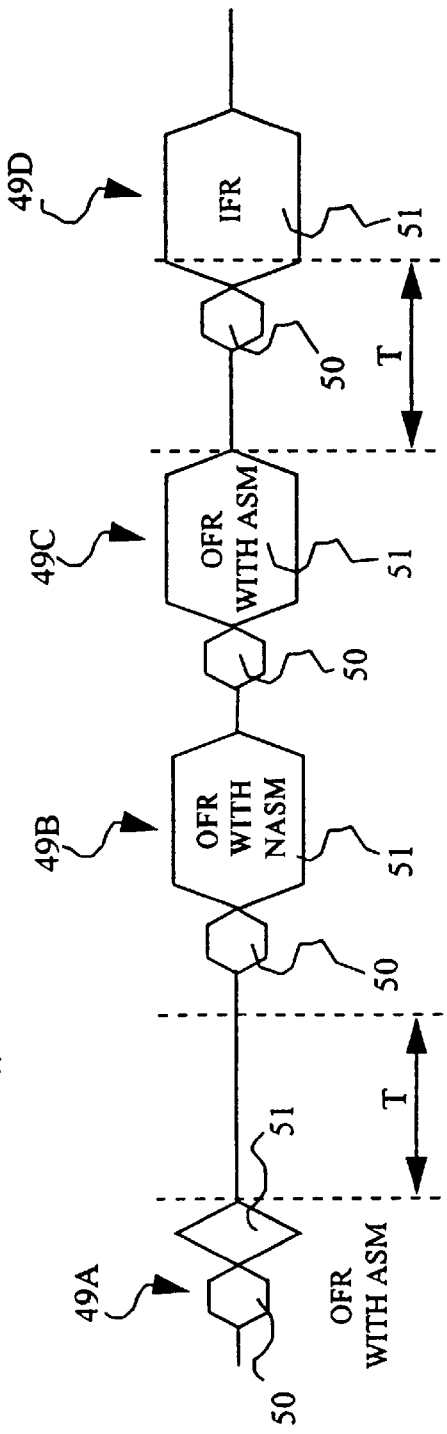
Figure 11:
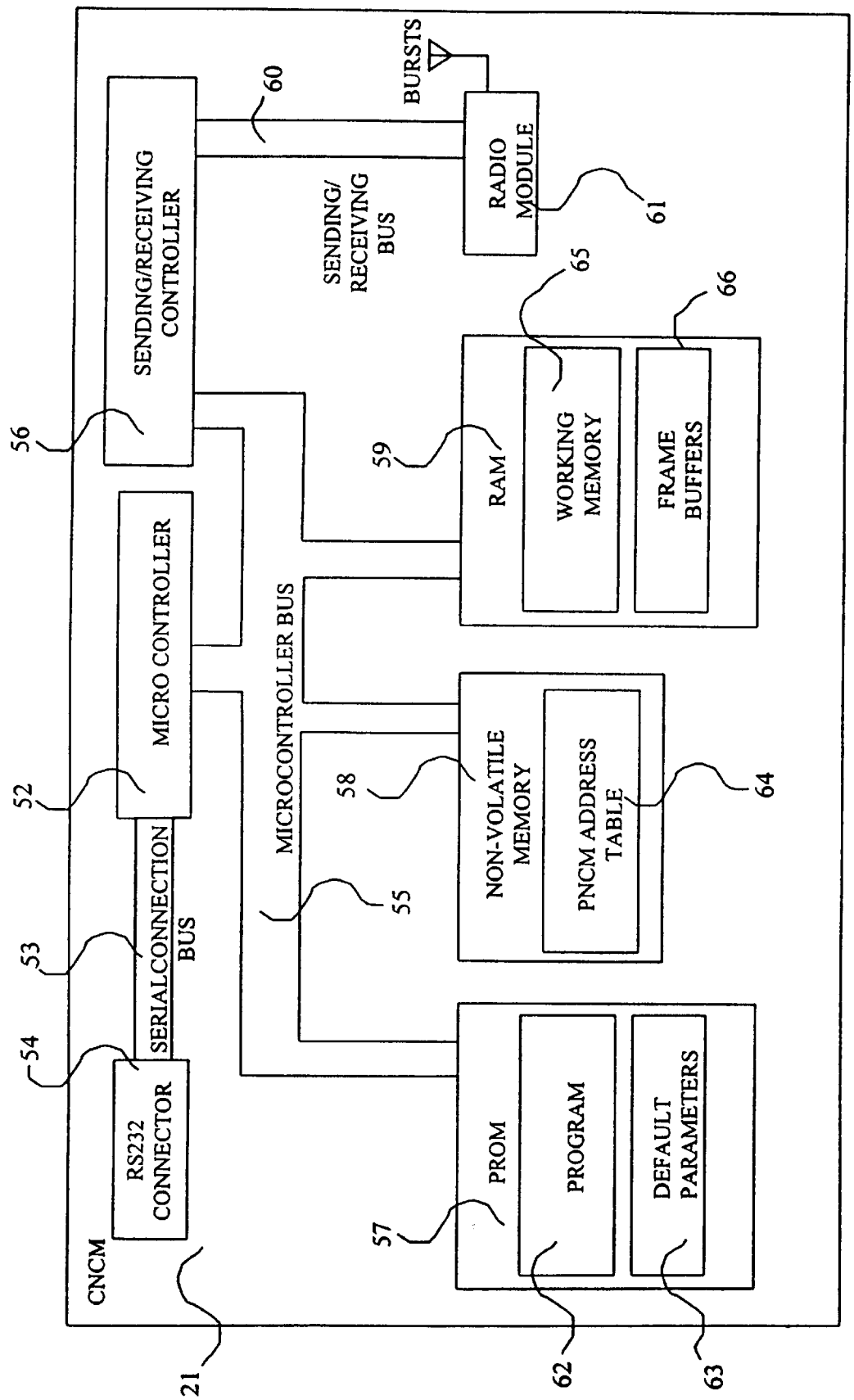
Figure 12:
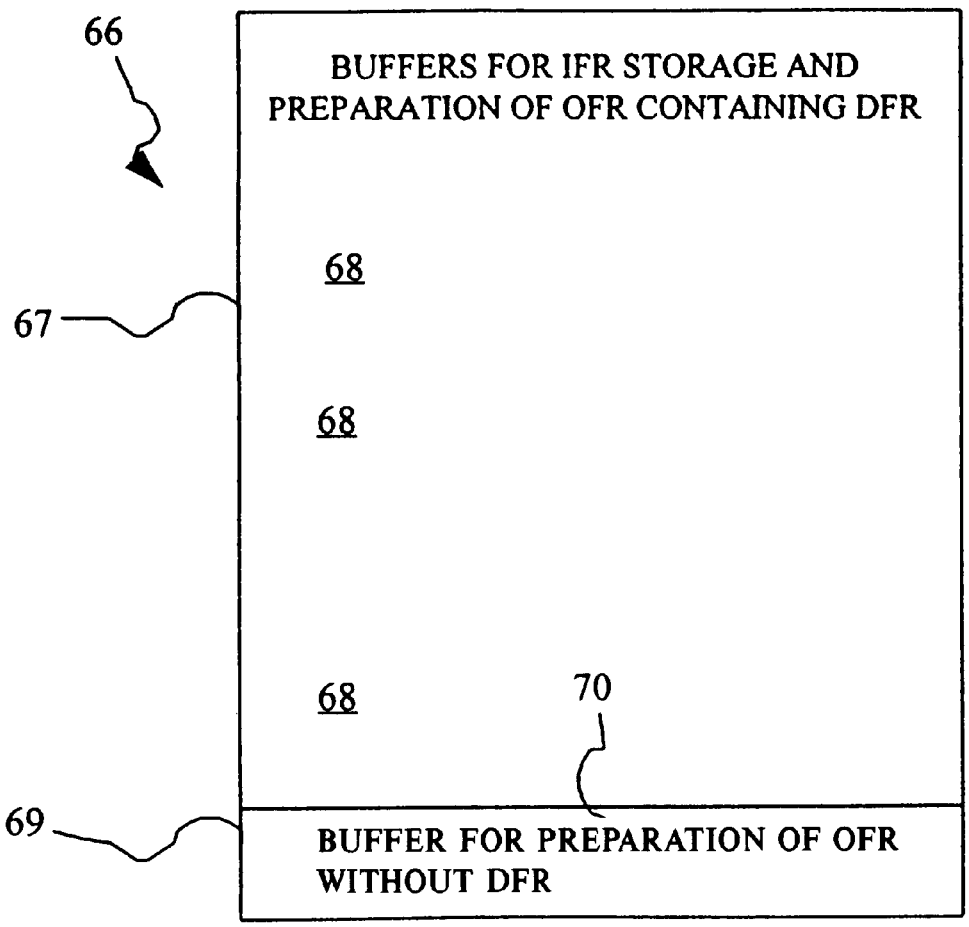
Figure 13:
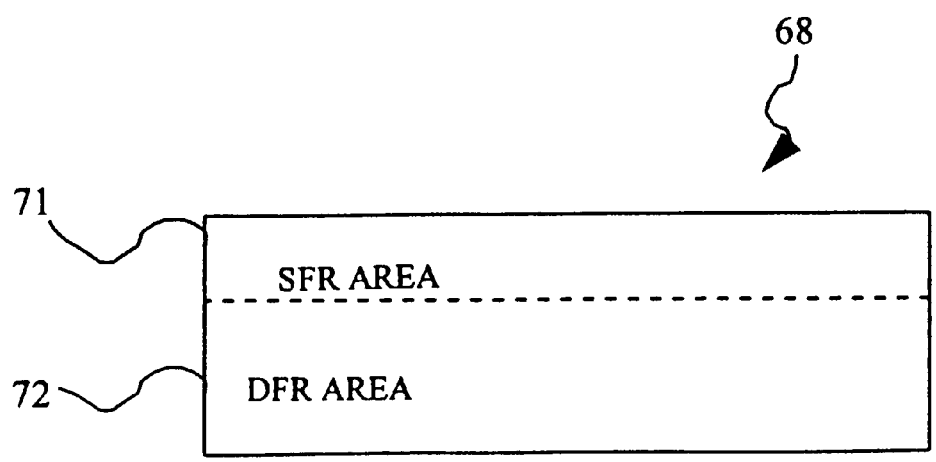
Figure 14:
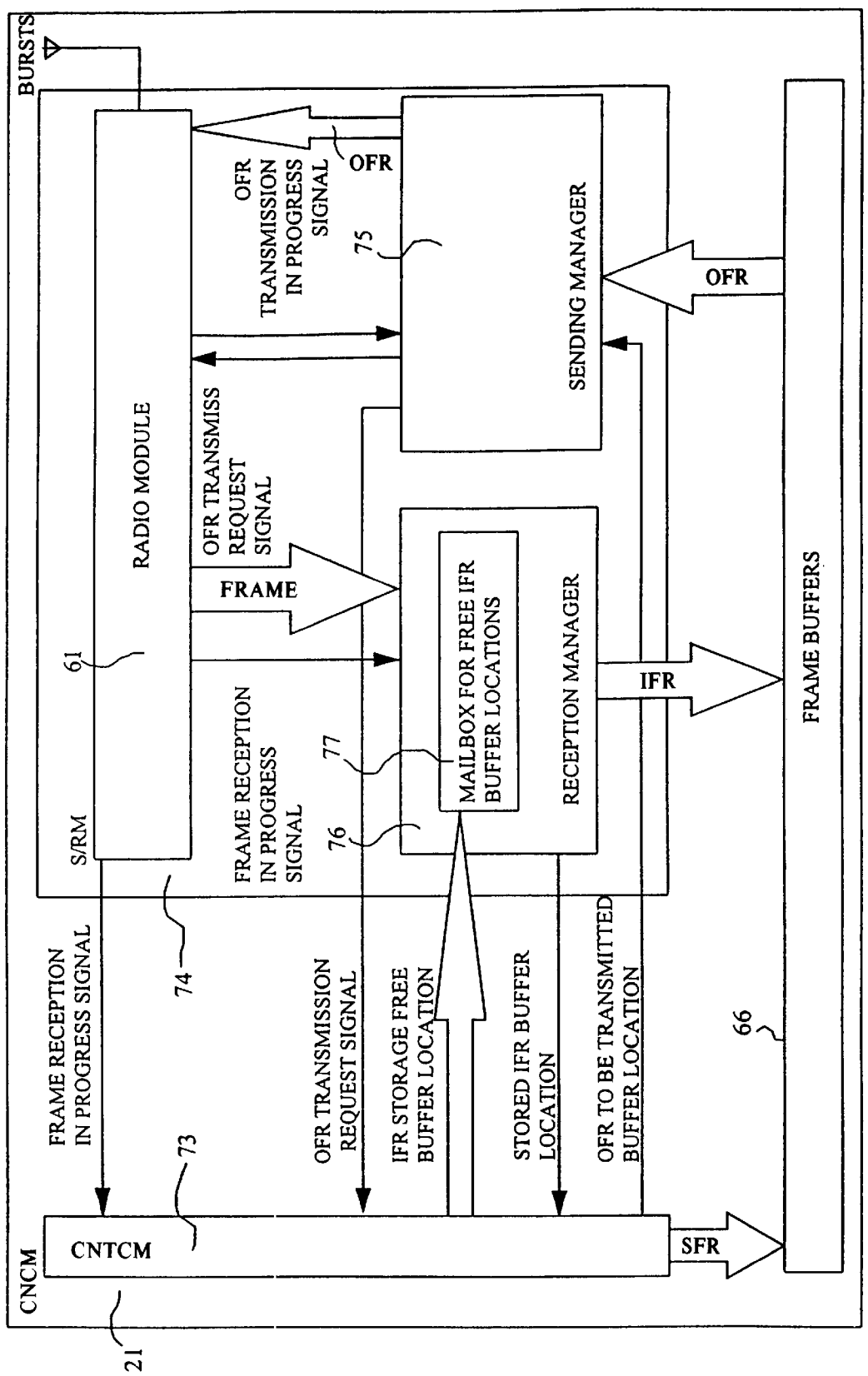
Figure 15:
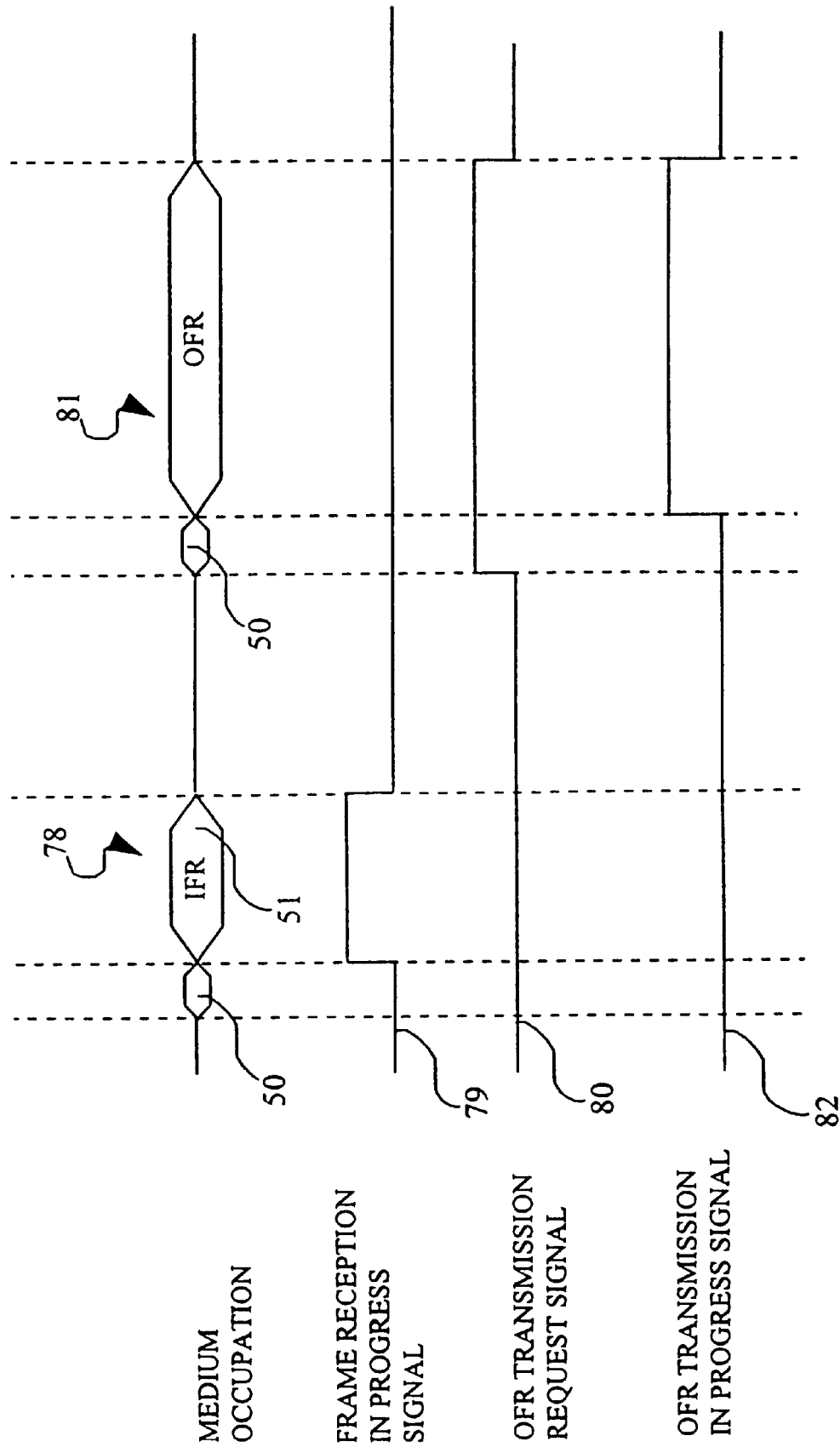
Figure 16:
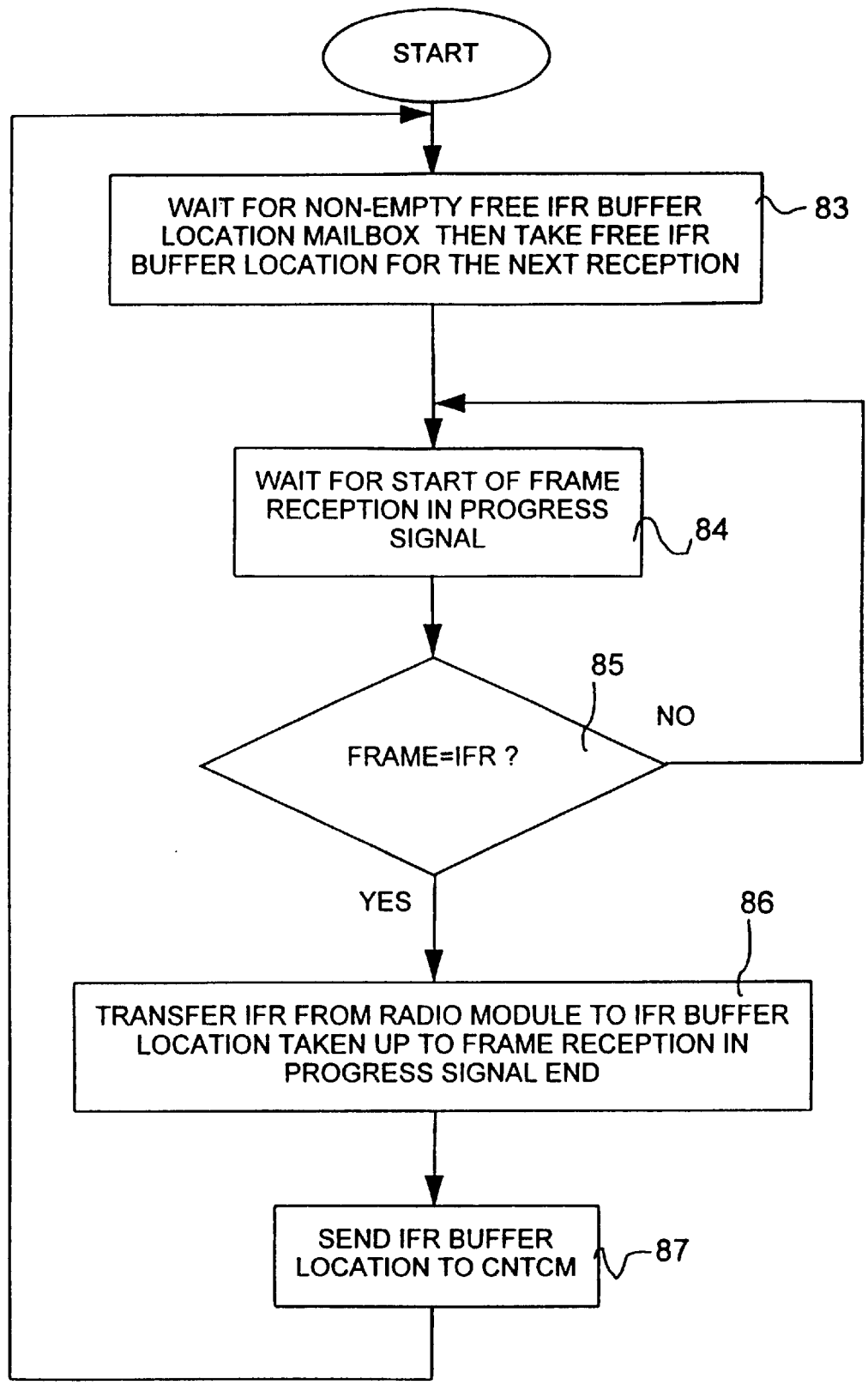
Figure 17:
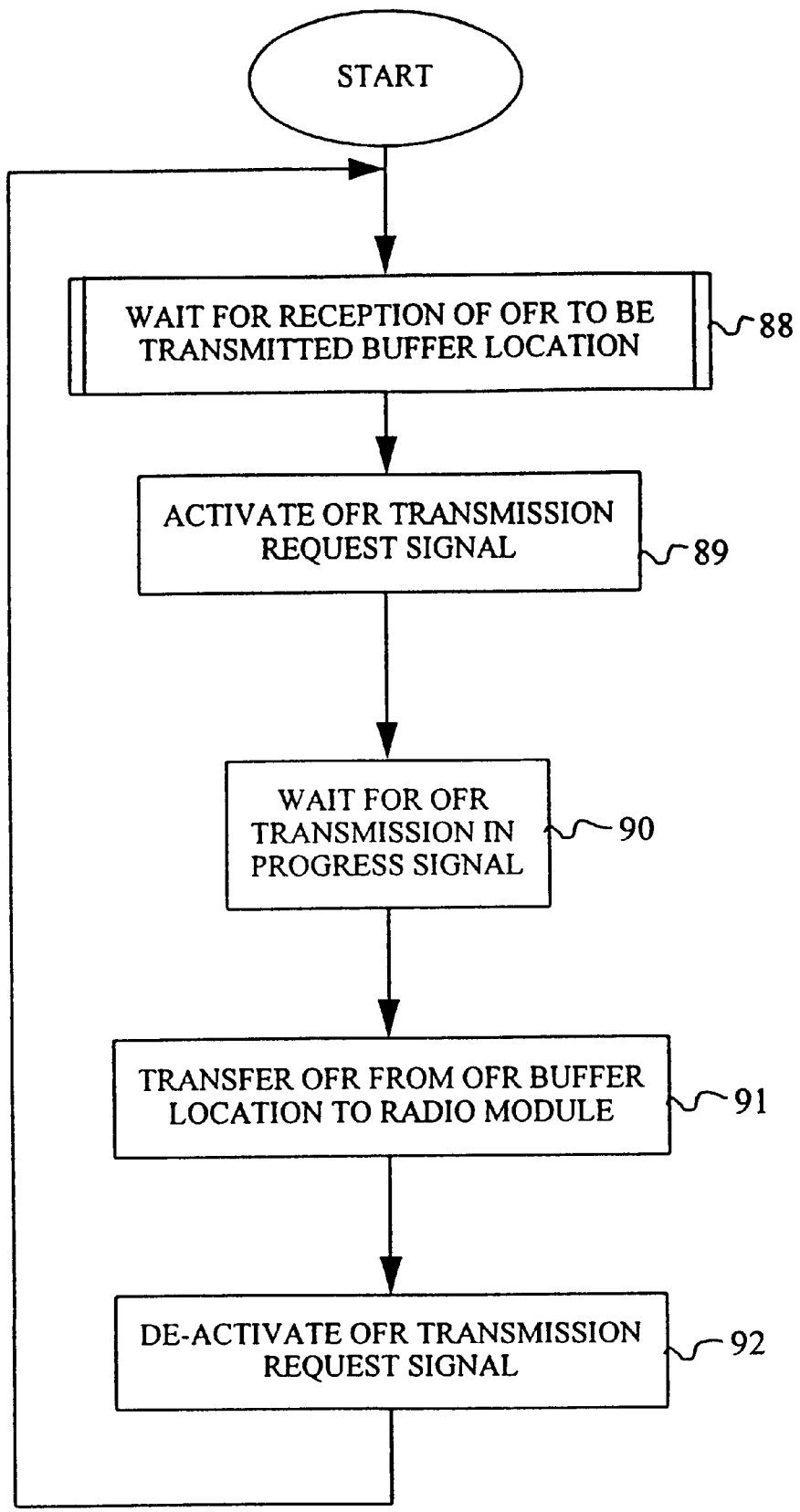
Figure 18:
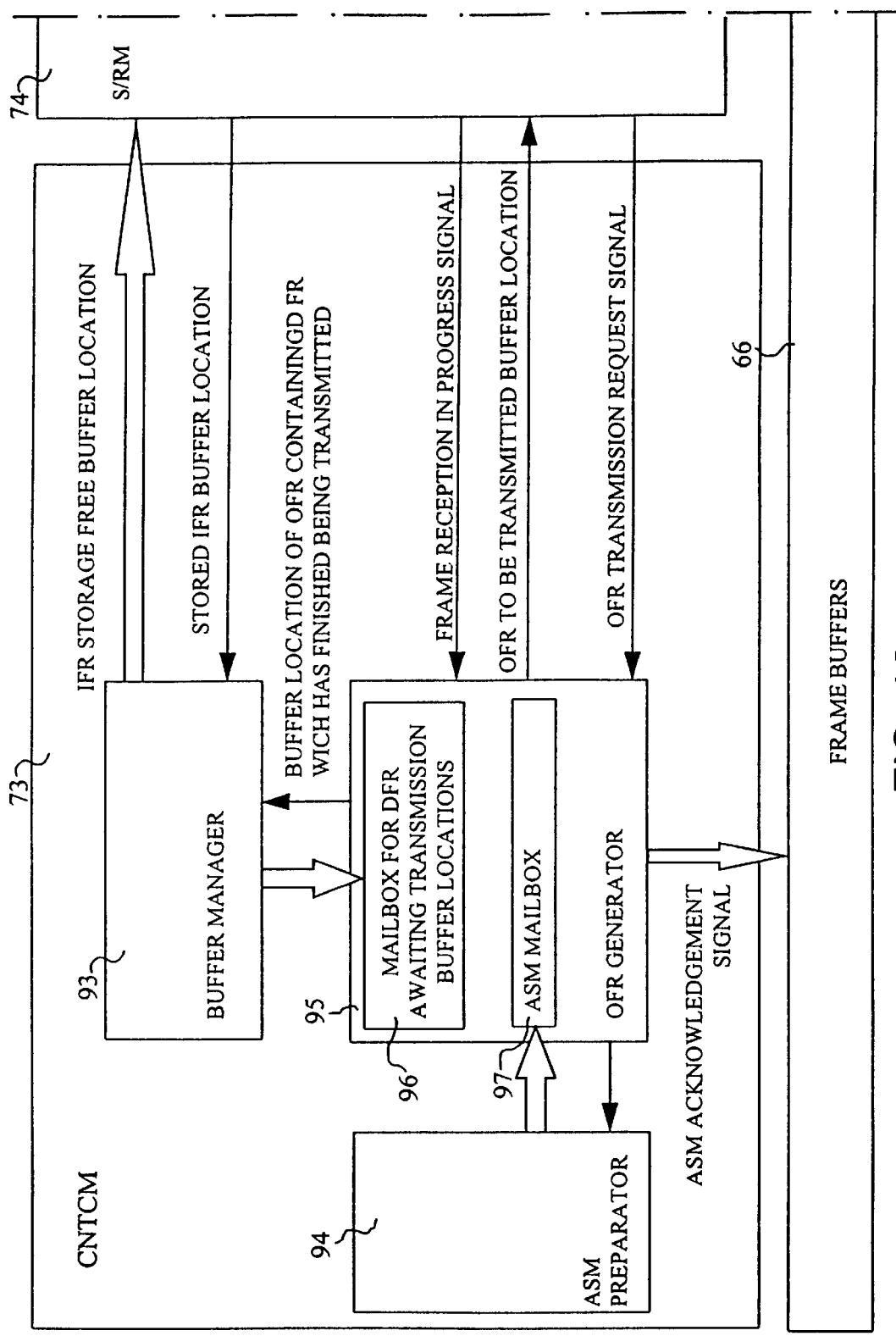
Figure 19:
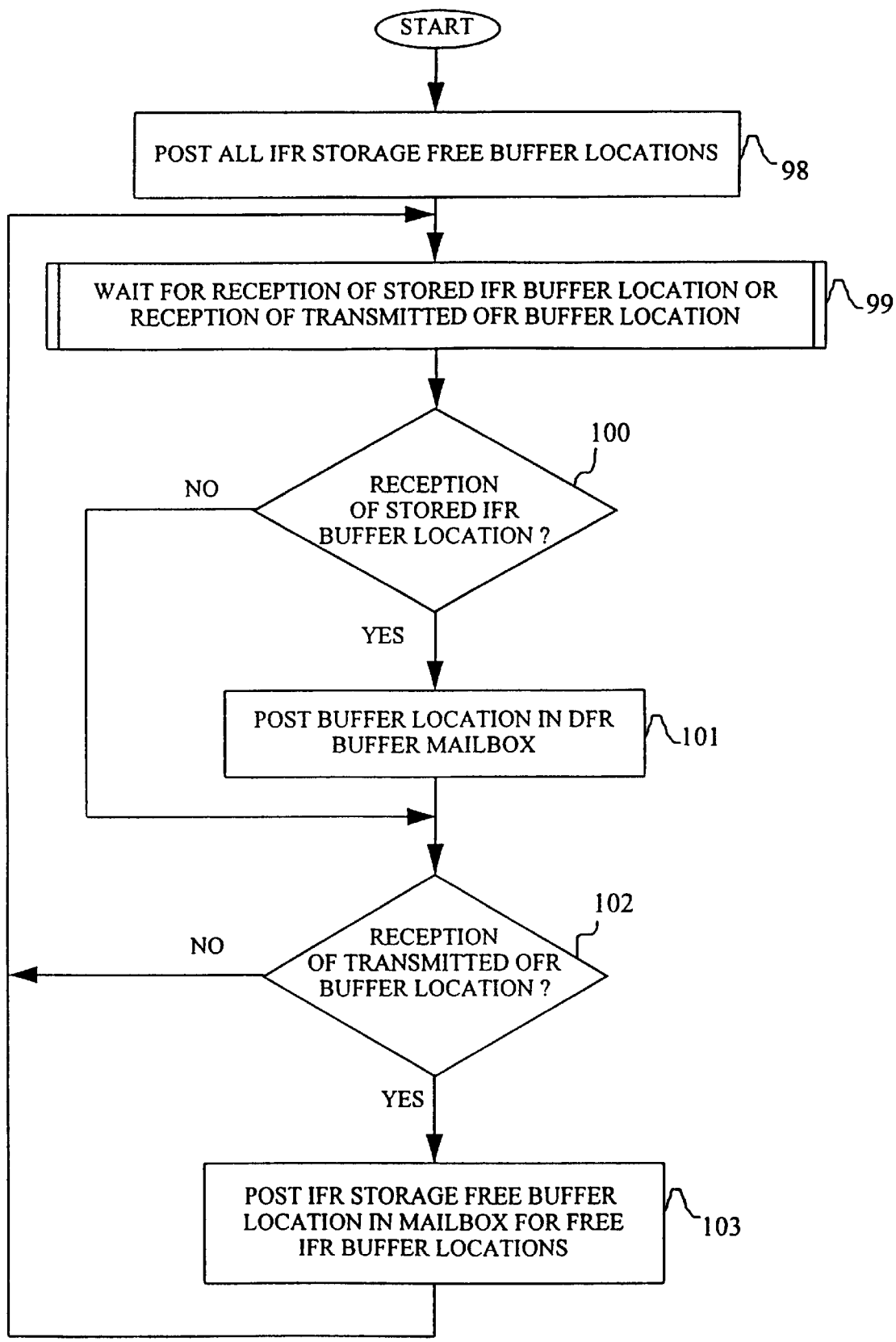
Figure 20:
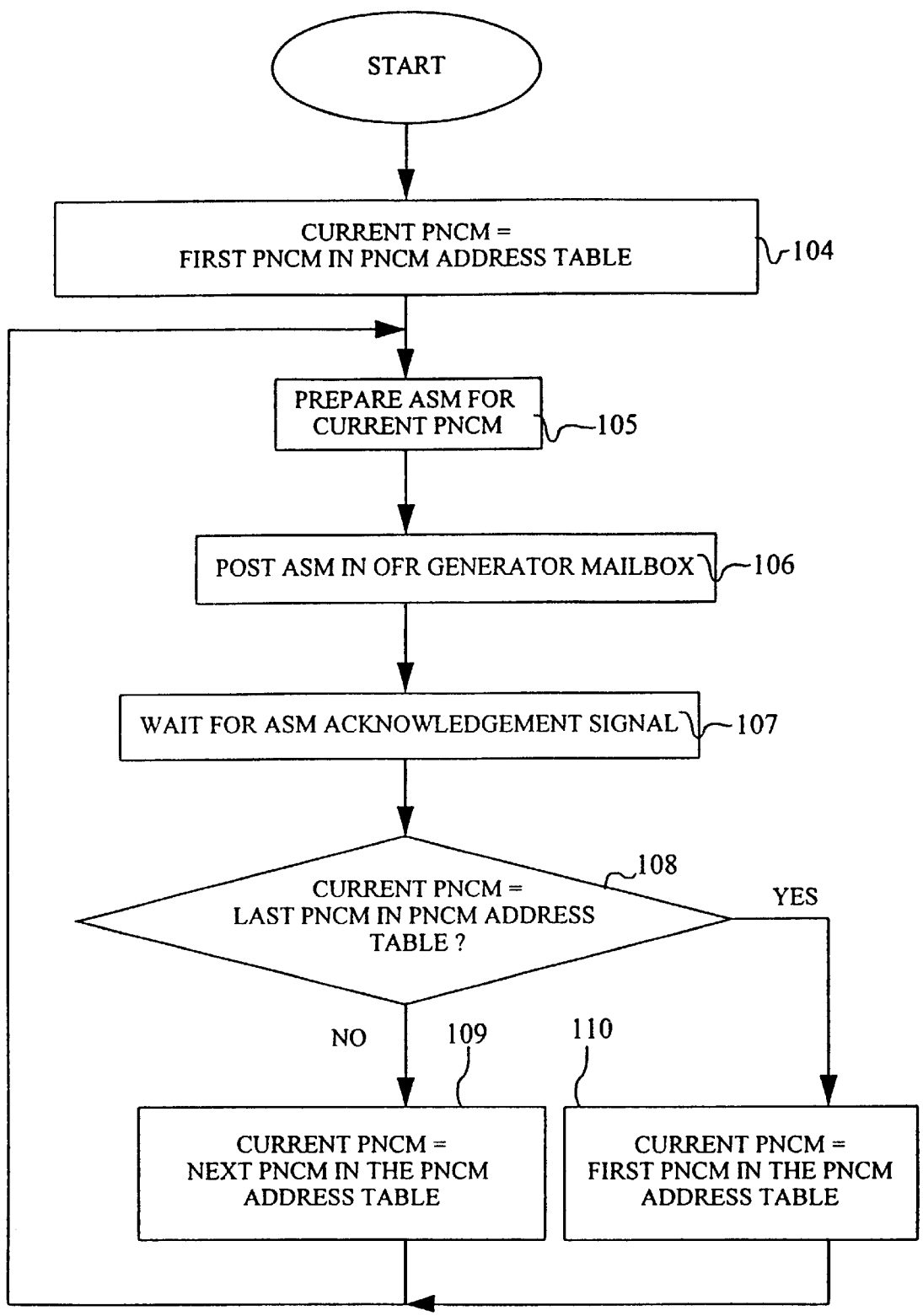
Figure 21:
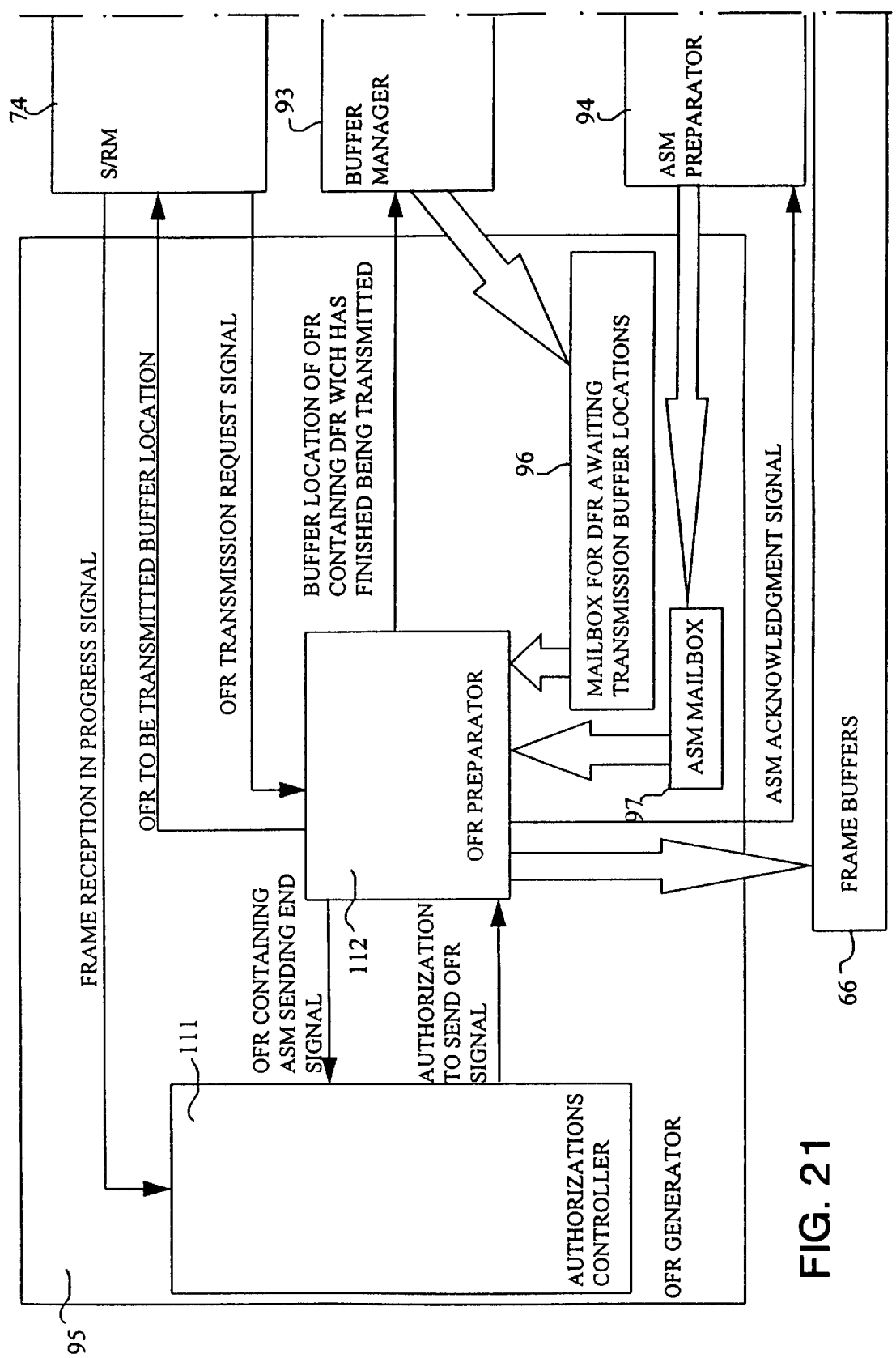
Figure 22:
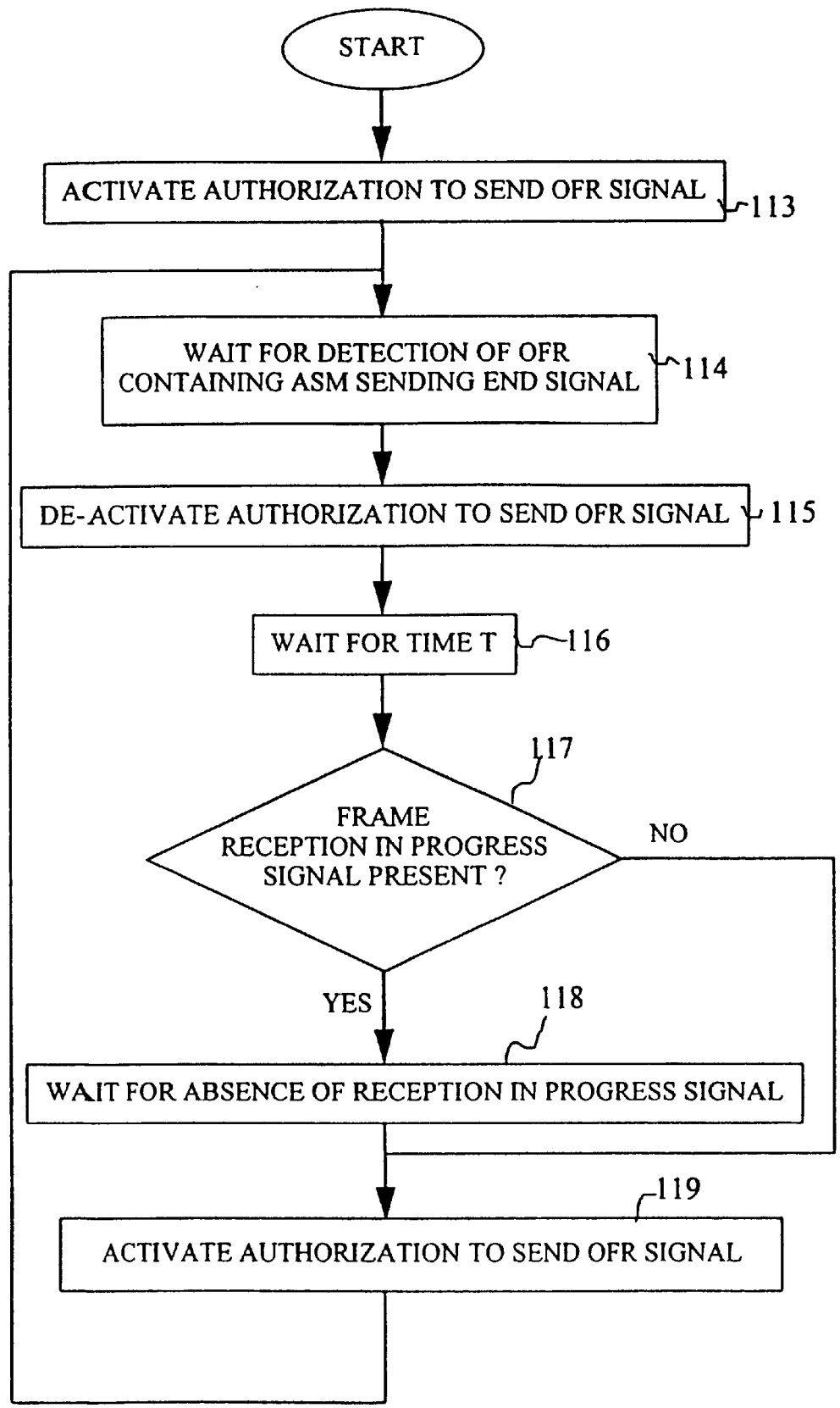
Figure 23:
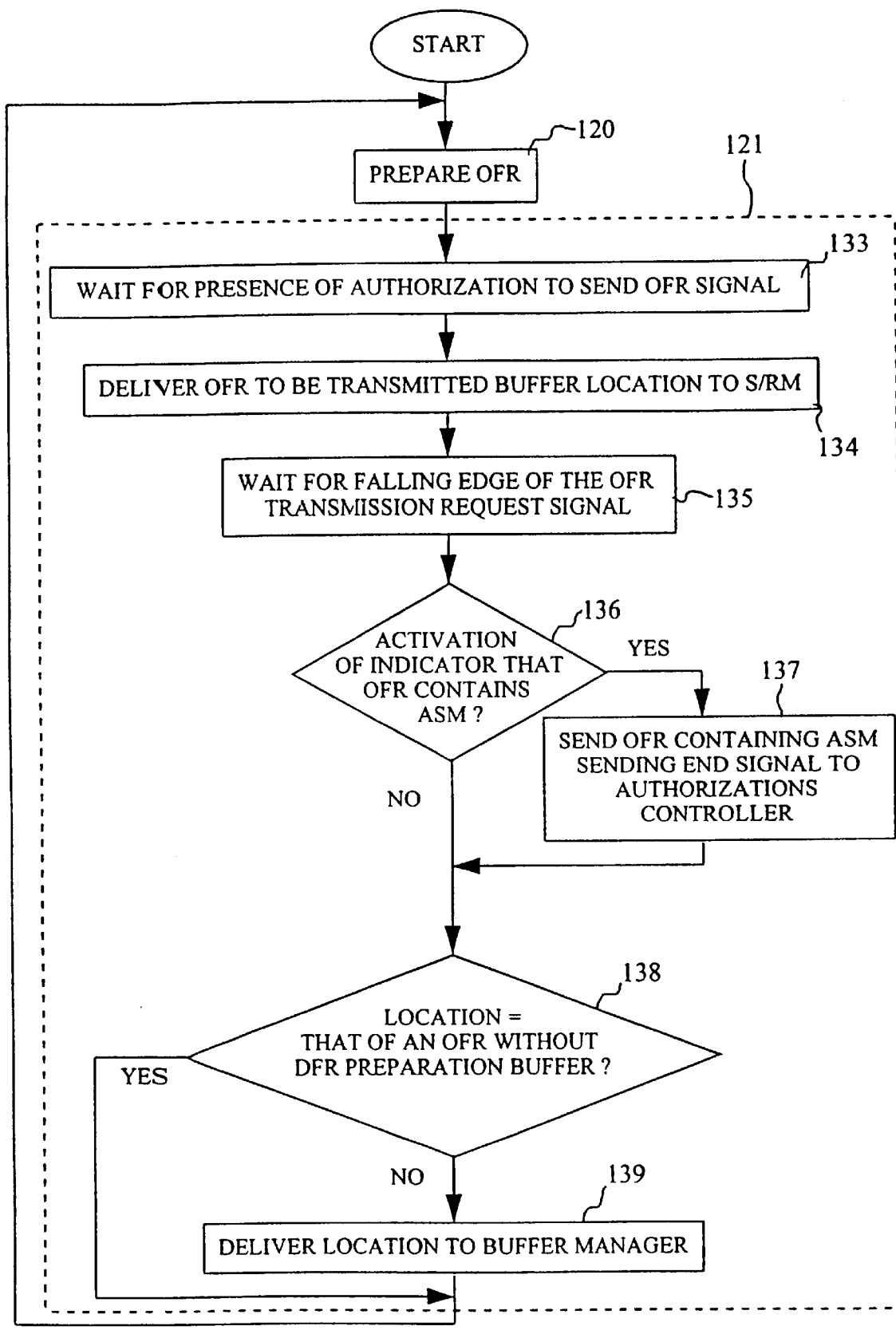
Figure 24:
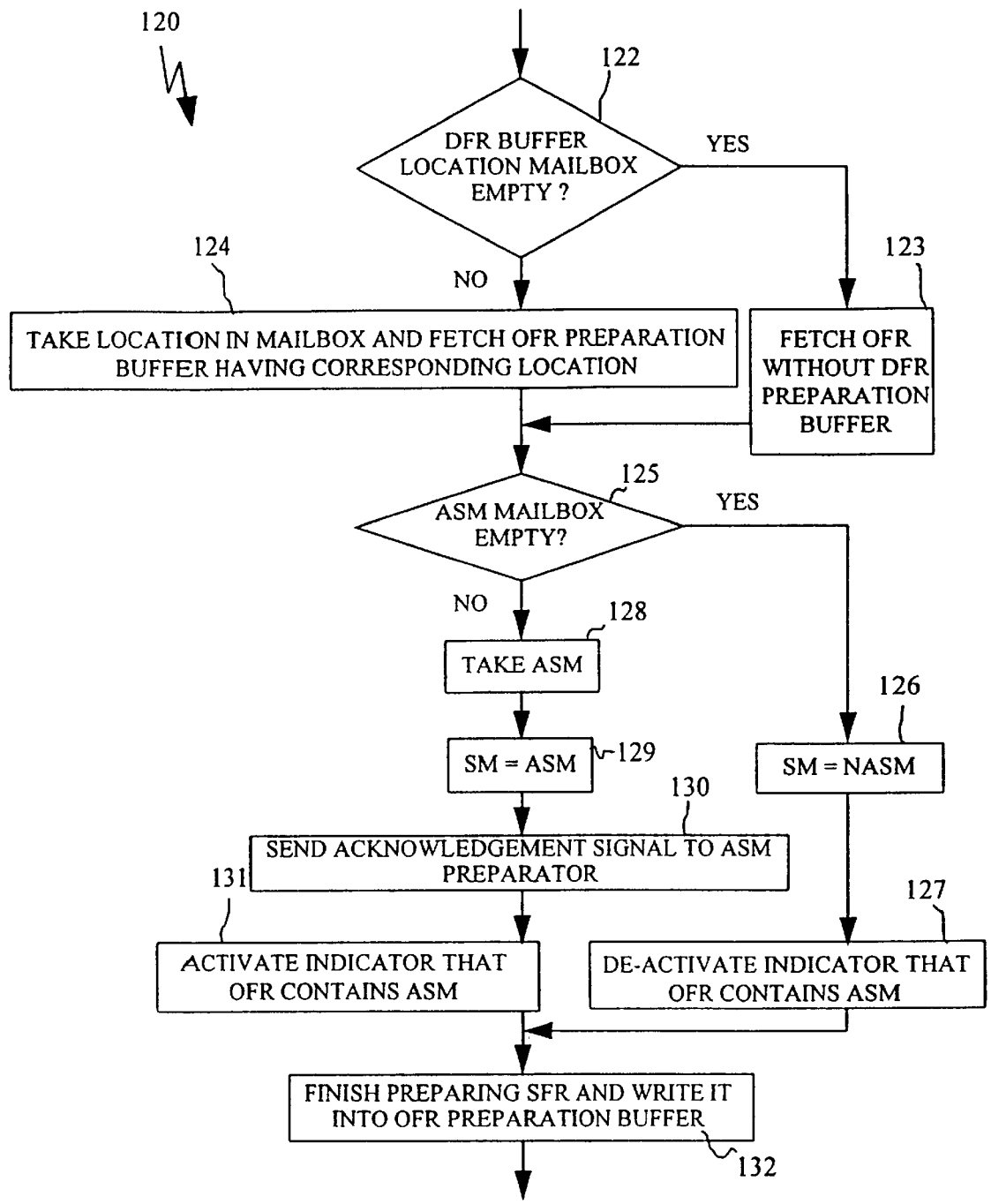
Figure 25:
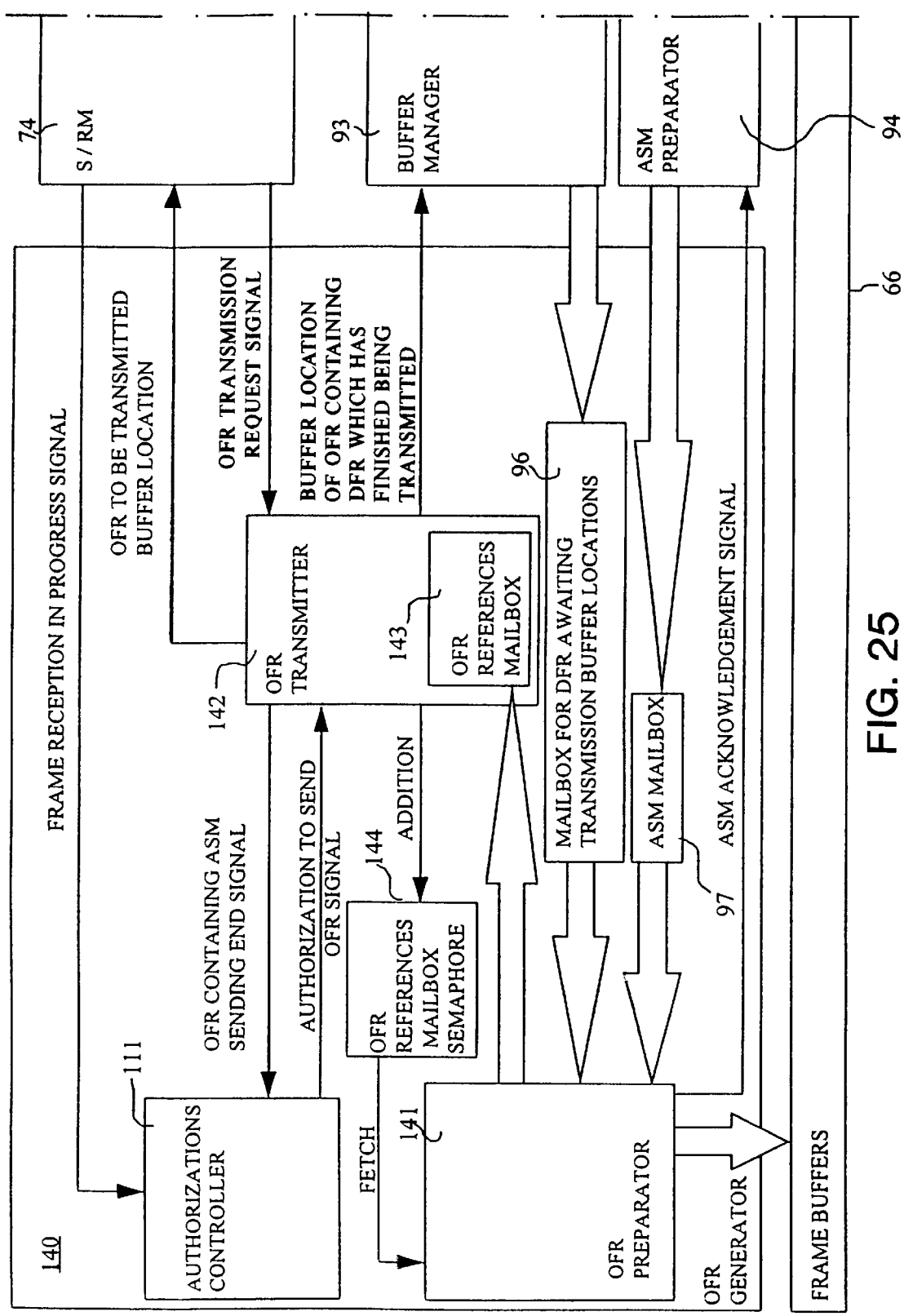
Figure 26:
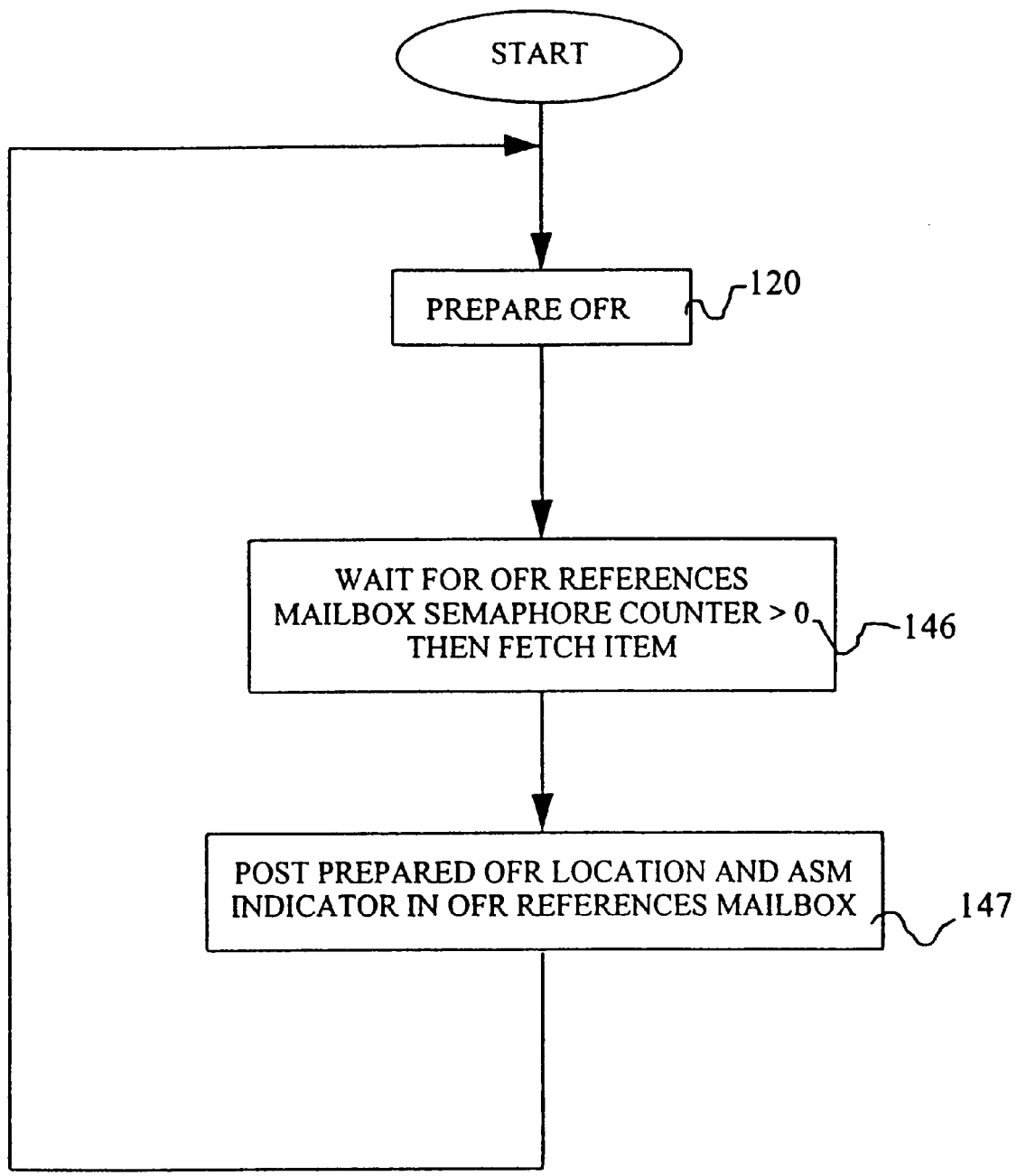
Figure 27:
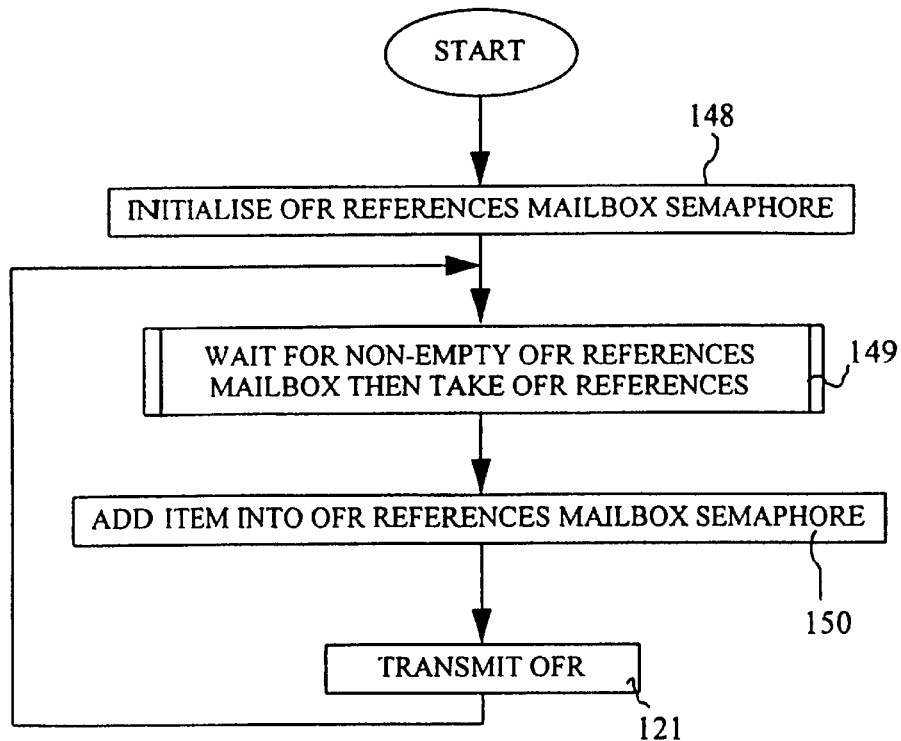
Figure 28:
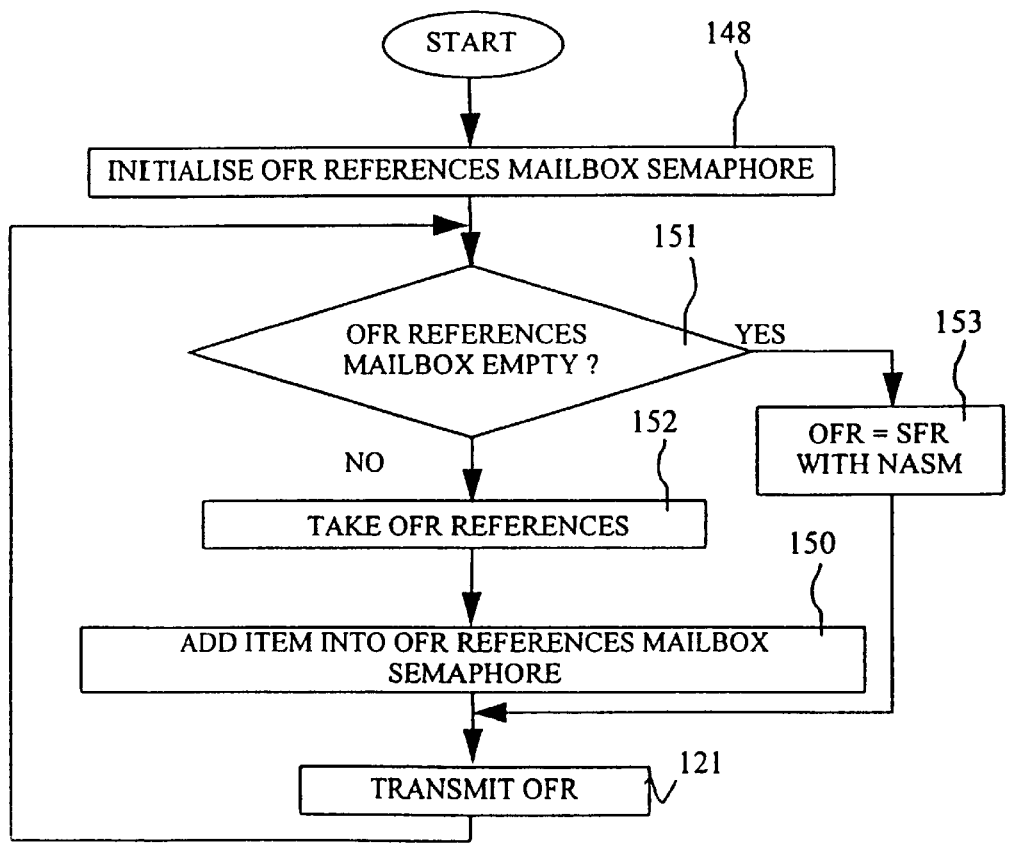
Figure 33:
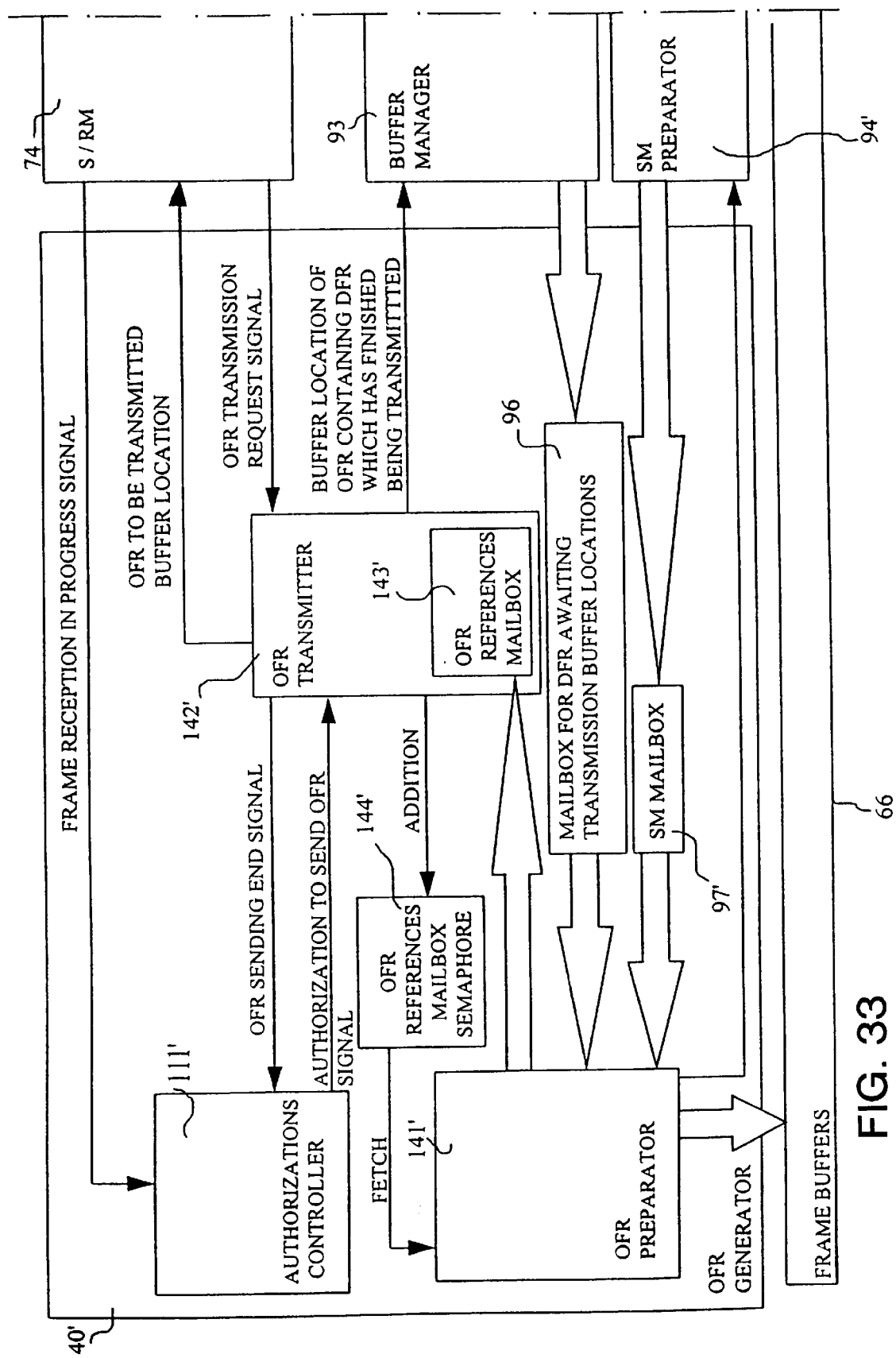
Figure 34:
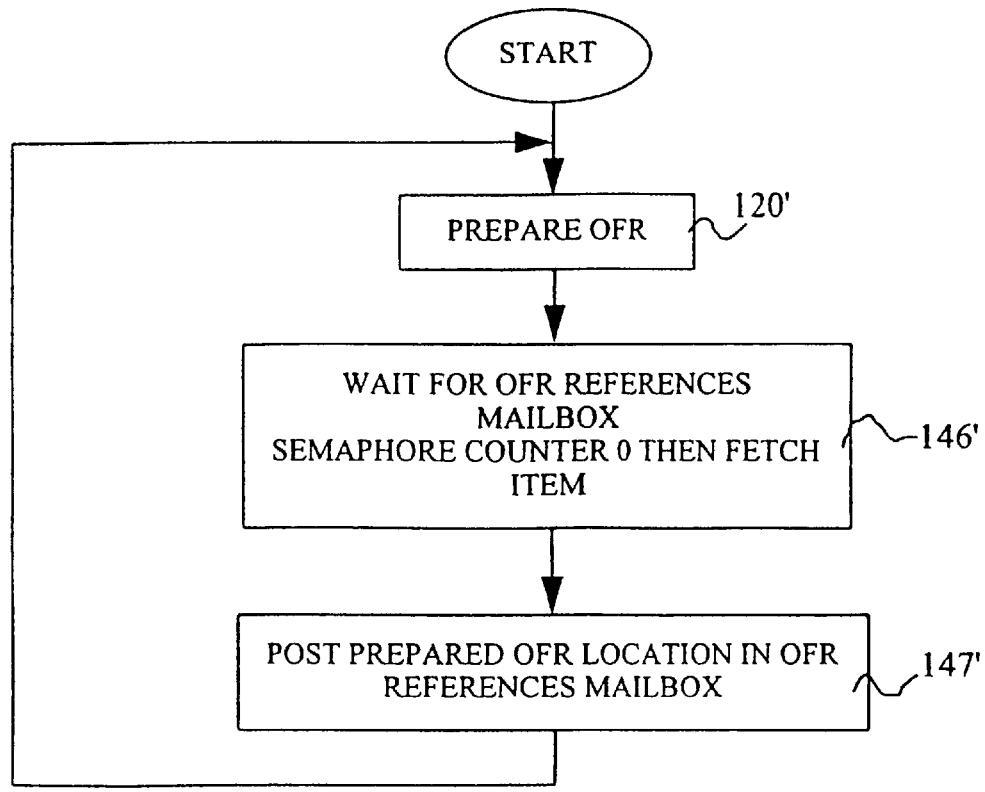
Figure 35:
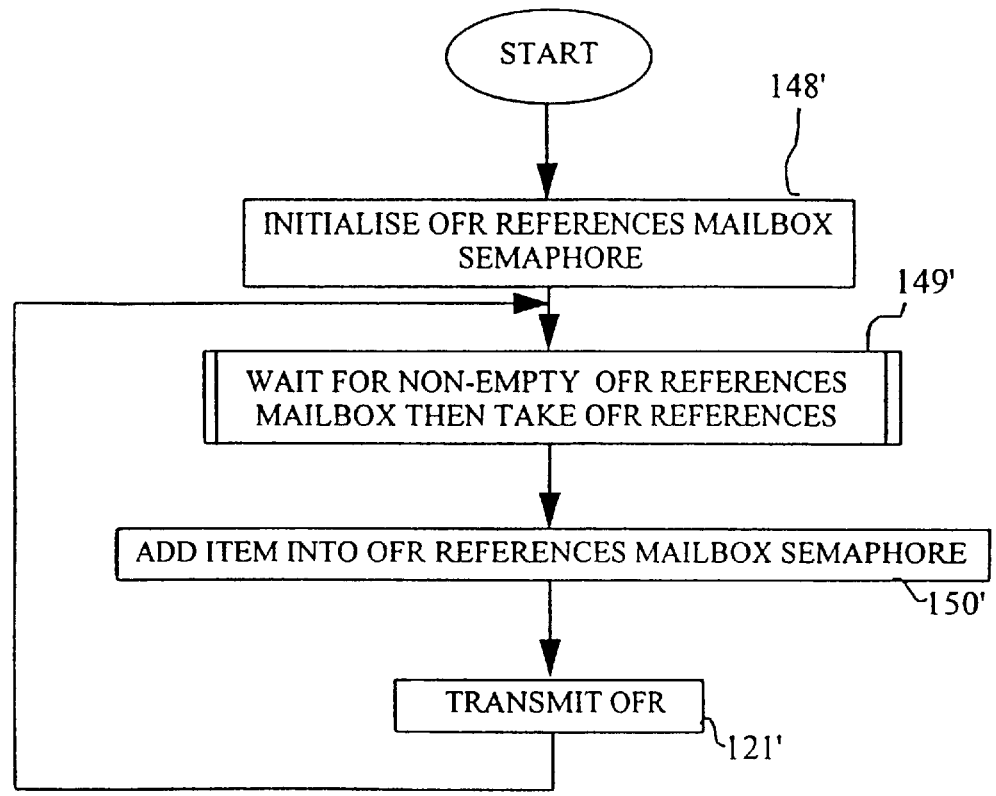
Figure 36:
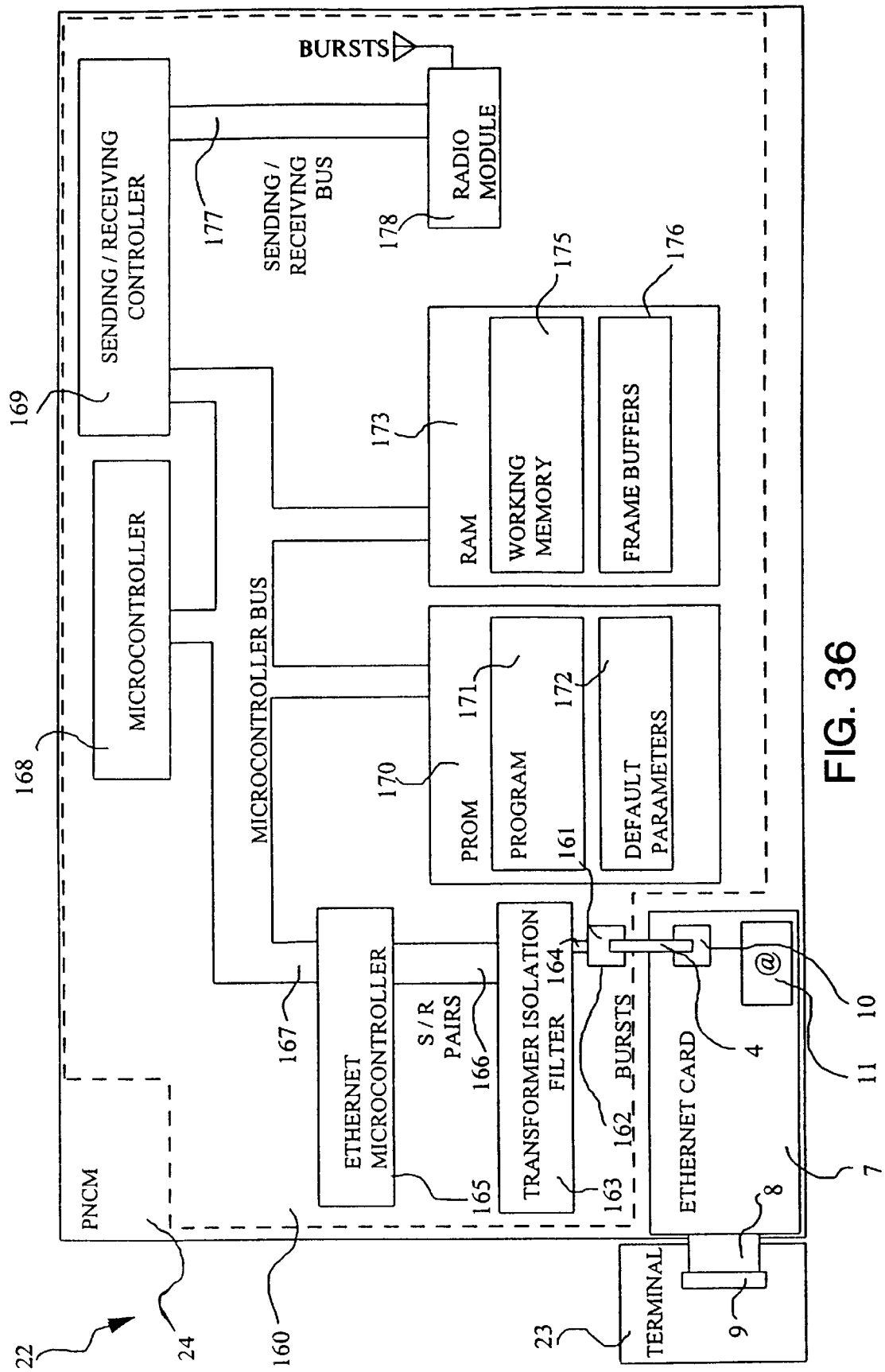
Figure 37:
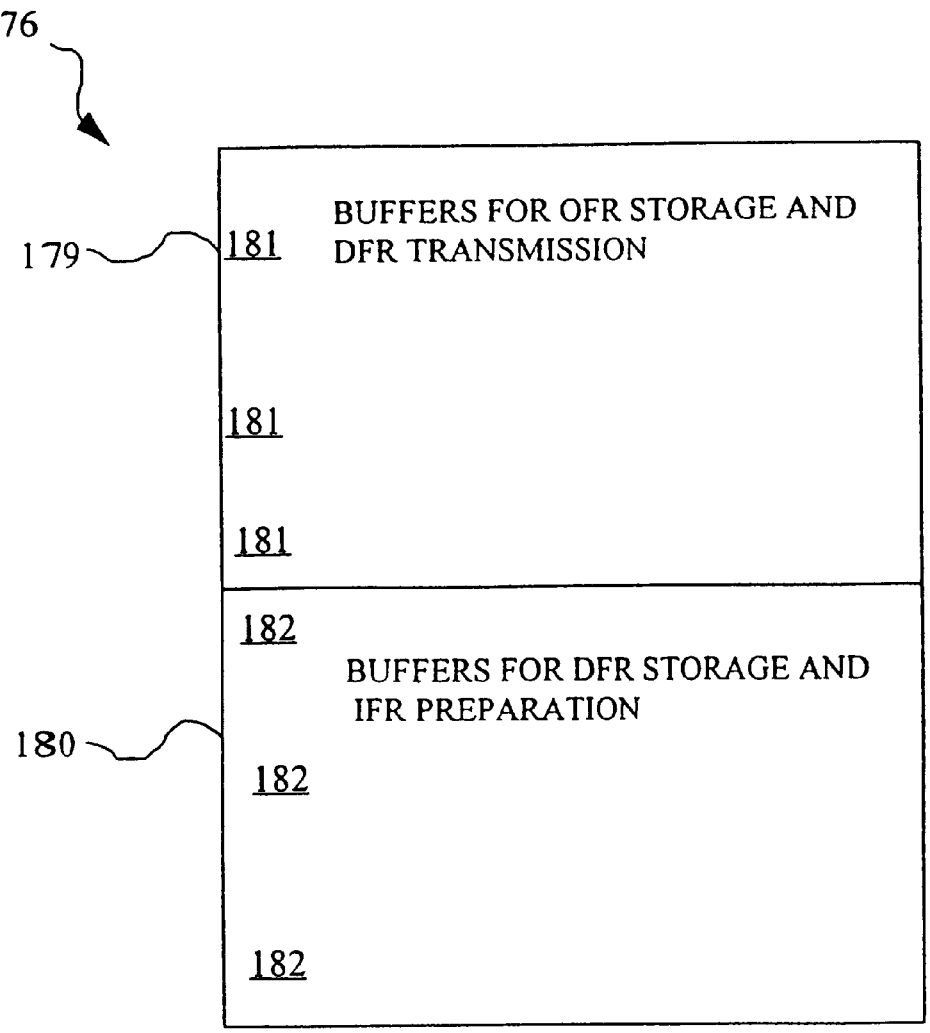
Figure 38:
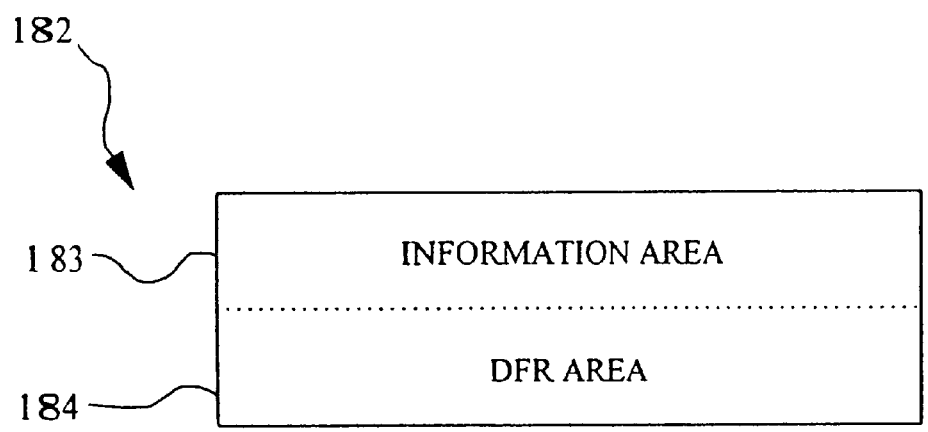
Figure 39:
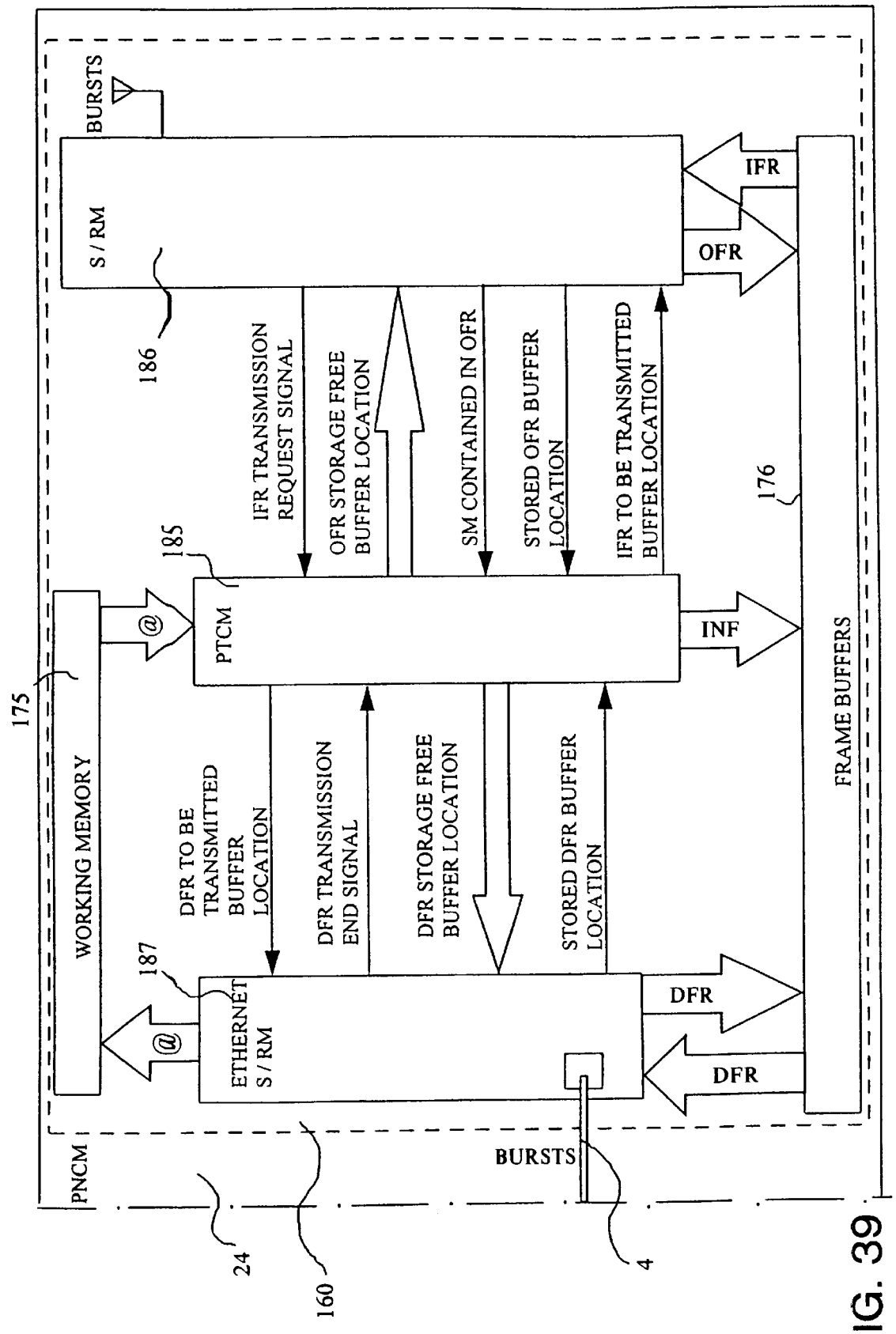
Figure 40:
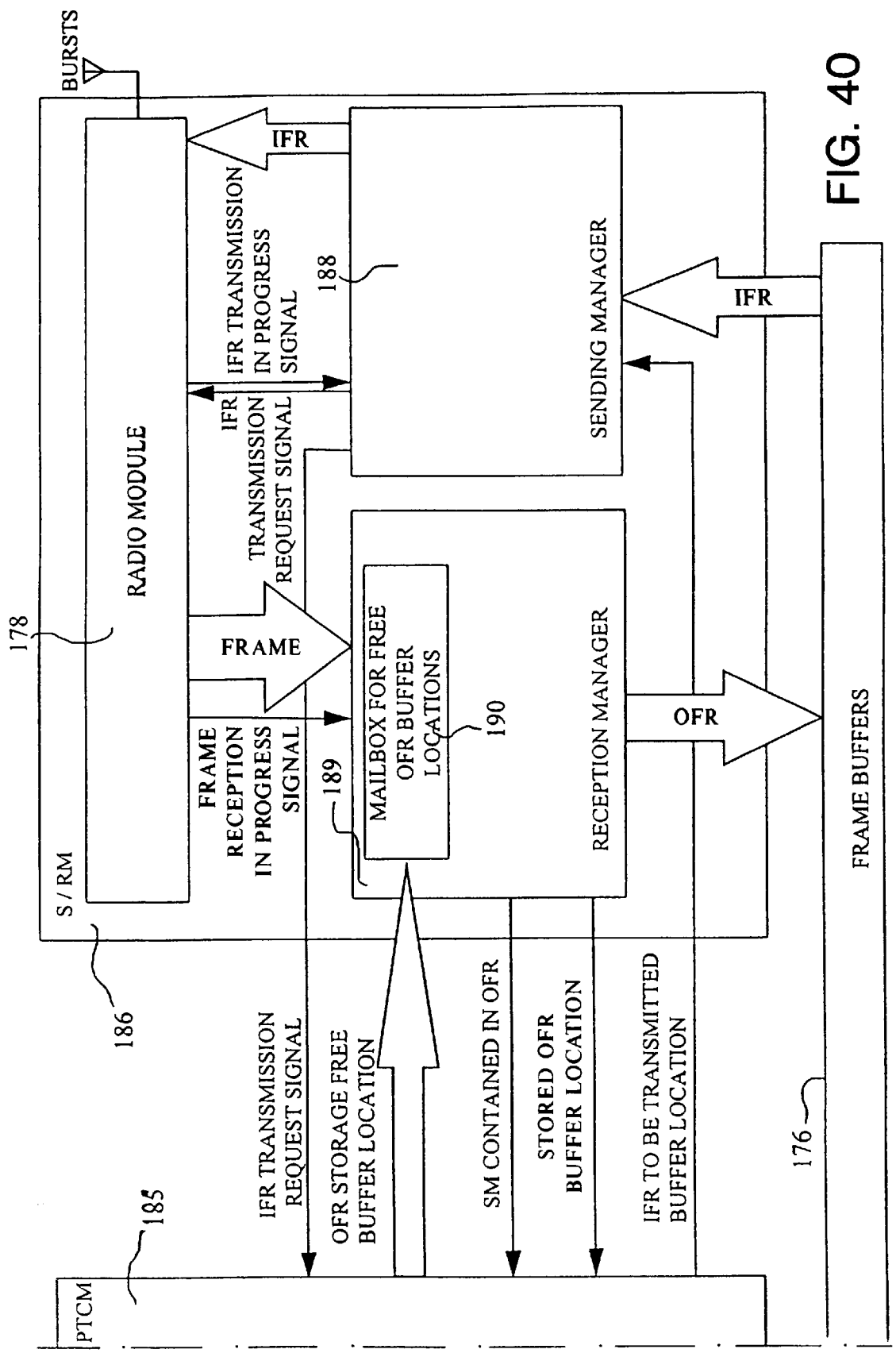
Figure 41:
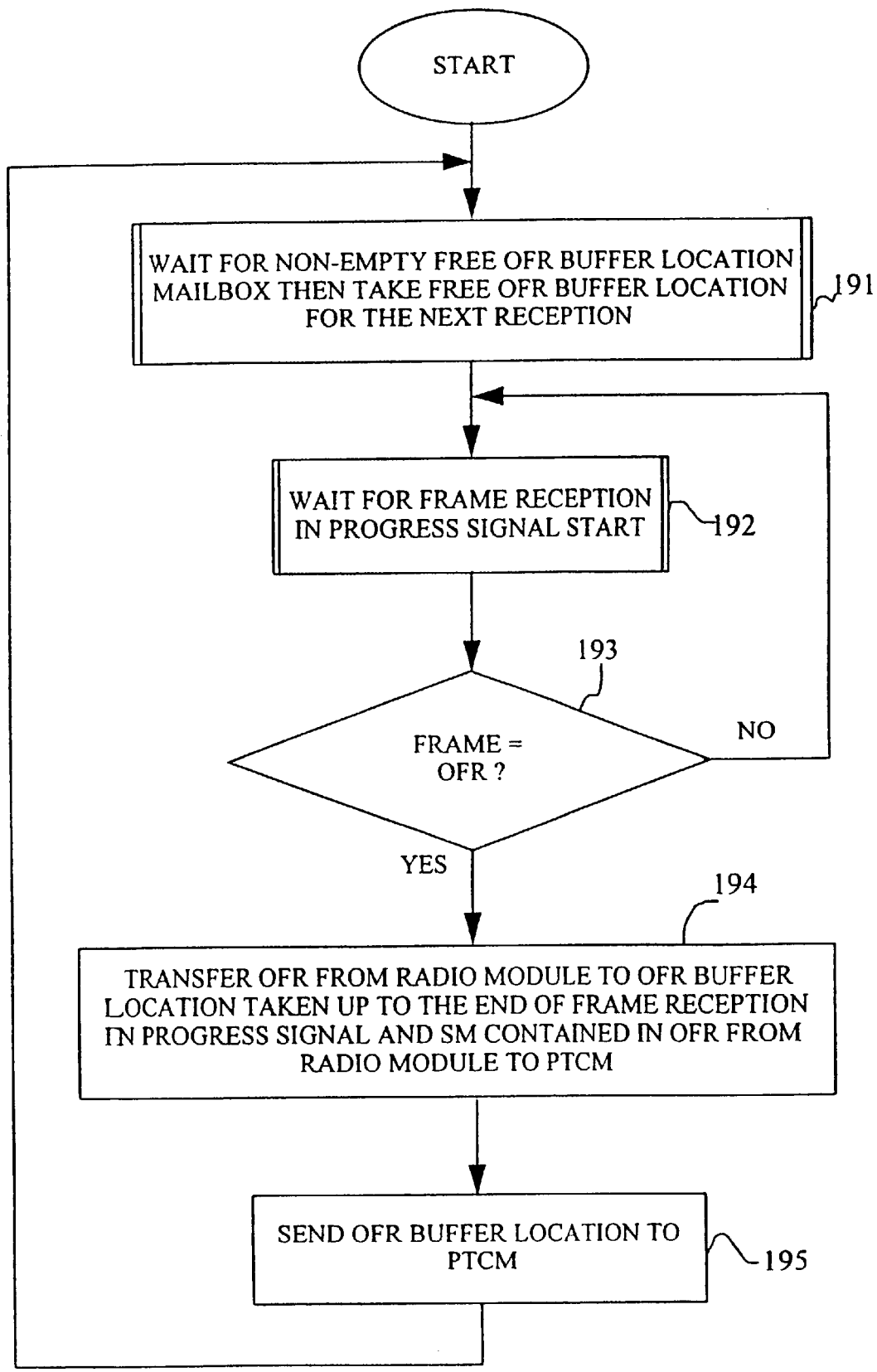
Figure 42:
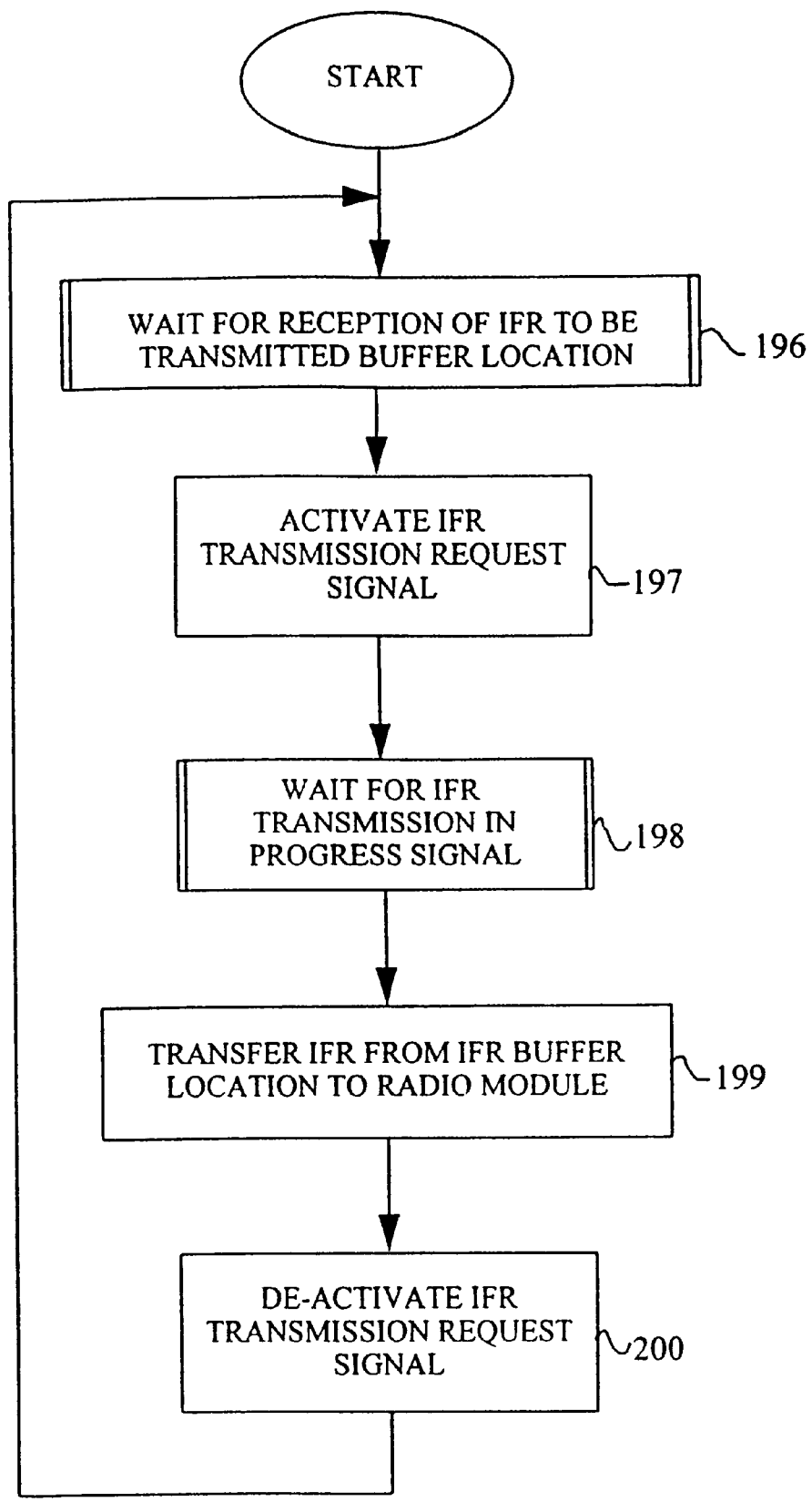
Figure 43:
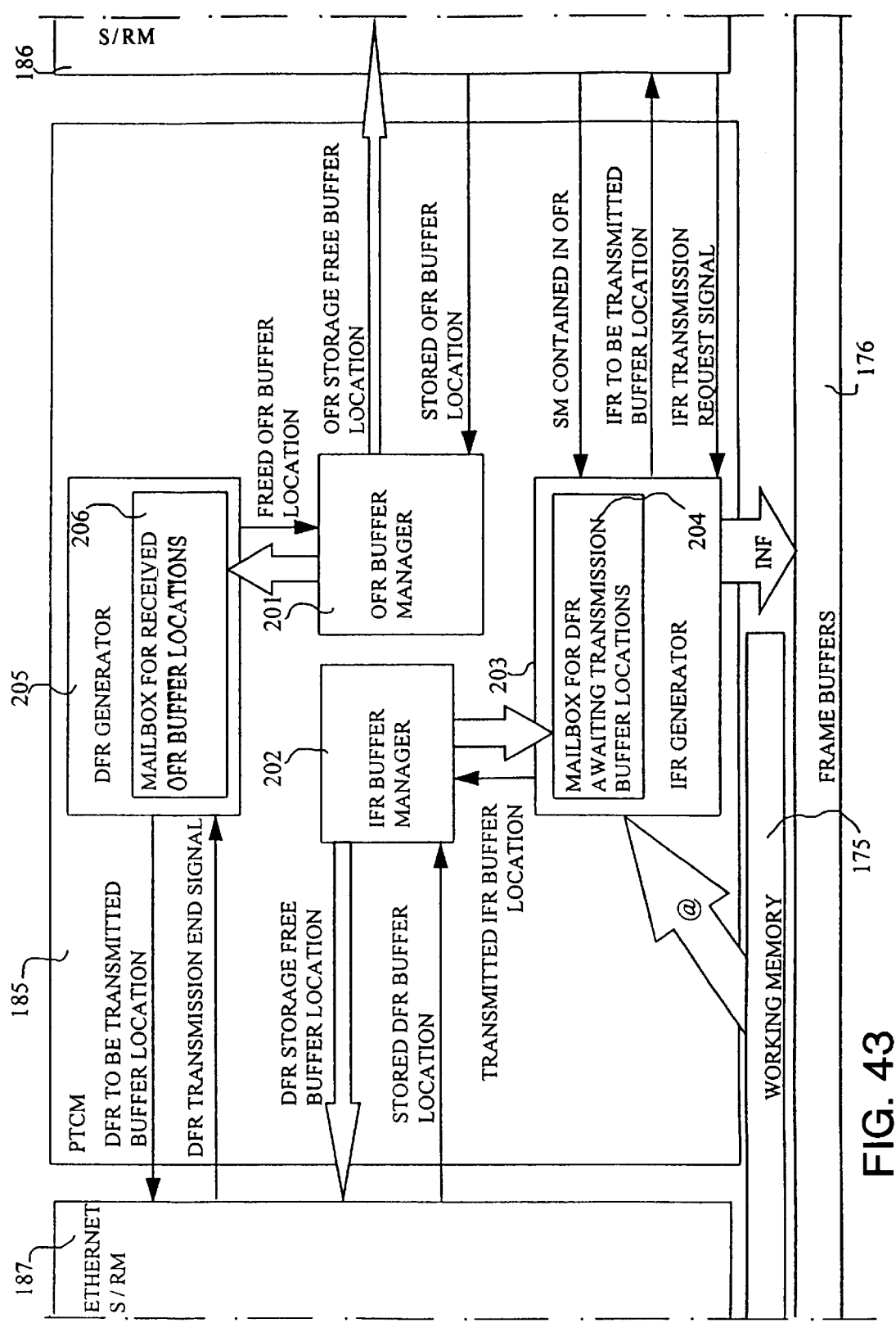
Figure 47:
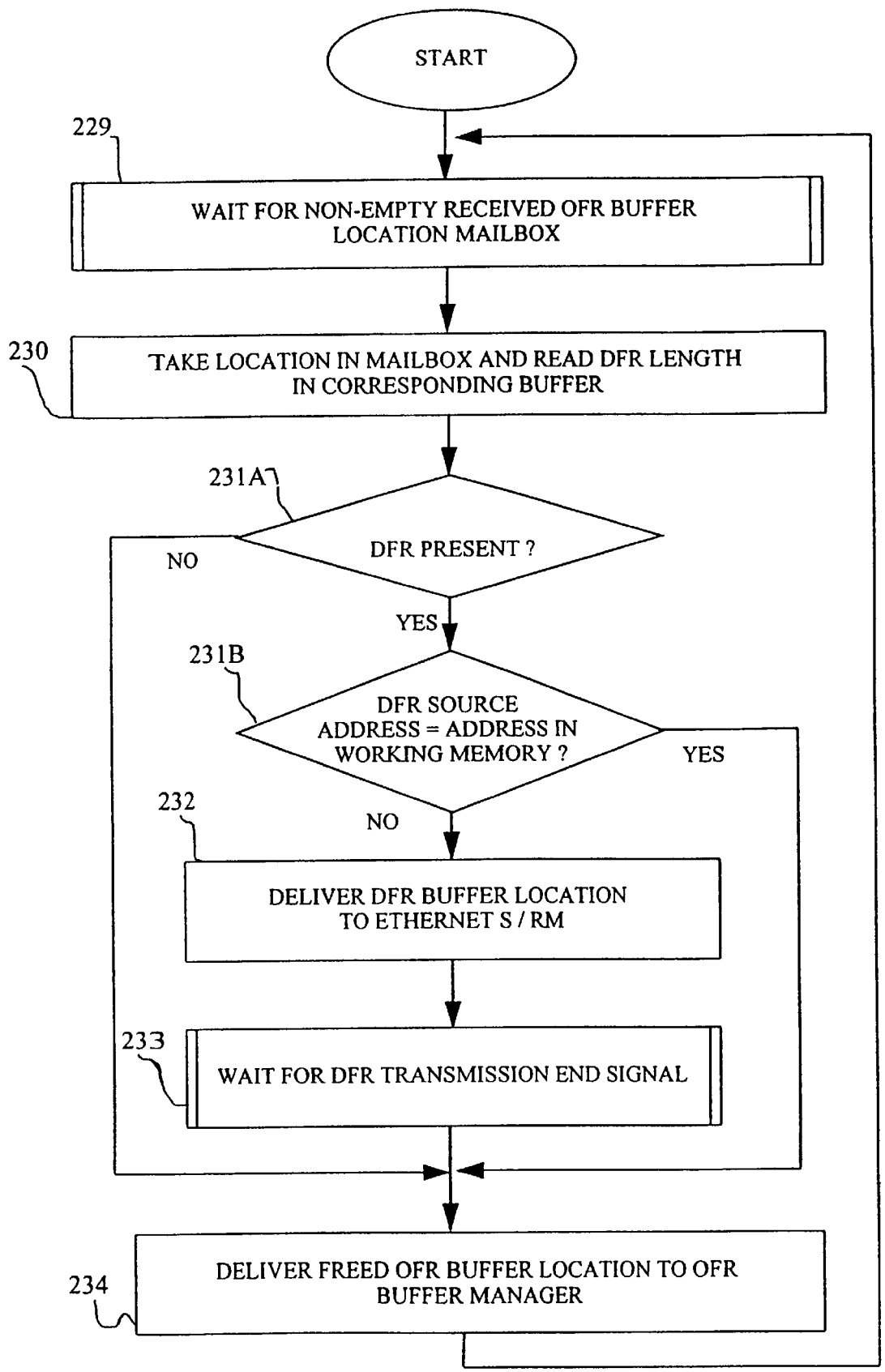
Figure 47A:
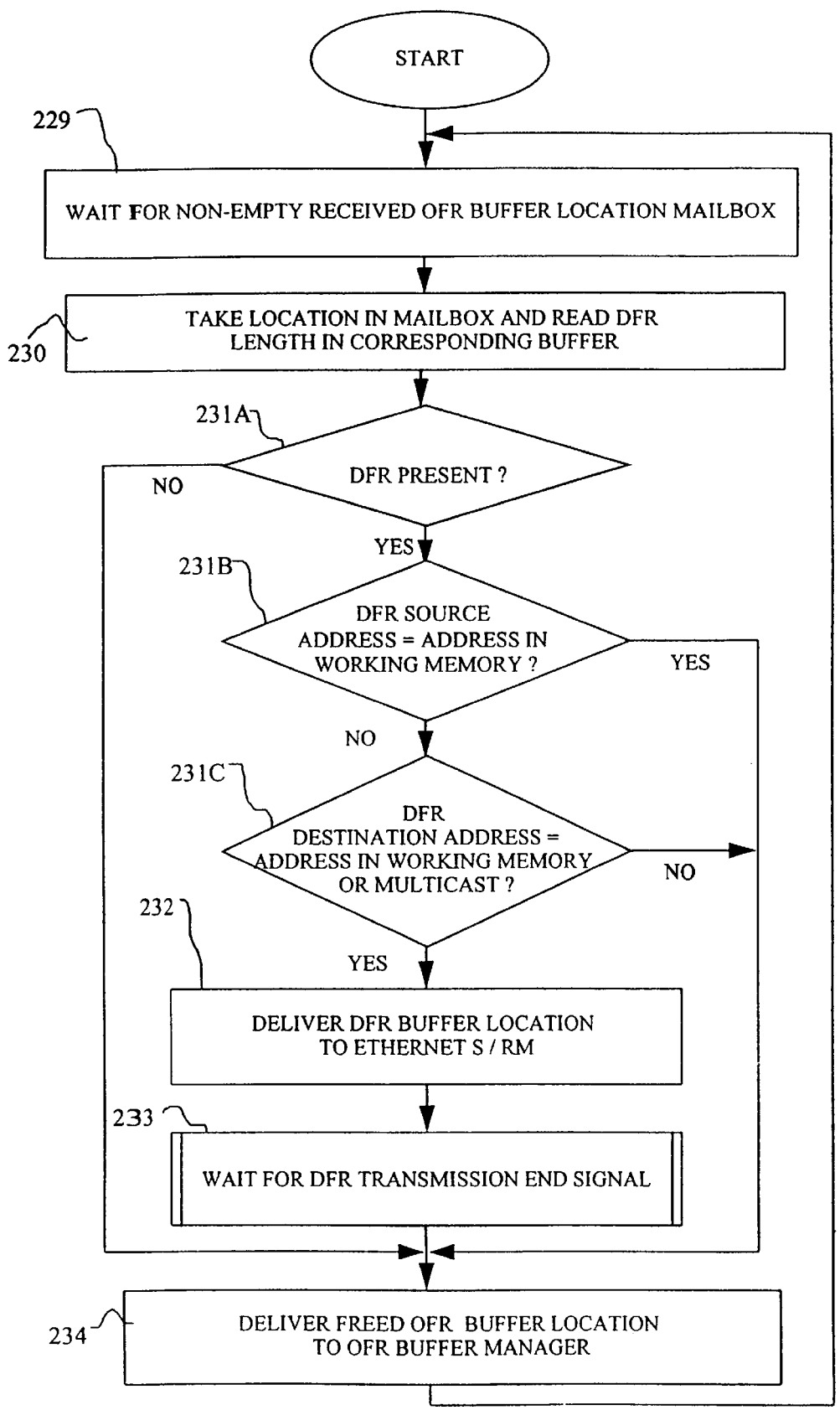
Figure 48:
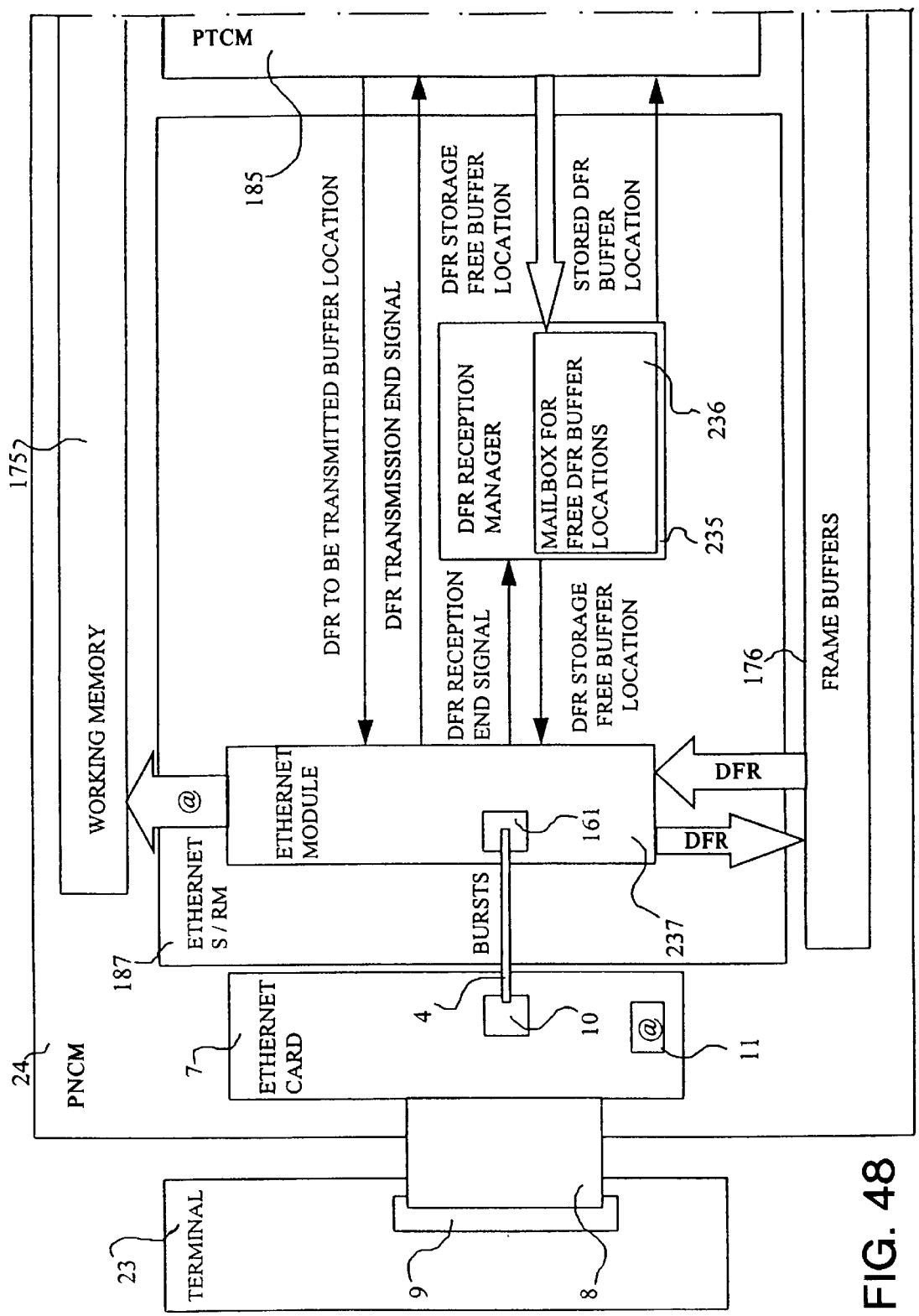
Figure 49:
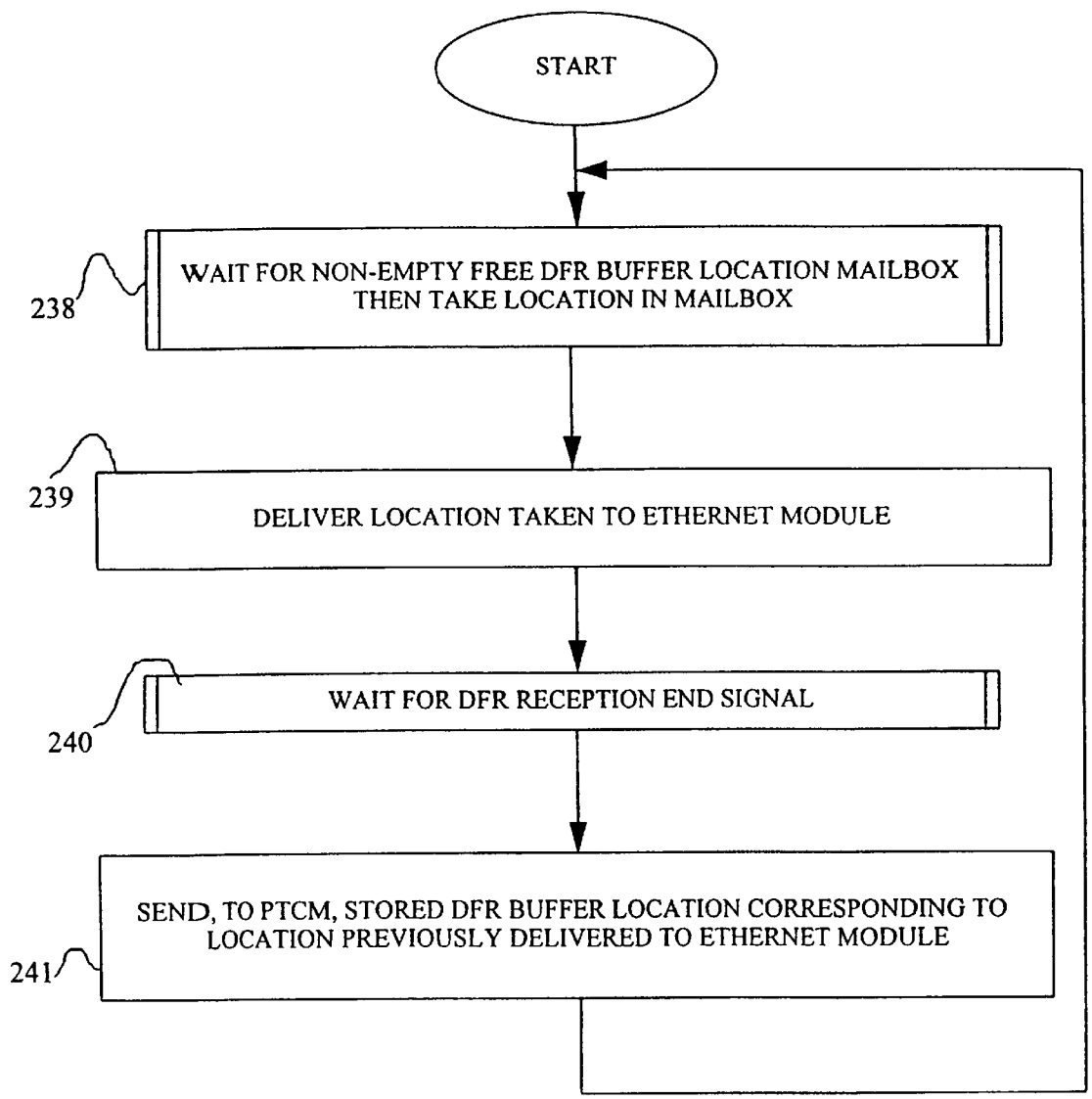
Figure 50:
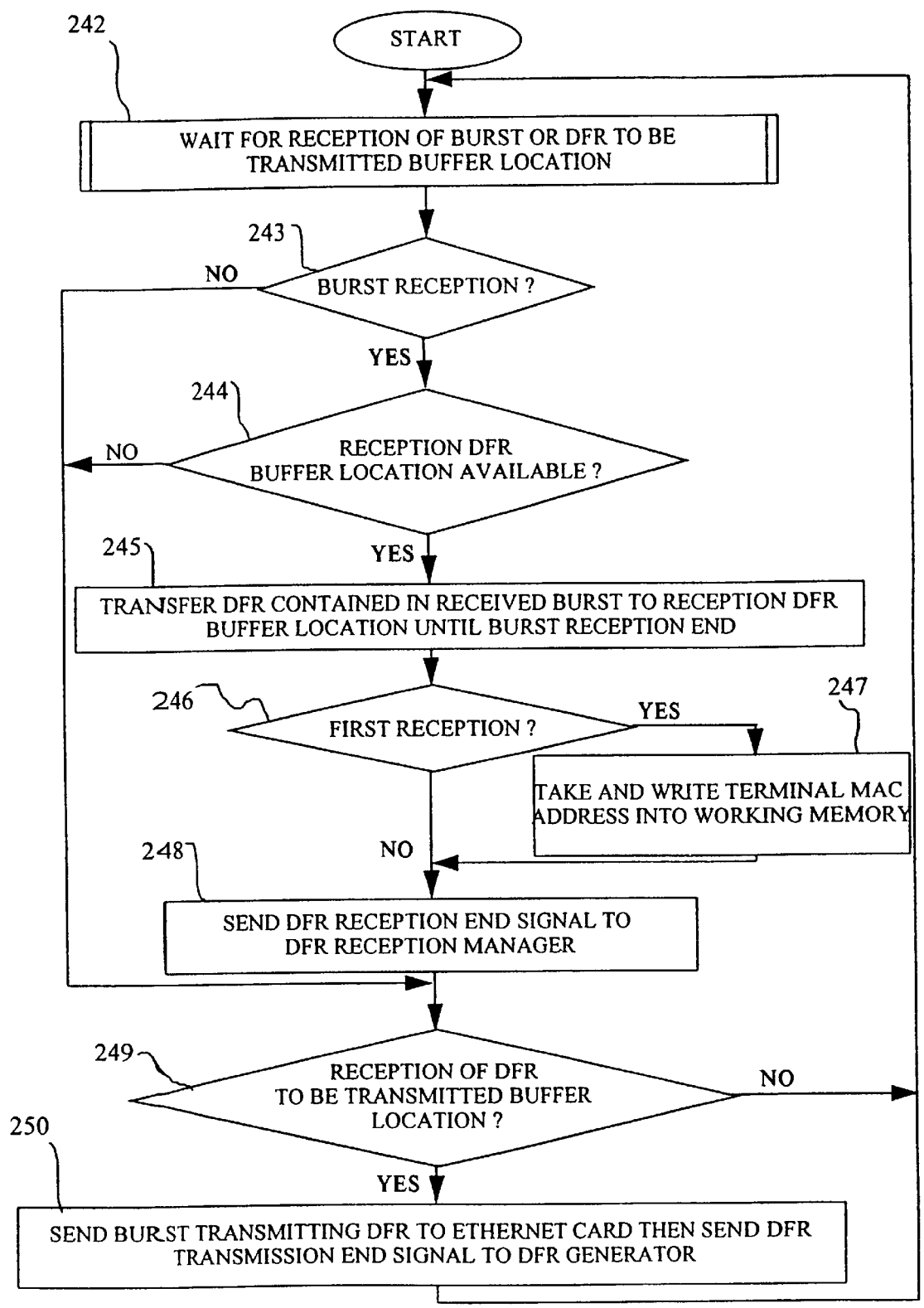
Figure 50A:
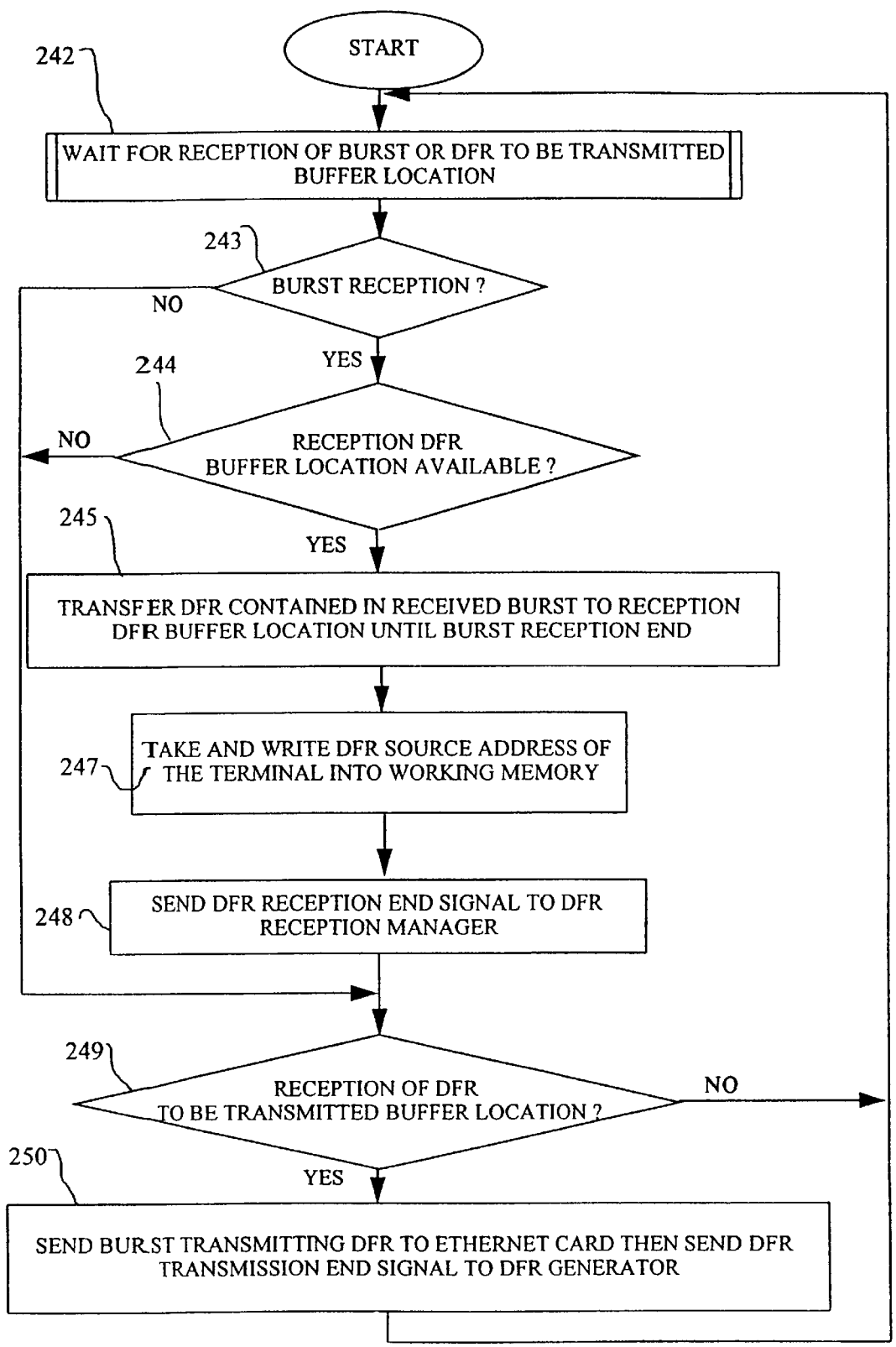
Figure 50B:
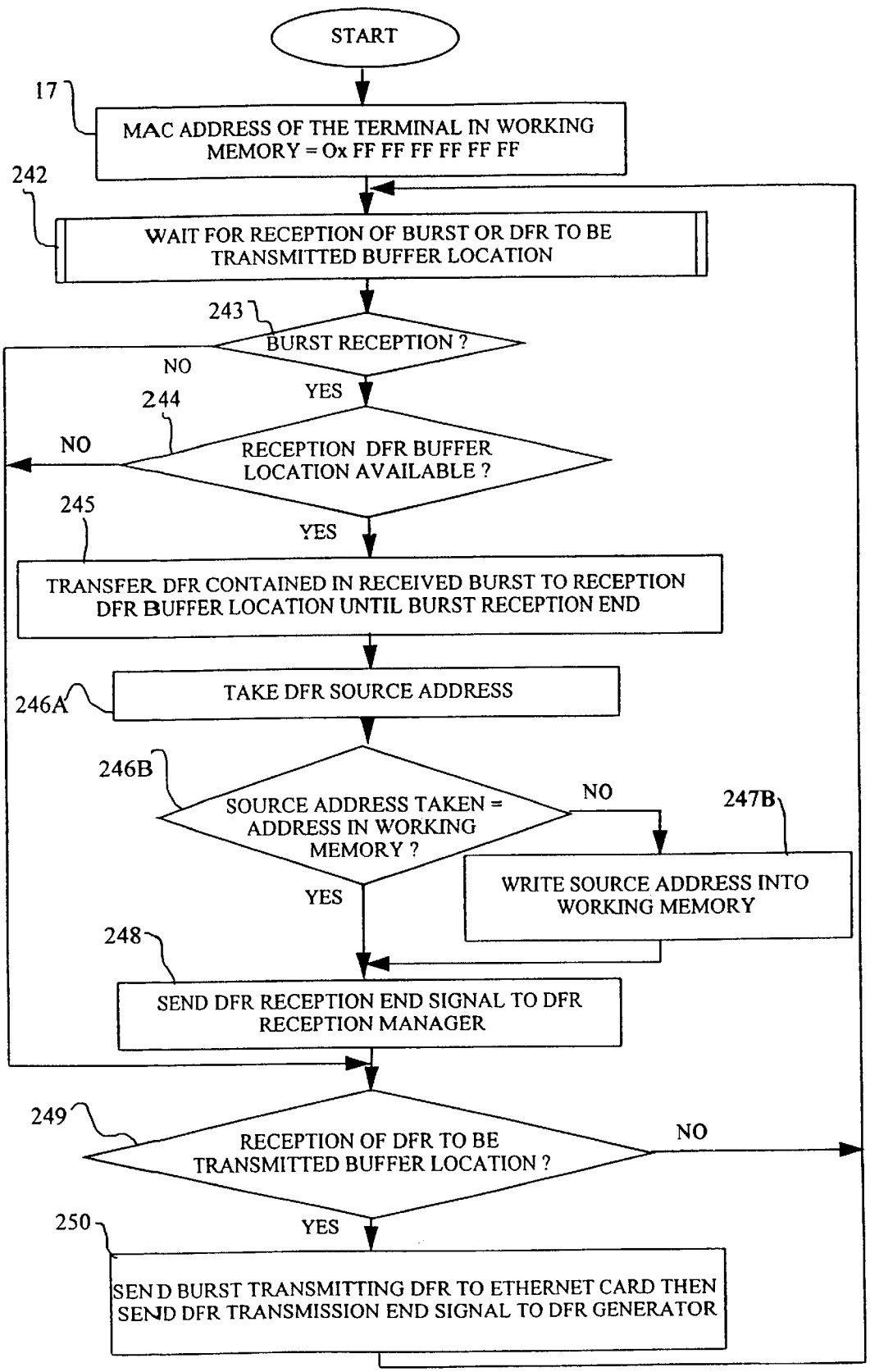
Figure 51:
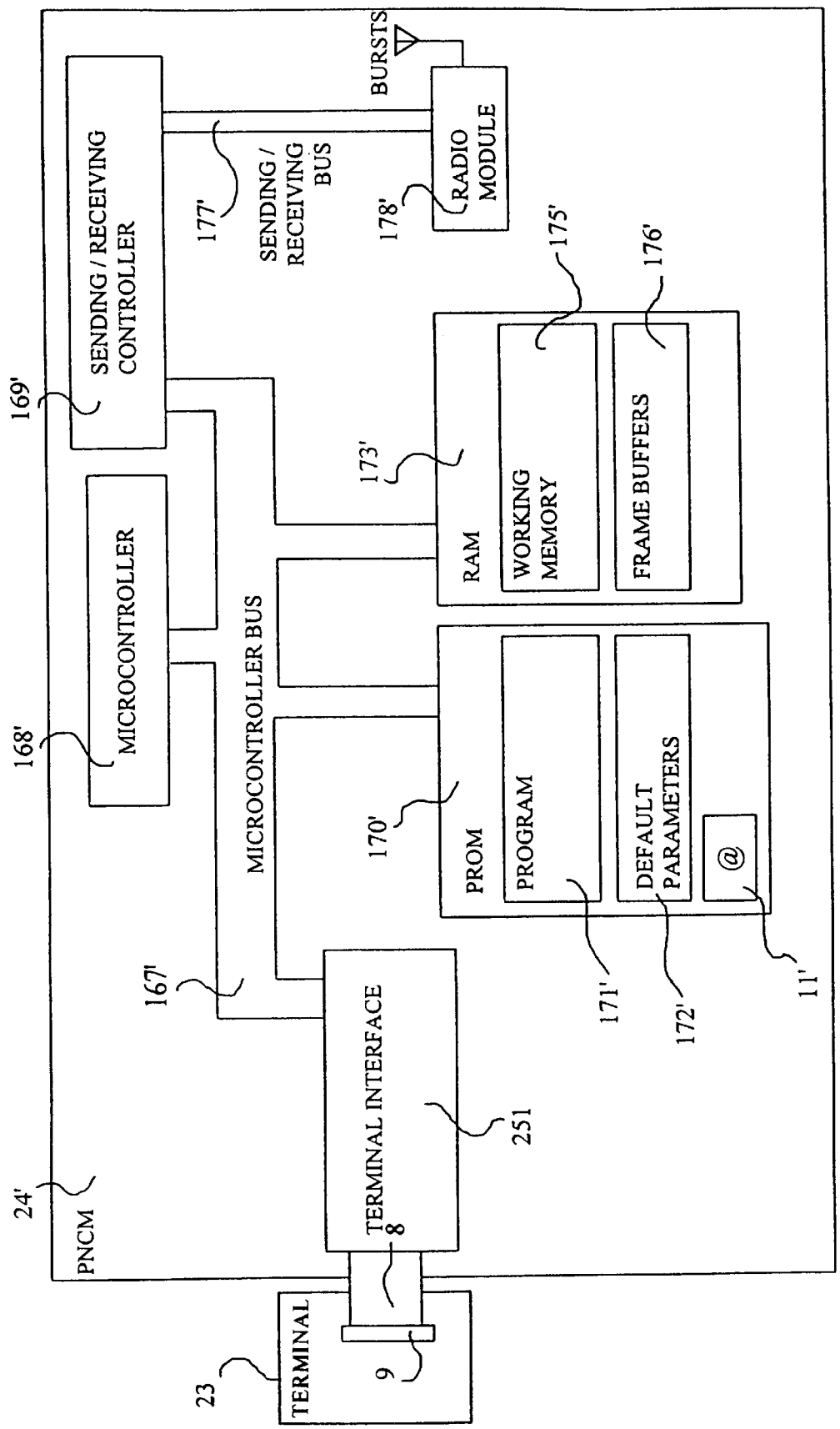
Figure 52:
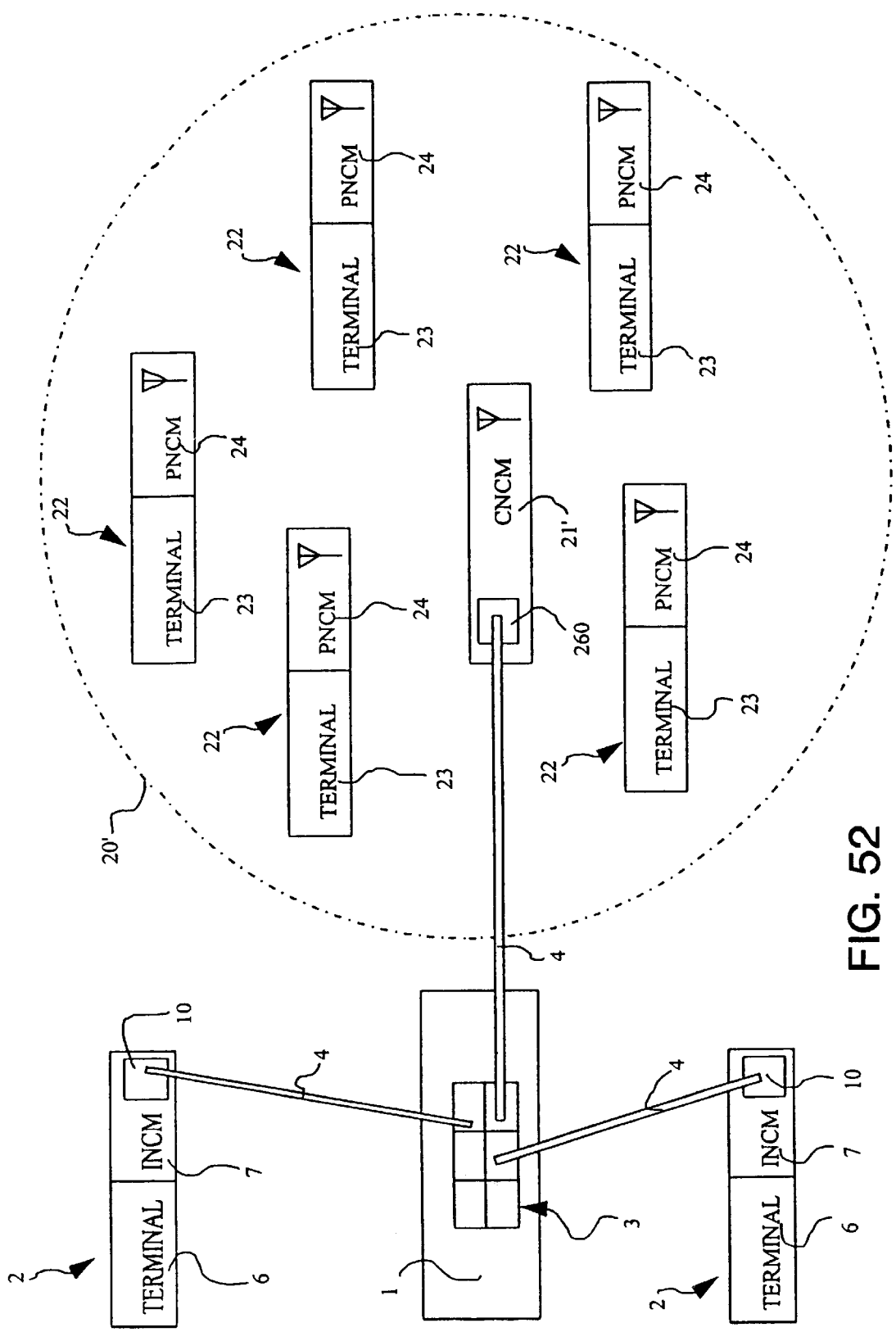
Figure 53:
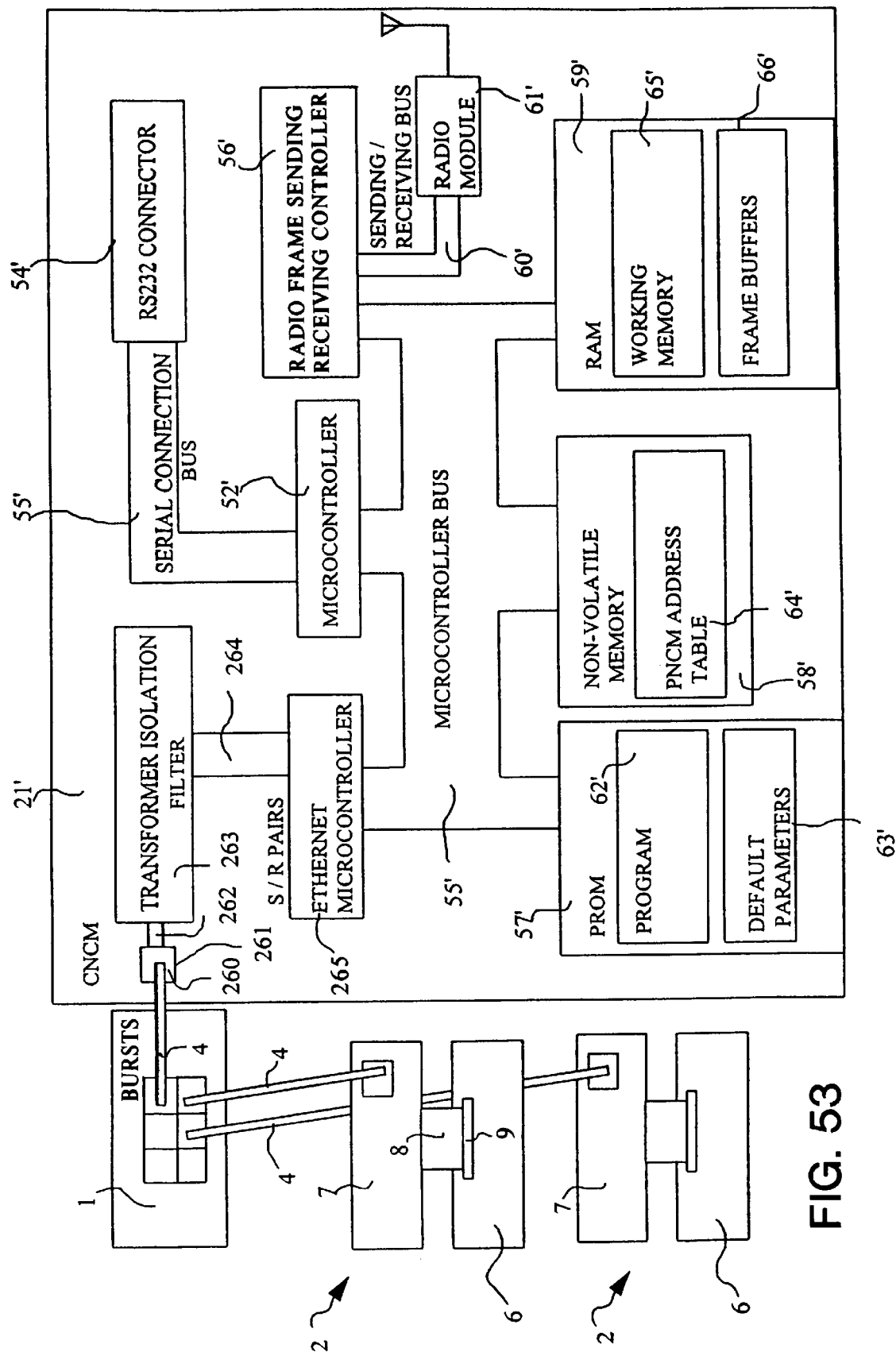
Figure 54:
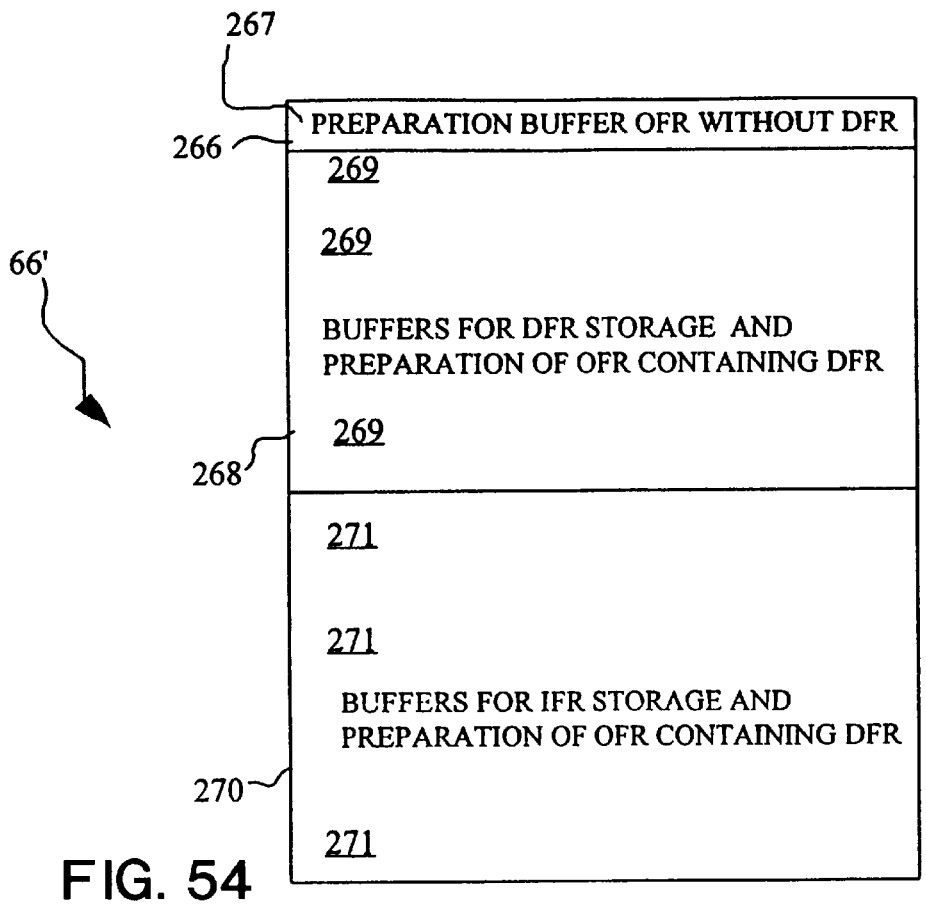
Figure 55:
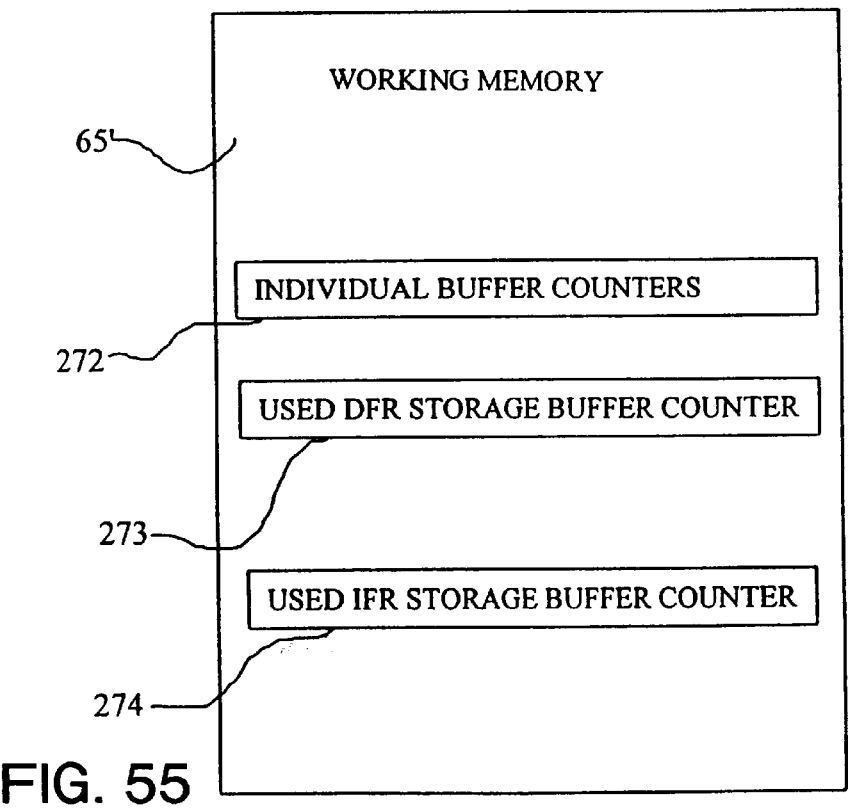
Figure 56:
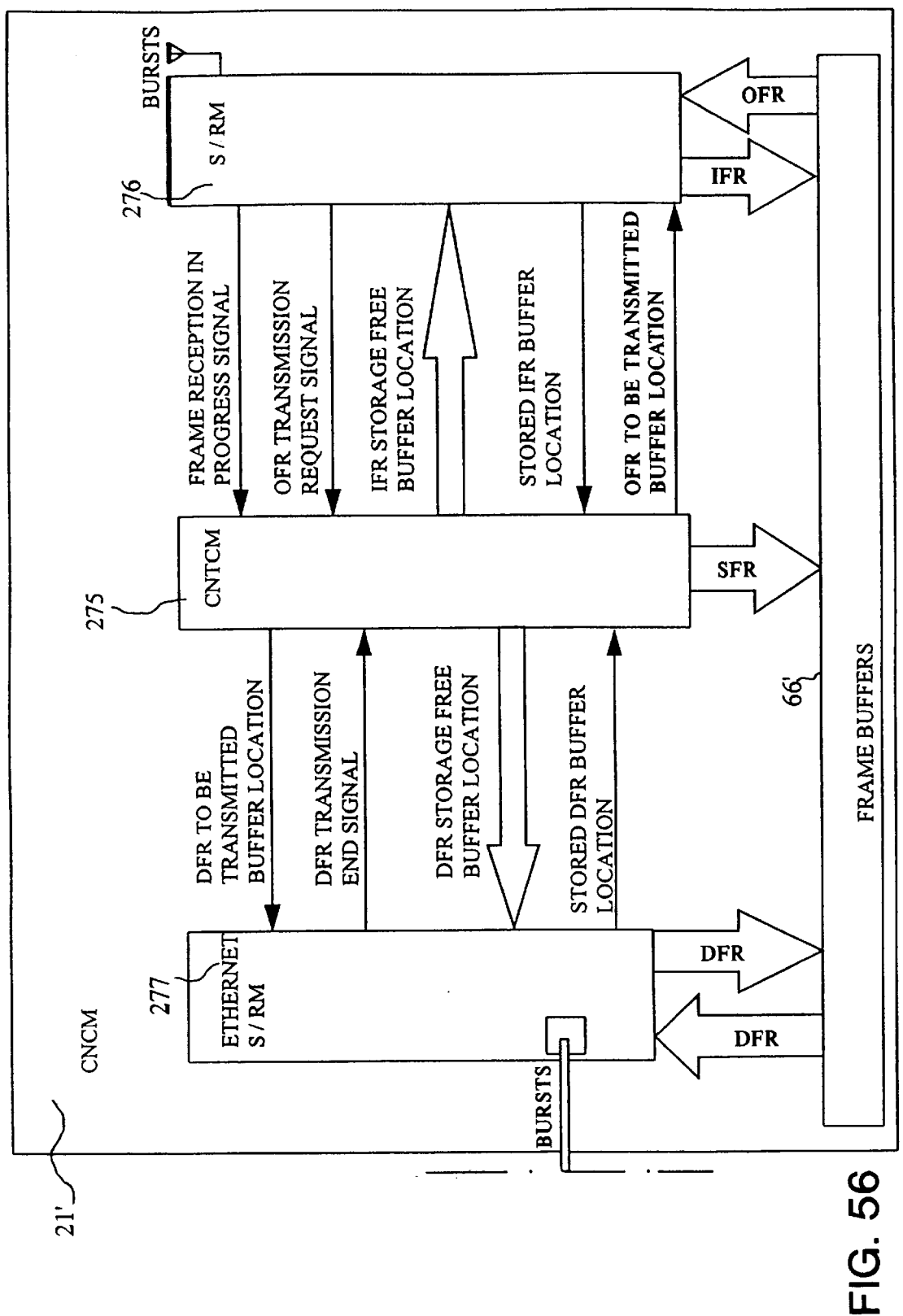
Figure 57:
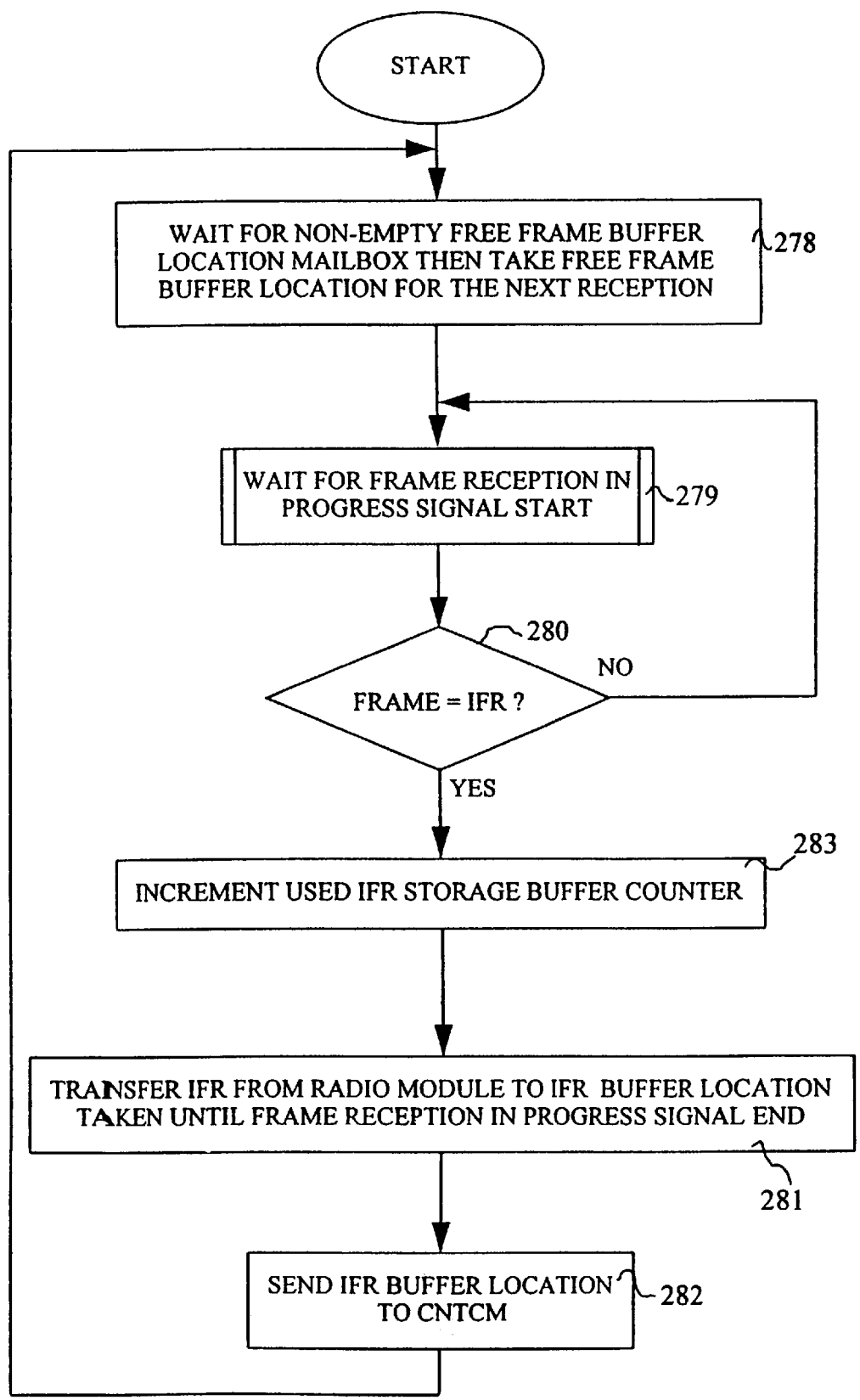
Figure 58:
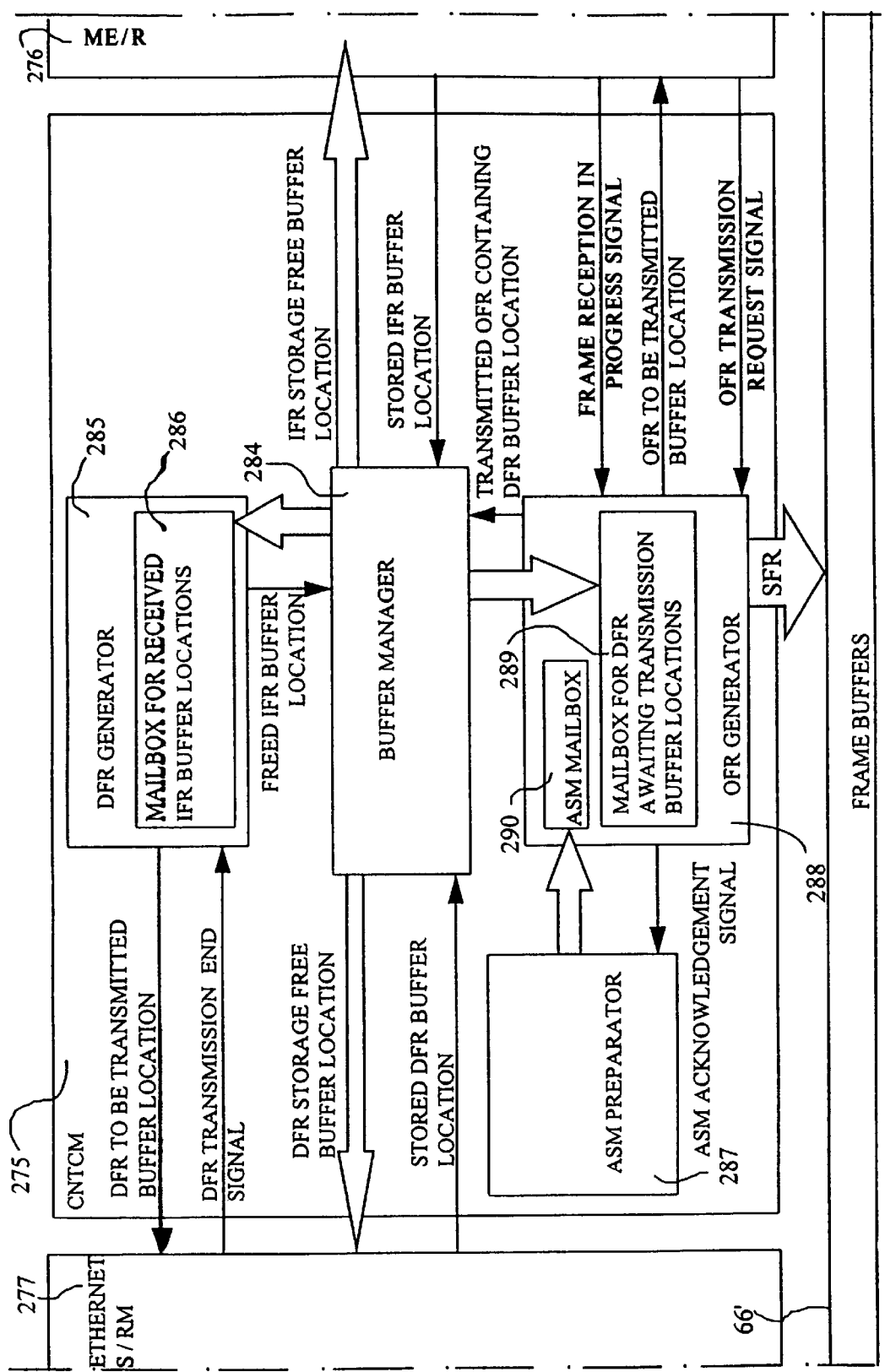
Figure 59:
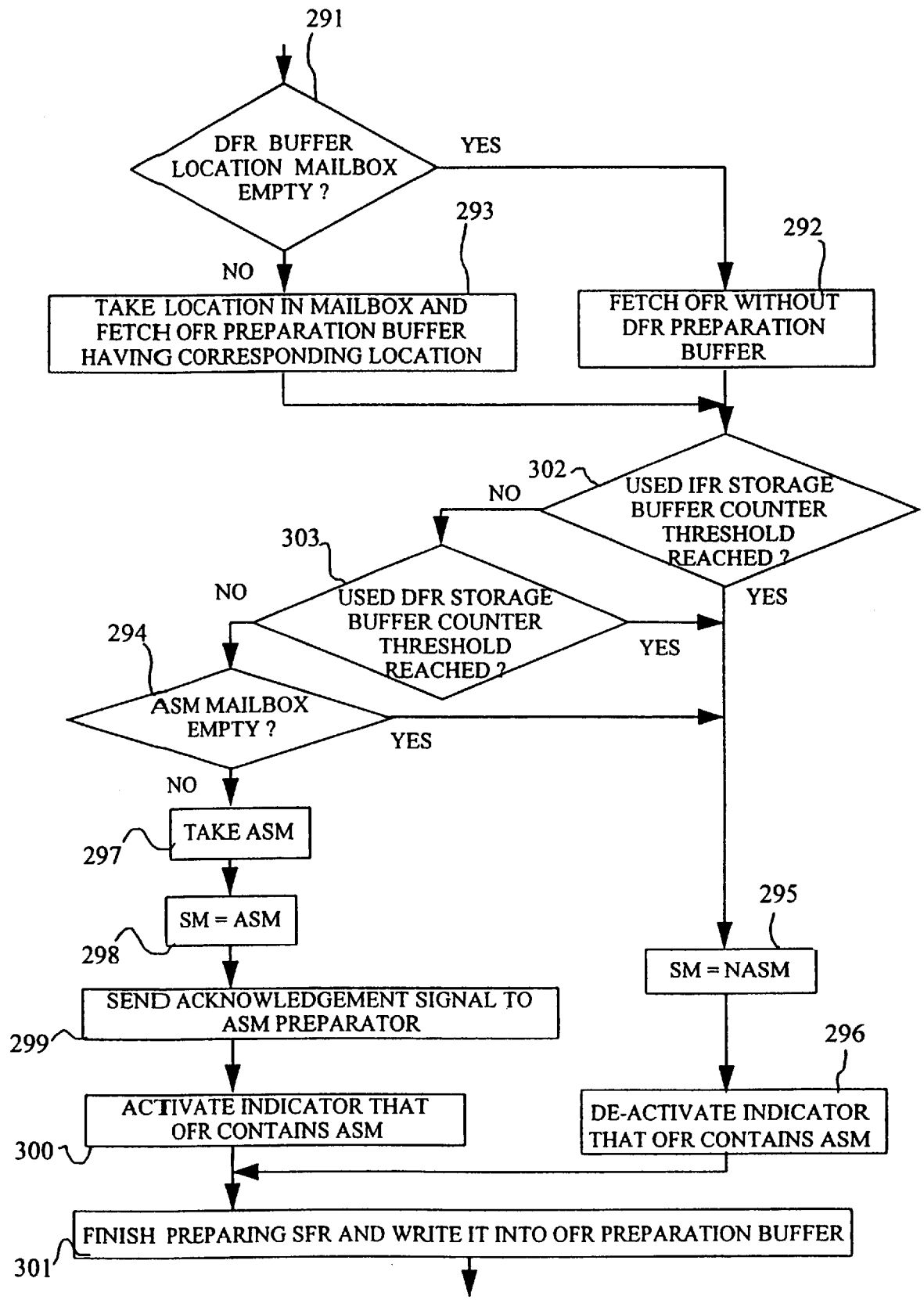
Figure 60:
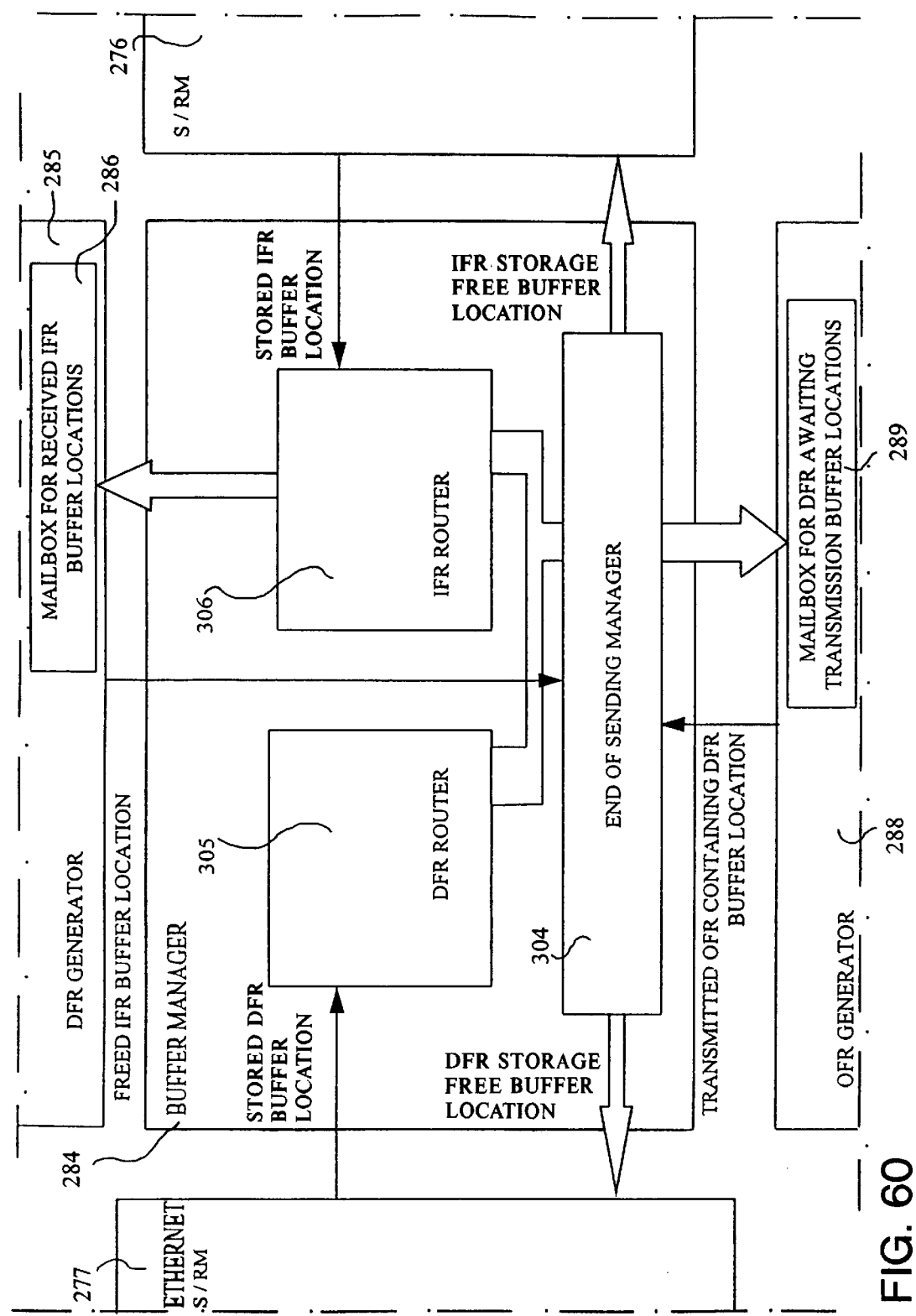
Figure 61:
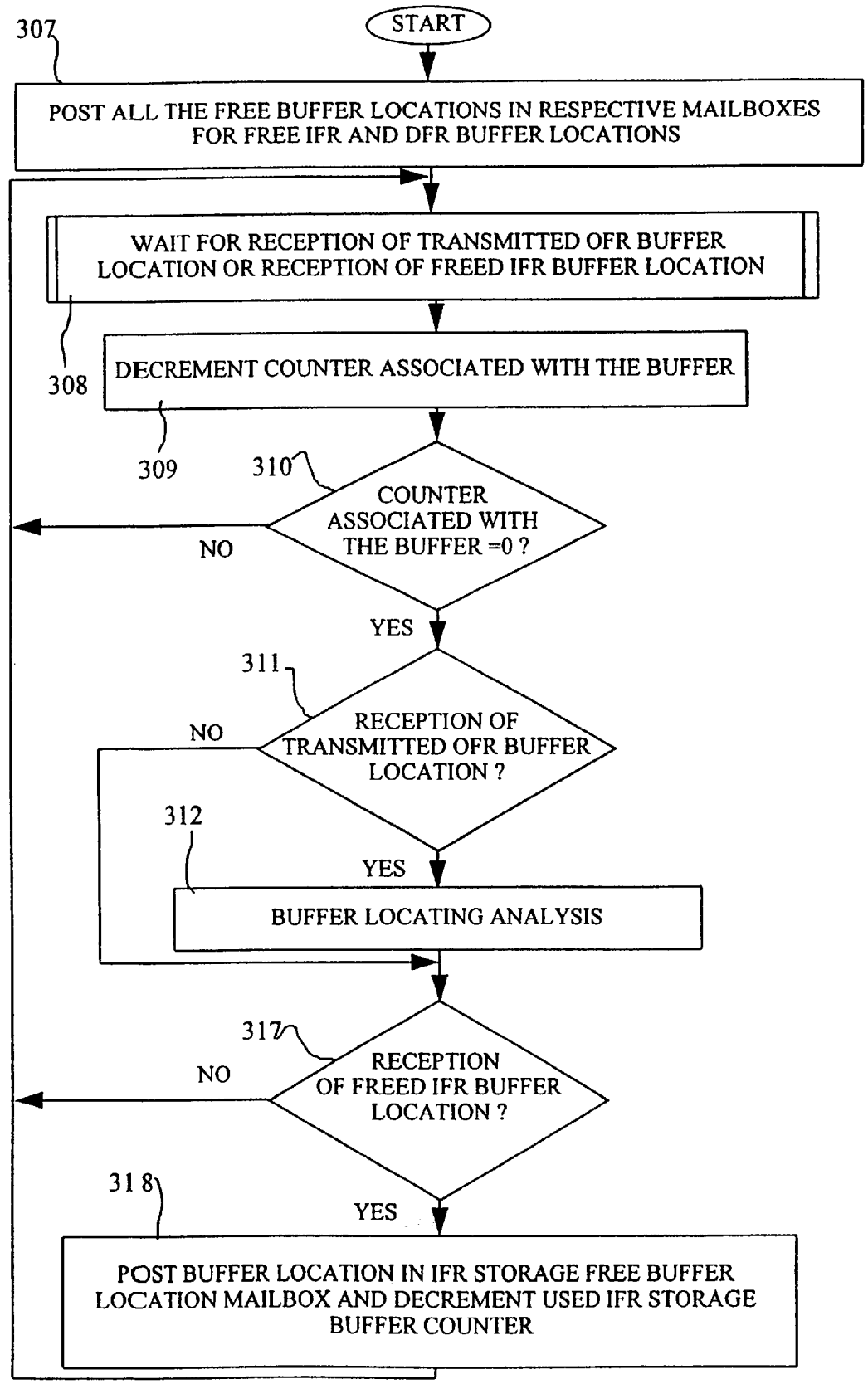
Figure 62:
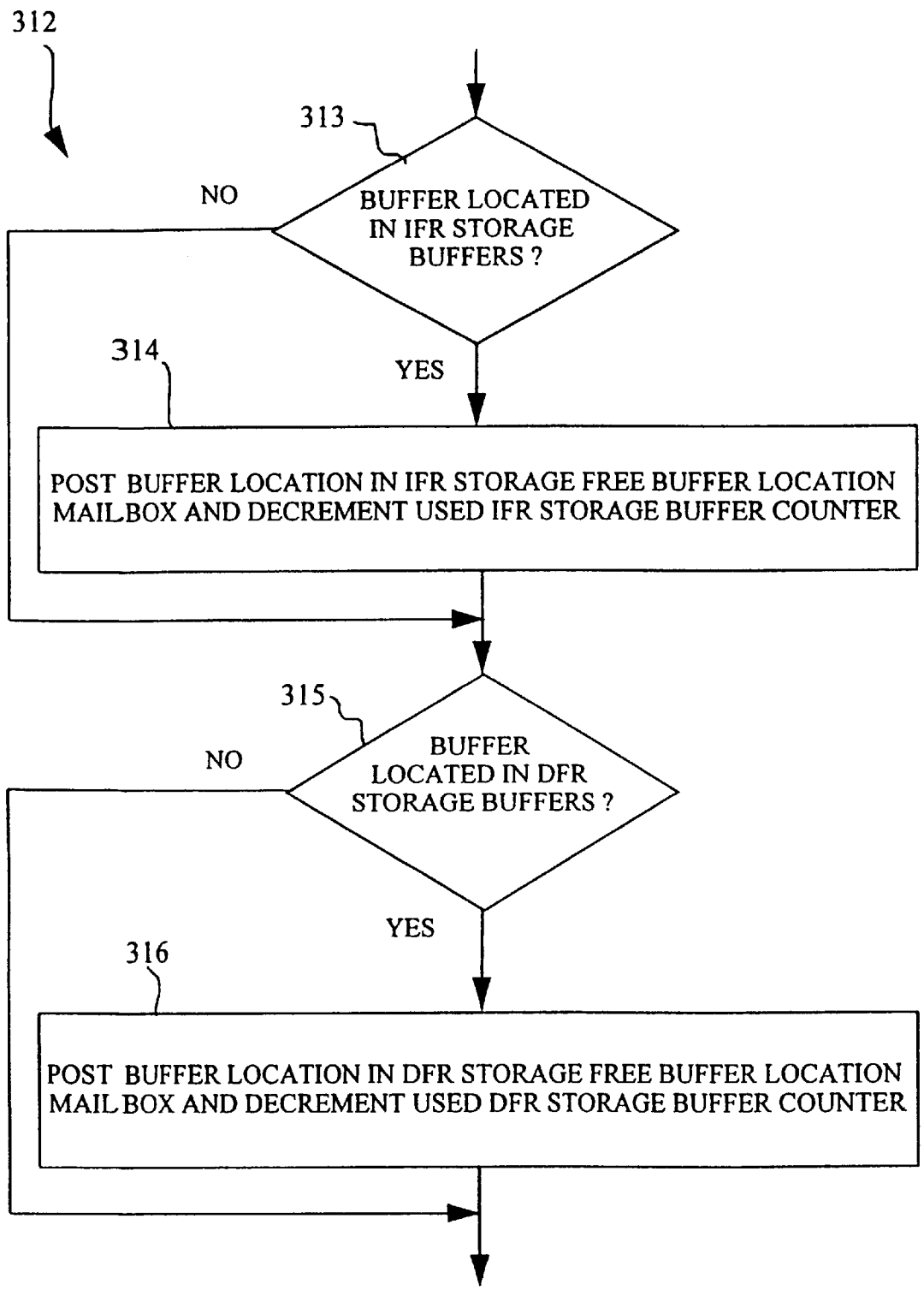
Figure 63:
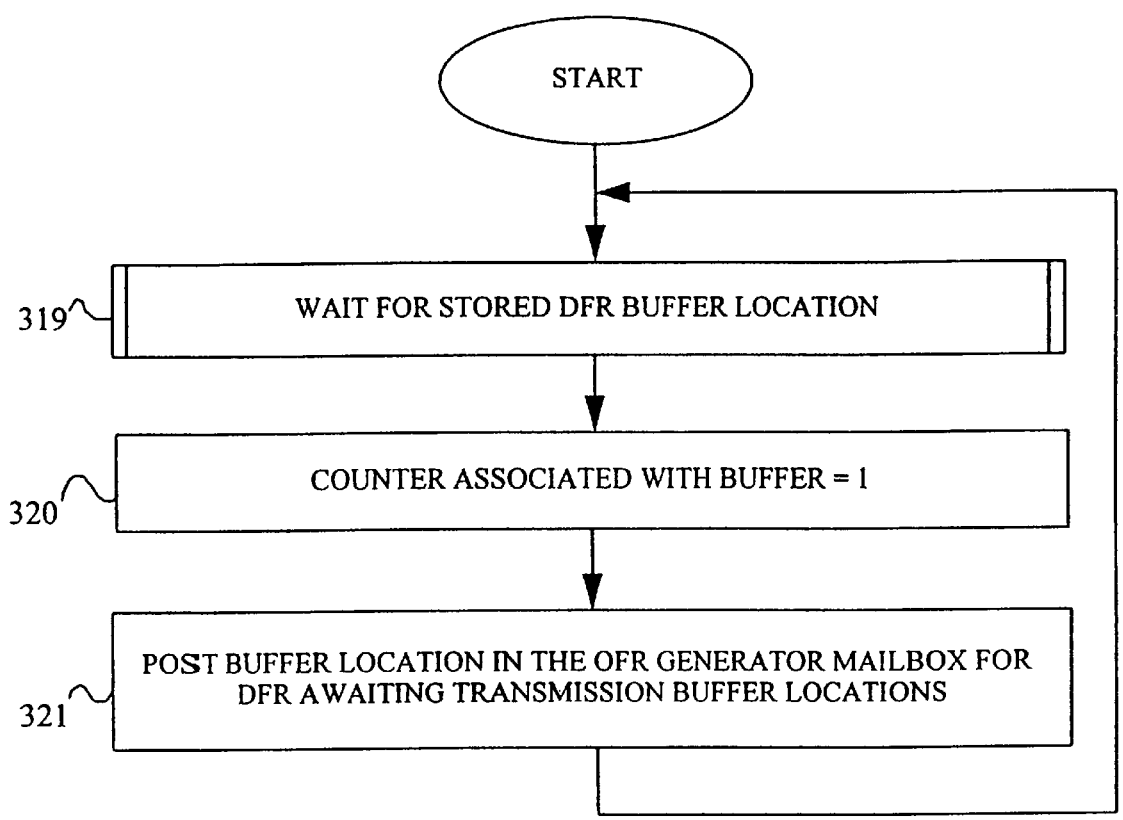
Figure 64:
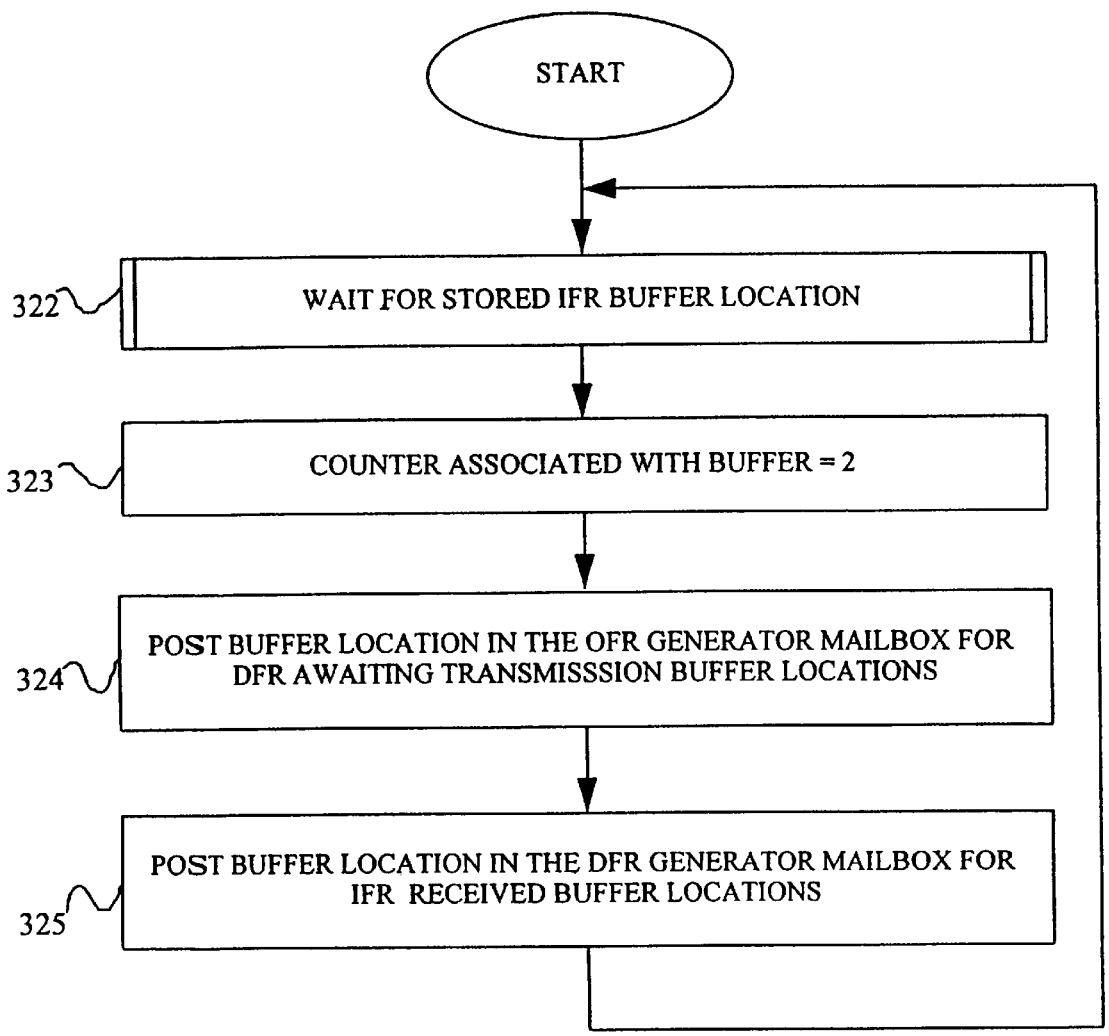
Figure 65:
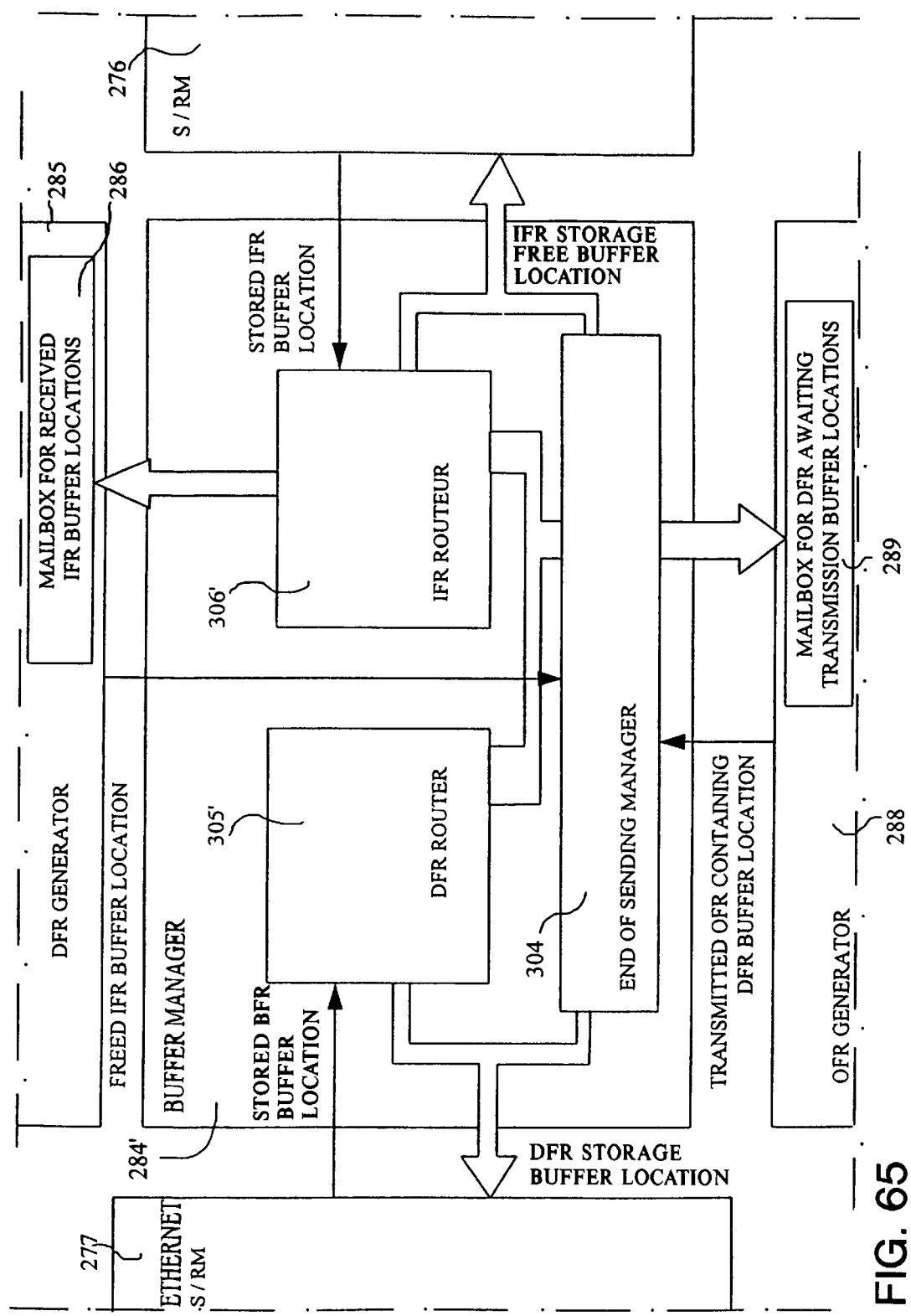
Figure 66:
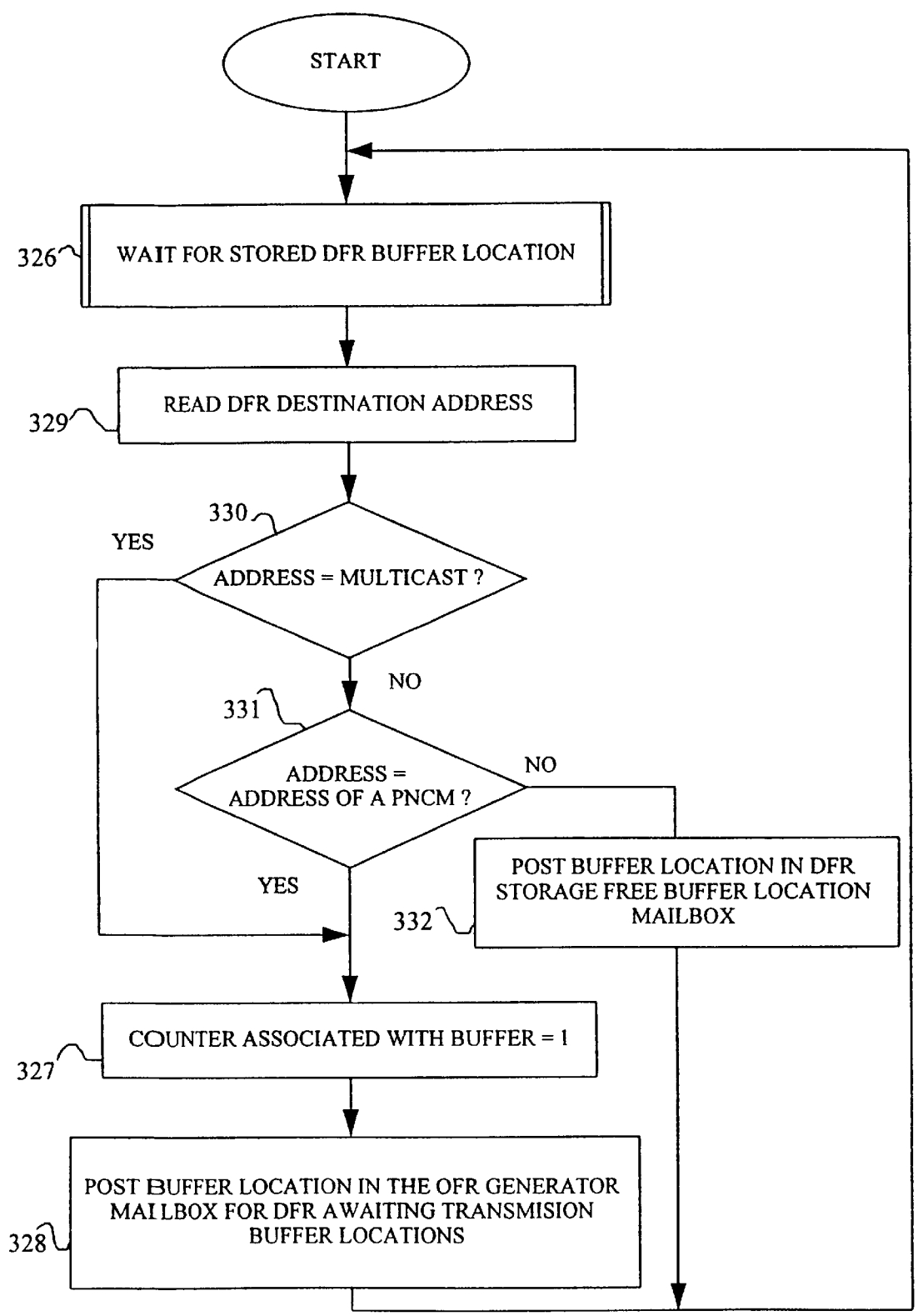
Figure 67:
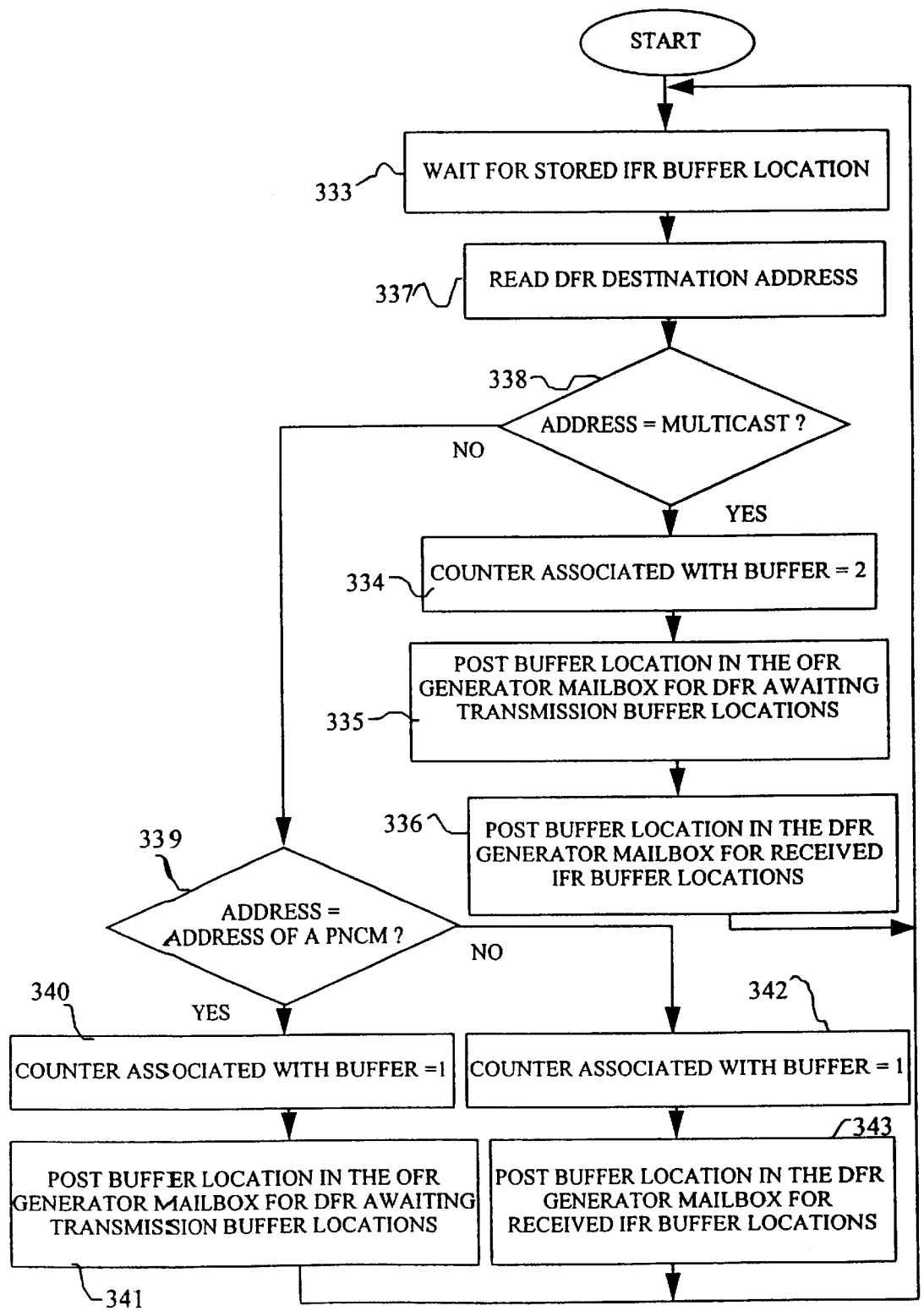
Figure 68:
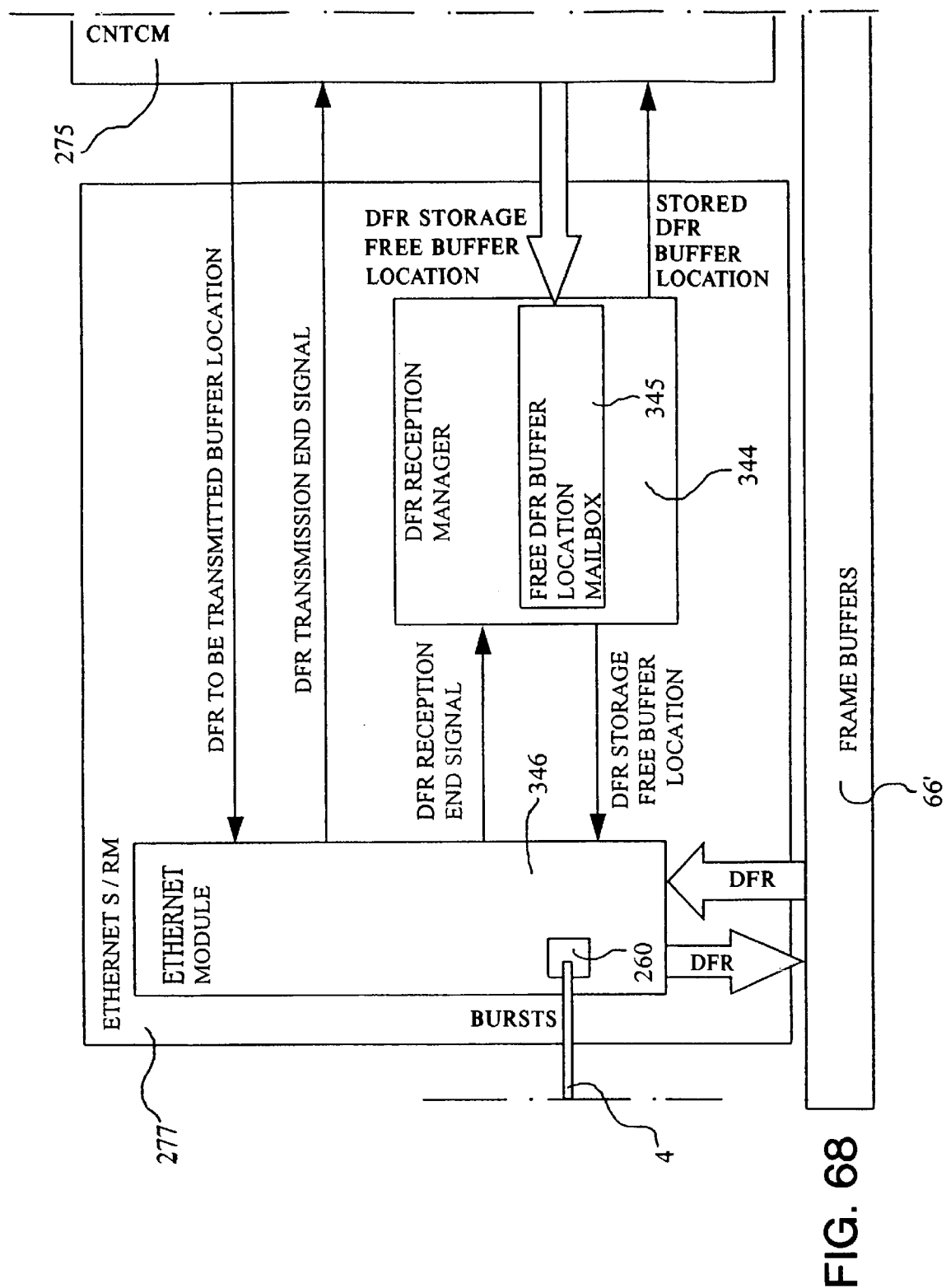
Figure 69:
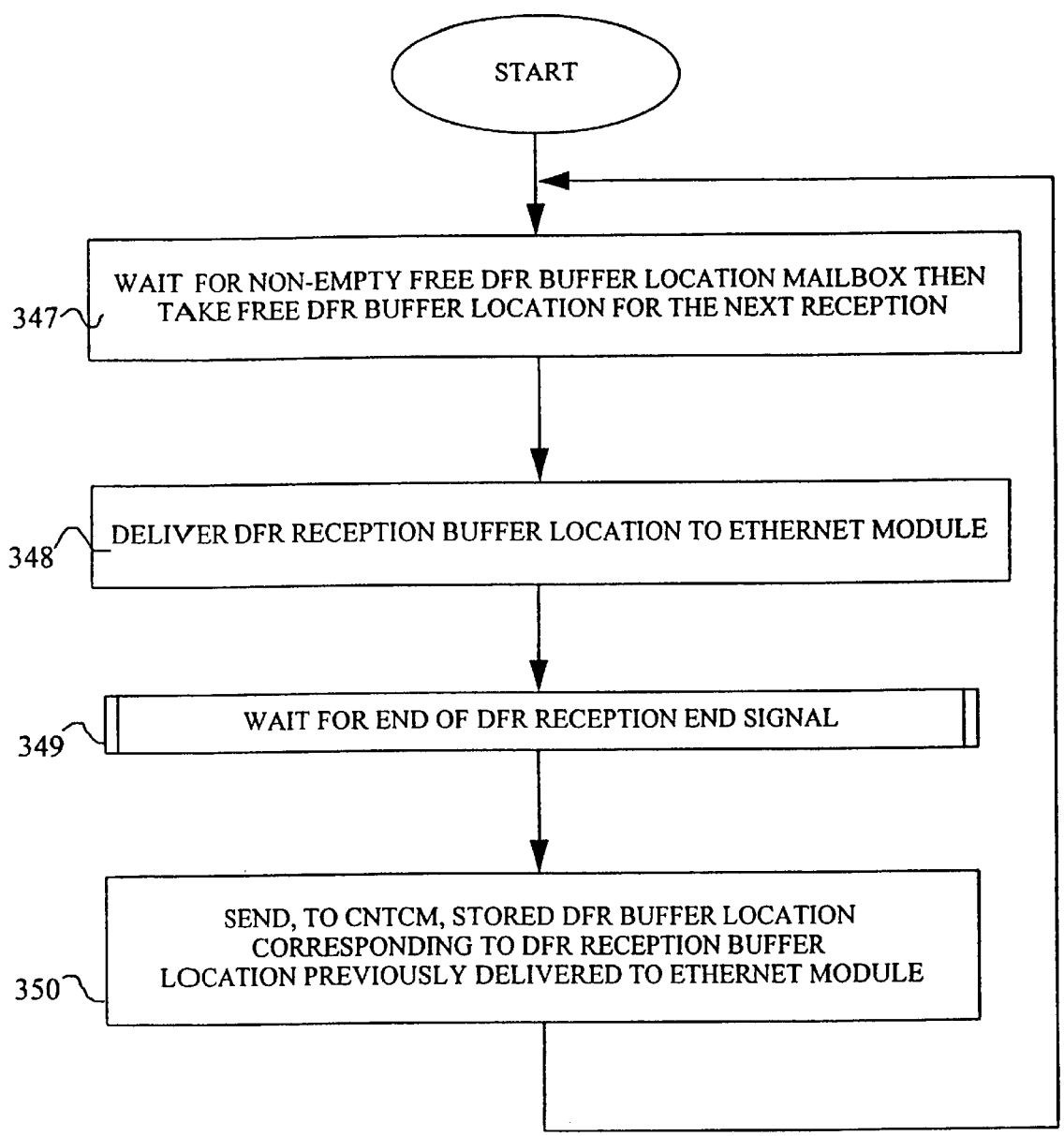
Figure 70:
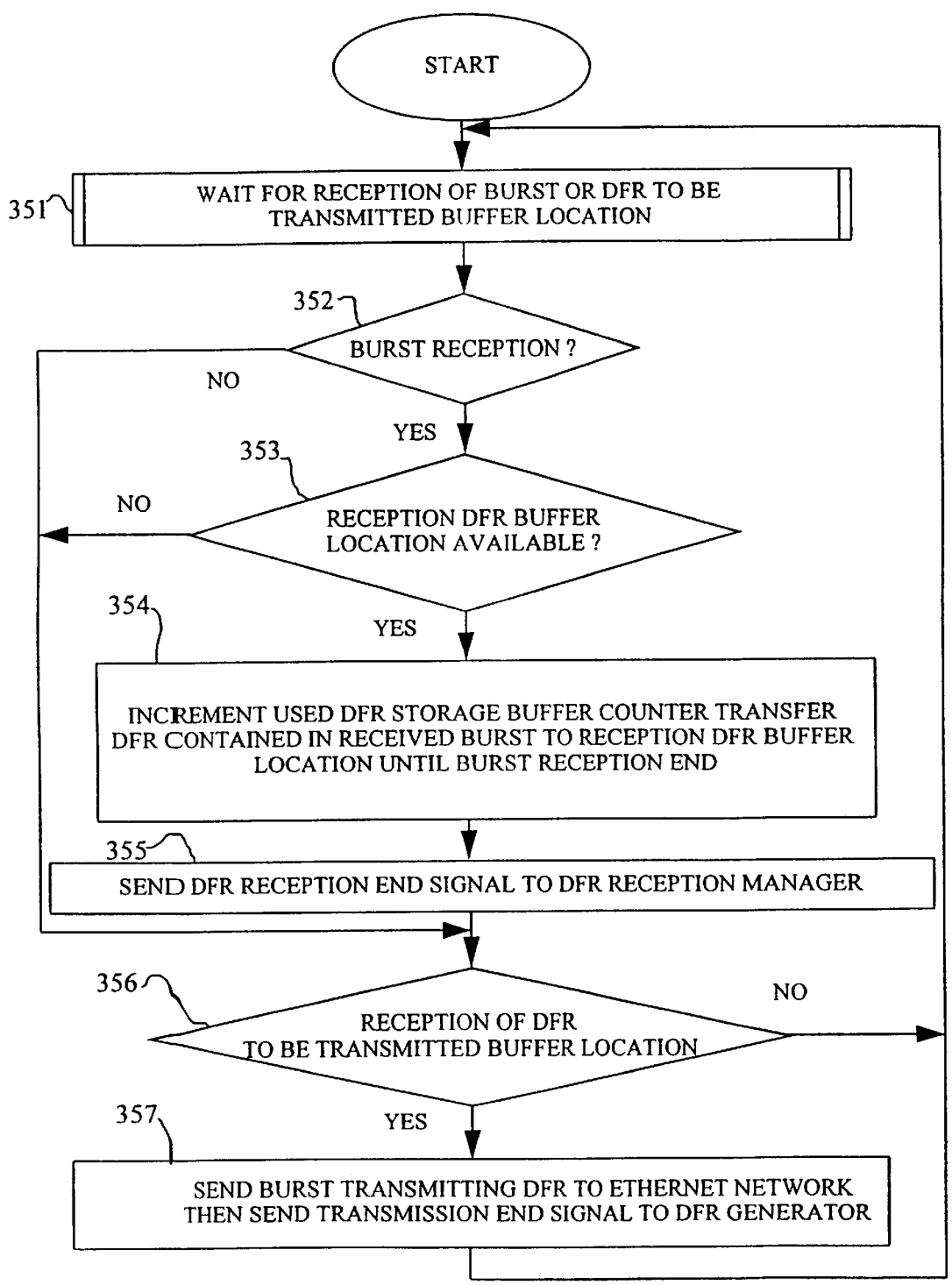
Figure 71:
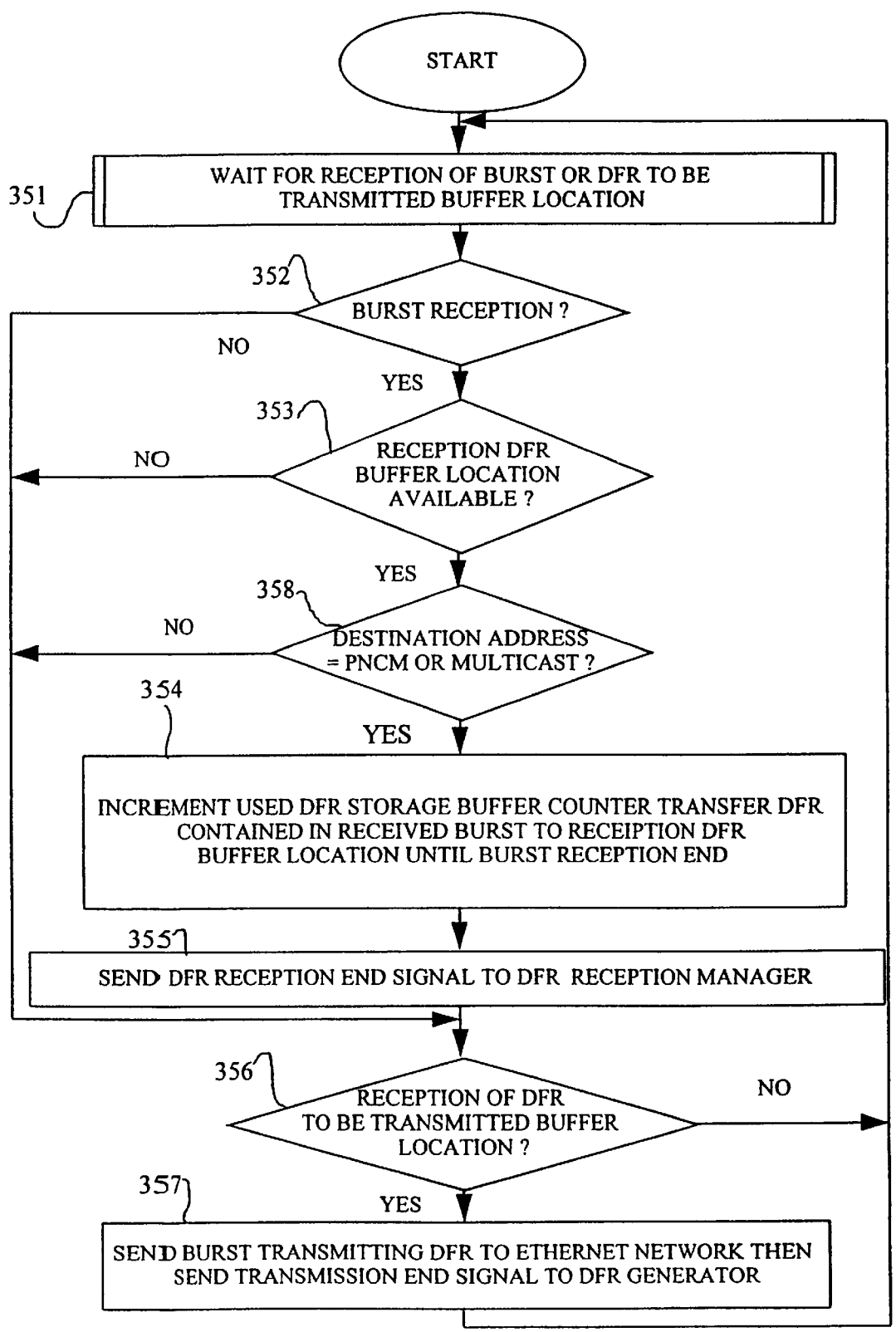
Figure 72:
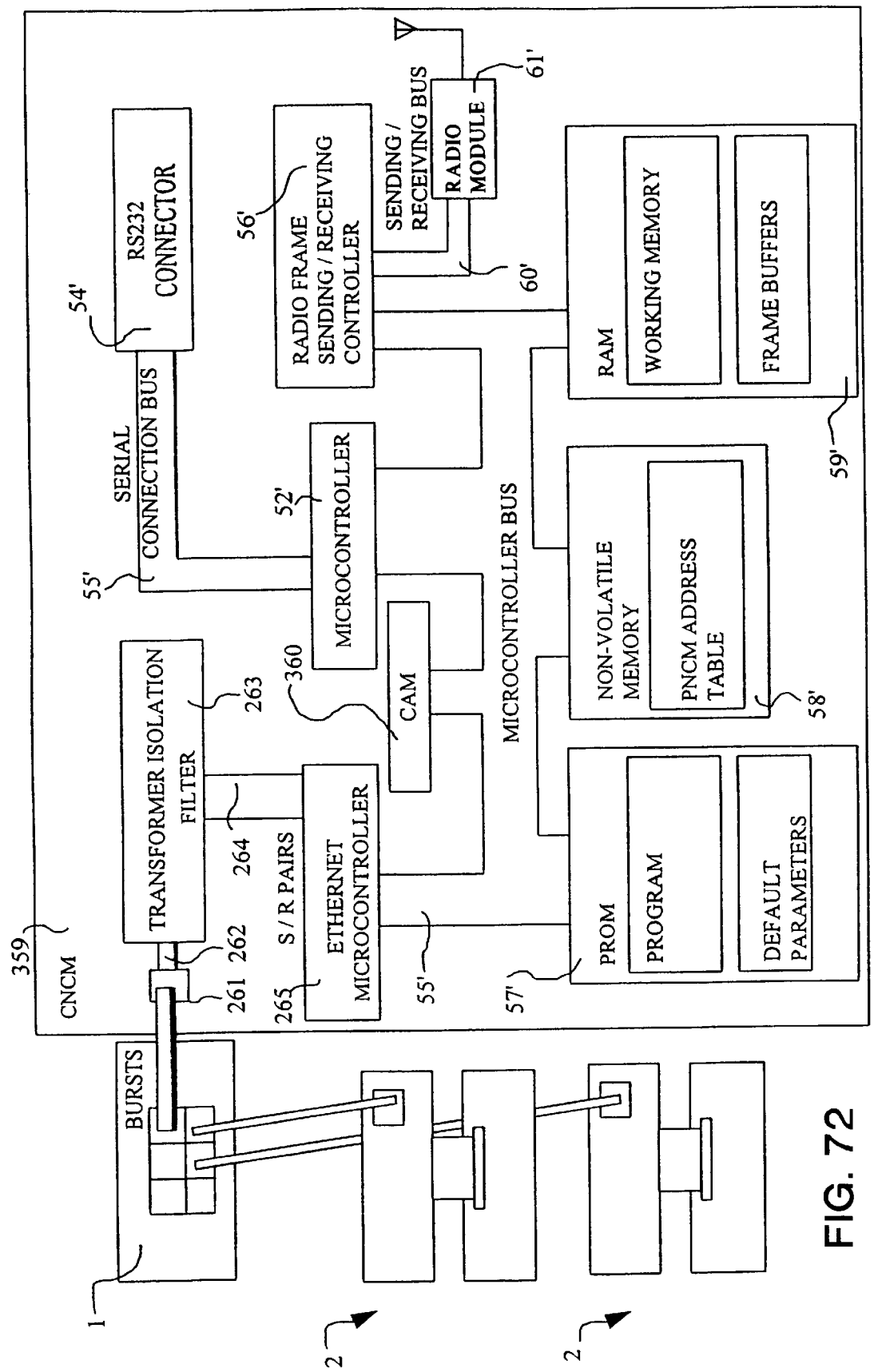
Figure 73:
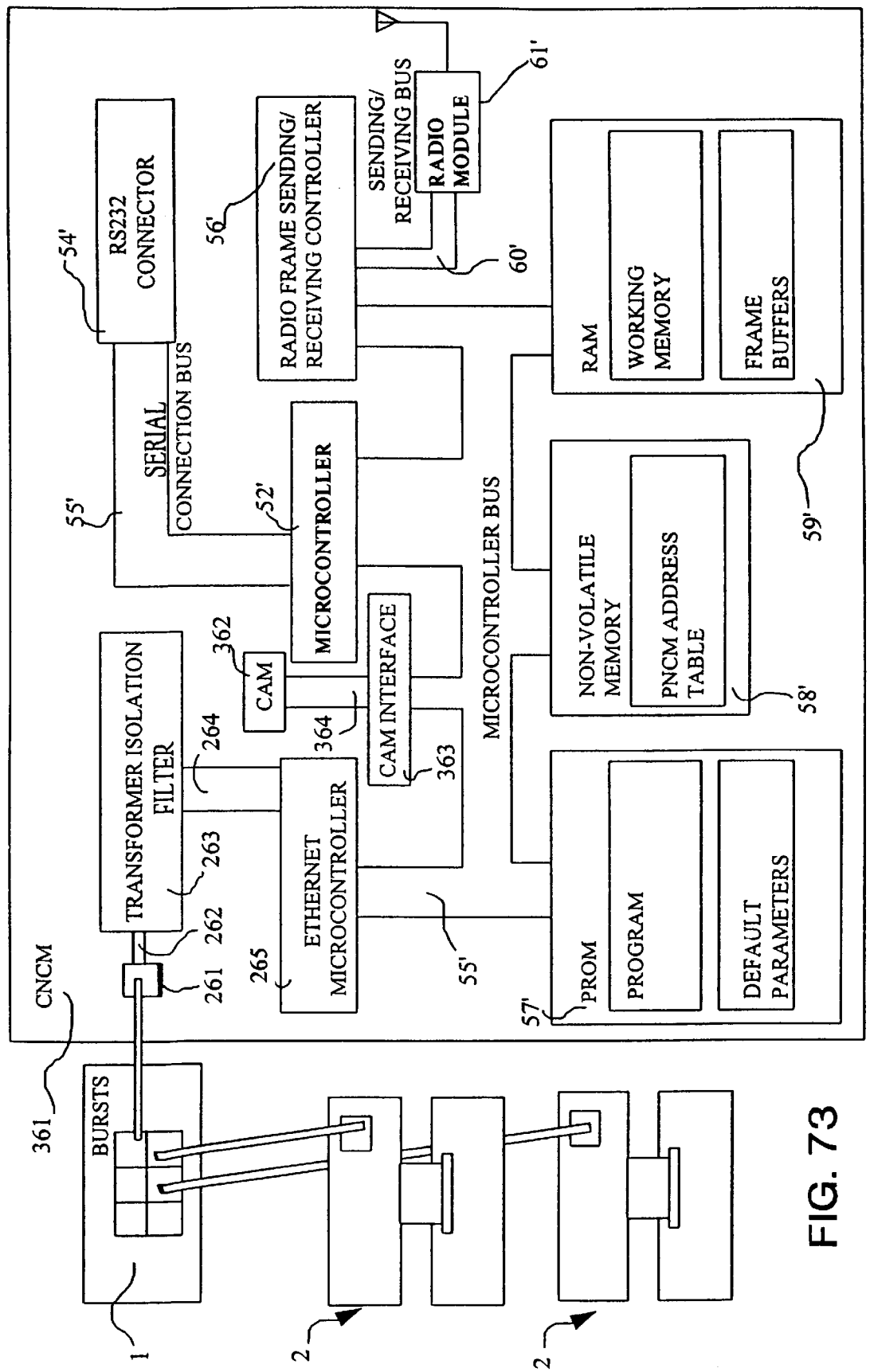
Figure 74:
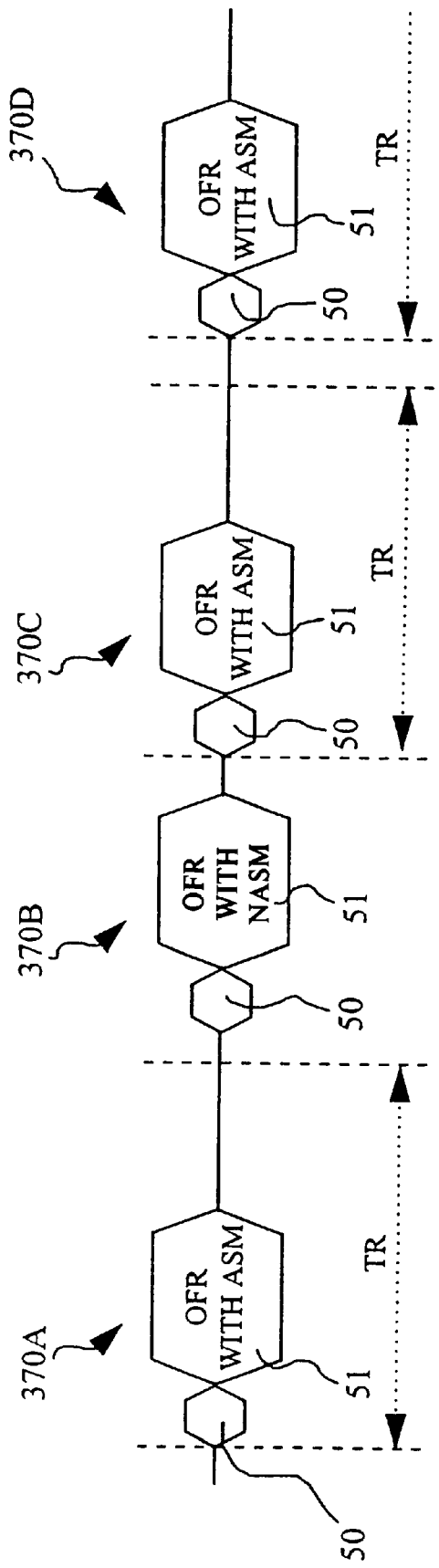
Figure 75:
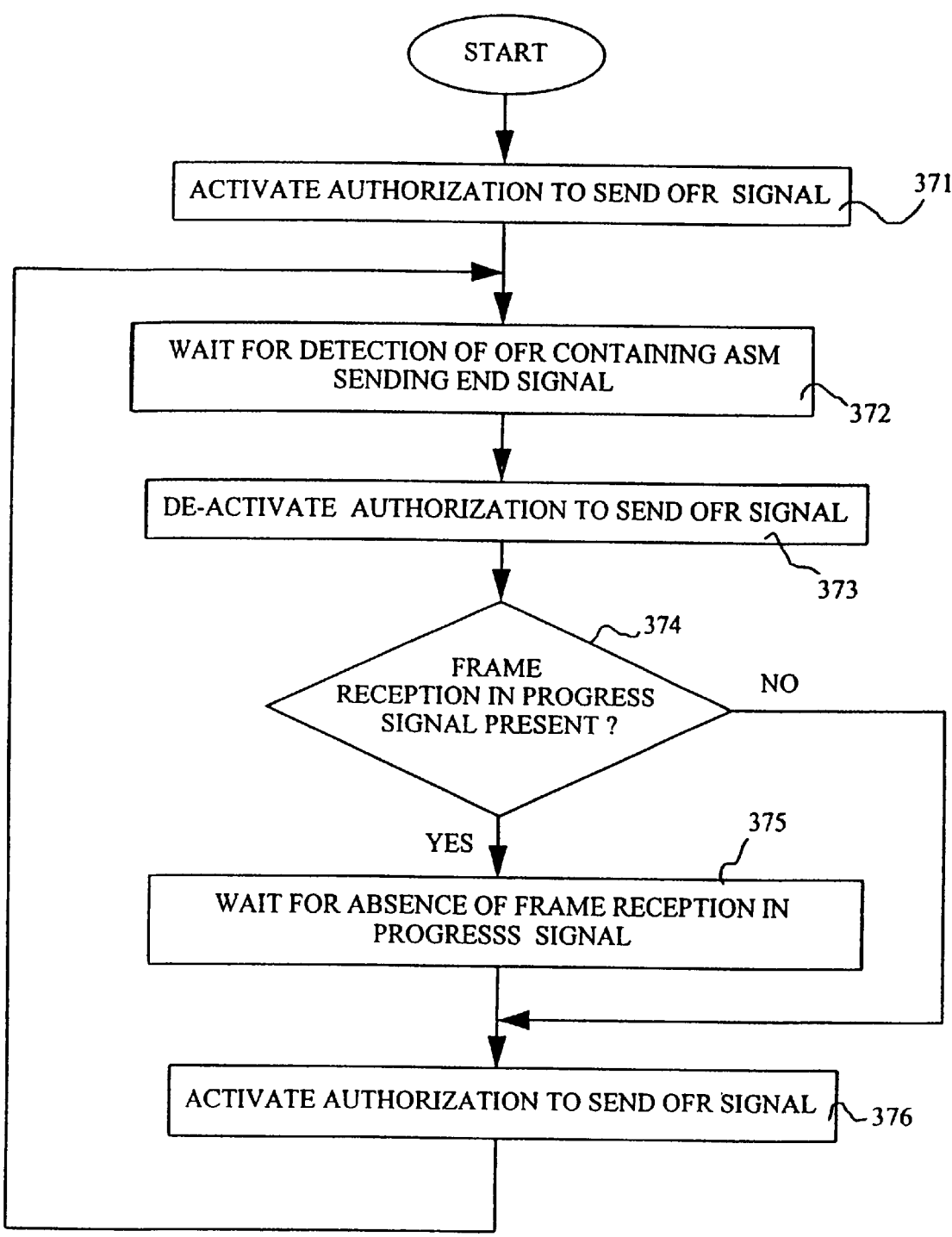
Figure 76:
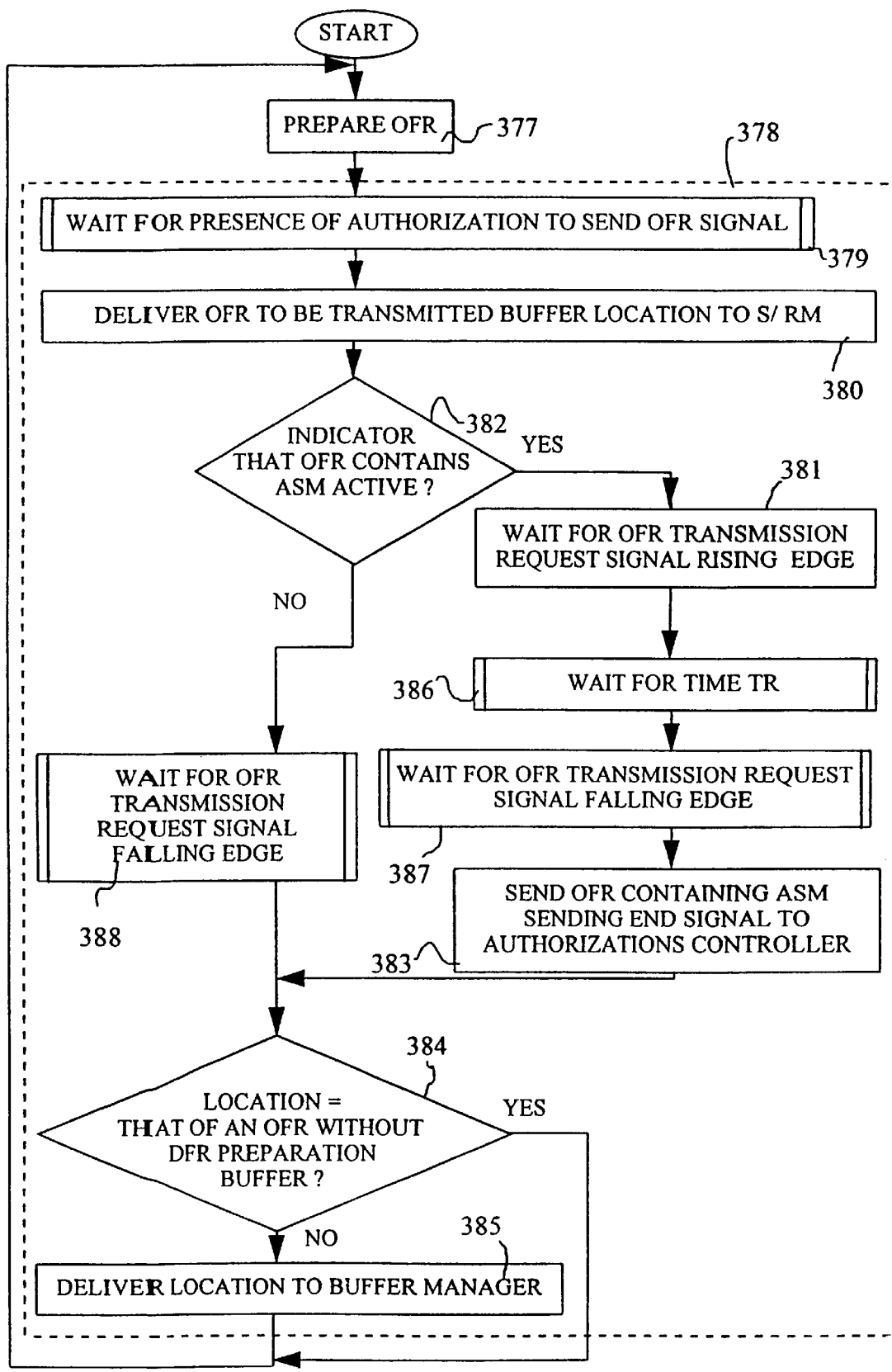
Figure 80:
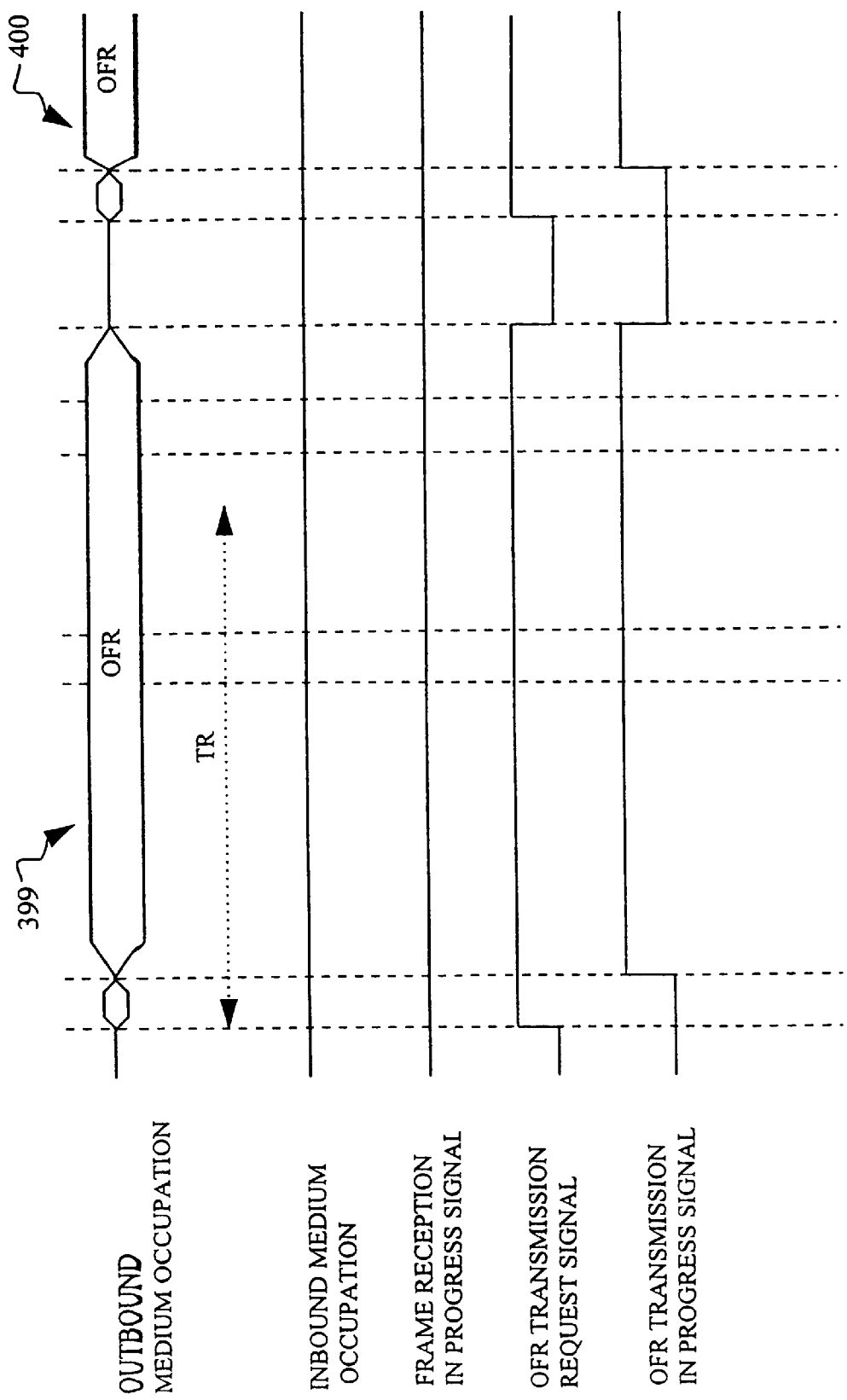
Figure 81:
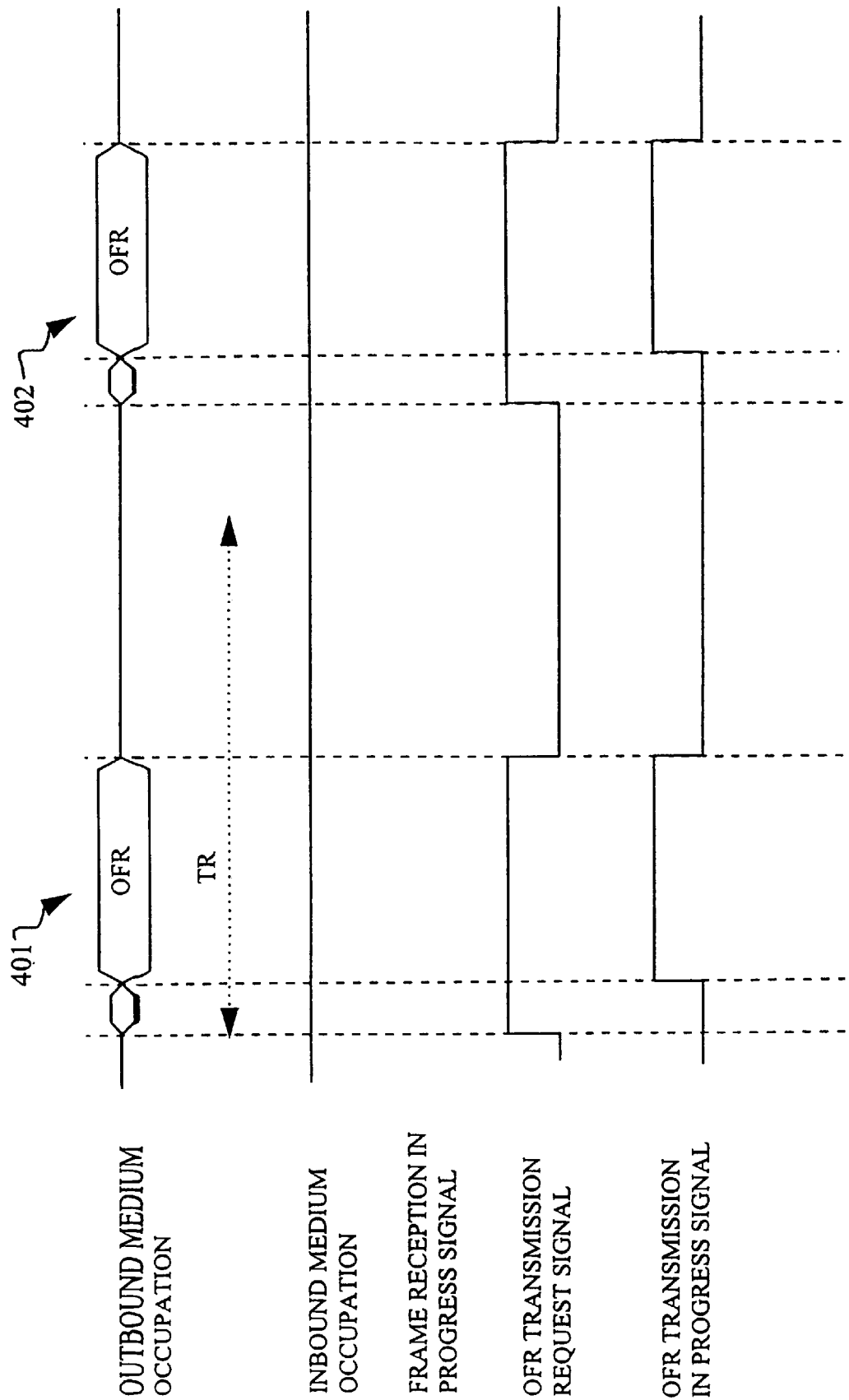
Figure 82:
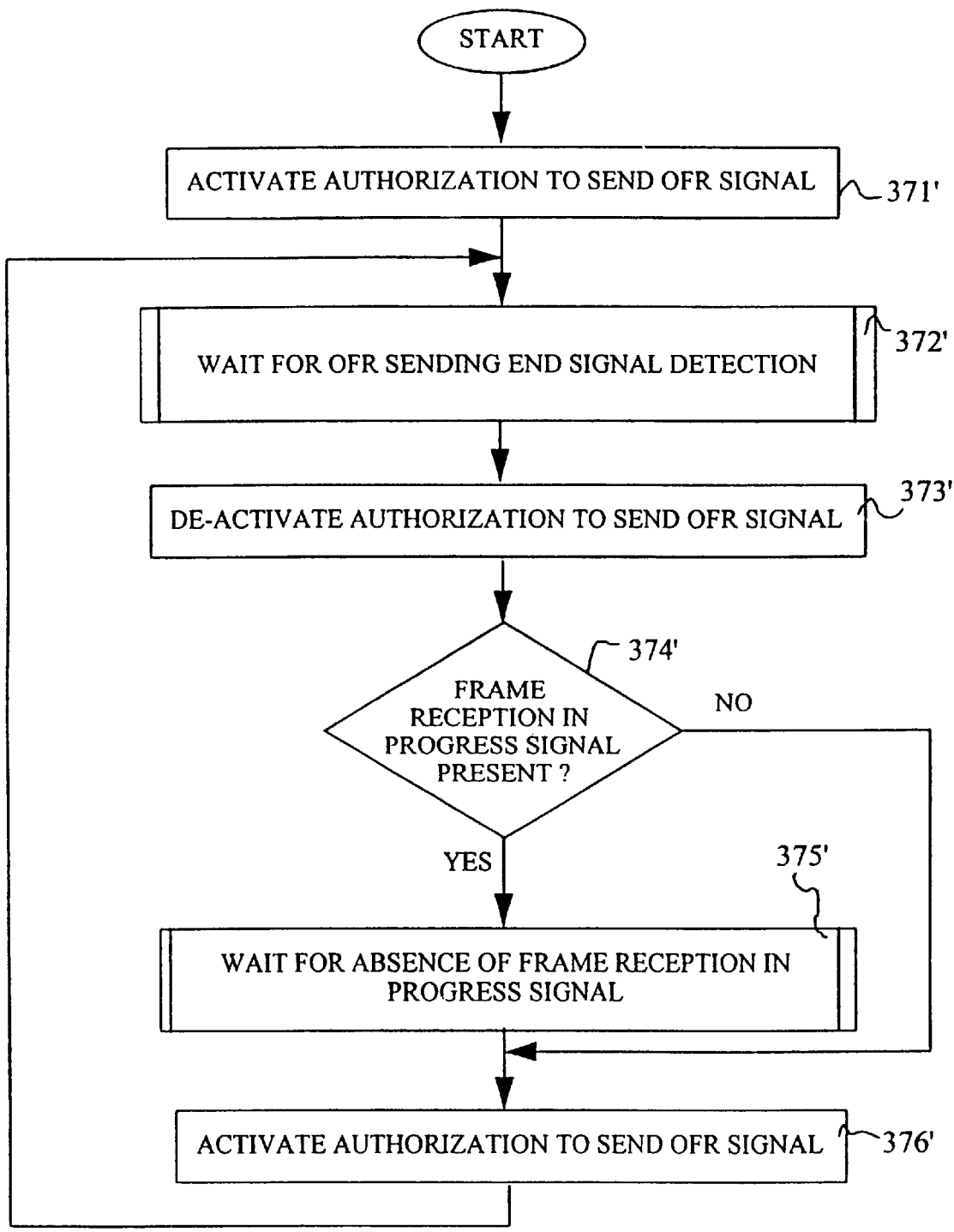
Figure 83:
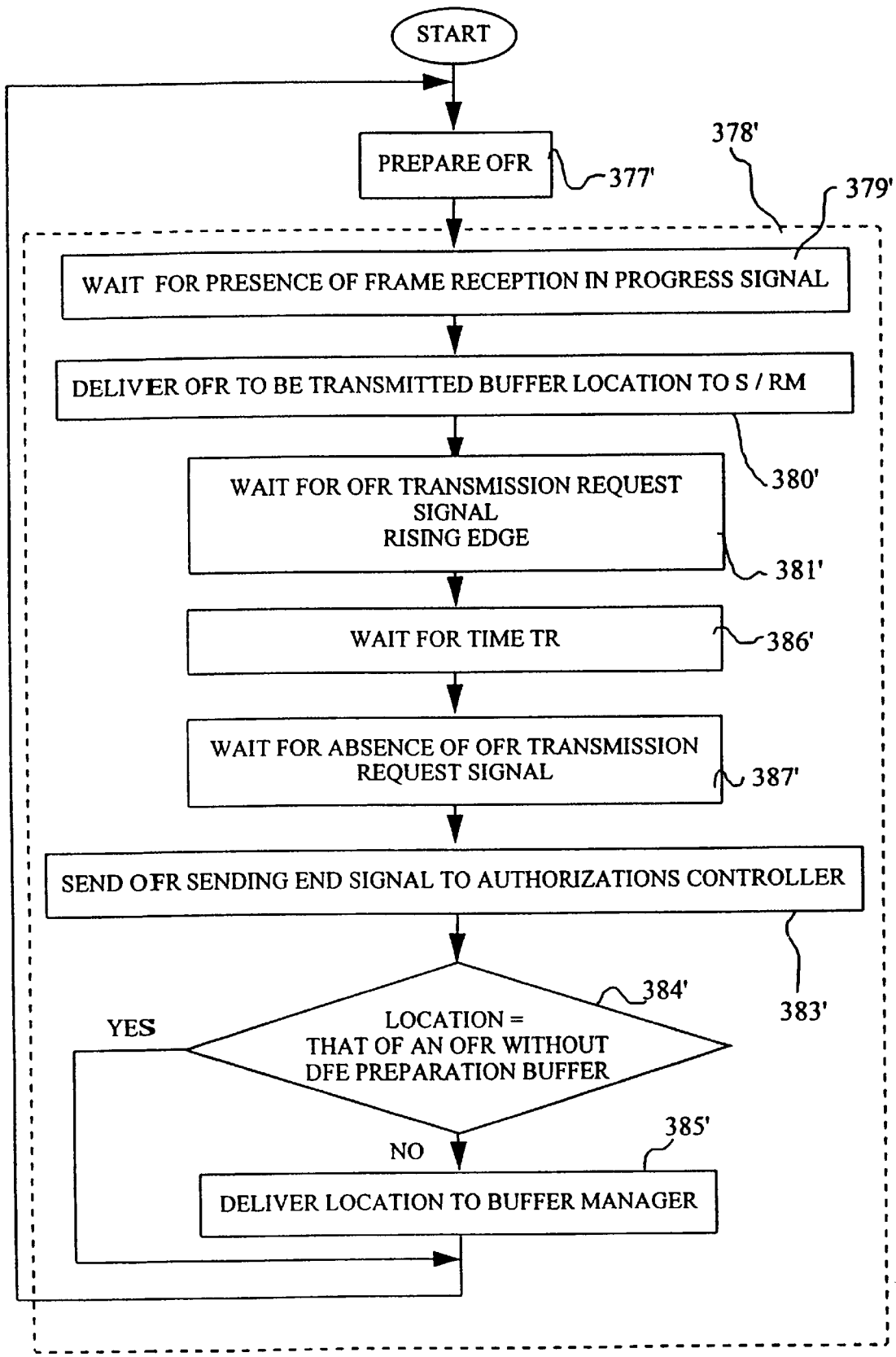

The disclosure of the invention will now be continued with a description of preferred embodiments, given below for illustration and non-limitatively, with the aid of FIG. 4 et seq of the accompanying drawings, in which:

FIG. 4 illustrates the topology of a wireless local area network (WLAN) implementing the invention, in which radio waves are used as a shared transmission medium;

FIGS. 5 and 6 show the constitution of the downlink frames broadcast by the central networked communication means by means of this shared medium, respectively where this downlink frame includes and does not include a data frame;

FIG. 7 shows the constitution of the service frame included in each downlink frame;

FIG. 8 shows the constitution of the service message included in each service frame;

FIG. 9 shows the constitution of the uplink frames transmitted by the peripheral networked communication means by means of the shared transmission medium;

FIG. 10 is a timing diagram showing an example of an occupation of the shared transmission medium by bursts transmitting downlink frames and an uplink frame;

FIG. 11 is an electronic diagram of the central networked communication means;

FIG. 12 is a diagram showing the composition of the space provided for frame buffers in the random access memory (RAM) of the central communication means;

FIG. 13 shows the arrangement which each of the buffers has for storing an uplink frame and preparing a downlink frame containing a data frame;

FIG. 14 is a functional diagram of the central networked communication means;

FIG. 15 is a timing diagram illustrating the functioning of the radio module of this central means;

FIGS. 16 and 17 are flow diagrams illustrating the functioning respectively of the reception management means and of the sending management means included in the sending/receiving means of the central communication means;

FIG. 18 is a partial functional diagram of the central communication means, showing in more detail the central transmission control means which it includes;

FIGS. 19 and 20 are flow diagrams illustrating the functioning respectively of the buffer management means and of the means preparing authorisation-to-send messages for the central transmission control means;

FIG. 21 is a partial functional diagram of the central networked communication means, showing more particularly the downlink frame production means included in the central transmission control means;

FIGS. 22 and 23 are flow diagrams illustrating the functioning respectively of the authorisation controlling means and of the downlink frame preparation means included in the downlink frame production means;

FIG. 24 shows in more detail the operation of preparing a downlink frame included in the flow diagram in FIG. 23;

FIG. 25 is a diagram similar to FIG. 21, for a second embodiment of the downlink frame production means;

FIGS. 26 and 27 are flow diagrams illustrating the functioning respectively of the downlink frame preparation means and of the downlink frame transmission means of the downlink frame production means shown in FIG. 25;

FIG. 28 is a flow diagram similar to that of FIG. 27, for a variant of the downlink frame transmission means;

FIGS. 29 to 32 are respectively similar to FIGS. 21 to 24, for a variant of the first embodiment of the downlink frame production means illustrated in the latter figures;

FIGS. 33 to 35 are respectively similar to FIGS. 25 to 27, for a variant of the second embodiment of the downlink frame production means illustrated in the latter figures;

FIG. 36 is an electronic diagram of one of the data stations of the network in FIG. 4, showing more particularly the peripheral networked communication means;

FIG. 37 is a diagram showing the composition of the space provided for frame buffers in the RAM of the communication converter forming part of the peripheral means;

FIG. 38 shows the arrangement which each of the buffers for storing a data frame and preparing an uplink frame has;

FIG. 39 is a partial functional diagram of the peripheral means, showing more particularly the communication converter;

FIG. 40 is a partial functional diagram showing particularly the sending/receiving means which the communication converter has;

FIGS. 41 and 42 are flow diagrams illustrating the functioning respectively of the reception management means and of the sending management means which this sending/receiving means has;

FIG. 43 is a partial functional diagram of the peripheral means, showing particularly the peripheral transmission control means which its communication converter has;

FIGS. 44 to 47 are flow diagrams illustrating the functioning respectively of the downlink frame buffer management means, of the uplink frame buffer management means, of the uplink frame production means and of the data frame production means which the transmission control peripheral means has;

FIG. 47A shows a variant for the flow diagram of FIG. 47;

FIG. 48 is a partial functional diagram of one of the data stations of the network of FIG. 4, showing particularly the Ethernet sending/receiving means which the communication converter of the peripheral networked communication means has;

FIGS. 49 and 50 are flow diagrams illustrating the functioning respectively of the data frame reception management means and of the Ethernet module which this Ethernet sending/receiving means has;

FIGS. 50A and 50B show variants of the flow diagram in FIG. 50;

FIG. 51 is an electronic diagram similar to FIG. 36, for a variant of the peripheral networked communication means presented directly in the form of a card connected to the ISA bus of the terminal;

FIG. 52 shows, from the topological point of view, a local network of the type shown in FIG. 1 and a local network of the type shown in FIG. 4, interconnected by means of a second embodiment of the central networked communication means, adapted for this purpose;

FIG. 53 is an electronic diagram showing particularly this second embodiment of the central means;

FIG. 54 is a diagram showing the composition of the space provided for frame buffers in the random access memory of this central means;

FIG. 55 is a diagram showing certain elements of the working memory provided in this random access memory;

FIG. 56 is a functional diagram of this embodiment of the central networked communication means;

FIG. 57 is a flow diagram illustrating the functioning of the reception management means which this sending/receiving means of this central means has;

FIG. 58 is a partial functional diagram of this central communication means, showing particularly the central transmission control means which it has;

FIG. 59 is a flow diagram illustrating the operation of preparing a downlink frame performed by the downlink frame production means shown in FIG. 58;

FIG. 60 is a partial functional diagram of the second embodiment of the central networked communication means, showing particularly its buffer management means;

FIG. 61 is a flow diagram illustrating the functioning of the end-of-sending management means which this buffer management means has;

FIG. 62 is a flow diagram setting out the operation of analysing the location of the buffer, shown in FIG. 61;

FIGS. 63 and 64 are flow diagrams illustrating the functioning respectively of the data frame routing means and of the uplink frame routing means of the buffer management means shown in FIG. 60;

FIG. 65 is a diagram similar to that of FIG. 60, for a variant of the buffer management means in which the data frame and uplink frame routing means effect a filtering;

FIGS. 66 and 67 are flow diagrams illustrating respectively the functioning of the data frame routing means and of the uplink frame routing means shown in FIG. 65;

FIG. 68 is a partial functional diagram of the second embodiment of the central networked communication means, showing particularly the Ethernet sending/receiving means;

FIGS. 69 and 70 are flow diagrams illustrating the functioning respectively of the data frame reception management means and of the Ethernet module shown in FIG. 68;

FIG. 71 is a flow diagram illustrating the functioning of a variant of this Ethernet module, effecting a filtering;

FIG. 72 is an electronic diagram similar to that of FIG. 53, for a variant including a content addressed memory (CAM) used by the microcontroller;

FIG. 73 shows another similar variant, in which an interface is provided between the microcontroller bus and the content addressed memory, so that the latter can be used both by the microcontroller and by the Ethernet microcontroller;

FIG. 74 is a timing diagram similar to that of FIG. 10, but in an embodiment where the radio transmission medium is full duplex;

FIGS. 75 and 76 are flow diagrams illustrating respectively the functioning of the authorisation controlling means and of the downlink frame preparation means which a variant of the central networked communication means has, operating in full duplex;

FIGS. 77 to 81 are timing diagrams similar to FIG. 15, showing different situations of occupation of the full-duplex transmission medium in the downlink and uplink directions; and FIGS. 82 and 83 are flow diagrams illustrating the functioning respectively of the authorisation controlling means and of the downlink frame preparation means which the variant of the central networked communication means operating in full duplex has.

The wireless local network 20 shown in FIG. 4 has a central networked communication means (MCCR in the drawings) 21 and data stations 22, each of which has a terminal 23 of the same type as the terminals 6 described above, and a peripheral networked communication means (MPCR in the drawings) 24.

Each of the peripheral means 24 is a particular type of individual networked communication means 7 described above, the shared transmission medium by means of which they transmit and/or receive data frames consisting of radio waves.

The central means 21 communicates with each peripheral means 24 by means of this medium, which it also shares, the topological arrangement and the respective radio transmission powers being such that each burst sent over this medium by the central means 21 can be received by each peripheral means 24, and each burst sent over this medium by any one of the means 24 can be received by the central means 21.

Communications between peripheral means 24 are designed to take place solely by means of the central means 21, the transmission of a data frame from a first to a second peripheral means 24 taking place first of all by transmission of the data frame from the first peripheral means 24 to the central means 21, and then by retransmission of this data frame from the central means 21 to the second peripheral means 24.

In this regard it should be noted that each downlink frame, also referred to as an information frame, has a source address which identifies the communication means which transmitted it and a destination address identifying the communication means for which it is intended.

The bursts which the central means 21 sends over the shared radio medium each enable it to broadcast a downlink frame 25 to the peripheral means 24 (FIGS. 5 and 6) whilst the bursts sent over this medium by the peripheral means 24 each enable the peripheral means 24 which has sent them to transmit an uplink frame 26 (FIG. 9) to the central means 21.

As can be seen in FIGS. 5 and 6, the downlink frames 25 systematically have a service frame 27, whilst, depending on circumstances, it may include (FIG. 5) or not include (FIG. 6) a data frame (TDO in the drawings) 28 of the same type as the frame 12 described above.

The format provided for the frame 25 determines the position of the service frame field 29, at the start of the frame 25, and the position of the data frame field 30, when such exists, directly after the field 29.

In the example illustrated, the service frame field 29 extends over twenty octets, and the data frame field 30 extends over zero (no data frame) to one thousand five hundred and forty octets.

As FIG. 7 shows, each service frame 27 included in a downlink frame 25 has a service message 31, information 32 on the length of the data frame which the frame 25 includes, and additional information 33. The format provided for the frame 27 determines the position of the service message field 34 at the start of this frame, the position of the data frame length field 35 following the field 34, and the position of the additional information field 36 following the field 35. In the example illustrated, the field 34 extends over twelve octets, the field 35 over two octets and the field 36 over eleven octets.

The service message 31, as shown in FIG. 8, includes information 37 on the nature of the service message, a message destination address 38 and additional information 39. Here, the information 39 includes network reference information and protocol version information, the message nature field 40 extends over one octet, the address field 41 over six octets and the additional information field 42 over five octets.

The uplink frames 26, as illustrated in FIG. 9, include information 43 on the length of the data frame which it has, additional information 44 and a data frame 45 of the same type as the frame 12 described above. The format provided for the frame 26 determines at the start thereof the position of the data frame length field 46, the position of the additional information field 47 following the field 46 and the position of the data frame field 48 following the field 47. In the present example, the field 46 extends over two octets, the field 47 over twenty three octets and the field 48 over zero to one thousand five hundred and forty octets.

Each service message 31, by means of the message nature information 37 and the destination address 38, activates a protocol controlling access to the shared radio medium, which is of the polling type.

More precisely, each service message 31 indicates to each peripheral means 24 whether or not it is authorised to transmit an uplink frame 26 in return, that is to say as soon as the shared medium is free to transmit a frame 26 after broadcast of the message 31.

The service messages 31 are generally of the authorisation-to-send message type, that is to say indicating that a peripheral means 24 is authorised to transmit an uplink frame in return, and, in certain circumstances, of the no-authorisation-to-send message type, that is to say indicating, to each peripheral means 24, that it is not authorised to transmit in return.

In the network 20, the radio medium used is of the half-duplex type, that is to say the transmissions in the uplink direction (peripheral means 24 to central means 21) and downlink direction (central means 21 to peripheral means 24) do not take place simultaneously. Thus the shared radio medium becomes free when the transmission of a downlink or uplink frame ends.

FIG. 10 shows an exemplary occupation of this shared radio medium, by four bursts 49A to 49D.

It will be observed first of all that each burst sent over the shared radio medium begins with a synchronisation prefix 50, which is identical for all the bursts, and continues with a signal 51, of a more or less long duration, which carries a bit stream conveying a downlink frame 25 (TDE in the drawings) or an uplink frame 26 (TMO in the drawings), the duration of the signal 51 of each of the bursts obviously depending on the length of the frame 25 or of the frame 26 transmitted by this burst.

In the example in FIG. 10, the downlink frame 25 transmitted by the burst 49A has only one service frame 27, so that its signal 51 is of particularly short duration, close to that of the prefix 50. On the other hand, the frames 25 or 26 transmitted by the bursts 49B to 49D include a data frame 28 or 45, their signal 51 consequently having a longer duration. To simplify the drawing, the respective signals 51 of the bursts 49B to 49D have been given the same duration, but in practice the duration of the signals 51 is very variable, since a data frame 28 or 45 has a length which varies over a range of up to one thousand five hundred and forty octets.

The duration T which can be seen in FIG. 10 is the one that the central means 21 allows to elapse as from the end of the transmission of a downlink frame 25 whose service message 31 is of the authorisation-to-send message type (MDE in the drawings), before transmitting a new downlink frame, unless, during the elapse of the period of duration T it has begun to receive a burst transmitting an uplink frame 26, in which case the central means 21 waits until it has finished receiving this uplink frame.

On the other hand, when the central means 21 transmits a downlink frame whose service message 31 is of the no-authorisation-to-send message type (MAD in the drawings), it can send a new downlink frame as soon as the transmission of the previous one has ended.

Thus, when the burst 49A transmitting a downlink frame including an authorisation-to-send message ended, the central means 21 waited until the period of duration T elapsed and, as during the latter no burst transmitting an uplink frame appeared on the shared radio medium, the central means 21 considered, as soon as this period expired, that it could transmit a new downlink frame, which it did with the burst 49B at the end of a period whose duration corresponds to its reaction time.

Since the downlink frame transmitted by the burst 49B included a no-authorisation-to-send message, the central means 21 considered that it could send a new downlink frame as soon as sending of the burst 49B ended, which it did by sending the burst 49C after a reaction time.

The downlink frame transmitted by the burst 49C included an authorisation-to-send message and, unlike the one contained in the downlink frame transmitted by the burst 49A, this authorisation-to-send message brought about a response from the peripheral means 24 for which it was destined, in the form of the burst 49D transmitting an uplink frame, which began to be sent before the expiry of the period of duration T, so that, when this expiry occurred, the central means 21 noted that reception of this uplink frame was underway, and therefore waited until reception of the burst 49D ended in order to consider that the shared radio medium had become free for it to send a new downlink frame.

The duration T is chosen as the shortest period at the end of which it is certain that any peripheral means 24 for which an authorisation-to-send message is intended has been able to begin to transmit an uplink frame in response, if it sought to do so.

By way of example, the duration T can be around 225 $\mu s$, the duration of the prefix 50 around 125 $\mu s$, the duration of the signal 51 in a range having an upper limit of around 10,000 $\mu s$.

The device used as the central means 21 in the network 20 will now be described with the help of FIGS. 11 to 24.

As can be seen in FIG. 11, the central means 21 has a microcontroller 52 connected, by means of a serial connection bus 53, to a connector 54 of the RS 232 type, and connected by means of a microcontroller bus 55 to a sending/receiving controller 56, a programmable read only memory (PROM) 57, a reprogrammable non-volatile memory and a random access memory (RAM) 59. The sending/receiving controller 56, in addition to being connected to the microcontroller bus 55, is connected to a sending/receiving bus 60, which connects it to a radio module 61.

The microcontroller 52 is for example the one sold by NEC under the reference V53®, operating in accordance with the program 62 stored in the memory 57, which also contains the default parameters 63 for initialising the central means 22 at start-up.

The program 62 is of the multi-task type, by virtue of a real-time nucleus, for example of the Realtime Craft® type sold by GSI TECSI.

The sending/receiving controller 56 is produced with a commercially available programmable logic circuit, for example the one sold by ALTERA® under the reference EPF81500®, or one of those sold by XYLINX.

The radio module 61 is for example produced with a transceiver sold by PULSE ENGINEERING under the reference MTR-2400M, with a space-diversity aerial sold by TELEDYNE ELECTRONIC TECHNOLOGIES suitably connected to the aforementioned transceiver, with error correction/control components, for example of the FEC (forward error correction) type from Reed Soloman, such as the ones sold by AHA® under the reference AHA 4011®, by LSI LOGIC® or by COMATLAS, and with an electrical interface allowing connection to the bus 60, notably affording signal matching. The radio module 61 can also be produced with transceivers other than the above-mentioned one, preferably of the spread spectrum, frequency hopping or direct sequence type.

The reprogrammable non-volatile memory 58 is for example produced with a random access memory (RAM) with battery back-up, such as the one sold by DALLAS SEMICONDUCTOR under the reference DS1497, or with an electrically erasable programmable read only memory (EEPROM) such as the one sold by XICOR or EXEL under the reference 24C02.

The memory 58 includes a table 64 of the addresses of the peripheral means 24 forming part of the network 20, in this case their MAC address, that is to say an address of the same type as the address 11 of the individual means 7 described above. The table 64 is entered in the central means 21 by means of a console which is connected for this purpose to the connector 54.

The random access memory 59 has a space occupied by the working memory 65, and a space 66 occupied by frame buffers.

As can be seen in FIG. 12, the space 66 includes a space 67 containing a certain number of buffers 68 storing an uplink frame and preparing a downlink frame as shown in FIG. 5, that is to say containing a data frame, and a space 69 containing a buffer 70 for preparing a downlink frame as shown in FIG. 6, that is to say without a data frame.

As can be seen in FIG. 13, the arrangement provided for each of the memories 68 is identical to the format provided for the downlink frames 25, that is to say it determines, at the start of each memory 68, the position of the service frame area 71, and the position of the data frame area 72, directly after the area 71, the latter having the same length as the field 29 (twenty five octets, whilst the area 72 has the maximum length over which the field 30 can extend (one thousand five hundred and forty octets), a maximum length which is also that of the data frame field 48 of the downlink frames 26.

The memories 68 are used as follows: when the central means 21 receives an uplink frame 26, it writes the data frame 45 which it has in the area 72 of a memory 68, placing the field 48 in the area 72 whilst making the start of this field coincide with the start of this area; and, to prepare a downlink frame as shown in FIG. 5, a downlink frame with which it will retransmit the data frame which it had previously stored in the area 72, the central means 21 writes a service frame 27 in the area 71 of the same memory 68, and then sends a burst transmitting the useful content of this memory 68, that is to say the one located in the space going from the start of the area 71 to the place in the area 72 where the data frame ends.

The arrangement provided for the buffer 70 is identical to the format of the service frames 27, the central means 21 using the memory 70 to prepare the downlink frames as shown in FIG. 6, each of these frames being transmitted by sending a burst transmitting the entire content of the memory 70.

FIG. 14, and more generally the functional diagrams included in the drawings in the following figures, depict the path of the information exchanged by the different means used, by means of a simple arrow, except where it is a case of an operation of reading or writing in a memory, in which case the arrow is of the thick type, thick arrows also having been used for the path of the frames delivered by the radio module, following reception of the bursts transmitting them, and for the frames delivered to the radio module, so that it sends a burst transmitting them.

As indicated above, the program 62 is of the multi-task type by virtue of a real-time nucleus for managing tasks and providing communication, signalling and synchronisation mechanisms between the tasks, these mechanisms involving the use notably of mailboxes each peculiar to a task, in which messages can be posted, and semaphores shared by several tasks.

The central means 21 includes, in general terms, a central networked transmission control means (MCCT in the drawings) 73 and a sending/receiving means (ME/R in the drawings) 74, which exchange information, the sending/receiving means 74 carrying out uplink frame writing and downlink frame reading operations in the space 66 of the random access memory 59 where the frame buffers are located, the central transmission control means 73 for its part carrying out service frame writing operations (TS in the drawings) in the space 66.

The sending/receiving means 74 includes the radio module 61, and uses resources procured by the microcontroller 52 with the help of the program 62, the default parameters 63 and the working memory 65, whilst the central transmission control means 73 uses resources procured by the microcontroller 52 with the help of the program 62, the default parameters 63, the table 64 and the working memory 65.

In addition to the radio module 61, the sending/receiving means 74 includes a sending management means 75, and a reception management means 76, which includes a mailbox 77 in which the central transmission control means 73 posts the locations of the various memories 68 each free for the storage of an uplink frame.

The functioning of the radio module 61 will now be described, with reference particularly to FIGS. 14 and 15.

The radio module 61 puts itself spontaneously in reception mode. In this mode, when it detects the presence of the prefix 50 of what will become a frame 78, it performs a synchronisation operation, and when the prefix 50 ends, it causes the signal 79 to go from a low level to a high level, which it makes it keep as long as reception of the signal 51 from the frame 78 lasts, a signal which normally conveys an uplink frame, the radio module returning the signal 79 to the low level when the signal 51 ends. The signal 79 therefore makes it possible to know, respectively when it is at the high level and at the low level, whether or not a frame is in the course of being received. For convenience, rather than to the signal 79, reference will be made, in the drawings and hereinafter, to a so-called frame reception in progress signal, which corresponds to the high level of the signal 79.

The radio module 61 communicates the frame reception in progress signal, on the one hand to the central transmission control means 73, which uses it at the expiry of the periods of duration T whose examples are shown in FIG. 10, and on the other hand to the reception management means 76, which uses it to know whether or not the radio module 61 is in the course of delivering to it the bits of a frame which is being received.

When the sending management means 75 wishes to deliver, to the radio module 61, a downlink frame so that the latter can be transmitted over the shared radio medium, it causes the signal 80, to which the radio module has access, to go from a low level to a high level, the module 61 switches from reception mode to sending mode and then sends the prefix 50 of what will become a frame 81, and, at the same time as it ends the sending of the prefix 50, it causes the signal 82 to which the means 75 has access to go from a low level to a high level, the sending management means 75 detects the rising edge of the signal 82 and then delivers to the radio module the downlink frame to be transmitted, and, when it has ended this delivery, the sending management means 75 causes the signal 80 to go from the high level to the low level, to which the module 61 responds by causing the signal 82 to go from the high level to the low level, and by switching from sending mode to reception mode.

For convenience, rather than to the signal 82, reference will be made, in the drawings and hereinafter, to a so-called downlink frame transmission in progress signal, which corresponds to the high level of the signal 82.

With regard to the signal 80, this is called, in the drawings other than FIG. 15, the downlink frame transmission request signal, the fact that it is caused to go from the low level to the high level being considered to be its activation, and causing it to go from the high level to the low level as its inactivation.

The downlink frame transmission in progress signal is communicated by the radio module solely to the sending management means 75, for the reasons which have just been explained.

The sending management means 75 communicates the downlink frame transmission request signal firstly to the radio module, for the reasons which have just been explained, and secondly to the central transmission control means 73, so that the latter can know the time of termination of the transmission of a downlink frame whose transmission it has requested of the sending management means 75, supplying it with the location of the buffer 68, that is to say the data indicating the location of the memory space where the downlink frame to be transmitted is located.

The functioning of the reception management means 76 is illustrated by the flow diagram in FIG. 16.

Directly after start-up, it enters a loop where it begins by performing an operation 83 in which it waits until there is at least one memory location 68 in the mailbox 77, that is to say the latter is not empty, and, when this becomes the case, it takes from this mailbox a location, and more precisely the one which is the first to have been posted therein where there are several of them, the memory 68 whose location was taken being that which it will use to store the next uplink frame that the radio module 61 sends to it.

The reception management means 76 then goes to an operation 84 where it awaits the start of the frame reception in progress signal, that is to say the rising edge of the signal 79, and, when this event occurs, the means 75 performs a test 85 in which it determines whether the frame which the radio module 61 is in the course of sending to it is indeed an uplink frame coming from one of the peripheral means 24, for example by checking whether an item of network reference information provided in the field 46 is indeed present.

Where the result of the test 85 is negative, the reception management means 76 returns to the operation 84, that is to say it awaits the reception of the next frame, ignoring the one which the radio module is in the course of sending to it.

When the result of the test 85 is positive, the reception management means 76 performs an operation 86 in which it transfers the uplink frame which the radio module 61 is in the course of sending to it into the buffer 68 situated in the last location which it has taken from the mailbox 77, until the end of the frame reception in progress signal, that is to say until the falling edge of the signal 79.

The reception management means 76 then performs an operation 87 in which it sends to the central transmission control means 76 the location of the memory 68 in which the uplink frame which has just been received has been stored, which advises the means 73 of the reception and storage of this frame.

The reception management means 76 then returns to the start of the loop, and will therefore perform iteratively, throughout its functioning, the series of operations which has just been described.

The functioning of the sending management means 75 is illustrated in FIG. 17.

Directly after start-up, it enters a loop in which it begins by performing an operation 88 in which it waits until the central transmission control means 73 sends it a memory location 68 containing a downlink frame to be transmitted over the shared radio medium, that is to say, given that the downlink frame does not necessarily occupy all the memory 68, the location of the part of this memory where the downlink frame is located. It will be noted in this regard that the data frame length information 43 included in the uplink frame 26 (FIG. 9) enables this location to be known in a particularly simple fashion. Thus, if the location is expressed by giving the address of the start of the memory 68 and then its length, the location of the memory 68 in which the downlink frame will be found will be expressed by the address of the start of the memory 68 followed by a length corresponding to the sum of the length of the service frame 27 (twenty five octets) and the length 43 which appeared in the uplink frame which transmitted the data frame included in the present downlink frame.

When the sending management means 75 receives such a location, it performs an operation 89 in which it activates the downlink frame transmission request signal, that is to say it causes the signal 80 to go from the low level to the high level, and then passes to an operation 90 in which it awaits the presence of the downlink frame transmission in progress signal, that is to say the signal 82 is at a high level, and when this event occurs it performs an operation 91 in which it delivers to the radio module 61 the downlink frame contained in the memory location 68 which was delivered to it during the operation 88, and when it has finished delivering this downlink frame it performs the operation 92 in which it inactivates the downlink frame transmission request signal, that is to say it causes the signal 80 to go from the high level to the low level, and then it returns to the start of the loop, and will therefore perform, throughout its functioning, the series of operations which has just been described.

The central transmission control means 73 will now be described in more detail with reference to FIGS. 18 to 24.

The means 73 includes a buffer management means 93, an authorisation-to-send message preparation means 94, and a downlink frame production means 95, including a mailbox 96 in which the buffer management means 93 posts the memory locations 68 in which there is a downlink frame awaiting transmission, and a mailbox 97 in which the means 94 posts authorisation-to-send messages as it prepares them.

The functioning of the buffer management means 93 is illustrated the flow diagram in FIG. 19.

After start-up, it performs an operation 98 in which it posts the location of each of the memories 68 in the mailbox 77 of the reception management means 76, the locations in question being stored amongst the default parameters 63.

Once the operation 98 has been accomplished, the management means 93 enters a loop in which it performs an operation 99 in which it waits until it receives, from the sending/receiving means 74, and more precisely from the reception management means 76, a buffer location 68 in which it has stored an uplink frame, or else from the production means 95, a buffer location 68 containing a downlink frame whose transmission has been effected.

When one or other of these two events occurs, the management means 93 goes to a test 100 in which it determines whether or not it is the first event which has occurred.

Where it is indeed the reception of a buffer location 68 in which an uplink frame has just been stored, which has occurred, the management means 93 performs an operation 101 in which it posts the location of the memory 68 which it has just received in the mailbox 96 of the production means 95.

Once the operation 101 has been accomplished, or when the result of the test 100 is negative, the management means 93 performs a test 102 in which it determines whether or not the second event has just occurred.

If this is the case, it performs an operation 103 in which it posts in the mailbox 77 of the management means 76 the buffer location 68 which it has just received.

Once the operation 103 has been accomplished, and where the result of the test 102 is negative, the management means 93 returns to the start of the loop and will therefore perform iteratively, throughout its functioning, the series of operations which has just been described, with the exception of the operation 98, which is outside the loop and which is therefore performed only just after start-up.

In general terms, the preparation means 94 performs, iteratively as from start-up, a series of operations in which it prepares an authorisation-to-send message for the peripheral means 24 having a current address, going from one series of operations to the following each time it receives, from the downlink frame production means 95, a signal to take into account an authorisation-to-send message, and using, in each above-mentioned new series of operations, as the current address, the following address in the table 64, in a circular permutation.

The functioning of the authorisation-to-send message preparation means 94 is shown in more detail by the flow diagram in FIG. 20.

After start-up, the preparation means 94 performs an operation 104 in which it takes into account, as the current address, the one of the peripheral means 24 which appears first in the table 64.

It then enters a loop in which it begins by performing an operation 105 in which it prepares an authorisation-to-send message with the current address, that is to say a message 31 (FIG. 8) in which the message nature information 37 indicates that it is a question of an authorisation-to-send message, and in which the address 38 is the current address.

The preparation means 94 then performs an operation 106 in which it posts the authorisation-to-send message which it has just prepared in the mailbox 97, and then goes to an operation 107 in which it waits until it receives, from the production means 95, an authorisation-to-send message acknowledgement signal.

When this event occurs, the preparation means 94 goes to a test operation 108, in which it determines whether or not the current peripheral means is the last in the table 64.

In the negative, it performs an operation 109, in which it takes into account, as the current address, the following one in the table 64, and in the affirmative, it performs an operation 110 in which it takes into account, as the current address, the first one appearing in this table.

Once the operation 109 or 110 has been accomplished, the preparation means 94 returns to the start of the loop, and will therefore perform iteratively, throughout its functioning, the series of operations which has just been described, with the exception of the operation 104, which is outside the loop and which it obviously performs only as initialisation just after start-up.

In the variants, not illustrated, of the preparation means 94, use is made of concepts of priority, so that certain peripheral means 24, which normally have greater data frame transmission requirements, receive authorisation-to-send messages with a higher frequency.

FIG. 21 shows in more detail the downlink frame production means 95. This includes an authorisation controlling means 111 and a downlink frame preparation means 112.

The controlling means 111 serves to determine whether or not a period of authorisation to transmit a downlink frame is in progress, a period which is in progress, as has been seen with the help of FIG. 10, at all times except during the periods of time T and the periods of reception of an uplink frame which has begun to be received during a period of time T.

The functioning of the authorisation controlling means 111 is illustrated in FIG. 22.

After start-up, the means 111 performs an operation 113 during which it activates a downlink frame authorisationto-send signal which is communicated to the preparation means 112, and then it enters a loop in which the first operation 114 is that of awaiting the detection of a downlink frame end-of-sending signal containing an authorisation-to-send message, a signal which is communicated to the controlling means 111 by the preparation means 112.

When this event occurs, that is to say for example at the end of sending of the signal 51 of the burst 49A or of the burst 49C shown in FIG. 10, the controlling means 111 first of all performs the operation 115 of activating the downlink frame authorisation-to-send signal, and then the operation 116 of awaiting the time T, and when the latter has elapsed it performs the test 117 in which it determines whether or not a frame reception in progress signal is present, that is to say whether the signal 79 (FIG. 15) is respectively at its high level or at its low level.

In the affirmative, it performs the operation 118 of awaiting the absence of the frame reception in progress signal, that is to say waiting for the signal 79 to be at its low level, and then awaiting an operation 119 in which it activates the downlink frame authorisation-to-send signal which had been inactivated in the operation 115.

When the result of the test 117 is negative, the controlling means 111 passes directly to the operation 119. Once the operation 119 has been performed, the controlling means 111 returns to the start of the loop, and will therefore perform iteratively, throughout its functioning, the series of operations which has just been described, with the exception of the operation 113, which is outside the loop and which it performs only just after start-up.

The functioning of the preparation means 112 is illustrated by the flow diagram in FIG. 23.

Directly after start-up, the preparation means 112 enters a loop in which it performs an operation 120 of preparing a downlink frame, then an operation 121 of transmitting this downlink frame, and then it returns to the start of the loop, and will therefore perform iteratively, throughout its functioning, an operation 120 followed by an operation 121.

The detail of the operation 120 of preparing a downlink frame is shown in FIG. 24.

The operation 120 begins with a test 122 for determining whether or not there is an absence of a memory location 68 containing a data frame awaiting transmission, that is to say whether or not the mailbox 96 is empty.

In the affirmative, the means 112 performs an operation 123 in which it takes account of the fact that it is the buffer memory 70 for preparing a downlink frame without a data frame which is to be used for the present downlink frame.

When the result of the test 122 is negative, the preparation means 112 performs the operation 124 in which it takes, from the mailbox 96, a memory location 68, and takes account of the fact that it is the buffer memory 68 corresponding to the location taken which is to be used for the preparation of the present downlink frame.

In the example illustrated, the preparation means 112 takes from the mailbox 96 the location which is the first to have been posted therein but, in a variant which is not illustrated, the concept of priority is involved, related for example to the destination address appearing in the field 13 (FIG. 3) of the different data frames received, so that the routing of those which are destined for certain peripheral means 24 is more rapid in the routing of the data frames destined for other peripheral means 24 for which the routing time may be longer.

After having performed the operation 123 or the operation 124, the preparation means 112 performs a test 125 in which it determines whether or not there is an absence of an authorisation-to-send message in the mailbox 97 in which the preparation means 94 posts the authorisation-to-send messages which it prepares.

In the affirmative, that is to say in practice where the test 125 is performed at a time when the means 94 has not yet had the time to prepare and post an authorisation-to-send message, the preparation means 112 performs an operation 126 in which it takes into account, as a service message to be included in the present downlink frame, a preconstituted no-authorisation-to-send message, loaded in the operating memory 65 using the parameters 63 at the start-up of the central means 21, and then performs an operation 127 in which it inactivates, where it was active, an indicator that the present downlink frame contains an authorisation-to-send message, this indicator appearing in the operating memory 65.

Where the test 125 is negative, the preparation means 112 performs an operation 128 in which it takes the authorisation-to-send message present in the mailbox 97, and then an operation 129 in which it takes account of this authorisation-to-send message as a service message to be included in the present downlink frame, and then an operation 130 in which it sends to the preparation means 94 a signal acknowledging an authorisation-to-send message, and finally and operation 131 in which it activates, where it is inactive, the indicator that the present downlink frame contains an authorisation-to-send message.

Once the operation 127 or the operation 131 has been accomplished, the preparation means 112 performs an operation 132 in which it finishes preparing the service frame of the present downlink frame, for example with regard to the data frame length information 32 and the additional information 33 (FIG. 7), and then the preparation means 112 writes the service frame in the buffer taken into account for the preparation of the present downlink frame, that is to say it writes the service frame either in the memory 70 or in the area 71 of the memory 68 whose location it took from the mailbox 96.

The details of the operation 121 which the preparation means 112 then performs will now be described with reference to FIG. 23.

The operation 121 begins with the operation 133 of awaiting the presence of the signal authorising to send a downlink frame which the authorisation controlling means 111 communicates to it.

When this event occurs, the preparation means 112 performs an operation 134 in which it delivers to the sending/receiving means 74, and more precisely to the sending management means 75 thereof, the memory location 68 or the memory location 70 in which the present downlink frame is to be found, and then it performs an operation 135 in which it awaits the falling edge of the downlink frame transmission request signal 80, that is to say the preparation means 112 remains blocked as long as a burst transmitting the present downlink frame has not finished being transmitted.

When the end of transmission of this burst occurs, the preparation means 112 passes to a test 136 in which it determines whether or not the indicator that the downlink frame contains an authorisation-to-send message is activated. In the affirmative, it performs an operation 137, in which it sends to the authorisation controller 111 a downlink frame end-of-sending signal containing an authorisation-to-send message, and then passes to the test 138, whereas, when the test 136 is negative, the preparation means 112 passes directly to the test 138.

In the latter, the preparation 112 determines whether or not the buffer location which it has sent to the sending/ receiving means in the operation 134 is the buffer 70. In the negative, that is to say where it was a case of a buffer 68, the preparation means 112 sends the location of this memory 68 to the buffer management means 93, the latter posting the corresponding location in the mailbox 77 of the reception management means 76, so that the means 76 can once again use this buffer 68 to store a new uplink frame.

The operation of transmitting a downlink frame 121 ends after the operation 139, when the test 138 was negative, or directly after this test, when it was positive.

Variants of the central transmission control means 73 will now be described.

In a first variant, the downlink frame production means 95 is replaced by the downlink frame production means 140 shown in FIG. 25.

As can be seen particularly by comparing FIGS. 21 and 25, the production means 140 is differentiated from the production means 95 by the fact that the preparation means 112 is replaced by an assembly formed by a downlink frame preparation means 141, a downlink frame transmitting means 142 which includes a mailbox 143 in which the preparation means 141 posts the references of the downlink frames which it prepares, that is to say on the one hand the location of the buffer 68 in which the downlink frame is to be found and on the other hand the active or inactive state of the indicator that the downlink frame contains an authorisation-to-send message, and a semaphore 144 to which the preparation means 141 and the transmitting means 142 have access, respectively to take units therefrom and add them thereto, the semaphore 144 being used by the preparation means 141 to enable it to know the filling level of the mailbox 143.

In general terms, the preparation means 141 iteratively performs a series of operations in which it prepares a downlink frame and waits for there to be a free location in the box 143 to post therein the references of the downlink frame which it has just prepared.

The functioning of the preparation in 141 is illustrated in more detail by the flow chart in FIG. 26.

After start-up the preparation means 141 directly enters a loop where it begins by performing the same operation 120 (FIG. 24) of preparing a downlink frame as the preparation means 112 of the production means 95.

Once the operation 120 has been accomplished, it passes to an operation 146 of taking a unit from the semaphore 144, that is to say more precisely that it immediately takes the unit from the semaphore counter if this is positive, whilst, if the counter is at zero, it waits for this counter to become positive in order to take the unit. As will be seen below when the functioning of the transmitting means 142 is described, this amounts to taking account of the filling of the mailbox 43 and, when it is full, waiting for one of its locations to become free.

Once the operation 146 has been accomplished, the preparation means 141 performs the operation 147, in which it posts in the mailbox 143 the buffer location 68 in which is found the downlink frame which it prepared during the operation 120 which it has just performed, and the active or inactive state of the indicator that this downlink frame contains an authorisation-to-send message, that is to say the references of this downlink frame.

Once the operation 147 has been accomplished, the preparation means 141 returns to the start of the loop, and will therefore perform iteratively, throughout its functioning, the series of operations which has just been described.

The functioning of the transmitting means 142 is illustrated by the flow diagram in FIG. 27.

After start-up, the transmitting means 142 performs an operation 148 in which it initialises the semaphore 144, that is to say it acts on the semaphore counter to make it equal to the number of locations that there are in the mailbox 143.

The transmitting means 142 then enters a loop where it begins by performing an operation 149 in which it waits until at least one location in the mailbox 143 is filled by the references of a downlink frame, that is to say this mailbox is not empty, and when this event occurs it takes the references which are to be found in one of the locations of the mailbox 143.

In the example illustrated, where several locations are filled, the transmitting means 142 takes the references from the location which is the first to have been filled.

In variants, not illustrated, of the transmitting means 142, use is made of concepts of priority, for example in order for the downlink frames containing a data frame whose destination address corresponds to that of certain peripheral means 24 enjoying a routing priority, to be transmitted before the downlink frames including a data frame whose destination address is that of a peripheral means 24 whose degree of routing priority is lower.

It will be observed that, in order to leave the waiting provided for in the operation 149, it was necessary for the preparation means 141 to have posted at least one set of references in the mailbox 143, and therefore for it to have taken at least one unit from the counter of the semaphore 144.

Once the operation 149 has been accomplished, the transmitting means 142 performs the operation 150 in which it adds one unit to the counter of the semaphore 144.

The transmitting means 142 then performs the same operation of transmitting the present downlink frame as the one performed by the preparation means 112 of the production means 95, that is to say the operation 121 whose details are given in FIG. 23.

The transmitting means 142 then returns to the start of the loop, and will therefore perform iteratively, throughout its functioning, the series of operations which has just been described, with the exception obviously of the initialisation operation 143, which is outside the loop and which is therefore only performed just after start-up.

In a variant of the transmitting means 142, whose functioning is illustrated by the flow diagram in FIG. 28, the situation of remaining blocked when the mailbox 43 is empty is avoided by replacing the operation 149 with a test 151 for determining whether or not this mailbox is empty with an operation 152 of taking a set of references of a downlink frame, identical to the one forming part of the operation 149, this operation 152 being performed when the test 151 is negative and being followed by the operation 150, and with an operation 153 which is performed when the test 151 is positive, the operation 153 being followed directly by the operation 121.

In this operation 153, a set of preconstituted downlink frame references is taken, this set including a memory location in which there appears a downlink frame as shown in FIG. 6, that is to say without a data frame, the service message being of the no-authorisation-to-send message type, the preconstituted set of references also including inactive state information for the indicator that the downlink frame contains an authorisation-to-send message.

The variant of the transmitting means 142 functioning as shown in FIG. 28 therefore does not remain blocked when the mailbox 143 is empty, and causes the shared radio medium to be occupied by a downlink frame consisting of a simple frame 27 whose service message 31 is of the no-authorisation-to-send message type.

A description will now be given, with reference to FIGS. 29 to 32, of a second variant of the central transmission control means 73, in which there are no no-authorisation-to-send messages, that is to say all the service messages indicate to a peripheral means 24 that it is authorised to transmit an uplink frame in return.

Figure 29:
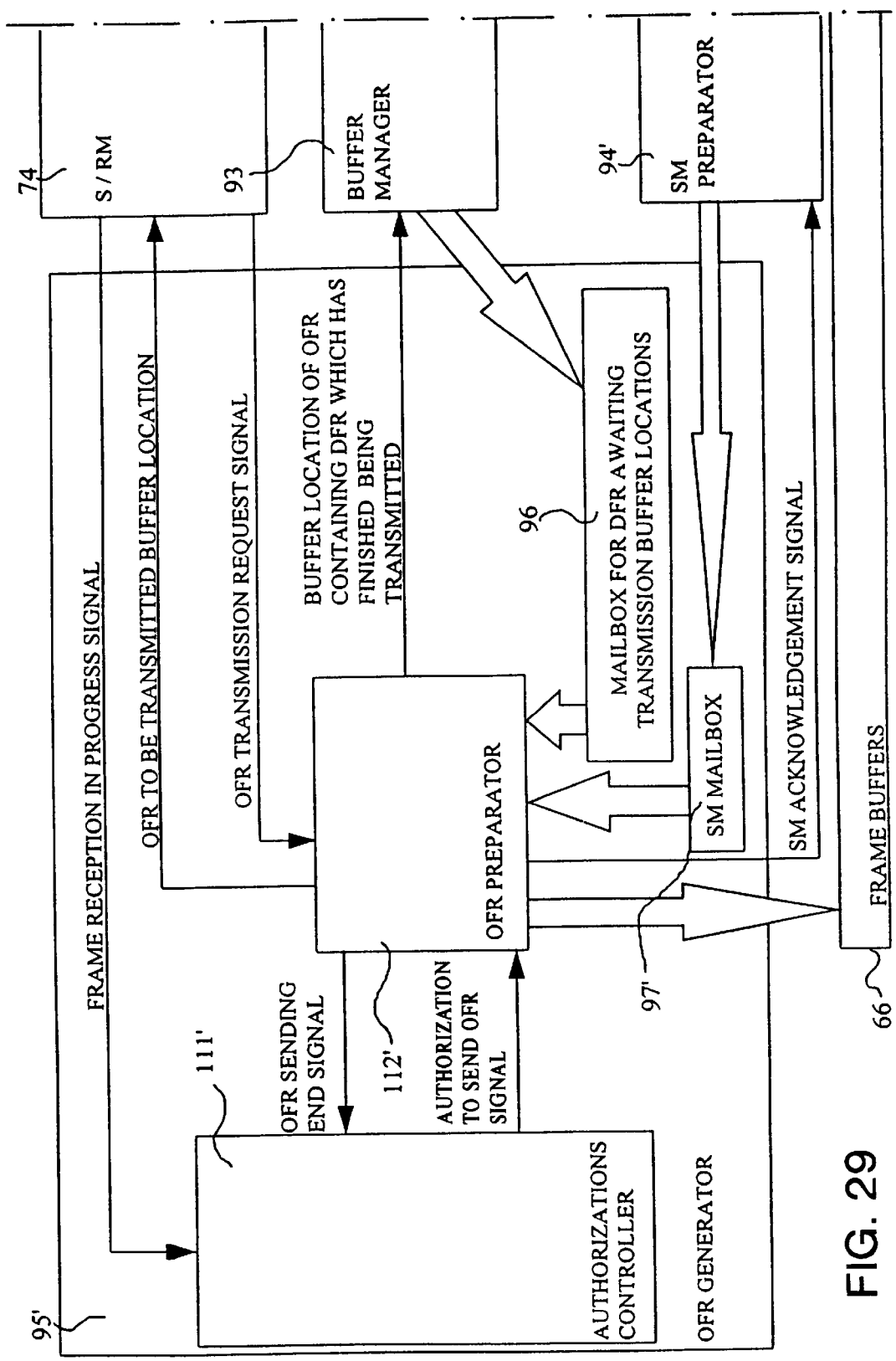

In this variant, as can be seen by comparing FIGS. 21 and 29, the means 94 preparing authorisation-to-send messages is replaced by a means 94' preparing service messages, and the downlink frame production means 95 is replaced by a downlink frame production means 95'.

The description given above for the preparation means 94 is also valid for the preparation means 94', provided that the references to an authorisation-to-send message is replaced by references to a service message.

With regard to the production means 95', the same reference as for the means 95 has been used for similar components, but given a "prime" index.

Figure 30:
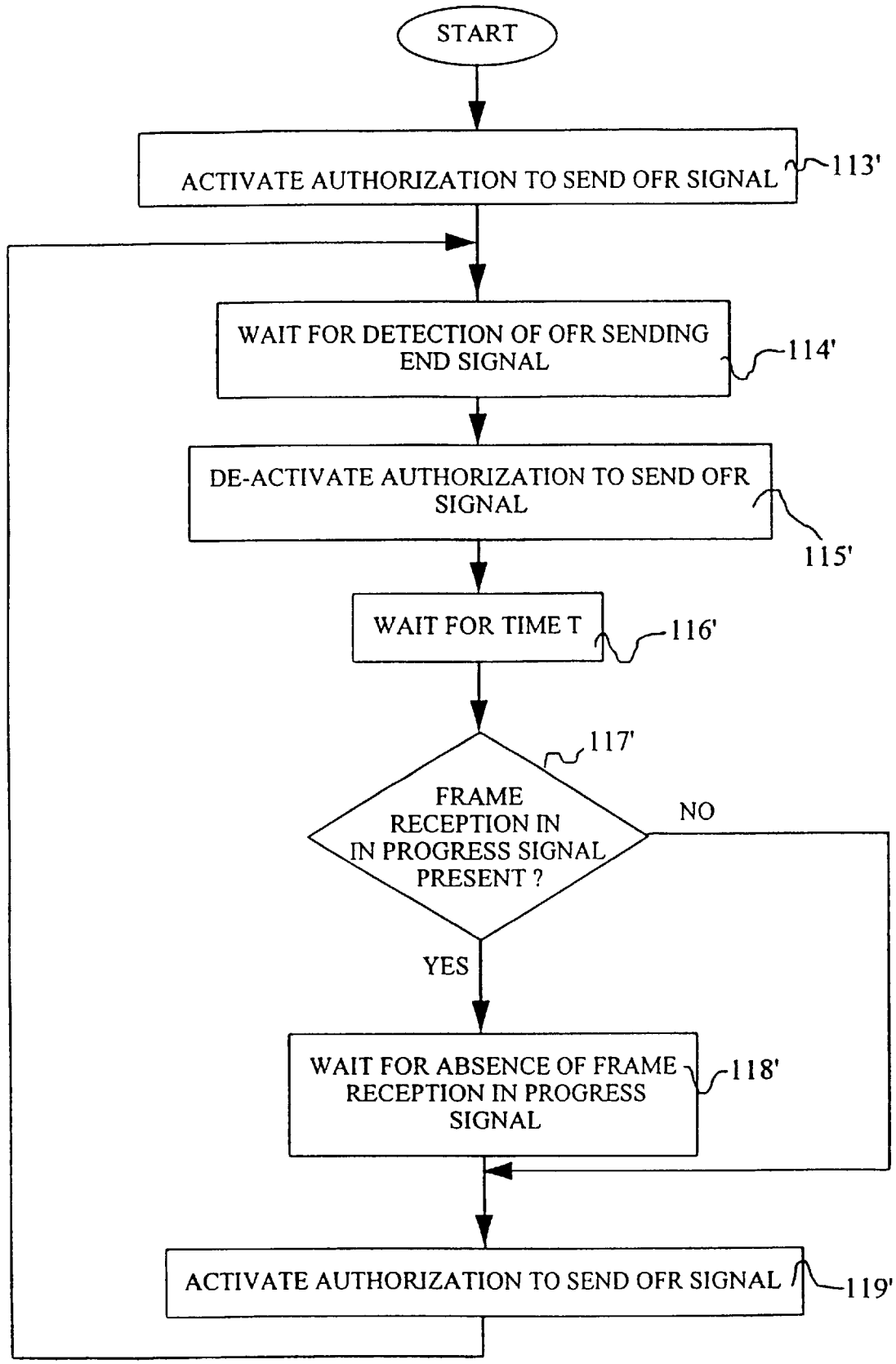

The functioning of the authorisation controlling means 111' is illustrated by the flow diagram in FIG. 30.

It can be seen, by comparing FIGS. 22 and 30, that the controlling means 111' functions exactly like the controlling means 111, the signal sent to it by the downlink frame preparation means 112' being simply a downlink frame end-of-sending signal rather than a downlink frame end-of-sending signal containing an authorisation-to-send message.

Figure 31:
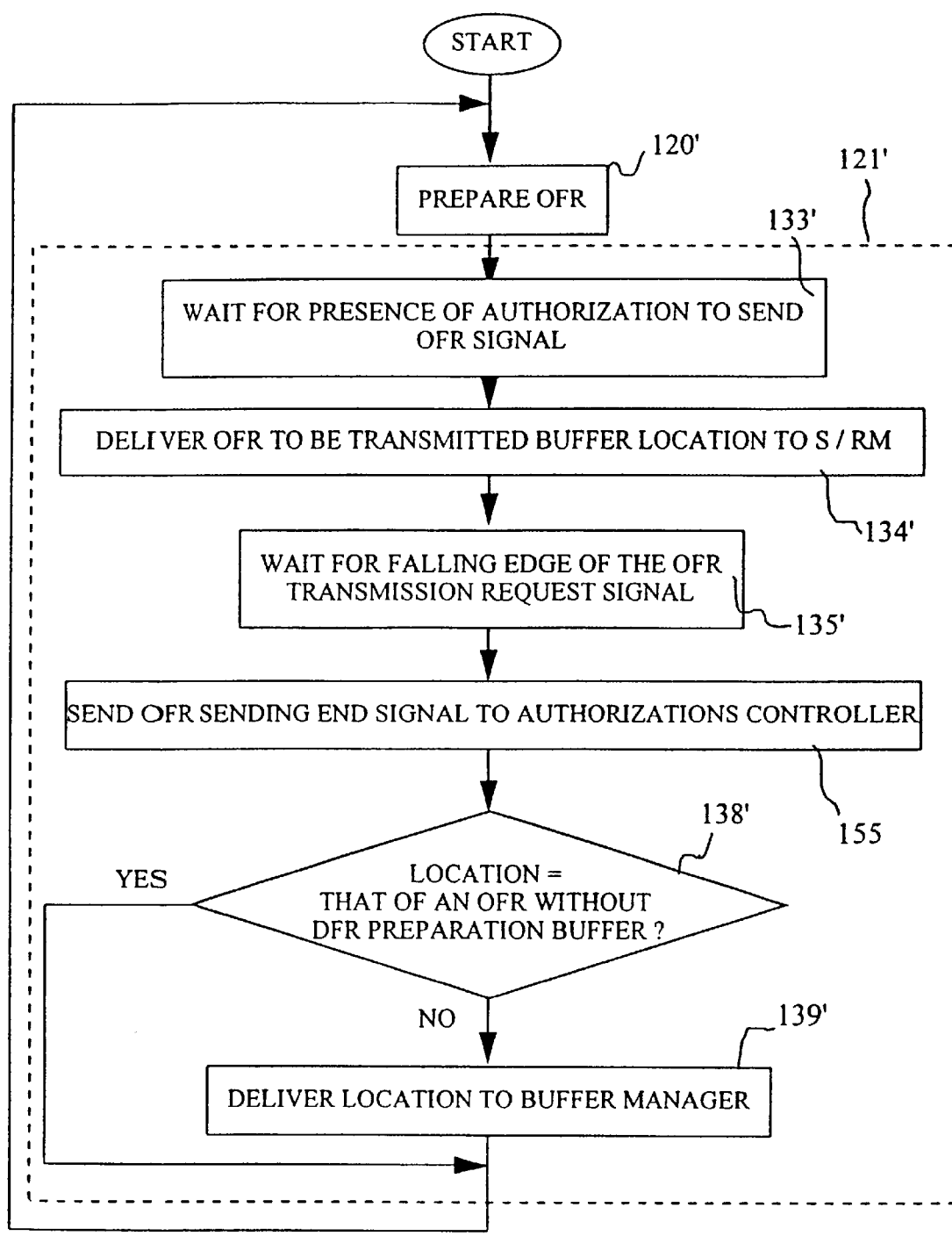

The functioning of the downlink frame preparation means 112' is illustrated in FIG. 31.

Figure 32:
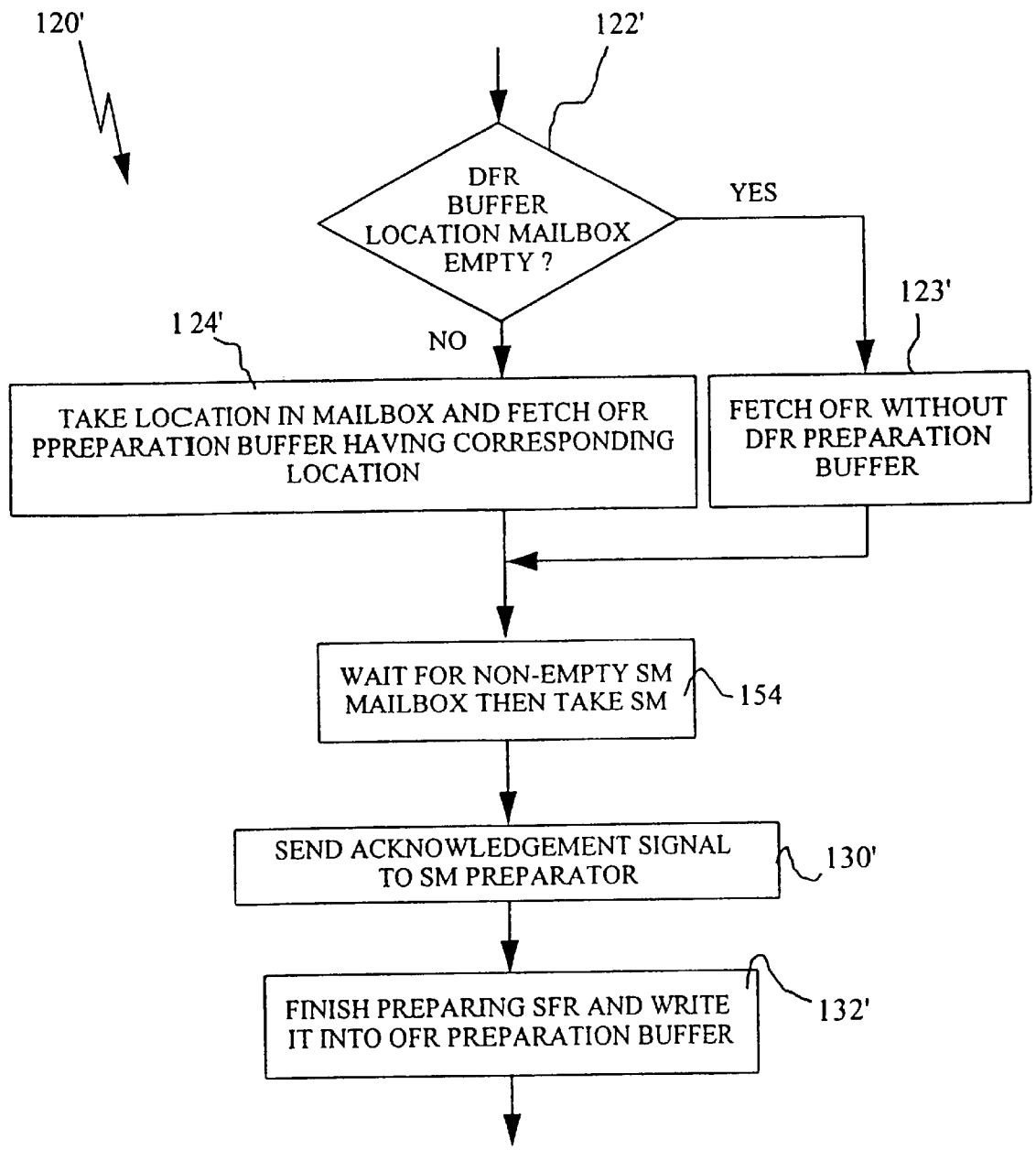

The details of the downlink frame preparation operation 120' are shown in FIG. 32.

It can be seen, by comparing FIGS. 24 and 32, that the operation 120' is distinguished from the operation 120 by the fact that, after the operation 123' or the operation 124', an operation 154 is simply performed in which there is a wait, if necessary, until the mailbox 97' is no longer empty, then the service message present therein is taken, and this service message is taken into account as to be included in the present downlink frame, the operation 154 being directly followed by the operation 130' where the preparation means 112' sends to the preparation means 94' a service message acknowledgement signal, the operation 130' being directly followed by the operation 132', which is identical to the operation 132.

With regard to the operation 121', it can be seen by comparing FIGS. 23 and 31 that it is identical to the operation 121 with the exception of the fact that the test 136 does not exist, and that it is directly an operation 155 similar to the operation 137 which is performed, that is to say the operation of sending a downlink frame end-of-transmission signal to the authorisation controller 111'.

A description will now be given of a third variant of the central transmission control means 73, corresponding in fact to the variant described with reference to FIGS. 25 to 27, but in the case where there are no no-authorisation-to-send messages.

As above, the same numerical references have been employed for similar components, but given a "prime" index.

In general terms, the differences between the production means 140' and the production means 140 are the same as between the means 95' and the means 95.

It will also be noted that the references of a data frame which are posted in the mailbox 143' correspond simply to the buffer location 80 in which there appears the downlink frame prepared by the preparation means 141'.

It can also be seen, by comparing FIG. 34, which illustrates the functioning of the preparation means 141', with FIG. 26, which illustrates the functioning of the preparation means 141, that the operation 147' is distinguished from the operation 147 by the fact that there is no authorisation-to-send message indication information posted in the mailbox 143', and more generally that the preparation means 141' and 140 have a similar functioning.

Likewise, by comparing the flow diagram in FIG. 35, which illustrates the functioning of the transmitting means 142', with the flow diagram in FIG. 27, which illustrates the functioning of the transmitting means 142, it can be seen that these two transmitting means have a similar functioning.

In other variants, not illustrated, the cooperation between the downlink frame preparation means and the authorisation-to-send or service message preparation means takes place through the use of a semaphore rather than an acknowledgement signal.

A description will now be given, with the help of FIGS. 36 to 50, of the device which is used as a peripheral means 24 for the terminals 23 of the network 20.

Figure 2:
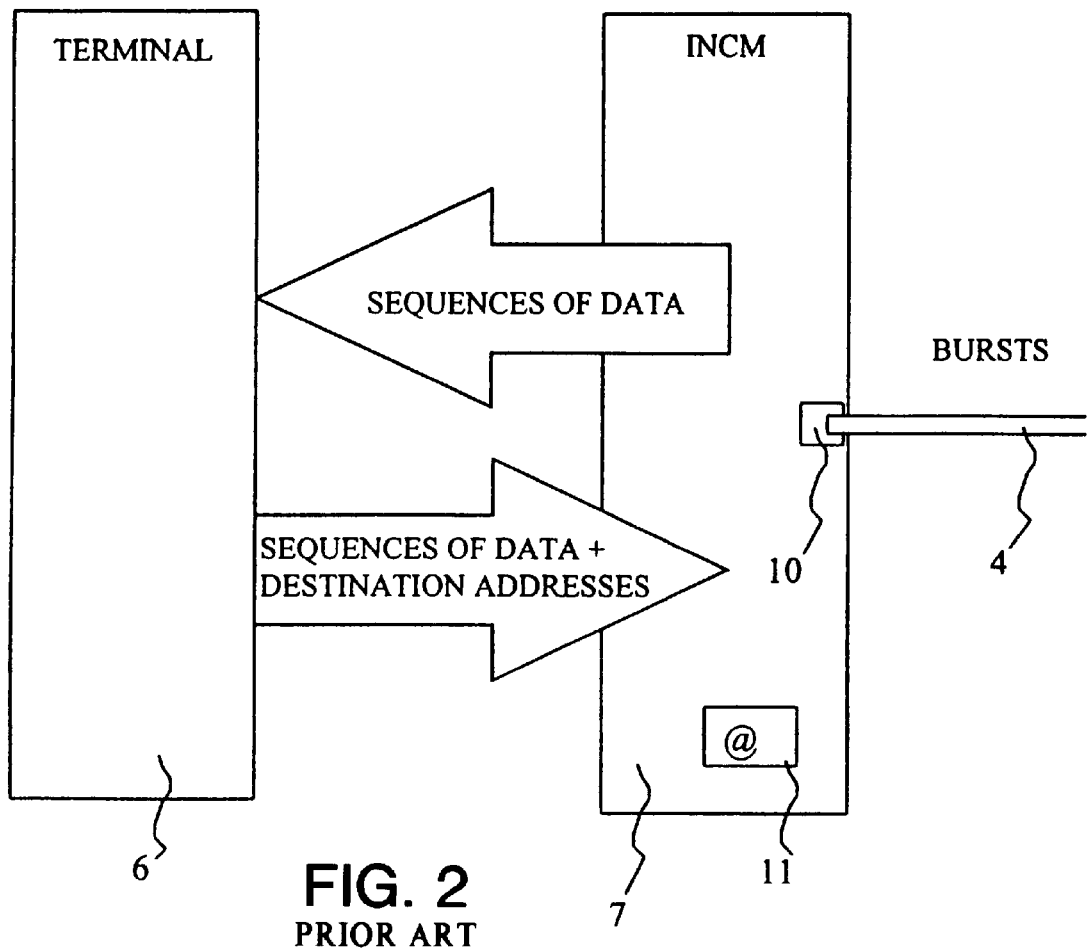
FIG. 2 is a diagram of one of the data stations of this network, illustrating the cooperation between the data processing terminal and the individual networked communication means of such a station.
Figure 3:
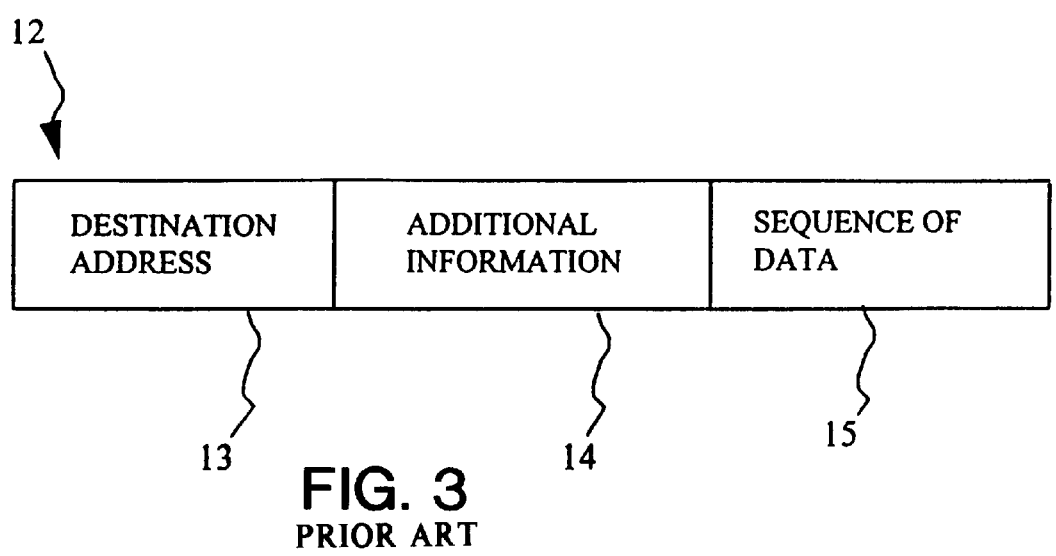
FIG. 3 shows the constitution of the data frames exchanged between the different stations.

As can be seen in FIG. 36, the peripheral means 24 includes an Ethernet card 7, cooperating with the terminal 23 and with the cable 4, one of the end connectors of which is plugged into its port 10, as explained with the help of FIGS. 1 to 3, and a communication converter 160 having a port 161 into which the other end connector of this cable 4 is plugged.

The communication converter 160 has a female RJ-45 connector 162 to give the port 161, a transformer isolation filter 163 connected to the connector 162 by conductors 164, an Ethernet microcontroller 165 connected to the filter 163 by sending/receiving pairs 166, the Ethernet microcontroller 165 also being connected to a microcontroller bus 167 which connects it to a part of the converter 160 which has the same structure, on the electrical level, as the central means 21, with the exception of the serial connection bus and the RS-232 connector, as well as the non-volatile memory.

The converter 160 thus includes a microcontroller 168 connected by means of the bus 167, in addition to the Ethernet microcontroller 165, to a sending/receiving controller 169, to a programmable read only memory 170 containing the program 171 of the microcontroller 168 and the default parameters 172 which enable the converter 160 to be initialised at start-up, and to a volatile random access memory 173 including a space occupied by a working memory 175 and a space 176 occupied by frame buffers; and the sending/receiving controller 169 is thus connected, in addition to the microcontroller bus 167, to a sending/receiving bus 177 which connects it to a radio module 178.

On the hardware level, in the example illustrated, the microcontroller 168, the sending/receiving controller 169 and the radio module 178 are produced in the same way as the microcontroller 152, the sending/receiving controller 56 and the radio module 61 respectively.

The Ethernet microcontroller is for example the one sold by FUJITSU under the reference MB86964, or the one sold by NATIONAL SEMICONDUCTOR® under the reference SONIC®-T, and the filter 163 can be respectively the one sold by PULSE ENGINEERING under the reference PE-65746 or the one sold by VALOR under the reference SF-1020.

The organisation of the space 176 occupied by the frame buffers is shown in FIG. 37.

The space 176 includes a space 179 containing a certain number of buffers 181 for storing a downlink frame and transmitting a data frame, and a space 180 containing a certain number of buffers 182 for storing a data frame and preparing an uplink frame.

The arrangement provided for each of the buffers 181 is the same as the one provided for the buffers 68 (FIG. 13), that is to say it fixes at the start of each memory 181 the position of an area for a service frame having the same length as the field 29 (twenty five octets) and, directly after the service frame area, a data frame area having a maximum length over which the field 30 can extend or the maximum length of a data frame 12.

The arrangement provided for each of the memories 182 is shown in FIG. 38 and is identical to the format provided for the uplink frames 26 (FIG. 9), that is to say it fixes at the start of each memory 82 the position of an information area 183 and directly after that the position of a data frame area 184, the area 183 having the same length as the whole formed by the fields 46 and 47 (twenty octets), whilst the area 184 has a maximum length over which the field 48 or the data frame 12 can extend (one thousand five hundred and forty octets).

When the communication converter 160 receives a downlink frame 25 by means of the shared radio transmission medium, it writes the data frame 28 which it includes in the data frame area of a memory 181, placing the field 30 in this area whilst making the start of this field coincide with the start of this area, the data frame thus stored by the communication converter 160 then being able to be transmitted by the latter to the Ethernet card 7 whilst making a burst appear at the transmission terminals of the port 161.

The burst transmitting the data frame to the Ethernet card transmits the useful content of the data frame area of the memory 181, that is to say the one located in the space going from the start of this area as far as the point where this data frame ends.

The use of the buffers 182 is similar, but in the direction Ethernet bursts to radio bursts: when the converter 160 sees a burst transmitting a data frame 12 appearing on the pair of reception terminals of its port 161, it writes this frame in the area 184 of a memory 182, making the start of this frame coincide with the start of this area; and to prepare an uplink frame 26 with which it will transmit the data frame that it had previously stored in the area 184, the communication converter 160 writes the length information 43 and the additional information 44 in the area 183 of this memory 182, and then sends, over the shared radio medium, a burst transmitting the useful content of this memory 182.

On the functional level, as shown in FIG. 39, the communication converter 160 includes, in general terms, a networked peripheral transmission control means (PTCM in the drawings) 185, a means of sending/receiving over the shared radio medium (S/RM in the drawings) 186, which exchanges information with the peripheral transmission control means 185, and a means of sending/receiving over the Ethernet transmission medium 4 (ETHERNET S/RM in the drawings) 187, which also exchanges information with the peripheral transmission control means 185, the sending/receiving means 186 carrying out operations of writing downlink frames and reading uplink frames in the space 176 of the random access memory 173 where there are found the frame buffers, the sending/receiving means 187 carrying out operations of writing and reading data frames in the space 176, the peripheral transmission control means 185 for its part carrying out operations of writing information in this space, the sending/receiving means 187 also carrying out, when it receives for the first time, after start-up, a data frame 12 by means of the cable 4, an operation of writing, in the operating memory 175, the source address which appears in the additional information field 14, a source address which corresponds to the MAC address 11 of the Ethernet card 7 to which the other end of the cable 4 is connected, the peripheral transmission control means 185 carrying out operations of reading this address, in order to compare it with the address 38 which appears in the service message of the downlink frames reaching it in order to know whether or not this service message is intended for the present peripheral means 24, the address appearing for the latter in the table 64 of the central means 21, corresponding, in the example illustrated, to the MAC address 11 of the Ethernet card 7 which the present peripheral means 24 has.

A description will now be given, with reference to FIGS. 40 to 42, of the constitution of the sending/receiving means 186, and the way in which it cooperates with the peripheral transmission control means 185 and with the space 176 where the frame buffers are located.

In general terms, the sending/receiving means 186 corresponding to the sending/receiving means 74 of the central means 21 but processing the downlink and uplink frames, as does the means 74 respectively for the uplink and downlink frames; and the information exchanged by the sending/receiving means 186 and the peripheral transmission control means 185 correspond to those exchanged by the sending/receiving means 74 and the central transmission control means 73, but with the change which has just been indicated, with the frame reception in progress signal which is not communicated to the peripheral transmission control means 185, and with the transfer by the sending/receiving means 186, directly in the course of the reception of a downlink frame, of the service message contained in the latter.

More precisely, the sending/receiving means 186 includes the radio module 178, and uses resources procured by the microcontroller 168 with the help of the program 171, default parameters 172 and working memory 175.

In addition to the radio module 178, the sending/receiving means 186 includes a sending management means 188, and a reception management means 189, which has a mailbox 190 in which the peripheral transmission control means 185 posts the locations of the different buffer memories 181 each free for the storage of a downlink frame.

As already indicated, the radio module 178 is produced in the same way as the radio module 61 of the central means 21. Its operation is therefore the same as that described with the help of FIG. 15, provided obviously that the references to an uplink frame are changed to a reference to a downlink frame, and vice versa.

The functioning of the reception management means 189 is illustrated by the flow diagram in FIG. 41.

Directly after start-up, the management means 189 enters a loop where it begins by performing an operation 191 in which it waits until there is at least one memory location 181 in the mailbox 190, that is to say the latter is not empty, and when this becomes the case, it takes a location from this mailbox, and more precisely the one which is the first to have been posted therein where there are several of them, the memory 181 whose location it has taken being that which it will use to store the next downlink frame which the radio module 178 sends to it.

The management means 189 then goes to an operation 192 in which it awaits the start of the frame reception in progress signal and, when this event occurs, the management means 189 performs a test 193 in which it determines whether the frame which the radio module 178 is in the process of delivering to it is indeed a downlink frame coming from the central means 21, for example by checking whether the service message 31 provided in the field 34 is indeed present.

Where the result of the test 193 is negative, which occurs in particular when the frame received is an uplink frame coming from another peripheral means 24, the management means 189 returns to the operation 192, that is to say it awaits reception of the next frame, ignoring the one that the radio module is in the process of delivering to it.

Where the result of the test 193 is positive, the management means 189 performs an operation 194 in which, on the one hand, it transfers the downlink frame which the radio module 178 is in the process of delivering to it, into the buffer 181 situated in the last location which it has taken from the mailbox 190, until the end of the frame reception in progress signal, and on the other hand it transfers the service message contained in this downlink frame to the peripheral transmission control means 185.

The management means 189 then performs an operation 195 in which it sends, to the means 185, the location of the memory 181 in which it has stored the downlink frame which has just been received, which informs the peripheral transmission control means 185 of the reception and storage of this frame.

The management means 189 then returns to the start of the loop and will therefore perform iteratively, throughout its functioning, the series of operations which has just been described.

It will be observed that, where there is no buffer 181 available for the reception of a downlink frame, the management means 189 remains locked at the operation 191, and therefore ignores any frames which the radio module 178 might deliver to it.

The functioning of the sending management means 188 is illustrated by the flow diagram in FIG. 42.

Directly after start-up, it enters a loop in which it begins by performing an operation 196 in which it waits for the peripheral transmission control means 185 to deliver to it a memory location 182 containing an uplink frame to be transmitted over the shared radio medium.

When this event occurs, the management means 188 performs an operation 197 in which it activates the downlink frame transmission request signal, and then goes to an operation 198 in which it awaits the presence of the uplink frame transmission in progress signal.

When this event occurs, the management means 188 performs an operation 199 in which it delivers to the radio module 178 the uplink frame contained in the memory location 182 which has been delivered to it in the course of the operation 196, and when it has finished delivering this uplink frame it performs the operation 200 in which it inactivates the downlink frame transmission request signal, then it returns to the start of the loop and will therefore perform, throughout its functioning, the series of operations which has just been described.

A description will now be given, with reference to FIGS. 43 to 47, of the details of the constitution and functioning of the peripheral transmission control means 185.

The latter uses resources procured by the microcontroller 168 with the aid of the program 171, default parameters 172 and working memory 175.

As can be seen in FIG. 43, the control means 185 includes a means 201 of managing buffers 181, a means 202 of managing buffers 182, a means 203 producing uplink frames, including a mailbox 204 in which the management means 202 posts the locations of buffers 182 in which a downlink frame awaiting transmission is situated, and a means 205 producing data frames, including a mailbox 206 in which the management means 201 posts the locations of buffers 181 in which is situated a downlink frame received by means of the shared radio medium.

Figure 44:
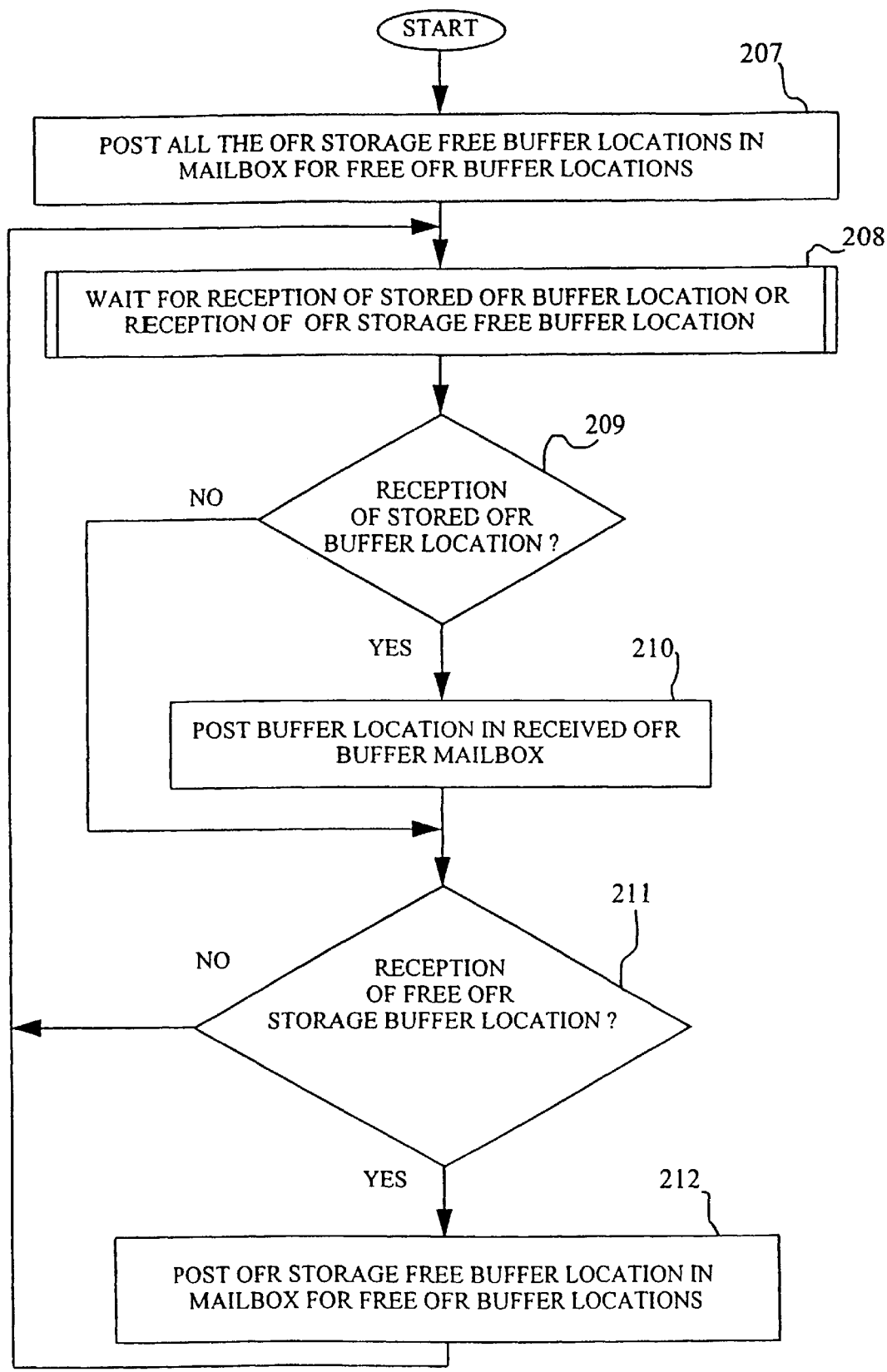

The functioning of the management means 201 is illustrated by the flow diagram in FIG. 44.

After start-up, it performs an operation 207 in which it posts the location of each of the buffers 181 in the mailbox 190 of the reception management means 189, the locations in question being stored amongst the default parameters 172.

Once the operation 207 has been accomplished, the management means 201 enters a loop in which it performs an operation 208 in which it waits until it receives, from the sending/receiving means 186, and more precisely from the reception management means 189, a buffer location 181 in which a downlink frame has been stored, hereinafter referred to as the first event, or else until it receives, from the production means 205, a buffer location 181 containing a data frame whose transmission over the Ethernet medium 4 has been effected, hereinafter referred to as the second event.

When one or other of these two events occurs, the management means 201 goes to a test 209 in which it determines whether or not it is the first event which has occurred.

Where it is indeed the reception of a buffer location 181 in which a downlink frame has just been stored, which has occurred, the management means 201 performs an operation 210 in which it posts the memory location 181 which it has just received, in the mailbox 206 of the production means 205.

Once the operation 201 has been accomplished, or when the result of the test 209 is negative, the management means 201 performs a test 211 in which it determines whether or not the second event has just occurred.

In the affirmative, it performs an operation 212 in which it posts in the mailbox 190 of the reception managements means 189, the buffer memory location 181 which it has just received.

Once the operation 212 has been accomplished, and where the result of the test 211 is negative, the management means 201 returns to the start of the loop, and will therefore perform iteratively, throughout its functioning, the series of operations which has just been described with the exception of course of the operation 207, which is outside the loop, and which is therefore performed only just after start-up.

Figure 45:
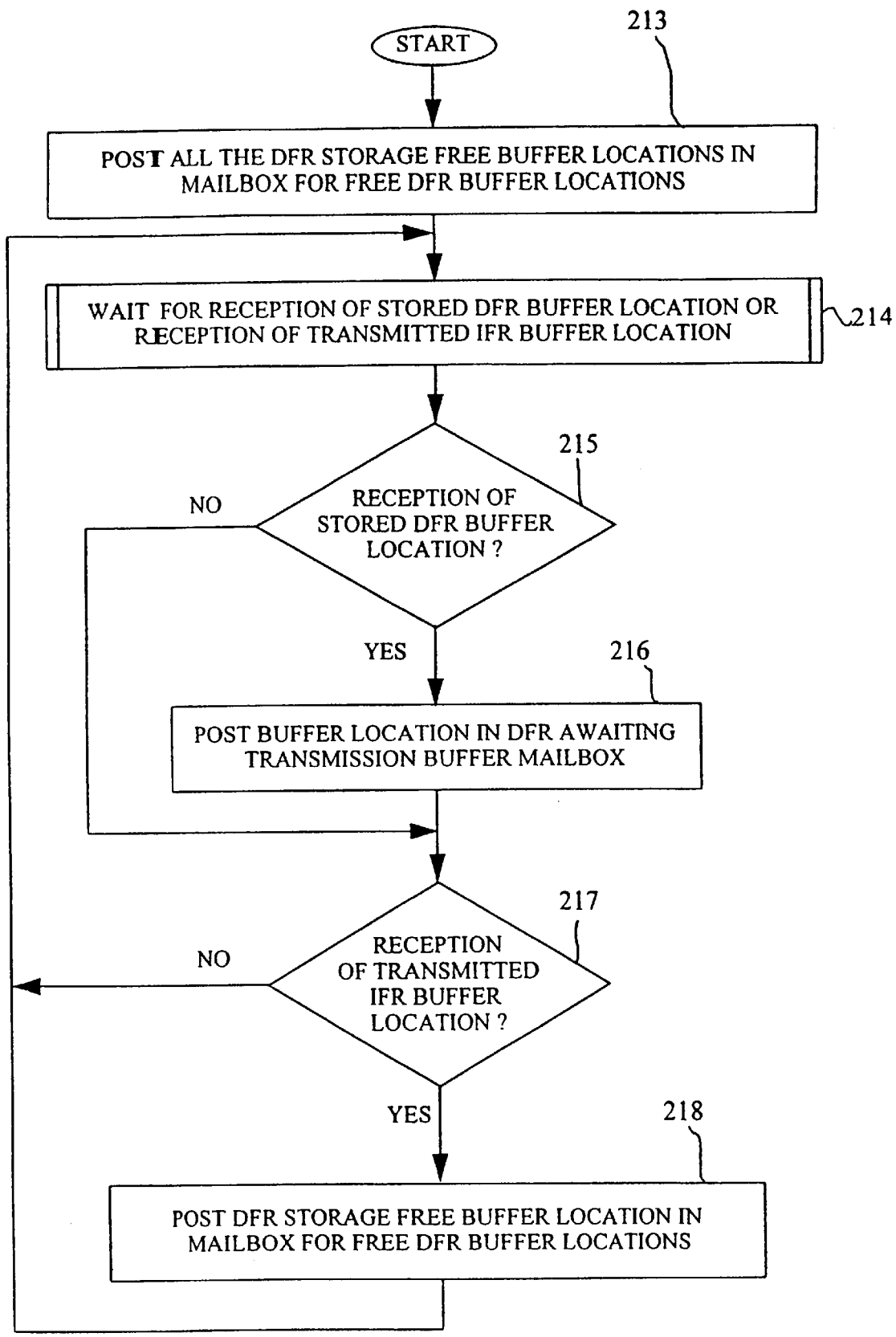

The functioning of the means 202 of managing buffers 182 is illustrated by the flow diagram in FIG. 45.

After start-up, it performs an operation 213 in which it posts the location of each of the memories 182 in the mailbox of a data frame reception management means included in the Ethernet sending/receiving means 187, the locations in question being stored amongst the default parameters 172.

Once the operation 213 has been accomplished, the management means 202 enters a loop in which it performs an operation 214 in which it waits until it receives, from the Ethernet sending/receiving means 187, and more precisely from its data frame reception management means, a buffer location 182 in which a downlink frame received by the Ethernet medium 4 has been stored, hereinafter referred to as the first event, or else until it receives, from the uplink frame production means 203, a buffer memory location 182 containing an uplink frame whose transmission over the shared radio medium has been performed, hereinafter referred to as the second event.

When one or other of these two events occurs, the management means 202 goes to a test 215 in which it determines whether or not it is the first event which has occurred.

Where it is indeed the reception of a buffer location 182 in which a data frame 12 has just been stored, which has occurred, the management means 202 performs an operation 216 in which it posts the memory location 182 which it has just received in the mailbox 204 of the production means 203.

Once the operation 216 has been accomplished, or when the result of the test 215 is negative, the management means 203 performs a test 217 in which it determines whether or not the second event has just occurred.

In the affirmative, it performs an operation 218 in which it posts in the mailbox of the data frame reception management means of the Ethernet sending/receiving means 187, the buffer location 182 which it has just received.

Once the operation 218 has been accomplished, and where the result of the test 217 is negative, the management means 203 returns to the start of the loop, and will therefore perform iteratively, throughout its functioning, the series of operations which has just been described, with the exception of course of the operation 213 which is outside the loop and which is therefore performed only just after start-up.

Figure 46:
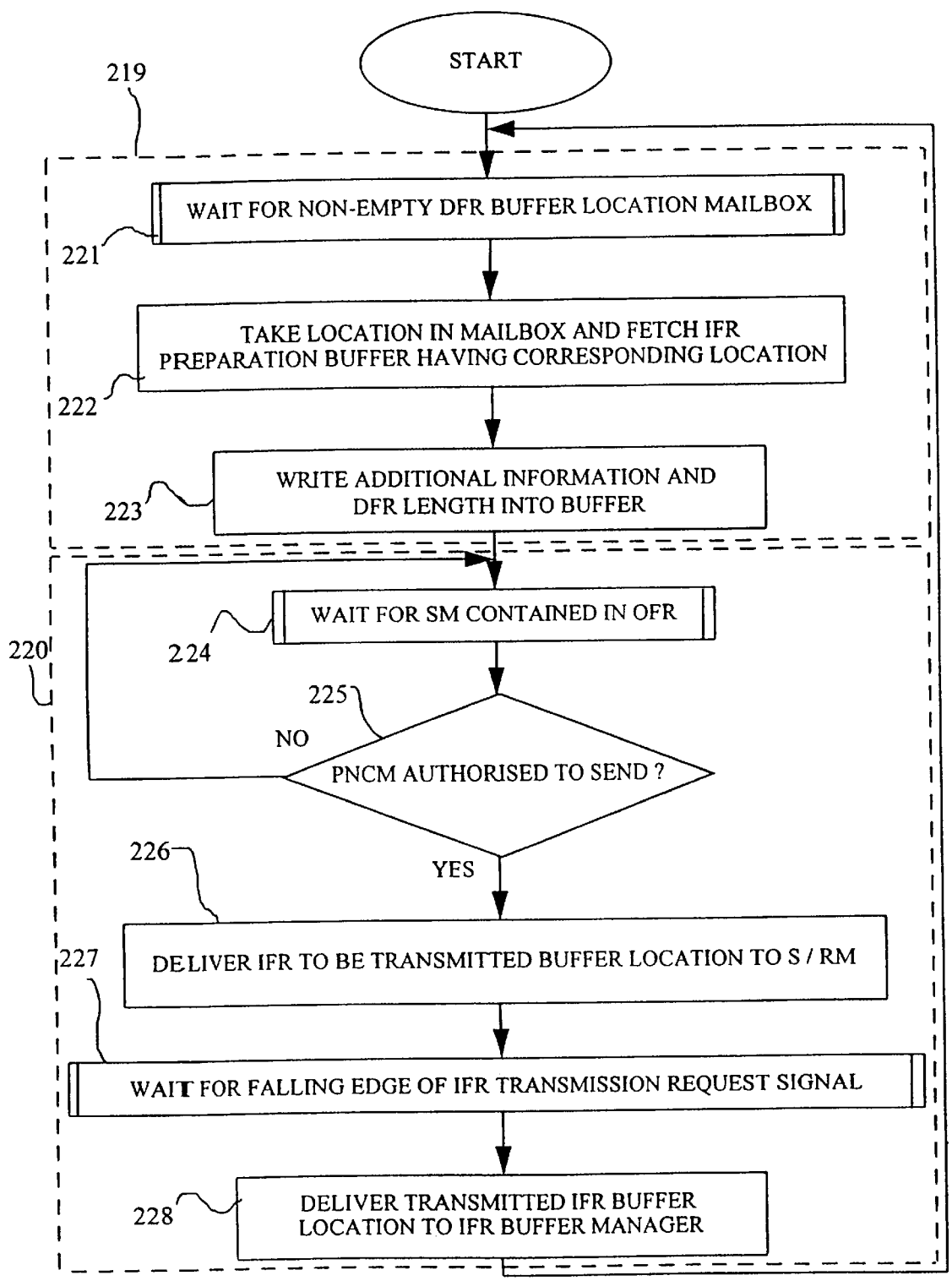

The functioning of the uplink frame preparation means 203 is illustrated by the flow diagram in FIG. 46.

Directly after start-up, the production means 203 enters a loop where it performs an operation 219 of preparing an uplink frame, and then an operation 220 of transmitting this uplink frame, and thereafter it returns to the start of the loop and will therefore perform iteratively, throughout its functioning, an operation 219 followed by an operation 220.

The operation 219 of preparing an uplink frame commences with an operation 221 in which the uplink frame production means 203 awaits, if necessary, until there is at least one memory location 182 in the mailbox 204, that is to say the latter is not empty.

When this event occurs, the uplink frame production means 203 performs an operation 222 in which it takes from the mailbox 204 a memory location 182 and takes account of the fact that it is the buffer memory 182 corresponding to the location taken which is to be used for the preparation of the present uplink frame.

In the example illustrated, where the mailbox 204 has several locations, the memory 203 takes the one which is the first to have been posted therein but, in a variant which is not illustrated, a concept of priority is involved, as explained above with regard to the preparation means 112 of the central transmission control means 73.

After having performed the operation 222, the means 203 performs an operation 223 in which it writes in the information area 183 of the memory 182 whose location it took in the operation 122, the data frame length information 43 and the additional information 44.

It will be noted that it is by virtue of the location taken from the mailbox 204 in the operation 222 that the production means 203 knows the length of this data frame, the locations posted in the mailbox 204 consisting of the address in the random access memory 173 of the start of the data frame area 184 and the length of the data frame which is stored therein.

When the operation 223 is accomplished, the uplink frame allowing the transmission of the data frame stored in the present buffer memory 182 has finished being prepared, and the production means 203 will pass directly to the operation 220 in which it transmits it.

The operation 220 begins with the operation 224 of awaiting, from the sending/receiving means 186, and more precisely from its reception management means 189, a service message contained in a downlink frame which is in the course of reception.

When this event occurs, the production means 203 performs the operation 225 in which it analyses the service message which it has just received in order to determine whether or not the latter authorises it to send an uplink frame in return.

The central transmission control means 73 of the central means 21 producing downlink frames whose service message may be either an authorisation-to-send message or a no-authorisation-to-send message, the operation 225 includes first of all the operation of determining whether the information 37 about the nature of the message contained in the field 40 indicates that it is a question of a no-authorisation-to-send message or an authorisation-to-send message. When it is a case of a no-authorisation-to-send message, the result of the operation 225 is negative and the production means 203 returns to the waiting operation 224.

When the information 37 indicates that it is a case of an authorisation-to-send message, the means 203 then determines whether the address 38 contained in the field 41 correspond to the one which has been written in the operating memory 175 by the Ethernet sending/receiving means 187, as explained above.

If there is correspondence, the result of the operation 225 is positive and the production means 203 goes to the operation 226.

In the variant of the central means 21 where the central transmission control means 73 is replaced by the first variant thereof described above, that is to say the one in which the downlink frame production means 95 is replaced by the means 140 (FIGS. 25 to 28), and more generally in all cases where the service message can be either of the authorisation-to-send message type or of the no-authorisation-to-send message type, the operation 225 is performed in the same way.

In the variants of the central means 21 where the central transmission control means 73 is replaced by the second and third variants described above, with reference to FIGS. 29 to 35, and more generally in all cases where the service message is solely of the authorisation-to-send message type, the operation 225 is limited to a simple operation of comparing the address 38 of the service message with the one written by the sending/receiving means 187 in the operating memory 175.

In the operation 226 which it performs when the result of the operation 225 is positive, the production means 203 delivers to the sending/receiving means 186, and more precisely to its sending management means 188, the present memory location 182, and then it performs an operation 227 in which it awaits the falling edge of the uplink frame transmission request signal, that is to say the production means 203 remains blocked as long as a burst transmitting the present uplink frame has not finished being transmitted.

When the end of transmission of this burst occurs, the production means 203 goes to an operation 228 in which it delivers to the management means 202 the location of the present memory 182, so that the management means 202 can post it in the mailbox of the data frame reception management means of the sending/receiving means 187, so that the latter can once again use this buffer 182 for storing a new data frame reaching the converter 160 over the Ethernet medium 4.

In a variant, not illustrated, of the peripheral transmission control means 185, the production means 203 is replaced with an uplink frame preparation means and with an uplink frame transmitting means, in a manner similar to that in which the downlink frame preparation means 112 of the downlink frame production means 95 is replaced in the downlink frame production means 140 with a downlink frame preparation means 141 and with a downlink frame transmitting means 142, that is to say with two means which perform in parallel respectively the operation 219 of preparing an uplink frame and the operation 220 of transmitting such a frame, with the uplink frame preparation means performing an operation 219 on each occasion when there is a free location in the mailbox of the uplink frame transmitting means, and with the latter performing an operation 220 of transmitting an uplink frame as long as its mailbox is not empty.

The functioning of the data frame production means 205 is illustrated by the flow diagram in FIG. 47.

Directly after start-up, the production means 205 enters a loop in which it commences by performing an operation 229 in which it waits until there is present in the mailbox 206 at least one buffer location 181 in which the sending/receiving means 186 has stored a downlink frame, that is to say this mailbox is not empty.

When this event occurs, the production means 205 goes to an operation 230 in which it takes in the mailbox 206 a memory location 181, the first to have been posted therein where there are several of them, and then it reads, in the buffer 181 corresponding to this location, the data frame length information 43 which appears in the field 46 of the downlink frame which is stored therein.

The means 203 then performs the test 231A in which it determines whether or not the information 43 which it has read is greater than zero, that is to say whether or not there is a data frame present in the downlink frame stored.

In the affirmative, the production means 205 performs an operation 231B in which it takes the destination address appearing in this data frame and determines whether or not this address corresponds to the one stored in the working memory 175.

In the negative, the production means 205 does whatever is necessary for the Ethernet sending/receiving means 187 to transmit this data frame over the Ethernet transmission medium 4: it thus first of all performs the operation 232, in which it delivers to the sending/receiving means 187 the location of the data frame area of the present buffer 181, that is to say the address in the memory 173 of the start of the data frame area and the length thereof, and then goes to the operation 233 in which it waits until the Ethernet sending/receiving means sends to it a signal of the end of transmission of this data frame.

When this event occurs, or when the result of the test 231A or 231B is respectively negative or positive, the production means 205 performs an operation 234 in which it delivers to the management means 201 the memory location 181 in which appeared the downlink frame including the data frame which has just been transmitted over the Ethernet transmission medium 4, so that the management means 201 posts this location in the mailbox 190 of the reception management means 189 of the radio sending/receiving means 186, so that this buffer 181 can once again be used to store a new downlink frame.

Once the operation 234 has been accomplished, the production means 205 returns to the start of the loop, and will therefore perform iteratively, throughout its functioning, the series of operations which has just been described.

FIG. 47A illustrates the functioning of a variant of the production means 205.

It can be seen, by comparing FIGS. 47 and 47A, that this variant has identical functioning, but, when the test 231B is negative, instead of directly ensuring that the Ethernet sending/receiving means 187 transmits the data frame, the variant of the production means 205 performs an operation 231 in which it takes the destination address of the data frame and determines whether or not this address corresponds to the address stored in the working memory or is a multi-destination (multicast) address, ensuring that the means 187 transmits the data frame only if the operation 231C is positive.

When this operation is negative, the variant of the production means 205 goes directly to the operation 234.

In variants, not illustrated, of the production means 205, a concept of priority is introduced, in order to transmit to the terminal 23, where there are several data frames present in the buffers 181 whose locations appear in the mailbox 206, the one from amongst these data frames which is to be transmitted on this occasion over the Ethernet medium 4.

A description will now be given, with the help of FIGS. 48 to 50, of the constitution and functioning of the Ethernet sending/receiving means 187.

The latter includes, as described with reference to FIG. 36, the Ethernet microcontroller 165 with the sending/receiving pairs 166, filter 163, conductors 164 and connector 162, and uses resources procured by the microcontroller 168 with the aid of the program 171, default parameters 172 and working memory 175.

As can be seen in FIG. 48, the Ethernet sending/receiving means 187 includes a data frame reception management means 235 provided with a mailbox 236, and an Ethernet module 237.

As explained above, it is the management means 202 which posts in the mailbox 236 the buffer locations 182 which are free for the storage of a data frame arriving in the communication converter 160 over the Ethernet transmission medium 4, and it is the data frame reception management means 235 which sends to the management means 202 the memory location 182 where such a data frame was stored.

With regard to the cooperation of the management means 235 with the Ethernet module 237, the latter receives from the management means 235, at start-up, a buffer location 182 in which it stores the first data frame which reaches it, after start-up, over the Ethernet medium 4, and, once the data frame has finished being received, the Ethernet module 237 sends to the management means 235 a data frame reception signal, which enables the management means 235 to know that there is a data frame stored in the memory location 182 which it had previously delivered to the Ethernet module 237, and to send to the latter a new buffer location 182.

The Ethernet module 237 also cooperates directly with the data frame production means 205 of the peripheral transmission control means 185, which delivers to it, as explained previously, one by one, the data frame area locations of the buffers 181 in which a downlink frame was stored, the Ethernet module 237 on each occasion advising the production means 205 of the transmission of the data frame present in this location by means of a data frame end of transmission signal.

The functioning of the data frame reception management means 235 is illustrated by the flow diagram in FIG. 49.

Directly after start-up, it enters a loop where it begins by performing an operation 238 in which it waits until there is at least one memory location 182 present in the mailbox 236, that is to say until the latter is not empty, and when this becomes the case, it takes from this mailbox a location, and more precisely the one which is the first to have been posted therein where there are several of them.

The management means 235 then goes to an operation 239 in which it delivers to the Ethernet module 237 the location which it has just taken, so that the module 237 uses the corresponding memory 182 in order to store therein the next data frame which it receives over the Ethernet medium 4.

The management means 235 then goes to an operation 240 in which it waits until the module 237 sends it the data frame end-of-reception signal, the reception of this signal signifying that the module 237 has stored a data frame received over the medium 4 in the memory 182 whose location the means 235 had communicated to it in the course of the preceding operation 239.

When the management means 235 receives the data frame end-of-reception signal, it goes to the operation 241 in which it sends to the peripheral transmission control means 185, and more precisely to the management means 202 thereof, this same buffer location 182, as explained above.

Once the operation 241 has been accomplished, the management means 235 returns to the start of the loop, and will therefore perform, throughout its functioning, the series of operations which has just been described.

The functioning of the Ethernet module 237 is illustrated by the flow diagram in FIG. 50.

Directly after start-up, the module 237 enters a loop in which it begins by performing an operation 242 of awaiting the reception of a burst over the Ethernet medium 4 or the reception of a buffer location 181 in which there is a data frame to be transmitted over this medium.

When one or other these two events occurs, the module 237 performs a test 243 in which it determines whether or not it is the first event which has occurred.

In the affirmative, the module 237 performs a test 244 in which it determines whether or not it has available a memory location 182, that is to say whether the management means 235 has delivered to it one which it has not yet used.

In the affirmative, the module 237 performs an operation 245 in which it transfers the data frame contained in the burst which it is in the process of receiving, into the area 184 of the memory 182 whose location it has available.

When the burst transmitting this data frame has finished being received, the module 237 goes to a test 246 in which it determines whether or not it is the first time that it receives a data frame by means of the Ethernet medium 4, this test for example being performed by means of an indicator which is inactivated at start-up and which the module 237 activates as soon as it has received a data frame.

When the result of the test 246 is positive, the module 237 performs an operation 247 in which it takes the source address appearing in the field 14 of the data frame received, a source address which corresponds to the MAC address 11 of the Ethernet card 7 associated with the terminal 23, and then the module 237 writes this address in the working memory 175.

When the operation 247 is accomplished, or when the result of the test 246 is negative, the module 237 performs an operation 248 in which it sends to the management means 235 the data frame end-of-reception signal.

When the operation 248 is accomplished, or where one or other of the tests 243 or 244 is negative, the module 237 performs a test 249 in which it determines whether or not the second event has just occurred.

In the affirmative, that is to say when the production means 205 has just delivered to the module 237 the location of the data frame area of a buffer 181, the module 237 performs an operation 250 in which it sends over the Ethernet medium 4 a burst transmitting the data frame contained in this memory 181, and in which it then sends a data frame end-of-transmission signal to the production means 205 of the peripheral transmission control means 185.

When the operation 250 is accomplished, or when the test 249 is negative, the module 237 returns to the start of the loop, and will therefore perform, throughout its functioning, the series of operations which has just been described.

FIG. 50A shows the functioning of a variant of the module 237, this functioning being identical to that shown in FIG. 50, with the exception of the fact that the test 246 is not performed, that is to say the Ethernet module in all cases goes directly from the operation 245 to the operation 247.

Thus there will be permanently in the operating memory 175 the source address appearing in the last data frame received by means of the medium 4.

This offers the advantage, where the converter 160 is able to be connected to a different Ethernet card 7 during its functioning, of being certain to have the correct address permanently.

FIG. 51 illustrates the functioning of another variant of the module 237 in which the operations 246 and 247 are replaced by the operations 246A, 246B and 247B, whilst, just after start-up, and before entering the loop, an operation 17 is performed.

In the latter operation, there is written in the working memory 175, an address in which all the bits are at one, that is to say the general broadcast address.

Given that this address cannot be that of a peripheral means, any problems caused by the fact that a random initialisation of the address appearing in the working memory 175 may happen to be the address of another peripheral means, are avoided.

It will be noted that it is advantageous also to perform the initialisation operation 17 in the embodiments of the Ethernet module whose functioning is shown respectively in FIGS. 50 and 50A.

In the variant whose functioning is illustrated in FIG. 50B, after performing the operation 245 and then the operation 246A of taking the source address of the data frame, the Ethernet module performs a test 246B in order to determine whether or not this source address corresponds to that which appears in the working memory 175.

In the negative, it performs the operation 247B in which it writes the source address read in the working memory and then goes to the operation 248, whilst in the affirmative it passes directly to this operation 248.

It will be observed that, just like the Ethernet module whose functioning is shown in FIG. 50A, the source address of the last data frame received is permanently in the working memory, but that the operations of writing this address in the working memory is avoided so long as it has not changed, which is normally the case.

It will be observed, in general terms, that the communication converter 160 makes it possible to have, in a particularly simple and convenient manner, a peripheral networked communication means 24, when there is already a data station of the type marked 2A to 2G in FIG. 1, since it suffices to plug in the two ends of a cable 4.

Where the individual networked communication means forming part of the data station available is in conformity with a recommendation or standard other than those mentioned above, variants of the converter 160 are used which are similar but in which the sending/receiving means 187 is replaced by a sending/receiving means which is similar but adapted to the MAC protocol of the data station, and more precisely the individual networked communication means to which a connection is made.

Where the terminal 23 is not associated with an available individual networked communication means, the device 24' shown in FIG. 51 is used, which is similar to the communication converter 160 but cooperates directly with the terminal 23.

In FIG. 51, for the components of the peripheral means 24', the same numerical references have been used as for the means 24, but given a "prime" index.

As can be seen by comparing FIGS. 36 and 51, the peripheral means 24' is similar to the converter 160, but with the assembly formed by the connector 162, the filter 163, the conductors 164, the Ethernet microcontroller 165 and the sending/receiving pairs 166 being replaced by a terminal interface 251 provided with a male ISA bus connector 8 designed to be plugged into the female connector 9 of the terminal 23, and with the programmable read-only memory 170' including an MAC address 11'.

On the functional level, the peripheral means 24' is similar to the converter 160, but with the Ethernet sending/receiving means 187 being replaced by a sending/receiving means cooperating directly with the terminal 23, the electrical signals which it sends or receives at the connector 8 in order to deliver a series of data to the terminal or to have delivered to it by the latter a series of data accompanied by a destination address, being converted, in the terminal 23, by the driver which was installed therein for the device 24', into signals compatible with the aforementioned logic interface, for example of the NDIS or ODI type.

Where it is desired to interconnect a network of the type shown in FIG. 1 and a network of the type shown in FIG. 4, it is possible to perform the interconnection by means of the central networked communication means, as shown in FIG. 52.

The wireless network 20' shown in the latter is similar to the network 20 but with the central networked communication means 21 replaced by a means 21' having a port 260 for a cable 4 or 5 forming part of a shared transmission medium of the type shown in FIG. 1, for example the particularly simple medium shown in FIG. 52, consisting of a concentrator 1 and three cables 4 each having one of their end connectors plugged into a port of a unit 3 of the concentrator 1, and the other end connector plugged respectively into the port of the individual networked communication means 7 of one or other of the data stations 2 or into the port 260 of the central means 21'.

By virtue of the interconnection of the two networks, any terminal from amongst the terminals 6 or 23 can send, by means of its individual networked communication means 7 or 24, a data sequence to another one of the terminals 6 or 23, independently of the location of the terminals in one or other of the two networks.

The central networked communication means 21' and variants thereof will now be described with reference to FIGS. 53 to 73.

As can be seen by comparing FIGS. 11 and 53, the device which is used as the central means 21' has the same components as the device which is used as the central means 21, to which the same reference numerals have been given, but allocated a "prime" index, and also a set of components allowing connection of the Ethernet transmission medium.

This set includes the RJ45 connector 261 connected to the conductors 262, a transformer isolation filter 263 connected to the conductors 262 and to the sending/receiving pairs 264, and an Ethernet microcontroller 265 connected to the pairs 264 and to the microcontroller bus 55'.

The information given above about the manner of procuring or producing the microcontroller 52, the sending/receiving controller 56, the radio module 61, the transformer isolation filter 163 and the Ethernet microcontroller 165 are valid respectively for the microcontroller 52', the sending/receiving controller 56', the radio module 61', the filter 263 and the Ethernet microcontroller 265.

The content of the memories 57' to 59' is similar to that of the memories 57 to 59, with however the content of the random access memory 59' being a little different, a certain number of counters being provided in the working memory 65', the space 66' for its part being occupied by a number of additional buffers.

As can be seen in FIG. 54, the latter space includes a space 266 containing a memory 267 which is identical and having the same use as the memory 70 of the central means 21, a space 268 containing a certain number of buffers 269 for storing a data frame 12 and preparing a downlink frame as shown in FIG. 5, that is to say containing a data frame, each of the memories 269 being arranged like the memories 68 of the central means 21, and being used for storing, in its data frame area, a data frame reaching the central means 21' over the Ethernet transmission medium, and then for preparing a downlink frame with which the means 21' will retransmit this data frame, and finally a space 270 containing a certain number of buffers 271 identical to the memories 68 of the central means 21, and having the same use.

The working memory 65', as can be seen in FIG. 55, has an assembly 272 including an individual counter for each buffer 269 and 271, a counter 273 of the number of buffers 269 used, and a counter 274 of the number of buffers 271 used.

The counters 272 each make it possible to know whether the buffer with which it is associated is respectively free, occupied by a data frame which must be transmitted by one or other of the radio or Ethernet shared transmission media, or occupied by a data frame which must be transmitted over each of its media, the counters 273 and 274 serving respectively to determine whether there is saturation, that is to say absence of a free buffer, respectively in the space 268 and in the space 270.

On the functional level, as shown in FIG. 56, the central means 21' includes, in general terms, a central transmission control means 275, a means 276 of sending/receiving over the shared radio medium, and a means 277 of sending/receiving over the shared Ethernet medium.

The means 275 and 276 exchange the same information as the means 73 and 74 of the central means 21, and carry out writing/reading operations in the frame buffer space 66', similar to those performed by the means 73 and 74 of the central means 21 in the space 66.

The central transmission control means 275 and the Ethernet sending/receiving means 277 for their part exchange the same information as the means 185 and 187 of the communication converter 160, with the means 277 performing writing/reading operations in the memory space 66', similar to those performed by the means 187 in the memory space 176.

The description given above for the sending/receiving means 74 is valid for the sending/receiving means 276, with the exception of the functioning of its reception management means, which is illustrated by the flow diagram in FIG. 57.

As can be seen by comparing the latter figure with FIG. 16, the reception management means of the sending/receiving means 276 performs in a loop the same series of operations as the management means 76, the operations 278 to 282 corresponding respectively to the operations 83 to 87, but with in addition, when the test 280 is positive, an operation 283 in which the reception management means of the means 276 increments the counter 274 by the number of buffers 271 used.

It will be observed that, where there is no buffer 271 available for the reception of an uplink frame, the reception management means of the means 276 remains blocked at the operation 278, and therefore ignores any frames which the radio module might deliver to it.

The transmission control means 275 will now be described with reference to FIGS. 58 to 64.

As shown in FIG. 58, the control means 275 includes a buffer management means 284, a data frame production means 285 including a mailbox 286 in which the management means 284 posts buffer memory locations 271, an authorisation-to-send message preparation means 287, and a downlink frame production means 288, including a mailbox 289 in which the management means 284 posts memory locations 269 to 271, and a mailbox 290 in which the preparation means 287 posts authorisation-to-send messages as it prepares them.

The data frame production means 285 has a functioning similar to that of the production means 205 of the communication converter 160, the description given above for its functioning, notably with regard to FIG. 47, being valid for the production means 285 provided that the references to the sending/receiving means 187, the mailbox 206 and the management means 201 are changed respectively to references to the Ethernet sending/receiving means 277, the mailbox 286 and the management means 284.

The authorisation-to-send message preparation means 287 has the same functioning as the means 94 of the central means 21, the description given above notably with reference to FIG. 20 also being valid for the preparation means 287, provided that the references to the production means 95, the mailbox 97 and the table 64 are changed respectively to references to the production means 288, the mailbox 290 and the table 64'.

The functioning of the production means 288 is similar to that of the production means 95 of the central means 1, the production means 288 having a constitution similar to that shown in FIG. 21, the authorisation controlling means which it includes having a functioning similar to that shown in FIG. 22, and the preparation means which it includes has a functioning similar to that shown in FIG. 23, with however the operation of preparing a downlink frame being not the one shown in FIG. 24 but the one illustrated by the flow diagram in FIG. 59.

As can be seen by comparing FIGS. 24 and 59, the operation of preparing a downlink frame performed by the production means 288 includes operations 291 to 301 which are respectively the same as the operations 122 to 132 of the operation 120, but after having accomplished one or other of the operations 292 or 293, the production means 288 goes to the test 294 only if the tests 302 and 303 are negative, the operation 295 being performed not only when the test 294 is positive but also when one or other of the tests 302 or 303 is positive.

In the test 302, the production means 288 determines whether the saturation threshold of the memory space 270 is attained, that is to say a predetermined number of buffers 271 are occupied, this test being performed in practice by determining whether or not the counter 274 has reached a value equal to this predetermined number.

The test 303 performed by the production means 288 is similar, but for the buffers 269 of the space 268, in practice by means of the counter 273.

It will be observed that, where one or other of the spaces 268 or 270 is saturated, the production means 288 includes, in the downlink frame which it is in the process of preparing, a service message of the no-authorisation-to-send message type, so that, as soon as it has transmitted the present downlink frame, the central means 21' can send a new downlink frame, so that a buffer 269 or 271 can be released as quickly as possible.

It should be stated in this regard that the reception management means of the sending/receiving means 276 remains locked on standby when it does not have any buffer location 271 available, that is to say when its mailbox is empty, so that any uplink frames which it may receive in the meantime are ignored, and it will be noted that a similar phenomenon occurs in the Ethernet sending/receiving means 277.

In variants which are not illustrated the production means 288 is replaced by a production means having, with respect to it, the same differences as the production means 140 with respect to the production means 95 of the central means 1.

In other variants, the preparation means 287 is replaced by a preparation means differentiated from it in the same way as the preparation means 94' is differentiated from the preparation means 94 of the central means 21, and the production means 288 is replaced by a production means differentiated in the same way as the production means 95' or 140' is differentiated from the production means 95 of the central means 21.

The buffer management means 284 will now be described with the help of FIGS. 60 to 64.

As can be seen in FIG. 60, the management means 284 includes an end-of-sending management means 304 which posts buffer locations 269 and 271 respectively in the mailbox of the reception management means of the sending/receiving means 277 and of the sending/receiving means 276, a data frame routing means 305 which posts in the mailbox 289 buffer locations 269 which have been communicated to it by the sending/receiving means 277, and an uplink frame routing means 306 which posts in the mailboxes 286 and 289 buffer locations 271 which have been communicated to it by the sending/receiving means 276.

The functioning of the end-of-sending management means 304 is illustrated by the flow diagram in FIG. 61.

After start-up, it performs an operation 307 in which it posts the location of each of the memories 269 in the mailbox of the reception management means of the sending/receiving means 277, and each of the memory locations 271 in the mailbox of the reception management means of the sending/receiving means 276.

Once the operation 307 has been accomplished, the management means 304 enters a loop, where it begins by performing the operation 308 of waiting until it receives, from the downlink frame production means 288, the location of a buffer memory 269 or 271 containing a downlink frame which has just been transmitted over the shared radio medium, hereinafter referred to as the first event, or else until it receives from the production means 285 the location of a buffer memory 271 containing a downlink frame which has just been transmitted over the shared Ethernet medium, hereinafter referred to as the second event.

When one or other of these two events occurs, the management means 304 goes to an operation 309 in which it decrements the individual counter, forming part of the assembly 272, associated with the memory 269 or 271 whose location it has just received, and then the management means 304 performs a test 310 in which it determines whether or not the individual counter which has just been decremented is at zero. As will be seen below, because of the values to which the routing means 305 or 306 takes the individual counter and the decrementation performed in the operation 309, the individual counter can be at zero only if the data frame of the buffer with which it is associated has been transmitted everywhere where it ought to have been, that is to say, according to circumstances, over the shared radio medium, over the shared Ethernet medium, or over both of them.

Where the test 310 is positive, the management means 304 performs the test 311 in which it determines whether the interruption of the waiting 308 has been produced by the first or the second event.

Where the test 311 is positive, that is to say where it is the reception of a buffer location coming from the downlink frame production means 288 which has occurred, the management means 304 performs an operation 312 of analysing the location of this buffer, the detail of which is given in FIG. 62.

The operation 312 begins with a test 313 in which the management means 304 determines whether or not the buffer whose location it has just received is in the space 370.

When the results of the test 313 is positive, that is to say when the memory whose location it has just received is a memory 271, the management means 304 performs the operation 314 in which it posts the location of this memory 271 in the mailbox of the reception management means of the sending/receiving means 276, and in which it decrements the counter 274 of the buffer 271 used.

Once the operation 314 has been accomplished, or where the test 313 is negative, the management means 304 performs a test 315 in which it determines whether or not the buffer location which it has just received forms part of the space 268.

When the result of the test 315 is positive, that is to say when it is a case of a buffer 269, the management means 304 performs an operation 316 of the same type as the operation 314 but with regard to the data frames received by the Ethernet shared medium, that is to say an operation in which it posts the buffer location which it has just received in the mailbox of the reception management means of the sending/receiving means 277, and in which it decrements the counter 273.

The operation 312 ends once the operation 316 is accomplished, or when the result of the test 315 is negative.

Once the operation 312 is accomplished, or when the result of the test 311 is negative, that is to say when it was not the first event which had caused the interruption of the waiting operation 308, the management means 304 performs the test 317 in which it determines whether or not the second event has just occurred.

In the affirmative, that is to say where a location has just been received from the data frame production means 285, the management means 304 performs an operation 318 identical to the operation 314, that is to say an operation in which it posts the location of the buffer memory 271 received in the mailbox of the reception management means of the sending/receiving means 276, and in which it decrements the counter 274.

Once the operation 318 has been accomplished, or when the result of the test 317 is negative or when the result of the test 310 is negative, the sending management means 304 returns to the start of the loop, and will therefore perform, throughout its functioning, the series of operations which has just been described, with the exception obviously of the initialisation operation 307, which it performs only just after start-up.

The functioning of the data frame routing means 305 is illustrated by the flow diagram in FIG. 63.

Directly after start-up, the means 305 enters a loop where it begins by performing the operation 319 of waiting until it receives, from the Ethernet sending/receiving means, and more precisely from its reception management means, a memory location 269 in the data frame area of which the sending/receiving means 277 has stored a data frame received by means of the Ethernet shared transmission medium.

When this event occurs, the routing means 305 goes to an operation 320 in which it puts the number 1 in the individual counter, forming part of the assembly 272, associated with this buffer 269, and then goes to the operation 321 in which it posts the location of this buffer in the mailbox 289 of the production means 288.

Once the operation 321 has been accomplished, the data frame routing means 305 returns to the start of the loop, and will therefore perform, throughout its functioning, the series of operations which has just been described.

The functioning of the uplink frame routing means 306 is illustrated by the flow diagram in FIG. 64.

Directly after start-up, the means 306 performs an operation 322 in which it waits until it receives, from the sending/receiving means 276, and more precisely from the reception management means thereof, a buffer memory location 271 in which an uplink frame has just been stored.

When this event occurs, the means 306 performs an operation 323 in which it puts the number 2 in the individual counter, forming part of the assembly 272, associated with this buffer 271, and then it goes to an operation 324 in which it posts the location of this buffer in the mailbox 289 of the production means 288, and an operation 325 in which it posts this location in the mailbox 286 of the production means 285.

Once the operation 325 has been accomplished, the means 306 returns to the start of the loop and will therefore perform, throughout its functioning, the series of operations which has just been described.

It can be seen that, when an uplink frame is stored in a memory 271, the routing means 306 passes the individual counter of this memory to the number 2, so that the first time that one or other of the production means 285 and production means 288 has delivered the location of this memory to the end-of-sending management means 304, the test 310 is negative, and it will be necessary to wait until the second of the production means 285 and 288 has delivered this location to the management means 304, so that the test 310 becomes positive, and this location is delivered to the reception management means of the sending/receiving means 276.

A variant 284' of the buffer management means 284 will now be described with reference to FIGS. 65 to 67.

In general terms, the means 284' is similar to the means 284, but with the routing means 305 and 306 being replaced by routing means 305' and 306' which perform a filtering, that is to say, when the destination address appearing in the field 13 of the data frame stored in the memory location 269 delivered to it by the reception management means of the sending/receiving means 277, shows that this data frame is not destined for one of the peripheral means 24, the routing means 305 directly posts this location in the mailbox of the reception management means of the sending/receiving means 277, and likewise the uplink frame routing means 306' posts the location received, according to the destination address of the data frame stored, either in the mailbox 286 or in the mailbox 289, unless the address is a multi-destination (multicast) address, in which case the data frame is posted in both mailboxes.

The functioning of the data frame routing means 305' is illustrated by the flow diagram in FIG. 66.

It can be seen, by comparing FIGS. 63 and 66, that the data frame routing means 305' performs, in a loop, a series of operations which includes operations 326 to 328 which are respectively identical to the operations 319 to 321 but, instead of going directly from the operation 326 to the operation 327, the means 305' goes to an operation 329 in which it reads the destination address contained in the field 13 of the data frame stored, and then goes to a test 330 in which it determines whether or not this address is a multicast address.

When the result 330 is negative, the means 305' goes to a test 331 in which it determines whether the destination address is that of a peripheral means 24.

When the result of the test 330 or that of the test 331 is positive, the means 305' goes to the operation 327 and then to the operation 328 before returning to the start of the loop, and when the result of the test 331 is negative, that is to say when the address is neither a multicast address nor the address of a peripheral means 24, the means 305' performs an operation 332 in which it directly posts, in the mailbox of the reception management means of the sending/receiving means 277, the buffer location 269 which has just been delivered to it, and once the operation 332 is accomplished it returns to the start of the loop.

The functioning of the uplink frame routing means 306' is illustrated by the flow diagram in FIG. 67.

It can be seen, by comparing FIGS. 66 and 67, that the series of operations performed in a loop by the means 306' includes operations 333 to 336 which are respectively identical to the operations 332 to 325 but that, when leaving the waiting operation 333, instead of going to the operation 334, the means 306' goes to an operation 337 in which it reads the destination address contained in the field 13 of the memory location 271 which has just been delivered to it, and then goes to a test 338 in which it determines whether or not this address is a multicast address.

Where the test 338 is negative, the means 306' performs the operations 334 to 336 respectively similar to the operations 323 to 325, and then returns to the start of the loop.

Where the test 338 is negative, the means 306' determines, in the course of the test 339, whether or not the destination address is the address of a peripheral means 24.

In the affirmative, it performs the operation 340 of setting at the number 1 the counter associated with the memory 271 whose location has just been communicated to it, and then it performs an operation 341 in which it posts this location in the mailbox 289, and once the operation 341 has been accomplished the means 306' returns to the start of the loop.

When the test 339 is negative, the routing means 306' performs the operation 342 in which it sets at the number 1 the counter associated with the buffer situated at the location which it has just received, and then the operation 343 in which it posts this location in the mailbox 286. Once the operation 343 has been accomplished, the means 306' returns to the start of the loop.

The filtering operations performed by the routing means 305' and 306' can be performed directly by software means or else, as will be seen below, by hardware means by virtue of a content addressable memory.

The Ethernet sending/receiving means 277 will now be described with reference to FIGS. 68 to 70.

As can be seen by comparing FIGS. 48 and 68, the sending/receiving means 277 of the central means 21' is similar to the sending/receiving means 187 of the communication converter 160, the components 344 to 346 corresponding respectively to the components 235 to 237.

The functioning of the data frame reception management means 344 is illustrated by the flow diagram in FIG. 69.

As can be seen by comparing FIGS. 49 and 69, the management means 344 has the same functioning as the management means 235, the operations 347 to 350 which the management means 344 performs in a loop being respectively similar to the operations 238 to 241.

The functioning of the Ethernet module 346 is illustrated by the flow diagram in FIG. 70.

As can be seen by comparing FIGS. 50 and 70, the operations 351 to 357 which the Ethernet module 346 performs in a loop are respectively similar to the operations 242 to 245 and 248 to 250 performed by the Ethernet module 237 of the communication converter 160, the operation 354 including however, in addition to the operations provided for in the operation 245, that of incrementing the counter 273 by the number of buffers 269 used.

FIG. 71 illustrates the functioning of a variant of the Ethernet module 346, also performing a filtering, that is to say ignoring the reception of a data frame when its destination address is neither that of a peripheral means 24 nor a multicast address, by means of a test 358 performed when the test 353 is positive, with a move to the operation 354 when this test 358 is positive and to the test 356 when the test 358 is negative.

In practice, the test 358, rather than by means of software resources, may be performed by means of a content addressable memory integrated in the Ethernet microcontroller 265, or external thereto as explained below with the help of FIGS. 72 and 73.

FIG. 72 shows the constitution of a variant 359 of the cental means 21', similar to the latter but also including a content addressable memory 360 directly connected to the microcontroller bus 55'.

This content addressable memory 360 is used by the microcontroller 52' for implementing the tests performed by the routing means 350' and 306' on the destination address of the data frames arriving at the central means 359, in order to perform the filtering explained above.

In another variant, the content addressable memory 360 is used by the Ethernet microcontroller 265 in order to use the variant of the Ethernet module 346 whose functioning is illustrated by the flow diagram in FIG. 71, that is the Ethernet module performing a filtering of the data frames received by the Ethernet transmission medium.

FIG. 73 shows another variant 361 of the central means 21', having a constitution similar to that of the latter, but with in addition an content addressable memory 362 connected to an interface 363 by conductors 364, the interface 363 being connected to the microcontroller bus 55'.

By virtue of the interface 363, both the Ethernet microcontroller 265 and the microcontroller 52' can use the content addressable memory 362, which thus serves both for using the variant of the Ethernet module 346 performing a filtering, and for using the routing means 305' and 306'.

It will be noted that, in general terms, the various variants described above for the central means 21 apply to the central means 21'.

A description will now be given, with reference to FIGS. 74 to 83, of a variant of the communication systems described above, that is to say systems including the central means 21 or one of its variants, and at least one peripheral means 24 or one of its variants.

In this variant, instead of being half-duplex, the shared transmission medium is full-duplex, that is to say allowing simultaneously a transmission in the direction from the central means 21 to the peripheral means 24 (downlink direction) and in the direction from the peripheral means 24 to the central means 21 (uplink direction), the shared radio medium used by the system of this variant therefore being free to transmit an uplink frame independently of the transmission of a downlink frame, and vice versa.

FIG. 74 shows an example of an occupation of this shared radio medium, in the downlink direction, by four bursts 370A to 370D.

The period TR which can be seen in FIG. 74 is the one which the present variant of the central means 21 allows to elapse as from the moment when there begins the sending of a burst transmitting a downlink frame 25 whose service message 31 is of the authorisation-to-send message type, before transmitting a new downlink frame, unless, during the period of duration TR, it has begun to receive a burst transmitting an uplink frame 26, in which case the central means awaits until it has finished receiving this uplink frame, as will be seen below.

On the other hand, when the present variant of the central means transmits a downlink frame whose service message 31 is of the absence of authorisation-to-send message type, it is able to send a new downlink frame as soon as the transmission of the previous one has ended.

Thus, when the burst 370A ended, the present variant of the central means waited until the period of duration TR had elapsed and, as during it no burst transmitting an uplink frame had appeared on the shared radio medium, the central means considered, as soon as this period had expired, that it could transmit a new downlink frame, which it did with the burst 370B at the end of a period whose duration corresponds to its reaction time.

Given that the downlink frame transmitted by the burst 370B included a no-authorisation-to-send message, the present central means considered that it could send a new downlink frame as soon as the sending of the burst 370B ended, which it did by sending the burst 370C after a reaction time.

The downlink frame transmitted by the burst 370C also included an authorisation-to-send message, which caused the reaction of no peripheral means, the present central means therefore considered that it could send a new downlink frame as soon as the period of duration TR expired, which it did at the end of a reaction time after the burst 370D also transmitting a downlink frame including an authorisation-to-send message.

It will be noted that counting the period TR as from the start of sending of a burst amounts to counting from the end of transmission of the service message contained in the downlink frame transmitted by the burst, given that all the prefixes 50 have the same duration, and that all the service messages 31 have the same length (twelve octets) so that the time necessary for their transmission as from the start of the signal 51 is the same for all the downlink frames.

In summary, if C is the constant time necessary for the sending of the prefix 50 and of the part of the signal 51 situated at its beginning, which serves to transmit the service message, counting the period TR as from the start of the burst amounts to counting the period TR-C from the end of transmission of the service message.

The period TR is chosen as being the shortest period at the end of which it is certain that any peripheral means for which an authorisation-to-send message is destined has been able to begin to transmit an uplink frame in response, if it attempted so to do.

By way of example, the period TR can be around 550 µs.

It will be noted that, in the examples of bursts illustrated in FIG. 74, the signals 51 are relatively short so that they end before the period of duration TR expires, but that in practice the signals 51 can be extended beyond the expiry of the period of duration TR, as will be seen below.

In general terms, the present variants of the central networked communication means are similar to the embodiment described above, with however a radio module capable of sending and receiving simultaneously, and a downlink frame production means exhibiting the differences which will now be described with the aid of FIGS. 75 and 76.

The functioning of the authorisation controlling means of the full-duplex variant of the different embodiments of the central means described above is illustrated by the flow diagram in FIG. 75.

As can be seen by comparing FIGS. 22 and 75, the present authorisation controller functions in a similar manner to a half-duplex authorisation controller, the operations 371 to 376 being respectively identical to the operations 113 to 115 and 117 to 119, but the present authorisation controller performs nothing similar to the operation 116 of awaiting the period T between the operation 373 where it inactivates the signal of authorisation to send a downlink frame, and the test 374 in which it determines whether or not a frame reception in progress signal is present.

It will be noted that the operation 375 of awaiting the absence of the frame reception in progress signal makes it possible to avoid giving a message of authorisation to send to a peripheral means, whereas the preceding peripheral means which received an authorisation-to-send message may still be in the course of sending an uplink frame in response, and the role of the present authorisation controlling means is essentially to avoid this type of situation.

FIG. 76 is a flow diagram illustrating the functioning of the downlink frame preparation means which replaces the preparation means 112 of the central means 21 in its full-duplex variant.

As can be seen by comparing FIGS. 23 and 76, the present preparation performs, in a loop, like the means 112, an operation 377 of preparing a downlink frame followed by an operation 378 of transmitting this downlink frame.

The preparation operation 377 is identical to the operation 120 performed by the means 112, and the operation 378 is similar to the operation 121, with the operations 379 to 385 being respectively identical to the operations 133 to 139, but, after accomplishing the operation 380, instead of going directly to the operation 381, the present preparation means performs the test 382, and it is only if this is positive that it goes to the operation 381.

When the expected event occurs in the latter operation, that is to say the start of sending of a burst transmitting a downlink frame, the present preparation means goes to the operation 386, in which it awaits the period TR and, when the latter has elapsed, it goes to the operation 387 in which it awaits, where the DLF transmission request signal is at the high level, the falling edge of this signal, that is to say where a burst transmitting a downlink frame is in the course of being sent, it awaits the end of sending of this burst, before going to the operation 383.

When the result of the test 382 is negative, the present preparation means performs an operation 388 similar to the operation 387, and then goes to the operation 384.

It will be noted that the operations 386 to 388 means that the present preparation means, after having requested the sending/receiving means to send a downlink frame in the operation 380, remains blocked until both the transmission medium becomes free in the downlink direction and the period of duration TR has elapsed, before going to the operation 383 or directly to the operation 384.

It will be noted that, in the full-duplex variant of the embodiment of the central means 21 where the preparation means 112 is replaced by preparation means 141 and transmitting means 142, the latter is replaced by a transmitting means having a functioning similar to that illustrated by the flow diagram in FIG. 27 or by the flow diagram in FIG. 28, provided that the operation 121 of transmitting a downlink frame is replaced by the operation 378.

In general terms, the full-duplex variant of the different embodiments of the peripheral networked communication means described above corresponds exactly to these embodiments, but with a radio module capable of sending and receiving simultaneously.

A description will now be given, with the aid of FIGS. 77 to 81, of different examples of occupation of the shared radio medium, respectively in the uplink direction and in the downlink direction, the signals relating to the functioning of the radio module also being shown in these figures.

Figure 77:
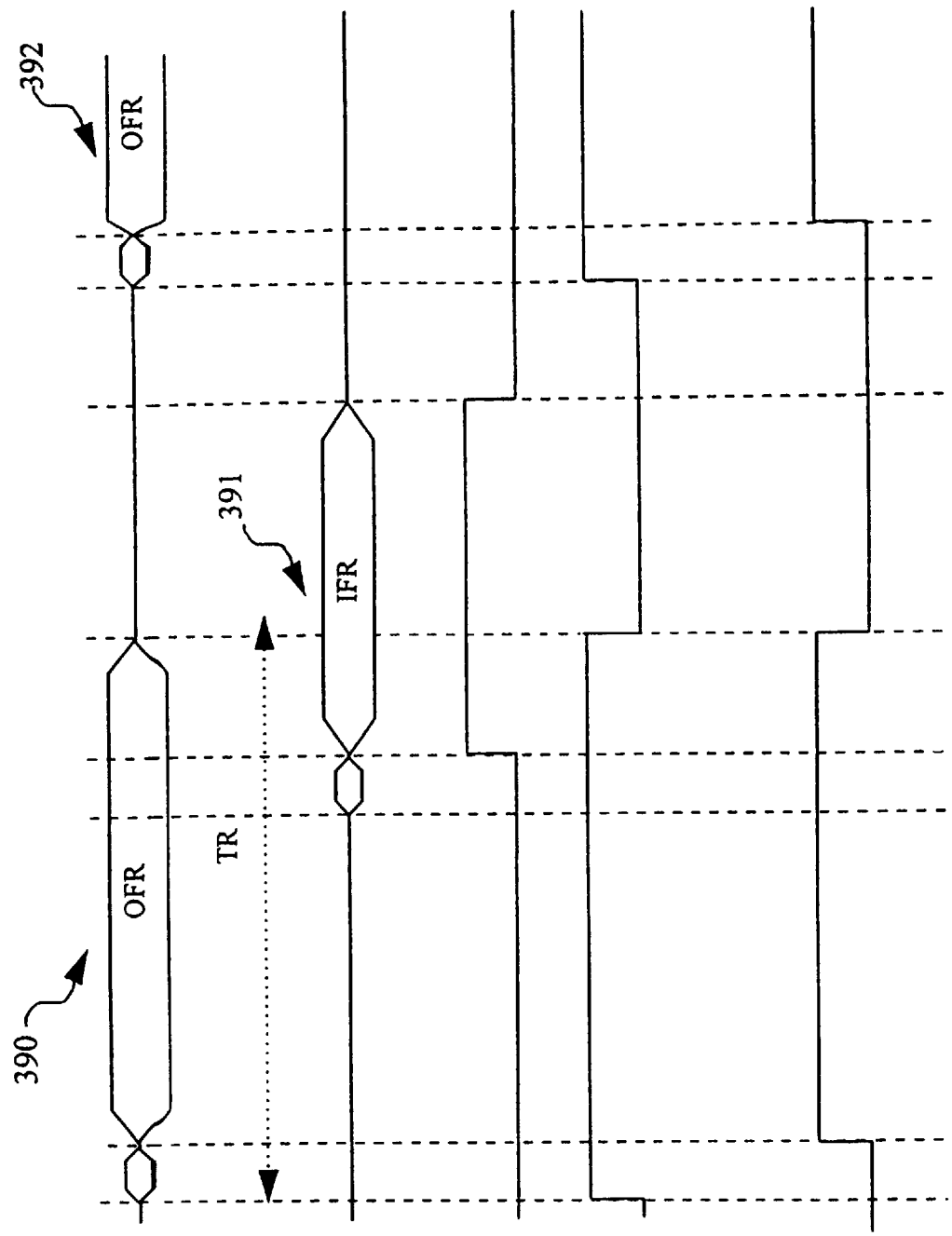

In the example shown in FIG. 77, the central means has sent a burst 390 transmitting a downlink frame containing an authorisation-to-send message and, in return for this message, the destination peripheral means has sent a burst 391 transmitting an uplink frame, even before the sending of the burst 390 is complete, the latter transmitting a data frame of relatively long length, but nevertheless sufficiently short for the burst 390 to end before the expiry of the period of duration TR.

It is therefore by virtue of the authorisation controller whose functioning in FIG. 75 that the present central means has awaited the end of reception of the burst 391 to consider that it could send a new downlink frame, which it did by means of the burst 392, which it began to send after a reaction time.

Figure 78:
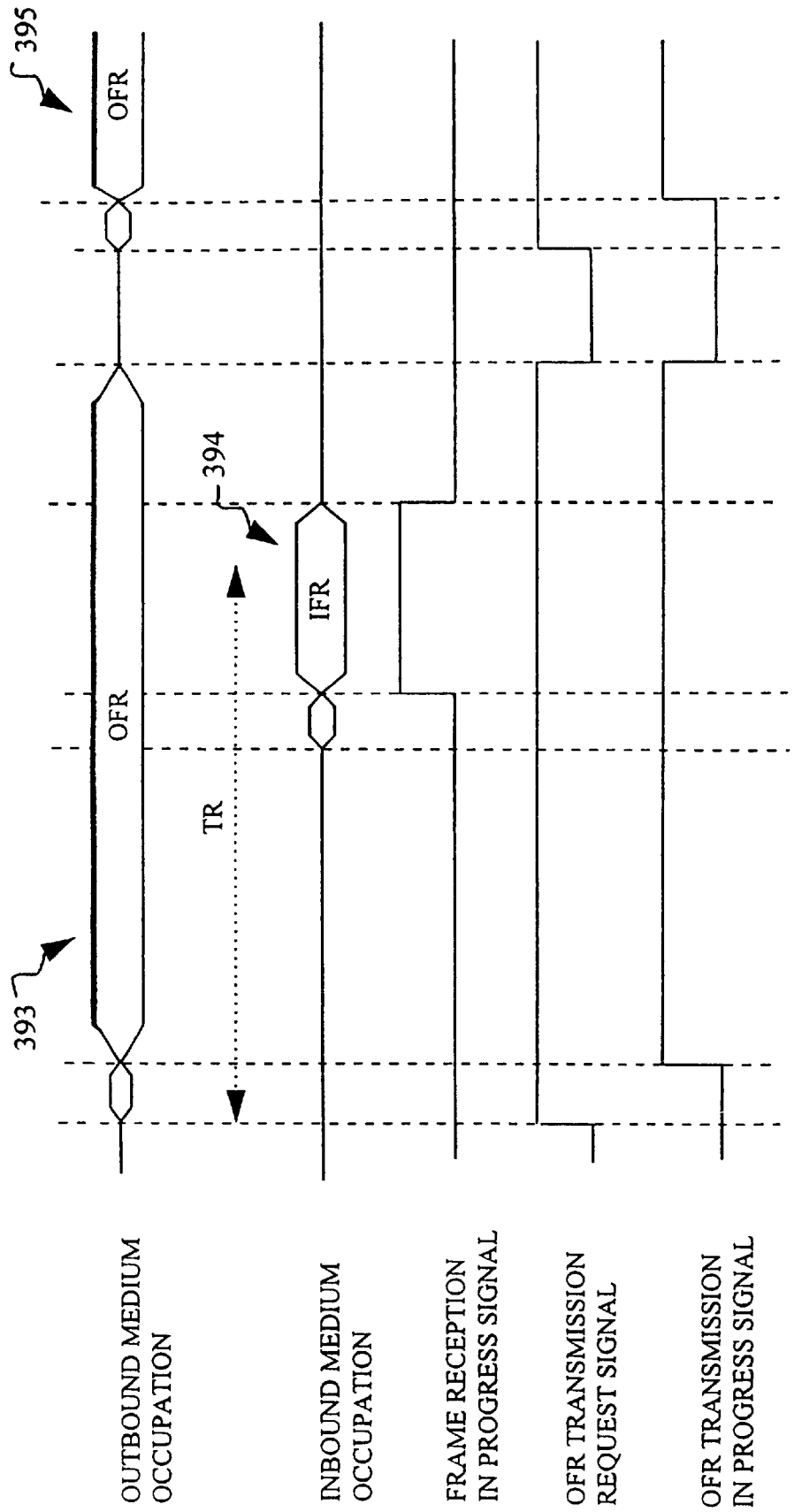

In the example in FIG. 78, the central means has sent a burst 393 transmitting a downlink frame containing an authorisation-to-send message and a particularly long data frame.

In return for the authorisation-to-send message transmitted by the burst 393, the peripheral means for which this authorisation-to-send message is intended has sent the burst 394 transmitting an uplink frame containing a particularly short data frame, so that the burst 394 has ended before the burst 393 has finished.

The downlink frame preparation or transmitting means of the present central means has therefore performed, in the operation 378 of transmitting a downlink frame, successively the operations 386 and 387 before considering that it could send a new downlink frame, that is to say it has awaited the end of sending of the burst 393. Then, after a reaction time, it has sent the burst 395 transmitting a new downlink frame.

Figure 79:
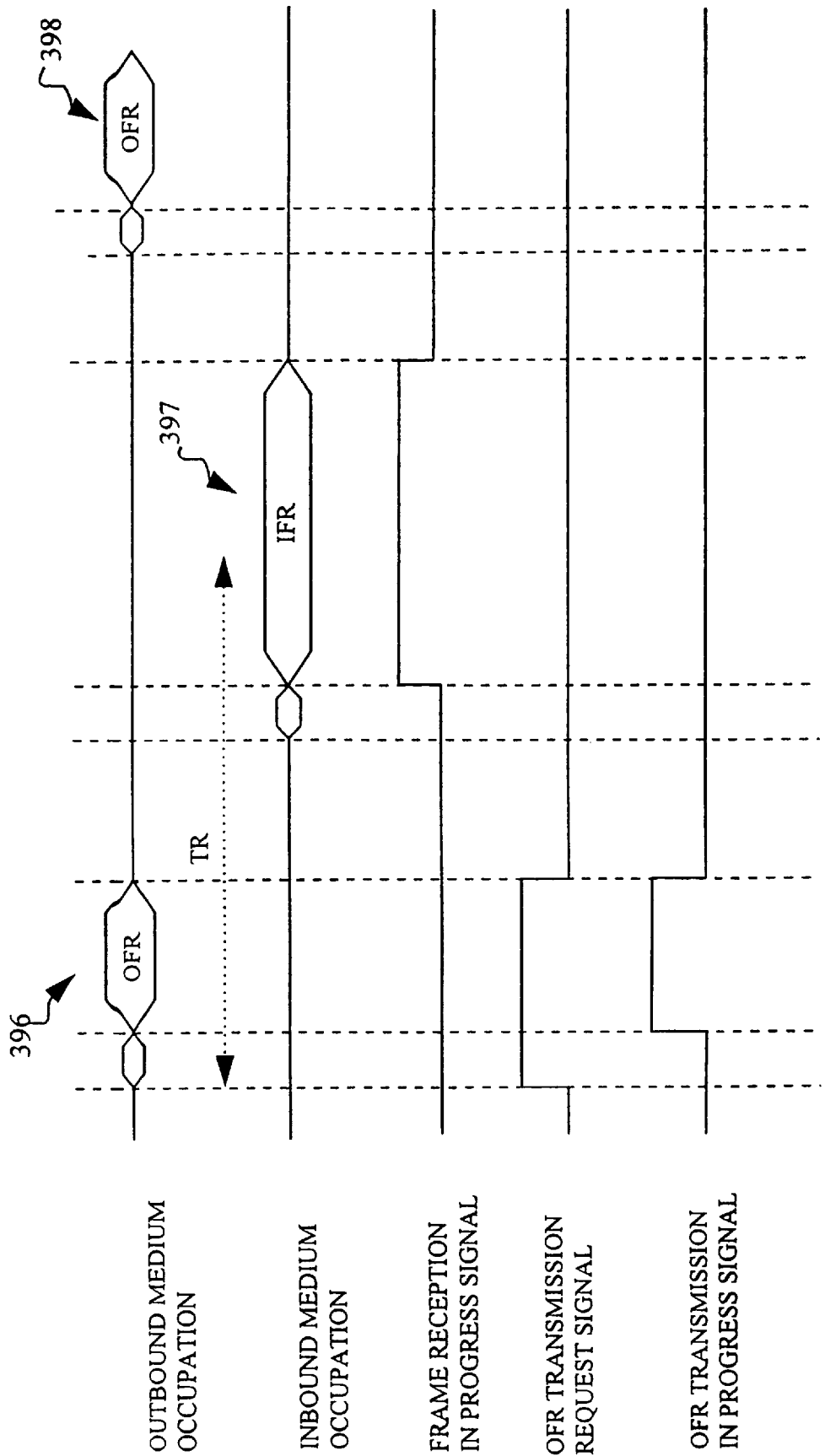

In the example in FIG. 79, the central means has sent a burst 396 transmitting a downlink frame including solely an authorisation-to-send message, so that the burst 396 is particularly short, and was already completed when the destination peripheral means replied by sending the burst 397 transmitting an uplink frame. The central means therefore awaited, because of the operation 365 of its authorisation controller, the end of the burst 397 to consider that it could once again send a downlink frame, which it did after a reaction time, by means of the burst 398.

In the example in FIG. 80, the central means has sent a burst 399 transmitting a downlink frame including an authorisation-to-send message and a relatively long data frame, but the peripheral means authorised to send in return by this authorisation-to-send message has not replied, and as the burst 399 was still in the process of being sent when the period of duration TR expired, it was, as indicated previously, the end of sending of this burst which enabled the central means to consider that it could send a new downlink frame, which it did after a reaction time by means of the burst 400.

Finally, in the example in FIG. 81, the central means has sent a burst 401 transmitting a downlink frame including an authorisation-to-send message and a relatively short data frame, so that the sending of the burst 401 has ended before the expiry of the period of duration TR.

Since the peripheral means for which the authorisation-to-send message transmitted by the burst 401 is intended did not replied, the central means considered, as from the expiry of the period of duration TR, that it could send a new downlink frame, which it did after a reaction time, by means of the burst 402.

In the above, the difference between the embodiments of the central means 21 in which the service messages can equally well be of the authorisation-to-send message or no-authorisation-to-send message type, and the full-duplex variant of the these embodiments, have just been described.

In general terms, the same differences exist between the embodiments of the half-duplex central means in which all the service messages are of the authorisation-to-send message type, and their full-duplex variant, as will be seen more precisely with reference to FIGS. 82 and 83.

The flow diagram in FIG. 82 illustrates the functioning of the authorisation controlling means which replaces the means 111' (FIG. 29) of the half-duplex embodiment.

As can be seen by comparing FIGS. 30 and 82, the present authorisation controlling means functions like the means 111', the operations 371' to 376' being identical respectively to the operations 113' to 115', and 117' to 119', with however a direct passage from the operation 373' to the operation 374', without performing the waiting operation such as the operation 116'.

The flow diagram in FIG. 83 illustrates the functioning of the downlink frame preparation means which replaces the means 112' of the half-duplex embodiment.

As can be seen by comparing FIGS. 31 and 83, the present preparation means functions like the preparation means 112', the operations 377' and 120' being identical, the operation 378' being similar to the operation 121', the operations 379' and 381' and 383' to 385' being identical respectively to the operations 133' to 135', 155, 138' and 139' but, instead of going directly from the operation 381' to the operation 383', the present preparation means performs the operations 386' and 387', which are identical to the operations 386 and 387 of the operation 378 shown in FIG. 76.

In the full-duplex variant of the embodiment of the central means in which the preparation means 112' is replaced by the preparation means 141' and by the transmitting means 142', the latter is replaced by a downlink frame transmitting means whose functioning is that of the flow diagram in FIG. 35, provided that the operation 121' is replaced by the operation 378'.

The different full-duplex variants of the central means which have just been described are obviously valid both for the central means 21 and its different embodiments, and for the central means 21' and its different embodiments.

Numerous other variants are possible according to circumstances.

In particular, in other variants, the radio transmission medium is replaced by an infrared transmission medium, by another wireless transmission medium, or else by a cable medium; and the uplink frames received by a peripheral means, instead of being ignored, give rise to a processing by the latter.

It should be stated that the invention is not limited to the examples described and depicted.

In particular, the invention is not limited solely to communication networks using a centralised polling communication protocol but, quite the contrary, extends to all converters for digital data transmission, whatever the transmission protocol used.

In particular, the invention applies on the one hand to non-centralised networks, that is to say those in which no communication means delivers an authorisation to send to the other communication means, and on the other hand to networks without repetition, that is to say in which no communication means repeats the frames sent by the individual networked communication means.

In order to produce a network which is non-centralised and without repetition, experts can easily use the above description whilst:

not producing the central networked communication means;

using the parts of the description which concerns solely the central networked communication means as an explanation of or complement to the other parts concerning the peripheral networked communication means;

causing to correspond, in the description, for each peripheral networked communication means, to the name "downlink frame", a frame which reaches it by the shared transmission medium, and to the name "uplink frame" a frame which it transmits by the said medium.

In this regard it should be noted that each frame transmitted here from one communication means to another, also referred to as an information frame, includes a source address which identifies the communication means which has transmitted it and a destination address identifying the communication means for which it is intended.

By way of example of modes of functioning of a network consisting solely of such peripheral networked communication means, a protocol for managing access to the network is given below.

According to this example, this protocol functions by random selection of a waiting period before a transmission possibly in competition with other communication means, in accordance with methods known to experts, and by causing to be supplied, by the peripheral networked communication means, in each uplink frame, information enabling each of the other peripheral networked communication means to know whether it is authorised to transmit by the network. This information replaces the service messages sent by the central networked communication means of FIGS. 5 to 8;

by causing to be determined, by each peripheral networked communication means, whether and when it is authorised to send, in accordance with the information present in the downlink frames.

For the functioning of the peripheral networked communication means, other protocols controlling access to a shared transmission medium are also known, notably of the TDMA—Time Division Multiple Access—type, in which the stations can transmit only in a time slot allocated to them.

According to a second example of peripheral networked communication means functioning in a non-centralised network without repetition, each peripheral networked communication means has, in addition, a collision detection means. It will be recalled that these collisions consist of the simultaneous transmissions of two peripheral networked communication means.

With regard to the protocol governing access of the different stations to the transmission medium (MAC protocol), one example consists of the one provided for by IEEE recommendation 802.3, of the carrier sense multiple access/collision detection (CSMA/CD) type.

According to this protocol, each peripheral networked communication means is authorised to send when the shared transmission medium is available. When it seeks to transmit data, it listens on the transmission medium, and as soon as this medium becomes free it transmits a data frame whilst listening to see if a collision occurs. If the said peripheral networked communication means detects a collision during the transmission of the uplink frame, it stops transmission immediately, selects a random time and waits until this time has elapsed before once again sending the said uplink frame.

Numerous other variants of networks with or without repetition and with or without a central means are within the scope of experts, notably using their knowledge of cabled networks.

The invention consequently applies just as well to the conversion of transmissions in accordance with protocols known by the names of "TOKEN RING", "TOKEN BUS" and ETHERNET and vice versa.

We claim:

1. Method of transmitting data frames between digital communication means, comprising the steps of:

A) providing:

at least one said digital communication means being a peripheral digital communication means, each said peripheral means transmitting and/or receiving said data frames by means of a shared transmission medium; and a central digital communication means communicating with each said peripheral means by means of the said shared transmission medium, by receiving uplink frames each coming from a said peripheral means and by broadcasting downlink frames to each said peripheral means;

B) with the said central means retransmitting or not, according to a first pre-set rule, each data frame appearing in the uplink frames reaching it, to a destination digital communication means for this data frame; and C) with the said central means including, in each said downlink frame:

a service message activating a protocol for controlling access of at least one first digital communication means to the shared transmission medium; and a data frame if, according to a second preset rule, there is one to be included in this downlink frame, so that the central digital communication means is able to retransmit said data frame to a second peripheral means; each said downlink frame thus having systematically a said service message and possibly a said data frame with independent destinations, and wherein each said service message indicates to each said peripheral means whether or not it is authorized to transmit an uplink frame, in return, that is to say as soon as the shared medium becomes free to transmit an uplink frame after broadcast of this service message.

2. Method according to claim 1, characterised in that the said operation A) also involves providing that each said peripheral means (24, 24') communicates by means of the said shared transmission medium, only with the central means (21, 21', 359, 361).

3. Method according to claim 1, characterised in that the said first preset rule implemented in operation B), is to retransmit systematically, with the central means (21, 21', 359, 361), the data frames (45) appearing in the uplink frames (26) reaching it, to their destination digital communication means (24, 24', 7).

4. Method according to claim 1, characterised in that the access control protocol activated by the said service messages (31) is of the polling type.

5. Method according to claim 1, wherein it includes the operation, with each peripheral means, of transmitting an uplink frame only in return for a service message authorizing it.

6. Method according to claim 5, characterised in that:
the said operation A) also involves making provision in the central means (21, 21', 359, 361) for a table (64, 64') having, for each peripheral means (24, 24'), an address (11, 11') specific to it; and it also includes the operation of carrying out, with the central means (21, 21', 359, 361), iteratively from start-up, a series of operations (105–110) including an operation (105) of preparing an authorisation-to-send message indicating to the peripheral means (24, 24') with a current address (11, 11') that it is authorised to transmit an uplink frame (26) in return, with the transition from one said series (105–110) to the next which is made each time that an operation (129, 154, 298) to include a said authorisation-to-send message as a service message (31), is carried out in the said operation C), each said series (105–110) including the operation (108–110) of taking a new address in the said table (64, 64') as the current address.

7. Method according to claim 6, characterised in that the said new address is the next address in the said table (64, 64'), according to a circular rotation.

8. Method according to claim 5, characterised in that it involves the operation of carrying out, with the central means (21, 21', 359, 361), iteratively from start-up, a series of operations (105–110) including an operation (105) of preparing an authorisation-to-send message indicating to a peripheral means that it is authorised to transmit an uplink frame (26) in return, an operation (106) of placing this authorisation-to-send message in a waiting condition, then an operation (107) of awaiting an acknowledgement signal for the authorisation-to-send message, before proceeding to a next said series of operations (105–110).

9. Method according to claim 8, characterised in that the said operation C) includes, for each said downlink frame (25), an operation (120, 291-303, 377) of preparing this downlink frame including an operation (125, 294) of determining the existence or not of a said waiting authorisation-to-send message, in the affirmative, an operation (129, 298) of including in this downlink frame (25) this authorisation-to-send message as a service message (31), then an operation (130, 299) of sending a said acknowledgement signal, and in the negative, an operation (126, 295) of including in this downlink frame (25), as a said service message (31), a no-authorisation-to-send message indicating to each said peripheral means (24, 24') that it is not authorised to transmit in return.

10. Method according to claim 8, characterised in that the said operation C) includes, for each said downlink frame (25), a preparation operation (120', 377') including an operation (154) of awaiting the existence of a said waiting authorisation-to-send message, an operation (154) of including in this downlink frame (25) this authorisation-to-send message as a service message (31), then an operation (130') of sending a said acknowledgement signal.

11. Method according to claim 5, characterised in that the said operation C) includes, for each said downlink frame (25), the operation of including as a service message (31): either an authorisation-to-send message indicating to a peripheral means (24, 24') that it is authorised to transmit an uplink frame (26) in return, or a no-authorisation-to-send message indicating to each said peripheral means (24, 24') that it is not authorised to transmit in return, with the said inclusion operation which includes an operation (302, 303) of determining, according to a third preset rule, whether it is a said authorisation-to-send message or a said no-authorisation-to-send message which is to be included in this downlink frame (25).

12. Method according to claim 11, characterised in that:
the said operation A) also includes making provision, in the central means (21, 21', 359, 361), for at least one buffer memory (68, 269, 271) for storing a data frame (12, 45) to be transmitted to a peripheral means (24, 24'); and the said third preset rule is to include a said no-authorisation-to-send message when a predetermined number of said buffer memory(ies) (68, 269, 271) is (are) occupied.

13. Method according to claim 1, characterised in that:
the said operation B) includes the operation (86, 87) of placing in a state of awaiting retransmission each data frame (45) appearing in the uplink frames (26) reaching the central means (21, 21', 359, 361); and the said operation C) includes, for each said downlink frame (25), an operation (120, 120', 291–303, 377, 377') of preparing this downlink frame, including the operation (124, 124', 293) of including in this downlink frame (25) a data frame (28), if there is at least one awaiting retransmission at the time of execution of the preparation operation (120, 120', 291–303, 377, 377'), the said second preset rule being to include in a downlink frame (25) a data frame (28) as soon as there is one awaiting retransmission.

14. Method according to claim 13, characterised in that:
the said operation A) also includes making provision in the central means (21, 21', 359, 361) for:
at least one buffer memory (68, 271) of a first type for storing an uplink frame (26) and for preparing a downlink frame (25) including a data frame (28);
a buffer memory (70, 267) of a second type for preparing a downlink frame (25) with no data frame;
the said placing in a state of awaiting retransmission operation includes, for each data frame (45) appearing in the uplink frames (26) reaching the central means (21, 21', 359, 361), an operation (86, 281) of writing this data frame into a said buffer memory (68, 271) of a first type, and an operation (87, 282) of putting the location of this buffer memory (68, 271) in a queue (96, 289);
each said operation of preparing a downlink frame (25) includes an operation (122, 122', 291) of determining the presence or not of a location in the said queue (96, 289), in the affirmative an operation (124, 124', 293) of taking the location which meets a first preset selection rule, then an operation (129, 154, 298) of writing a service message (31) into the buffer memory (68, 271) of a first type at this location, and in the negative, an operation (123, 123', 292) of writing a service message (31) into the buffer memory (70, 267) of a second type.

15. Method according to claim 14, characterised in that the said first preset selection rule is to take the location which was the first to be put in the said queue (96, 289).

16. Method according to claim 14, characterised in that the said first preset selection rule is to take the location where the data frame (45) having the highest predetermined level of priority is found.

17. Method according to claim 14, characterised in that:
it includes the operation of predetermining:
an uplink frame (26) format, fixing the position of a field (48) for a data frame (45);
a downlink frame (25) format, fixing the position of a field (34) for a service message (31) and fixing the position of a field (30) for a data frame (28);
a layout of buffer memory (68, 271) of a first type, identical to the said downlink frame (25) format, and therefore fixing the position of an area (71) for a service message (31) and the position of an area (72) for a data frame (45); and a layout of buffer memory (70, 267) of a second type, fixing at an area for a service message (31) a position identical to the position of the field (34) for a service message in the said downlink frame (25) format;

each said operation (86, 281) of writing, into a buffer memory (68, 271) of a first type, a data frame (45) appearing in an uplink frame (26), is carried out by writing this data frame (45) into the said area (72) for a data frame of this buffer memory (68, 271); and each said operation (129, 154, 298) of writing a service message (31) respectively into a buffer memory (68, 271) of a first type and into the buffer memory (70, 267) of a second type, is carried out by writing this service message (31) into the said area for a service message respectively of this memory (68, 271) of a first type and this memory (70, 267) of a second type.

18. Method according to claim 17, characterised in that the said predetermining operation lays down a downlink frame (25) format having only a field (29) for a service frame (27) and a field (30) for a data frame (28), with the said field (34) for a service message (31) forming part of the field (29) for a service frame (27); and each said operation (120, 120', 291-303, 377, 377') of preparing a downlink frame (25) ends when an operation (132, 132', 301) of writing a service frame (27) respectively into a buffer memory (68, 271) of a first type or into the buffer memory (70, 267) of second type is complete.

19. Method according to claim 1, characterised in that it includes the operation of carrying out, with the central means, iteratively after start-up, a series of operations including:

an operation (120, 120', 377, 377') of preparing a said downlink frame (25), using the said operation C), then an operation (121, 121', 378, 378') of transmitting this downlink frame (25).

20. Method according to claim 1, characterised in that:

the said operation A) includes making provision in the central means (21, 21', 359, 361) for a queue (143, 143') for transmission of downlink frame(s), having a number of predetermined location(s); and it also includes the operation of carrying out with the central means (21, 21', 359, 361), in parallel:

iteratively after start-up, a first series of operations (120, 146, 147, 120', 146', 147') including an operation (120, 120') of preparing a downlink frame (25), using the said operation C), then an operation (146, 146') of determining the presence or not of a free location in the said queue (143, 143'), and in the affirmative, an operation (147, 147') of putting this downlink frame in the said queue (143, 143'); and iteratively after start-up, a second series of operations (149, 150, 121, 151, 152, 153, 150, 121, 149', 150', 121') including an operation (149, 151, 149') of determining the presence or not of at least one downlink frame (25) in the said queue (143, 143') and in the affirmative an operation (149, 152, 149') of taking that which meets a second preset selection rule, an operation (150, 150') of releasing the location it occupied in the said queue, and an operation (121, 121') of transmitting this downlink frame.

21. Method according to claim 20, characterised in that the said second preset selection rule is to take the downlink frame which is the first to be entered in the said queue (143, 143').

22. Method according to claim 20, characterised in that in the said second series of operations, when the said operation (149, 149') of determining the presence or not of at least one downlink frame (25) in the said queue is negative, there is a wait (149, 149'), with no downlink frame transmission, until there is at least one downlink frame in the said queue.

23. Method according to claim 20, characterised in that in the said second series of operations, when the operation (151) of determining the presence or not of at least one downlink frame in the said queue is negative, an operation (153, 121) is carried out of transmitting a pre-prepared downlink frame including, as a service message (31), a no-authorisation-to-send message indicating to each said peripheral means (24, 24') that it is not in return authorised to transmit an uplink frame (26).

24. Method according to claim 1, characterised in that:

the said operation A) includes making provision, as a said shared transmission medium, for a half-duplex transmission medium, that is to say a medium which is free for transmitting an uplink or downlink frame, only when there is transmission of neither an uplink nor a downlink frame;

it also includes the implementation, with the central means (21, 21', 359, 361), of a continuous operation (113–119, 113'–119') of determining whether or not a period of authorization to transmit a downlink frame (25) is currently elapsing, such a period being in the course of elapsing at all times except between each:

first instant at the end of transmission of a downlink frame (25) which contains a service message (31) indicating that a said peripheral means (24, 24') is authorised to transmit an uplink frame (26) in return, that is to say as soon as the shared medium becomes free for transmitting an uplink frame after broadcast of this service message, and second instant when either a period of predetermined length (T) from this first instant has elapsed without the central means having received an uplink frame (26), or the central means has finished receiving an uplink frame (26) which it started to receive before the said period of predetermined length (T) had elapsed, and each operation (121, 121') of transmitting a downlink frame starts with an operation (133, 133') of waiting if necessary for a said period of authorization to be in the course of elapsing.

25. Method according to claim 24, characterised in that each operation (121, 121') of transmitting a downlink frame (25) includes, after the said operation (133, 133') of waiting, if necessary for a said period of authorization to be in the course of elapsing, an operation (134, 134') of initiating the sending of a burst (49A, 49B, 49C) transmitting this downlink frame, then an operation (135, 135') of waiting until the sending of this burst is finished.

26. Method according to claim 25, characterised in that each operation (121, 121') of transmitting a downlink frame (25), includes, after the said operation (135, 135') of waiting until sending of the burst transmitting this downlink frame is finished, an operation (138, 139, 138', 139'), if this downlink frame contains a data frame (28), of releasing a buffer memory (68, 269, 271) having served for storing this data frame and preparing this downlink frame.

27. Method according to claim 1, characterised in that:

the said operation A) also includes making provision, as a said shared transmission medium, for a full-duplex transmission medium, that is to say a medium which is free for transmitting an uplink frame independently of the transmission of a downlink frame, and vice-versa;

it also includes the implementation, with the central means (21, 21', 359, 361), of a continuous operation (371–376, 371'–376') of determining whether or not a period of authorization to transmit a downlink frame (25) is currently elapsing, such a period being in the course of elapsing at all times except between each:

first instant at the end of transmission of a downlink frame which contains a service message indicating that a said peripheral means (24, 24') is authorised to transmit an uplink frame (26) in return, that is to say as soon as the broadcast of this service message ends, and when the central means is then in the operation of receiving an uplink frame, and second instant when the central means has finished receiving this uplink frame; and each operation (378, 378') of transmitting a downlink frame starts with an operation (379, 379') of waiting if necessary for a said period of authorization to be in the course of elapsing.

28. Method according to claim 27, characterised in that each operation (378, 378') of transmitting a downlink frame (25) includes, after the said operation (379, 379') of waiting if necessary for a period of authorization to be in the course of elapsing, an operation (380, 380') of initiating the sending of a burst (370A-370D) transmitting this downlink frame, then:

in the case where this downlink frame contains a service message indicating that a said peripheral means (24, 24') is authorised to transmit an uplink frame in return, an operation (381, 381') of waiting for a predetermined moment during the sending of this burst, then an operation (386, 386') of waiting a predetermined time (TR), then an operation (387, 387') of waiting until the sending of this burst is finished; or in the contrary case, immediately an operation (388) of waiting until the sending of this burst is finished.

29. Method according to claim 28, characterised in that each operation (378, 378') of transmitting a downlink frame (25) includes, after the said operation (387, 388, 387') of waiting until the sending of the burst transmitting this downlink frame is finished, an operation (384, 385, 384', 385'), if this downlink frame contains a data frame (28), of releasing a buffer memory (68, 269, 271) which has served for storing this data frame and for preparing this downlink frame.

30. Method according to claim 1, characterised in that the said operation A) also includes providing that the said shared transmission medium is wireless.

31. Method according to claim 30, characterised in that the said shared transmission medium is of the radio type, and in that the central means (21, 21', 359, 361) and each said peripheral means (24, 24') encode the streams of bits which they transmit by means of the said medium, by spectrum spreading.

32. Method according to claim 1, characterised in that:

the said operation A) also includes making provision for the central means (21', 359, 361) to communicate with at least one digital communication means (7), which is not a said peripheral means, by means of a transmission medium (1, 4) distinct from the said shared transmission medium, by sending and/or receiving data frames (12); and the said operation B) involves retransmitting or not:
according to the said first preset rule, each data frame (45) appearing in the uplink frames (26) reaching it, intended for a said digital communication means (7) which is not a peripheral means, by means of the said distinct transmission medium (1, 4), and according to a fourth preset rule, each data frame (12) which it receives by means of the said distinct transmission medium (1, 4), intended for a peripheral means (24, 24'), by means of the said shared transmission medium.

33. Method according to claim 32, characterised in that the said fourth preset rule is to retransmit systematically, with the central means (21', 359, 361), the data frames (12) reaching it by means of the said distinct transmission medium (1, 4) to the destination peripheral means (24, 24').

34. Method according to claim 32, characterised in that:

the said operation A) also includes making provision in the central means (21', 359, 361) for at least one buffer memory (271) of a first type for storing an uplink frame (26); and it involves, for each data frame (45) appearing in the uplink frames (26) reaching the central means (21', 359, 361), an operation (281) of writing this data frame into a said buffer memory (271) of a first type and an operation (322–325, 333–343) of putting the location of this buffer memory (271), if it is necessary to do this in accordance with a third preset selection rule, into a first queue (286) for transmission of data frames (45) by means of the said distinct transmission medium (1, 4), and into a second queue (289) for transmission of data frames (45) by means of the said shared transmission medium.

35. Method according to claim 34, characterised in that the said third preset selection rule is to put the said buffer memory (271) location systematically into the first and second queues (286, 289).

36. Method according to claim 34, characterised in that the said third preset selection rule involves putting into the said first queue (286) only the data frames (45) intended for a digital communication means (7) which is not a said peripheral means.

37. Method according to claim 34, characterised in that the said third preset selection rule involves putting into the said second queue (289) only the data frames (45) intended for a peripheral means (24, 24').

38. Method according to claim 32, characterised in that:

the said operation A) also includes making provision in the central means (21', 359, 361) for at least one buffer memory (269) of a third type for storing a data frame (12) reaching it by means of the said distinct transmission medium (1, 4); and it includes for each data frame (12) reaching it by means of the said distinct transmission medium (1, 4), an operation (358, 354) of writing this data frame (12) into a buffer memory (269) of a third type, if it is necessary to do this in accordance with a fourth preset selection rule, and an operation (319-321, 326-332) of putting the location of this buffer memory (269), if it is necessary to do this in accordance with a fifth preset selection rule, into a queue (289) for transmission of this data frame (45) by means of the said shared transmission medium.

39. Method according to claim 38, characterised in that the said fourth preset selection rule is to write all the data frames (12) reaching the central means (21', 359, 361) by means of the said distinct transmission medium, into a buffer memory (269) of a third type.

40. Method according to claim 38, characterised in that the said fourth preset selection rule is to write into a said buffer memory (269) of a third type only the data frames

(12) received by means of the said distinct transmission medium (1, 4) and intended for a peripheral means (24, 24').

41. Method according to claim 39, characterised in that the said fifth preset selection rule is to put into the said queue (289) all the locations of buffer memory (269) in which a data frame (12) received by means of the said distinct transmission medium (1, 4) has just been stored.

42. Method according to claim 39, characterised in that the said fifth preset selection rule is to put into the said queue (289) only the locations of buffer memory in which a data frame, received by means of the said distinct transmission medium (1, 4), which is intended for a said peripheral means (24, 24'), has just been stored.

43. Method according to claim 32, characterised in that the said distinct transmission medium (1, 4) is of wire.

44. Method according to claim 32, characterised in that the said distinct transmission medium (1, 4) is shared according to an access control protocol of the carrier sense multiple access/collision detection type.

45. Method according to claim 1, characterised in that the said operation A) also includes making provision in the said central means (21, 21', 359, 361) for:
a memory (58, 58') for storing a table (64, 64') having, for each peripheral means (24, 24'), an address which is specific to it; and
a connector (54, 54') in order to enter the said table into it.

46. Method according to any of claims 1 to 45, characterised in that it includes the operation, with each peripheral means (24, 24'), of carrying out for each data frame (45) which it has to be transmitted by means of the said shared transmission medium, an operation (245, 248, 240, 241) of placing this data frame in a state of awaiting transmission.

47. Method according to claim 46, characterised in that:
the said operation A) also includes making provision, for each peripheral means (24, 24'), for at least one buffer memory (182) of a fourth type for storing a data frame (45) to be transmitted by means of the said shared transmission medium, and for preparing an uplink frame (26) including this data frame;
each said operation of placing a data frame (45) in a state of awaiting transmission includes an operation (245) of writing this data frame into a said buffer memory (182) of a fourth type, and an operation (248, 240, 241) of putting the location of this buffer memory into a queue (204), and
it also includes the operation, with each peripheral means (24, 24'), of carrying out for each data frame (45) which it has to be transmitted by means of the said shared transmission medium, an operation (219) of preparing an uplink frame, including an operation (221) of waiting for the presence of a location in the said queue (204), then an operation (222) of taking the location which meets a sixth preset selection rule, then an operation (223) of writing information (43, 44) into the buffer memory (182) of a fourth type at that location.

48. Method according to claim 47, characterised in that the said sixth preset selection rule is to take the location which was the first to be put in the said queue (204).

49. Method according to claim 47, characterised in that the said sixth preset selection rule is to take the location where the data frame (45) having the highest predetermined priority level is found.

50. Method according to claim 47, characterised in that:
it includes the operation of predetermining:
an uplink frame (26) format, fixing the position of a field (46, 47) for information (43, 44), and fixing the position of a field (48) for a data frame (45);
a layout of buffer memory (182) of a fourth type, identical to the said uplink frame (26) format, and therefore fixing the position of an area (183) for information (43, 44) and the position of an area (184) for a data frame (45);
each said operation (245) of writing a data frame (45) into a said buffer memory (182) of a fourth type is carried out by writing this data frame (45) into the said area (184) for a data frame; and
each said operation (223) of writing information (43, 44) into a buffer memory (182) of a fourth type is carried out by writing this information (43, 44) into the said area (183) for information.

51. Method according to claim 50, characterised in that:
the said predetermining operation fixes an uplink frame (26) format having only a field (46, 47) for information (43, 44) and one field (48) for a data frame (45), with the said field for information which includes a field (46) for data frame length information (43) and a field (47) for additional information (44); and
each said operation (219) of preparing an uplink frame (26) ends when an operation (223) of writing information (43, 44) into a buffer memory (182) of a fourth type is complete.

52. Method according to claim 1, characterised in that it includes the operation of carrying out, with each peripheral means (24, 24'), iteratively after start-up, a series of operations including:
an operation (219) of preparing a said uplink frame (26), then
an operation (220) of transmitting an uplink frame (26).

53. Method according to claim 1, characterised in that with each said peripheral means (24, 24'), each operation (220) of transmitting an uplink frame (26) includes an operation (224, 225) of awaiting reception of a service message (31) authorising it.

54. Method according to claim 53, characterised in that each operation (220) of transmitting an uplink frame (26) includes, after the said operation (224, 225) of awaiting reception of a service message authorising it, an operation (226) of initiating the sending of a burst (49D, 391, 394, 397) transmitting this uplink frame, then an operation (227) of waiting until the sending of this burst is finished.

55. Method according to claim 54, characterised in that each operation (219) of transmitting an uplink frame (26) includes, after the said operation (227) of waiting until the sending of the burst transmitting this uplink frame is finished, an operation (228) of releasing a buffer memory (182) which has served for preparing this uplink frame.

56. Method according to claim 1, characterised in that it includes the operation, with each peripheral means (24, 24'), of carrying out for each downlink frame (25) reaching it, an operation (194, 195) of placing this downlink frame in a state of awaiting processing.

57. Method according to claim 56, characterised in that:
the said operation A) also involves making provision, for each peripheral means (24, 24'), for at least one buffer memory (181) of a fifth type for storing a downlink frame (25) and for processing any data frame included in this downlink frame;
each said operation for placing a downlink frame (25) in a state of awaiting processing includes an operation (194) of writing this downlink frame into a said buffer memory (181) of a fifth type and an operation (195) of putting the location of this buffer memory into a queue (206); and it also includes the operation, with each peripheral means (24, 24'), of carrying out for each downlink frame (25) reaching it, an operation (229-234) of processing this downlink frame, including an operation (229) of awaiting the presence of a location in the said queue (206), then an operation of taking the location which meets a seventh preset selection rule, then an operation (230, 231) of determining the presence of a data frame (28) in the buffer memory (181) of a fifth type at that location.

58. Method according to claim 57, characterised in that the said seventh preset selection rule is to take the location which was the first to be put in the said queue (206).

59. Method according to claim 57, characterised in that: it includes the operation for predetermining:
a downlink frame (25) format, fixing the position of a field (29) for a service frame (27) and fixing the position of a field (30) for a data frame (28); and
a layout of buffer memory (181) of a fifth type, identical to the said downlink frame (25) format, and therefore fixing the position of an area for a service frame (27) and the position of an area for a data frame (28); and
each said operation (194) of writing a downlink frame (25) into a buffer memory (181) of a fifth type is carried out by writing the service frame (27) from the downlink frame into the said area for a service frame and, if necessary, the data frame (28) appearing in this downlink frame, into the said area for a data frame of this buffer memory (181).

60. Method according to claim 59, characterised in that: the said predetermining operation fixes a downlink frame (25) format, in which the field (29) for a service frame (27) includes a field (35) for data frame length information (32); and
each said operation of determining the presence or not of a data frame includes an operation (230) of reading, in the said buffer memory (181) of a fifth type, the said data frame length information (32) and an operation (231) of determining whether or not the length information (32) read is equal to zero.

61. Method according to claim 58, characterised in that each said operation (229–234) of processing a downlink frame (25) includes, in the case where the said operation (230, 231) of determining the presence of a data frame is positive, an operation (232) of initiating an operation of processing this data frame.

62. Method according to claim 61, characterised in that it includes, after the said operation (232) of initiating a data frame processing operation, an operation (233) of waiting until the said processing operation is finished.

63. Method according to claim 57, characterised in that each said operation (229–234) of processing a downlink frame (25) ends when an operation (234) of releasing the buffer memory (181) which has served for storing the said downlink frame is complete.

64. Method according to claim 1, characterised in that it includes the operation, with each peripheral means (24, 24'), of carrying out, for each data frame (28) appearing in the downlink frames (25) reaching it, a data frame processing operation (232) aimed at delivering, to a terminal (23) with which this peripheral means cooperates, a sequence of data appearing in this data frame, if the latter is intended for this peripheral means.

65. Method for transmitting digital data between terminals each intended to cooperate with an individual networked communication means assigned with an address which is specific to it, each said terminal being adapted:

to deliver, in a predetermined manner, to its individual networked communication means, sequences of user data each accompanied by a destination address corresponding to the address specific to the individual networked communication means of the terminal for which the sequence of data it accompanies is intended, and/or to allow sequences of user data to be delivered to it, in a predetermined manner, by its individual networked communication means;

each said individual networked communication means being intended to send and/or receive, over a transmission medium, bursts each transmitting a stream of bits, in a manner allowing it to be identified from the first to the last bits, and being adapted:

for each said sequence of user data accompanied by a destination address which its terminal has delivered to it, to prepare a data frame (12) including, arranged according to a predetermined format, this sequence of data and the destination address which accompanies it;

for each data frame prepared, to send over the said transmission medium a burst transmitting a stream of bits including this data frame; and for each burst which it receives by the said transmission medium, to determine whether a data frame appears in the stream of bits transmitted by this burst, and if a data frame is present therein, to isolate in the latter, in accordance with the said predetermined data frame format, the said destination address which appears in it, to compare whether this address corresponds to that which is specific to it, and if there is correspondence, to isolate in this data frame (12) the sequence of data which appears there, and to deliver it to its terminal;

method characterised in that it includes operations of transmitting data frames between said individual networked communication means (24, 24', 7), which are carried out in accordance with the method according to claim 1.

66. Central digital communication device, comprising:
means for communicating with at least one peripheral digital communication device by means of a shared transmission medium, by receiving uplink frames each coming from a said peripheral device and by broadcasting downlink frames to each said peripheral device, adapted so that said uplink and downlink frames include data frames;

means for retransmitting or not, according to a first preset rule, each data frame appearing in the uplink frames reaching it, to a destination digital communication device for this data frame; and means for including in each said downlink frame:
a service message activating a protocol for controlling access for at least one first digital communication device to the shared transmission medium; and
a data frame if, according to a second preset rule, there is one to be included in this downlink frame, so that the central digital communication device is able to retransmit said data frame to a second peripheral device;

each said downlink frame thus having systematically a said service message and possibly a said data frame with independent destinations, and
wherein each said service message indicates to each said peripheral means whether or not it is authorized to transmit an uplink frame, in return, that is to say as soon as the shared medium becomes free to transmit an uplink frame after broadcast of this service message.

67. Device according to claim 66, characterised in that the said means (73, 74, 275–277) for retransmitting or not each data frame (45) appearing in the uplink frames reaching it, are adapted so that the said first preset rule is to systematically retransmit these data frames to their destination digital communication devices (24, 24', 7).

68. Device according to claim 66, characterised in that the said inclusion means (73, 275) are adapted so that the said access control protocol activated by the said service messages (31) is of the polling type.

69. Device according to claim 66, characterised in that the said inclusion means (73, 275) are adapted so that each said service message (31) indicates to each said peripheral device (24, 24') whether or not it is authorised to transmit an uplink frame (26) in return, that is to say as soon as the shared medium becomes free for transmitting an uplink frame after broadcast of this service message, each said peripheral device (24, 24') being adapted to transmit an uplink frame (26) only in return for a service message (31) so authorising it.

70. Device according to claim 69, characterised in that:
it also includes a memory (58, 58') containing a table (64, 64') including, for each said peripheral device (24, 24'), an address (11, 11') which is specific to it; and
it includes a preparation means (94, 94', 287) for authorisation-to-send messages, in order to prepare authorisation-to-send messages each indicating to a peripheral device (24, 24') having a current address (11, 11') that it is authorised to transmit an uplink frame in return, each time that a downlink frame production means (95, 140, 95', 140', 288) includes, as a service message (31), a said authorisation-to-send message, the said preparation means (94, 94', 287) taking as the current address, each time it prepares an authorisation-to-send message, a new address in the said table (64, 64').

71. Device according to claim 70, characterised in that the said preparation means (94, 94', 287) is adapted so that the said new address is the next address in the said table (64, 64'), according to a circular rotation.

72. Device according to claim 69, characterised in that it includes a preparation means (94, 94', 287) for authorisation-to-send messages in order to prepare authorisation-to-send messages each indicating to a peripheral device that it is authorised to transmit an uplink frame (26) in return, which is adapted, each time it has prepared a said authorisation-to-send message, to post it in a mailbox (97, 97', 290) of a downlink frame production means (95, 140, 95', 140', 288), and to await from the latter a signal acknowledging this authorisation-to-send message, before preparing a new one.

73. Device according to claim 72, characterised in that the said downlink frame (25) production means (95, 140, 288) is adapted, for preparing each said downlink frame, to determine the existence or not of a said authorisation-to-send message in the said mailbox (97, 290), in the affirmative, to include in this downlink frame this authorisation-to-send message as a said service message, then to send a said acknowledgement signal, and in the negative, to include in this downlink frame, as a said service message, a no-authorisation-to-send message indicating to each said peripheral device (24, 24') that it is not authorised to transmit in return.

74. Device according to claim 72, characterised in that the said downlink frame (25) production means (140', 95') is adapted, for preparing each said downlink frame, to await the existence of a said authorisation-to-send message in the said mailbox (97'), to include in this downlink frame this authorisation-to-send message as a service message, then to send a said acknowledgement signal.

75. Device according to claim 69, characterised in that the said inclusion means (73, 275) are adapted, for each said downlink frame (25), to include as a service message (31): either an authorisation-to-send message indicating to a peripheral device (24, 24') that it is authorised to transmit an uplink frame (26) in return, or a no-authorisation-to-send message indicating to each said peripheral device (24, 24') that it is not authorised to transmit in return, the said inclusion means (73, 275) being adapted, for each said downlink frame, to determine, according to a third preset rule, whether it is a said authorisation-to-send message or a said no-authorisation-to-send message which is to be included in this downlink frame.

76. Device according to claim 75, characterised in that:
it has at least one buffer memory (68, 269, 271) for storing a data frame (12, 45) to be transmitted to a peripheral device (24, 24'); and
the said inclusion means (73, 275) are adapted so that the said third preset rule is to include a said no authorisation to send message when a predetermined number of said buffer memory (68, 269, 271) is (are) occupied.

77. Device according to claim 66, characterised in that the said means (73, 74, 275–277) for retransmitting or not each data frame (45) appearing in the uplink frames (28) reaching it are adapted to place each of these frames in a state of awaiting retransmission; and
the said inclusion means (73, 275) are adapted, for preparing each said downlink frame, to include in it a data frame (28), if there is at least one awaiting retransmission at the time the downlink frame is prepared, the said second preset rule being to include in a downlink frame (25) a data frame (28) as soon as there is one awaiting retransmission.

78. Device according to claim 77, characterised in that:
it has:
at least one buffer memory (68, 271) of a first type for storing an uplink frame (26) and for preparing a downlink frame (25) including a data frame (28); and
a buffer memory (70, 267) of a second type for preparing a downlink frame (25) with no data frame;
the said means (73, 74, 275–277) for retransmitting or not are adapted, for placing in a state of awaiting retransmission each data frame (45) appearing in the uplink frames, to write each said data frame into a said buffer memory (68, 271) of a first type, and to put into a queue (96, 289) the location of this buffer memory (68, 271); and
the said inclusion means (73, 275) are adapted, for preparing each said downlink frame, to determine the presence or not of a location in the said queue (96, 289), in the affirmative to take the location which meets a first preset selection rule, then to write a service message (31) into the buffer memory (68, 271) of a first type situated at that location, and in the negative, to write a service message (31) into the buffer memory (70, 267) of a second type.

79. Device according to claim 78, characterised in that the said inclusion means (73, 275) are adapted so that the said first preset selection rule is to take the location which was the first to be put into the said queue (96, 289).

80. Device according to claim 78, characterised in that the said inclusion means (73, 275) are adapted so that the said first preset selection rule is to take the location where the data frame (45) having the highest predetermined priority level is found.

81. Device according to claim 66, characterised in that:
  it has a sending/receiving means (74, 276) adapted to cooperate with a said shared transmission medium which is half-duplex, that is to say a medium which is free to transmit a downlink or uplink frame only when there is neither transmission of a downlink frame, nor of an uplink frame;
  it has an authorization checking means (111, 111') for determining continuously whether or not a period of authorization to transmit a downlink frame (25) is currently elapsing, such a period being in the course of elapsing at all times except between each:
    first instant at the end of transmission of a downlink frame (25) which contains a service message (31) indicating that a said peripheral device (24, 24') is authorised to transmit an uplink frame (26) in return, that is to say as soon as the shared medium becomes free for transmitting an uplink frame after broadcast of this service message, and
    second instant when either a period of predetermined length (T) from the first instant has passed without the central device having received an uplink frame (26), or the central device has finished receiving an uplink frame which it started to receive before the said period of predetermined length (T) had elapsed; and
  it has a downlink frame transmitting means (112, 142, 112', 142') which is adapted, for each downlink frame, to transmit it by starting with a wait if there is reason for a said period of authorization to be in the course of elapsing.

82. Device according to claim 81, characterised in that the said downlink frame transmitting means (112, 142, 112', 142') is adapted, for each downlink frame, after having waited if there is reason for a period of authorization to be in the course of elapsing, to initiate the sending of a burst (49A, 49B, 49C) transmitting this downlink frame, then to wait until the sending of this burst is finished.

83. Device according to claim 82, characterised in that the said downlink frame transmitting means (112, 142, 112', 142') is adapted, for each said downlink frame, after having waited until the sending of the burst transmitting it is finished, to release, if this downlink frame contains a data frame (28), a buffer memory (68, 269, 271) which has served for storing this data frame and for preparing this downlink frame.

84. Device according to claim 66, characterised in that:
  it has a sending/receiving means adapted to cooperate with a said shared transmission medium which is full duplex, that is to say a medium which is free for transmitting a downlink frame independently of the transmission of an uplink frame, and vice-versa;
  it has an authorization checking means for determining continuously whether or not a period of authorization to transmit a downlink frame is currently elapsing, such a period being in the course of elapsing at all times except between each:
    first instant at the end of transmission of a downlink frame which contains a service message indicating that a said peripheral device (24, 24') is authorised to transmit an uplink frame in return, that is to say as soon as the broadcast of this service message is finished, and when the central means is then in the operation of receiving an uplink frame, and
    second instant when the central means has finished receiving this uplink frame; and
  it has a downlink frame transmitting means adapted, for each downlink frame, to transmit it by starting with a wait if there is reason for a said period of authorization to be in the course of elapsing.

85. Device according to claim 84, characterised in that the said transmitting means is adapted, for each downlink frame, after having waited if there is reason for a period of authorization to be in the course of elapsing, to initiate the sending of a burst (370A-370D) transmitting this downlink frame, then:
  in the case where this downlink frame contains a service message indicating that a said peripheral means (24, 24') is authorised to transmit an uplink frame in return, to wait for a predetermined moment during the sending of this burst, then to wait a predetermined time (TR), then to wait if necessary until the sending of this burst is finished; or
  in the contrary case, to wait immediately until the sending of this burst is finished.

86. Device according to claim 85, characterised in that the said transmitting means is adapted, for each downlink frame, after having waited until the sending of the burst transmitting it is finished, to release, if this downlink frame contains a data frame (28), a buffer memory (68, 269, 271) which has served for storing this data frame and for preparing this downlink frame.

87. Device according to claim 66, characterised in that it has a sending/receiving means (74, 276) adapted to cooperate with a said shared transmission medium which is wireless.

88. Device according to claim 87, characterised in that the said sending/receiving means (74, 276) is adapted to encode the streams of bits which it transmits by means of the said medium, by spectrum spreading.

89. Device according to claim 66, characterised in that:
  it also has means (275, 277) for communicating with at least one digital communication device (7) which is not a said peripheral device, by means of a transmission medium (1, 4) distinct from the said shared transmission medium, by sending and/or receiving data frames (12); and
  means (275–277) for retransmitting or not:
    according to the said first preset rule, each data frame (45), appearing in the uplink frames (26) reaching it, intended for a said digital communication device (7) which is not a peripheral device, by means of the said distinct transmission medium (1, 4); and
    according to a fourth preset rule, each data frame (12) which it receives by means of the said distinct transmission medium (1, 4), intended for a peripheral device (24, 24'), by means of the said shared transmission medium.

90. Device according to claim 89, characterised in that the said means (275–277) for retransmitting or not are adapted so that the said fourth preset rule is to retransmit systematically the data frames (12) reaching it by means of the said distinct transmission medium (1, 4) to the destination peripheral means (24, 24').

91. Device according to claim 89, characterised in that:
  it has at least one buffer memory (271) of a first type for storing an uplink frame;
  it has a means (276) for writing each data frame (45) appearing in the uplink frames (26) reaching it, into a said buffer memory (271) of a first type; and
  it has a buffer memory management means (284), for putting the location of a said buffer memory (271) of a first type in which a data frame (45) appearing in an uplink frame (26) has just been stored, if there is reason to do this in accordance with a third preset selection rule, into a first queue (286) for transmission of data frames (45) by means of the said distinct transmission medium (1, 4), and into a second queue for transmission of data frames (45) by means of the said shared transmission medium.

92. Device according to claim 91, characterised in that the said buffer memory management means (284) is adapted so that the said third preset selection rule is to put the said buffer memory (271) location systematically into the first and second queues (286, 289).

93. Device according to claim 91, characterised in that the said buffer memory management means (284) is adapted so that the said third preset selection rule is to put into the said first queue (286) only the data frames (45) intended for a digital communication device (7) which is not a said peripheral device.

94. Device according to claim 91, characterised in that the said buffer memory management means (284) is adapted so that the said third preset selection rule consists of putting into the said second queue (289), only the data frames (45) intended for a peripheral device (24, 24').

95. Device according to any one of claims 89 to 94, characterised in that:
   it has at least one buffer memory (269) of a third type for storing a data frame (12) reaching it by means of the said distinct transmission medium (1, 4); and
   it has a means (277) for writing each data frame (12) reaching it by means of the said distinct transmission medium (1, 4), into a buffer memory (269) of third type, if there is reason to do this in accordance with a fourth preset selection rule; and
   it has a buffer memory management means (284), for putting the location of each buffer memory (269) in which a data frame (12) received by means of the said distinct transmission medium (1, 4) has just been stored, if it is necessary to do this in accordance with a fifth preset selection rule, into a queue (289) for transmission of this data frame (45) by means of the said shared transmission medium.

96. Device according to claim 95, characterised in that the said buffer memory management means (284) is adapted so that the said fourth preset selection rule is to write all the data frames (12) reaching it by means of the said distinct transmission medium, into a buffer memory (269) of a third type.

97. Device according to claim 96, characterised in that the said buffer memory management means (284) is adapted so that the said fourth preset selection rule is to write into a said buffer memory (269) of a third type only the data frames (12) received by means of the said distinct transmission medium (1, 4) and intended for a peripheral device (24, 24').

98. Device according to claim 96, characterised in that the said buffer memory management means (284) is adapted so that the said fifth preset selection rule is to put into the said queue (289) all the locations of buffer memory (269) in which a data frame (12) received by means of the said distinct transmission medium (1, 4) has just been stored.

99. Device according to claim 96, characterised in that the said buffer memory management means (284) is adapted so that the said fifth preset selection rule is to put into the said queue (289) only the locations of buffer memory in which a data frame, received by means the said distinct transmission medium (1, 4), which is intended for a said peripheral device (24, 24'), has just been stored.

100. Device according to claim 89, characterised in that it has a means for sending/receiving on the said distinct transmission medium (1, 4), which is adapted to cooperate with a wired transmission medium.

101. Device according to claim 89, characterised in that it has a sending/receiving means (277) adapted to cooperate with the said distinct transmission medium (1, 4) according to an access control protocol of the carrier sense multiple access/collision detection type.

102. Device according to claim 66, characterised in that it has:
   a memory (58, 58') for storing a table (64, 64') having, for each peripheral device (24, 24'), an address which is specific to it; and
   a connector (54, 54') in order to enter the said table into it.

103. Peripheral digital communication device suitable for implementing the method according to claim 1, as a said peripheral digital communication means, characterised in that it has:
   means (185, 186) for communicating with a central digital communication device (21, 21', 359, 361) by means of a shared transmission medium, by transmission of uplink frames (26) to the said central device and by reception of downlink frames (25) from the said central device, adapted so that said uplink and downlink frames (26, 25) include data frames (45, 28);
   means (185) for including in the uplink frames (26) which it transmits, data frames (45) intended for a digital communication device (24, 24', 7) other than the said central device; and
   means (185, 186) for extracting from each said downlink frame (25) reaching it:
      a service message (31) activating a protocol for controlling access to the said shared transmission medium; and
      a data frame (28), if there is one included in this downlink frame;
   each said downlink frame having systematically a said service message (31) and possibly a said data frame (28).

104. Device according to claim 103, characterised in that the said communication means (185, 186) are adapted to communicate, by means of the said shared transmission medium, only with the said central device (21, 21', 359, 361).

105. Device according to claim 103, characterised in that it is adapted so that the access control protocol activated by the said service messages (31) is of the polling type.

106. Device according to any one of claims 103 to 105, characterised in that it has an uplink frame (26) production means (203) adapted:
   for each said service message (31) extracted from a downlink frame (25), to determine whether or not this service message authorises it to transmit an uplink frame (26), in return, that is to say as soon as the shared medium becomes free to transmit an uplink frame after broadcast of this service message; and
   to transmit an uplink frame (26) only in return for a service message (31) authorising it to do so.

107. Device according to claim 103, characterised in that it has means (187, 185) for placing in a state of awaiting transmission each data frame (45) which it has to be transmitted by means of the said shared transmission medium.

108. Device according to claim 107, characterised in that it has at least one buffer memory (182) of a fourth type for storing a data frame (45) to be transmitted by means of the said shared transmission medium, and for preparing an uplink frame (26) including this data frame;

the said means (187, 185) for placing in a state of awaiting transmission a data frame to be transmitted by means of the said shared transmission medium, has means (187) for writing each said data frame into a buffer memory (182) of a fourth type, and means (187, 202) for putting the location of this buffer memory into a queue (204); and the said uplink frame (26) production means (203) are also adapted, for each data frame (45) to be transmitted by means of the said shared transmission medium, to prepare an uplink frame, by waiting for the presence of a location in the said queue (204), then by taking the location which meets a sixth preset selection rule, then by writing information (43, 44) into the buffer memory (182) of a fourth type at that location.

109. Device according to claim 108, characterised in that the said uplink frame production means (203) are adapted so that the said sixth preset selection rule is to take the location which was the first to be put in the said queue (204).

110. Device according to claim 108, characterised in that the said uplink frame production means (203) are adapted so that the said sixth preset selection rule is to take the location where the data frame (45) having the highest predetermined priority level is found.

111. Device according to claim 103, characterised in that it has uplink frame production means (203) adapted, for each uplink frame, to prepare it and then to transmit it.

112. Device according to claim 103, characterised in that it is adapted to wait for reception of a service message authorising it to transmit an uplink frame in return, in order to transmit such a frame.

113. Device according to claim 112, characterised in that in order to transmit an uplink frame, it is adapted, after having waited for reception of a service message authorising it to transmit such a frame, to initiate the sending of a burst (49D, 391, 394, 397) transmitting this uplink frame, and then to wait until the sending of this burst is finished.

114. Device according to claim 113, characterised in that it is adapted, in order to transmit an uplink frame, after having waited until the sending of the burst transmitting this uplink frame is finished, to release a buffer memory (182) which has served for preparing this uplink frame.

115. Device according to claim 103, characterised in that it has means (189) for placing in a state of awaiting processing each downlink frame (25) reaching it.

116. Device according to claim 115, characterised in that:

it has at least one buffer memory (181) of a fifth type for storing a downlink frame (25) and for processing any data frame included in this downlink frame;

the said means (189) of placing in a state of awaiting processing are adapted, for each downlink frame reaching it, to write this downlink frame into a said buffer memory of a fifth type;

it has means (189, 201) for putting into a queue (206), for each downlink frame reaching it, the location of the buffer memory (181) of a fifth type into which this downlink frame has been written; and it has data frame production means (205) adapted to wait for the presence of a location in the said queue (206), then to take the location which meets a seventh preset selection rule, then to determine the presence of a data frame in the buffer memory (181) of a fifth type at that location.

117. Device according to claim 116, characterised in that the said data frame production means (205) are adapted so that the said seventh preset selection rule is to take the location which was the first to be put in the said queue (206).

118. Device according to claim 117, characterised in that the said data frame production means (205) are adapted, after having determined the presence of a data frame in a said buffer memory, to initiate an operation of processing this data frame.

119. Device according to claim 117, characterised in that the said data frame production means (205) are adapted, after having initiated the said operation of processing a data frame, to wait until the said processing operation is finished.

120. Device according to claim 119, characterised in that the said data frame production means (205) are adapted, after having waited until the said processing operation is finished, to release the buffer memory (181) which has served for storing the said downlink frame.

121. Device according to claim 103, characterised in that it is adapted, for each data frame (28) appearing in the downlink frames reaching it, to operation this data frame in order to deliver to a terminal (23) with which it cooperates, a sequence of data appearing in this data frame, if the latter is intended for it.

122. Device according to claim 103, characterised in that it has a sending/receiving means (186) adapted to cooperate with a said shared transmission medium which is wireless.

123. Device according to claim 122, characterised in that the said sending/receiving means (186) is adapted to encode the streams of bits which it transmits by means of the said medium, by spectrum spreading.

124. Digital communication system comprising digital communication means, wherein at least one said digital communication means is a peripheral digital communication means, each said peripheral digital communication means transmitting and/or receiving data frames by means of a shared transmission medium, wherein a central digital communication means communicates with each said peripheral digital communication means by means of the said shared transmission medium by receiving uplink frames each coming from a said peripheral means and by broadcasting downlink frames to each said peripheral digital communication means, wherein the said central means retransmits, or not, according to a first pre-set rule, each data frame appearing in the uplink frames reaching it, to a destination digital communication means for this data frame, and wherein the said central means includes, in each said downlink frame:

a service message activating a protocol for controlling access of at least one first digital communication means to the shared transmission medium; and a data frame if, according to a second preset rule, there is one to be included in this downlink frame, so that the central digital communication means is able to retransmit said data frame to a second peripheral means, each said downlink frame thus having systematically a said service message and possibly a said data frame with independent destinations; and wherein each said service message indicates to each said peripheral means whether or not it is authorized to transmit an uplink frame, in return, that is to say as soon as the shared medium becomes free to transmit an uplink frame after broadcast of this service message.

* * * * *

UNITED STATES PATENT AND TRADEMARK OFFICE
CERTIFICATE OF CORRECTION

PATENT NO.   :   6,122,267
DATED        :   September 19, 2000
INVENTOR(S)  :   ANNE ABIVEN ET AL.

It is certified that error appears in the above-identified patent and that said Letters Patent is hereby corrected as shown below:

FIGURE 18:

SHEET 12, "D FR" should read --DFR-- and "WICH" should read --WHICH--.

FIGURE 21:

SHEET 15, "WICH" should read --WHICH--.

FIGURE 30:

SHEET 23, "IN" should be deleted.

FIGURE 65:

SHEET 58, "ROUTEUR" should read --ROUTER--.

COLUMN 7:

Line 9, "particularly" should read --particular--; and
    Line 58, "-so-" should read ---to---.

COLUMN 24:

Line 24, "and" (second occurrence) should read --an--.

COLUMN 37:

Line 22, "one or other these" should read --one or the other of these--.

UNITED STATES PATENT AND TRADEMARK OFFICE
CERTIFICATE OF CORRECTION

PATENT NO. : 6,122,267
DATED : September 19, 2000
INVENTOR(S) : ANNE ABIVEN ET AL.

It is certified that error appears in the above-identified patent and that said Letters Patent is hereby corrected as shown below:

COLUMN 39:

Line 8, "an" should read --a--.

COLUMN 46:

Line 36, "an" should read --a--.

COLUMN 50:

Line 1, "replied," should read --reply,--.

COLUMN 59:

Line 27, "claims 1 to 45," should read --claim 1,--.

COLUMN 64:

Line 23, "memory" should read --memory(ies)--.

COLUMN 67:

Line 24, "claims 89 to 94," should read --claim 89,--.

COLUMN 68:

Line 49, "claims 103 to 105," should read --claim 103,--.

UNITED STATES PATENT AND TRADEMARK OFFICE
CERTIFICATE OF CORRECTION

PATENT NO.   : 6,122,267
DATED        : September 19, 2000
INVENTOR(S)  : ANNE ABIVEN ET AL.

It is certified that error appears in the above-identified patent and that said Letters Patent is hereby corrected as shown below:

COLUMN 70:

Line 18, "operation" should read --operate--.

Signed and Sealed this

Twenty-second Day of May, 2001

Attest:

NICHOLAS P. GODICI

*Attesting Officer*    *Acting Director of the United States Patent and Trademark Office*